(12) United States Patent
Murakami et al.

(10) Patent No.: US 12,191,945 B2
(45) Date of Patent: *Jan. 7, 2025

(54) TRANSMISSION DEVICE AND TRANSMISSION METHOD

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP); Hiroyuki Motozuka, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,965

(22) Filed: Nov. 13, 2023

(65) Prior Publication Data

US 2024/0129003 A1 Apr. 18, 2024

Related U.S. Application Data

(63) Continuation of application No. 18/097,644, filed on Jan. 17, 2023, now Pat. No. 11,863,264, which is a (Continued)

(51) Int. Cl.
*H04B 7/0456* (2017.01)
*H04B 7/0413* (2017.01)
(Continued)

(52) U.S. Cl.
CPC ......... *H04B 7/0456* (2013.01); *H04B 7/0413* (2013.01); *H04B 7/0417* (2013.01); *H04B 7/0615* (2013.01)

(58) Field of Classification Search
None
See application file for complete search history.

(56) References Cited

U.S. PATENT DOCUMENTS 8,638,875 B1   1/2014 Zhang et al.
2005/0129068 A1   6/2005 Ginzburg et al.
(Continued)

FOREIGN PATENT DOCUMENTS

EP   2 854 318   4/2015
EP   2854318 A1 * 4/2015 ............. H04B 7/022
(Continued)

OTHER PUBLICATIONS

International Search Report (ISR) issued on Aug. 29, 2017 in International (PCT) Application No. PCT/JP2017/022771.
(Continued)

*Primary Examiner* — Adolf Dsouza
(74) *Attorney, Agent, or Firm* — Wenderoth, Lind & Ponack, L.L.P.

(57) ABSTRACT

A transmission device includes: a weighting synthesizer that generates a first precoded signal and a second precoded signal; a first pilot inserter that inserts a pilot signal into the first precoded signal; a phase changer that applies a phase change of $i \times \Delta\lambda$ to the second precoded signal, where i is a symbol number and an integer that is greater than or equal to 0; an inserter that inserts a pilot signal into the phase-changed second precoded signal; and a phase changer that applies a phase change to the phase-changed and pilot-signal-inserted second precoded signal. $\Delta\lambda$ satisfies $\pi/2$ radians$<\Delta\lambda<\pi$ radians or $\pi$ radians$<\Delta\lambda<3\pi/2$ radians.

3 Claims, 81 Drawing Sheets

Related U.S. Application Data continuation of application No. 17/500,190, filed on Oct. 13, 2021, now Pat. No. 11,601,168, which is a continuation of application No. 16/791,312, filed on Feb. 14, 2020, now Pat. No. 11,184,060, which is a continuation of application No. 16/235,236, filed on Dec. 28, 2018, now Pat. No. 10,790,887, which is a continuation of application No. PCT/JP2017/022771, filed on Jun. 21, 2017.

(60) Provisional application No. 62/432,895, filed on Dec. 12, 2016, provisional application No. 62/419,166, filed on Nov. 8, 2016, provisional application No. 62/417,699, filed on Nov. 4, 2016, provisional application No. 62/372,953, filed on Aug. 10, 2016, provisional application No. 62/356,779, filed on Jun. 30, 2016.

(51) Int. Cl.
*H04B 7/0417* (2017.01)
*H04B 7/06* (2006.01)

(56) References Cited

U.S. PATENT DOCUMENTS

| | | |
|---|---|---|
| 2009/0046788 A1 | 2/2009 | Kotecha |
| 2009/0156227 A1 | 6/2009 | Frerking et al. |
| 2009/0232194 A1 | 9/2009 | Yoshida |
| 2010/0014413 A1* | 1/2010 | Castelain ............ H04L 27/2636 370/208 |
| 2010/0034152 A1 | 2/2010 | Imamura |
| 2010/0091919 A1 | 4/2010 | Xu et al. |
| 2010/0195604 A1* | 8/2010 | Papasakellariou .... H04L 5/0023 370/329 |
| 2011/0200071 A1 | 8/2011 | Hamaguchi et al. |
| 2012/0263140 A1 | 10/2012 | Nishio et al. |
| 2012/0300877 A1 | 11/2012 | Murakami et al. |
| 2013/0083867 A1 | 4/2013 | Frenne |
| 2013/0089164 A1 | 4/2013 | Murakami et al. |
| 2013/0195066 A1 | 8/2013 | Lee |
| 2014/0205038 A1 | 7/2014 | Nakamura et al. |
| 2014/0219318 A1 | 8/2014 | Hamaguchi et al. |
| 2014/0348257 A1 | 11/2014 | Murakami et al. |
| 2015/0092884 A1 | 4/2015 | Murakami et al. |
| 2016/0248490 A1 | 8/2016 | Murakami et al. |
| 2016/0294417 A1 | 10/2016 | Suzuki |
| 2017/0155436 A1 | 6/2017 | Murakami et al. |
| 2018/0062714 A1 | 3/2018 | Murakami et al. |
| 2019/0207659 A1 | 7/2019 | Murakami et al. |
| 2021/0105048 A1 | 4/2021 | Murakami et al. |
| 2023/0036708 A1 | 2/2023 | Murakami et al. |
| 2023/0379019 A1 | 11/2023 | Murakami et al. |

FOREIGN PATENT DOCUMENTS

| | | |
|---|---|---|
| EP | 3 361 657 | 8/2018 |
| JP | 2012-034319 A | 2/2012 |
| JP | 2013-038666 A | 2/2013 |
| WO | 2010/016355 A1 | 2/2010 |

OTHER PUBLICATIONS

David Vargas, et al., "MIMO for DVB-NGH, The Next Generation Mobile TV Broadcasting", IEEE Communications Magazine, vol. 51, No. 7, pp. 130-137, Jul. 2013.

Armin Dammann, et al., "Standard Conformable Antenna Diversity Techniques for OFDM and its Application to the DVB-T System", IEEE Globecom 2001, pp. 3100-3105, Nov. 2001.

IEEE P802.11n™/D3.00, Draft Standard for Information Technology—Telecommunications and information exchange between systems—Local and metropolitan area networks—Specific requirements—, Part 11: Wireless LAN Medium Access Control (MAC) and Physical Layer (PHY) specifications, Sep. 2007.

Extended European Search Report issued May 14, 2019 in corresponding European Patent Application No. 17819973.3.

European Search Report dated Aug. 18, 2021 in corresponding European patent application No. 21167821.4.

3GPP TS 38.211 V0.0.1, "$3^{rd}$ Generation Partnership Project; Technical Specification Group Radio Access Network; NR; Physical channels and modulation (Release 15)", Jun. 2017, 23 pages.

3GPP TS 38.331 V15.1.0, "$3^{rd}$ Generation Partnership Project; Technical Specification Group Radio Access Network; NR; Radio Resource Control (RRC) protocol specification (Release 15)", Mar. 2018, 268 pages.

3GPP TSG-RAN WG1 Meeting #84, R1-161563, "Introduction of LC/CE MTC", St Julian's, Malta, Feb. 15-19, 2016, 127 pages.

3GPP TSG-RAN WG1 Meeting #84, R1-161558, "Introduction of NB-IoT", St Julian's, Malta, Feb. 15-19, 2016, 16 pages.

* cited by examiner

TRANSMISSION DEVICE AND TRANSMISSION METHOD

CROSS REFERENCE TO RELATED APPLICATIONS

This application is a continuation of U.S. application Ser. No. 18/097,644, filed Jan. 17, 2023, which is a continuation of U.S. application Ser. No. 17/500,190, filed Oct. 13, 2021, now U.S. Pat. No. 11,601,168, which is a continuation of U.S. application Ser. No. 16/791,312, filed Feb. 14, 2020, now U.S. Pat. No. 11,184,060, which is a continuation of U.S. application Ser. No. 16/235,236, filed Dec. 28, 2018, now U.S. Pat. No. 10,790,887, which is a U.S. continuation application of PCT International Patent Application Number PCT/JP2017/022771 filed on Jun. 21, 2017, claiming the benefit of priority of U.S. Provisional Application No. 62/356,779 filed on Jun. 30, 2016, U.S. Provisional Application No. 62/372,953 filed on Aug. 10, 2016, U.S. Provisional Application No. 62/417,699 filed on Nov. 4, 2016, U.S. Provisional Application No. 62/419,166 filed on Nov. 8, 2016, and U.S. Provisional Application No. 62/432,895 filed on Dec. 12, 2016, the entire contents of which are hereby incorporated by reference.

BACKGROUND

1. Technical Field

The present disclosure relates in particular to transmission devices and reception devices that communicate by using multiple antennas.

2. Description of the Related Art

In a line of sight (LOS) environment in which a direct wave is dominant, one example of a communications method that uses multiple antennas is the multiple-input multiple-output (MIMO) communications method, and one example of a transmission method for achieving favorable reception quality is the method disclosed in "MIMO for DVB-NGH, the next generation mobile TV broadcasting," IEEE Commun. Mag., vol. 57, no. 7, pp. 130-137, July 2013.

FIG. 17 illustrates one example of a configuration of a transmission device based on the Digital Video Broadcasting•Next Generation Handheld (DVB-NGH) standard, in a case where there are two transmitting antennas and two transmission modulated signals (transmission streams). This example is disclosed in "MIMO for DVB-NGH, the next generation mobile TV broadcasting," IEEE Commun. Mag., vol. 57, no. 7, pp. 130-137, July 2013. In the transmission device, data 003 encoded by encoder 002 is split into data 005A and data 005B by splitter 004. Data 005A is interleaved by interleaver 004A and mapped by mapper 006A. Similarly, data 005B is interleaved by interleaver 004B and mapped by mapper 006B. Weighting synthesizers 008A, 008B receive inputs of mapped signals 007A, 007B, and weighting synthesize these signals to generate weighting synthesized signals 009A, 016B. The phase of weighting synthesized signal 016B is then changed. Then, radio units 010A, 010B perform processing related to orthogonal frequency division multiplexing (OFDM) and processing such as frequency conversion and/or amplification, and transmit transmission signal 011A from antenna 012A and transmission signal 011B from antenna 012B.

The conventional configuration does not consider transmitting single stream signals together. In such a case, in particular, it is favorable to implement a new transmission method for improving data reception quality in the reception device that receives the single stream.

SUMMARY

The present disclosure relates to a transmission method used when transmitting a combination of single stream signals and multi-stream signals under the use of a multi-carrier transmission scheme, such as OFDM, and via this, has an object to improve single stream data reception quality and multi-stream data reception quality in a propagation environment including LOS (line of sight).

A transmission device according to the present disclosure includes: a weighting synthesizer that generates a first precoded signal and a second precoded signal by performing a precoding process on a first baseband signal and a second baseband signal, respectively; a first pilot inserter that inserts a pilot signal into the first precoded signal; a first phase changer that applies a phase change of $i \times \Delta\lambda$ to the second precoded signal, where i is a symbol number and an integer that is greater than or equal to 0; a second pilot inserter that inserts a pilot signal into the second precoded signal applied with the phase change; and a second phase changer that applies a phase change to the second precoded signal applied with the phase change and inserted with the pilot signal. $\Delta\lambda$ satisfies $\pi/2$ radians$<\Delta\lambda<\pi$ radians or $\pi$ radians$<\Delta\lambda<3\pi/2$ radians.

A transmission method according to the present disclosure includes: generating a first precoded signal and a second precoded signal by performing a precoding process on a first baseband signal and a second baseband signal, respectively; inserting a pilot signal into the first precoded signal; applying a phase change of $i \times \Delta\lambda$ to the second precoded signal, where i is a symbol number and an integer that is greater than or equal to 0; inserting a pilot signal into the second precoded signal applied with the phase change; and applying a phase change to the second precoded signal applied with the phase change and inserted with the pilot signal. $\Delta\lambda$ satisfies $\pi/2$ radians$<\Delta\lambda<\pi$ radians or $\pi$ radians$<\Delta\lambda<3\pi/2$ radians.

In this way, according to the present disclosure, it is possible to provide a high-quality communications service since it is possible to improve single stream data reception quality and improve multi-stream data reception quality in a propagation environment including LOS (line of sight).

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments according to the present disclosure will be described in detail with reference to the drawings.

Embodiment 1

A transmission method, transmission device, reception method, and reception device according to this embodiment will be described in detail.

Figure 1:
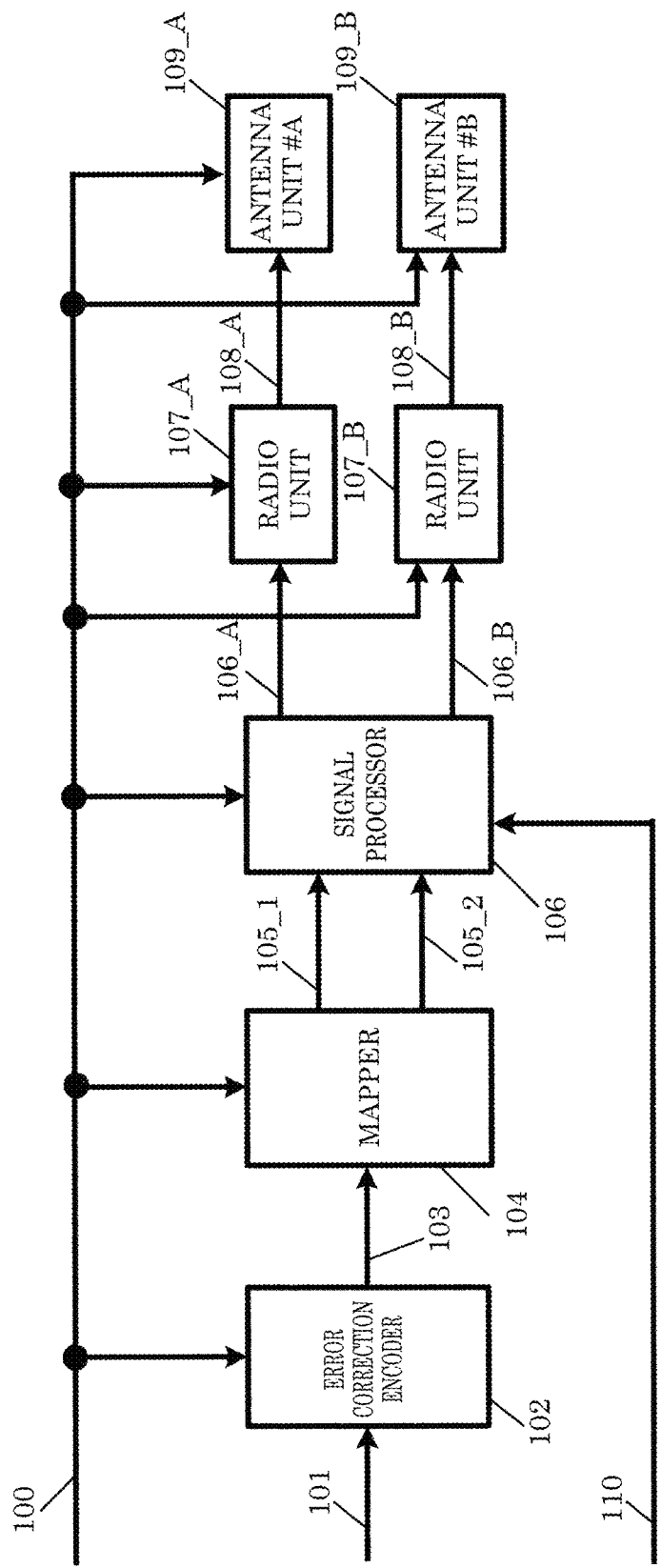
FIG. 1 illustrates one example of a configuration of a transmission device according to an embodiment.

FIG. 1 illustrates one example of a configuration of a transmission device according to this embodiment, such as a base station, access point, or broadcast station. Error correction encoder 102 receives inputs of data 101 and control signal 100, and based on information related to the error correction code included in control signal 100 (e.g., error correction code information, code length (block length), encode rate), performs error correction encoding, and outputs encoded data 103. Note that error correction encoder 102 may include an interleaver. In such a case, error correction encoder 102 may rearrange the encoded data before outputting encoded data 103.

Mapper 104 receives inputs of encoded data 103 and control signal 100, and based on information on the modulated signal included in control signal 100, performs mapping in accordance with the modulation scheme, and outputs mapped signal (baseband signal) 105_1 and mapped signal (baseband signal) 105_2. Note that mapper 104 generates mapped signal 1051 using a first sequence and generates mapped signal 105_2 using a second sequence. Here, the first sequence and second sequence are different.

Signal processor 106 receives inputs of mapped signals 105_1 and 105_2, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 2 later.

Radio unit 107_A receives inputs of signal-processed signal 106_A and control signal 100, and based on control signal 100, processes signal-processed signal 106_A and outputs transmission signal 108_A. Transmission signal 108_A is then output as radio waves from antenna unit #A (109_A).

Similarly, radio unit 107_B receives inputs of signal-processed signal 106_B and control signal 100, and based on control signal 100, processes signal-processed signal 106_B and outputs transmission signal 108_B. Transmission signal 108_B is then output as radio waves from antenna unit #B (109_B).

Antenna unit #A (109_A) receives an input of control signal 100. Here, based on control signal 100, antenna unit #A (108_A) processes transmission signal 108_A and outputs the result as radio waves. However, antenna unit #A (109_A) may not receive an input of control signal 100.

Similarly, antenna unit #B (109_1B) receives an input of control signal 100. Here, based on control signal 100, antenna unit #B (108_B) processes transmission signal 108_B and outputs the result as radio waves. However, antenna unit #B (109_1B) may not receive an input of control signal 100.

Note that control signal 100 may be generated based on information transmitted by a device that is the communication partner in FIG. 1, and, alternatively, the device in FIG. 1 may include an input unit, and control signal 100 may be generated based on information input from the input unit.

Figure 2:
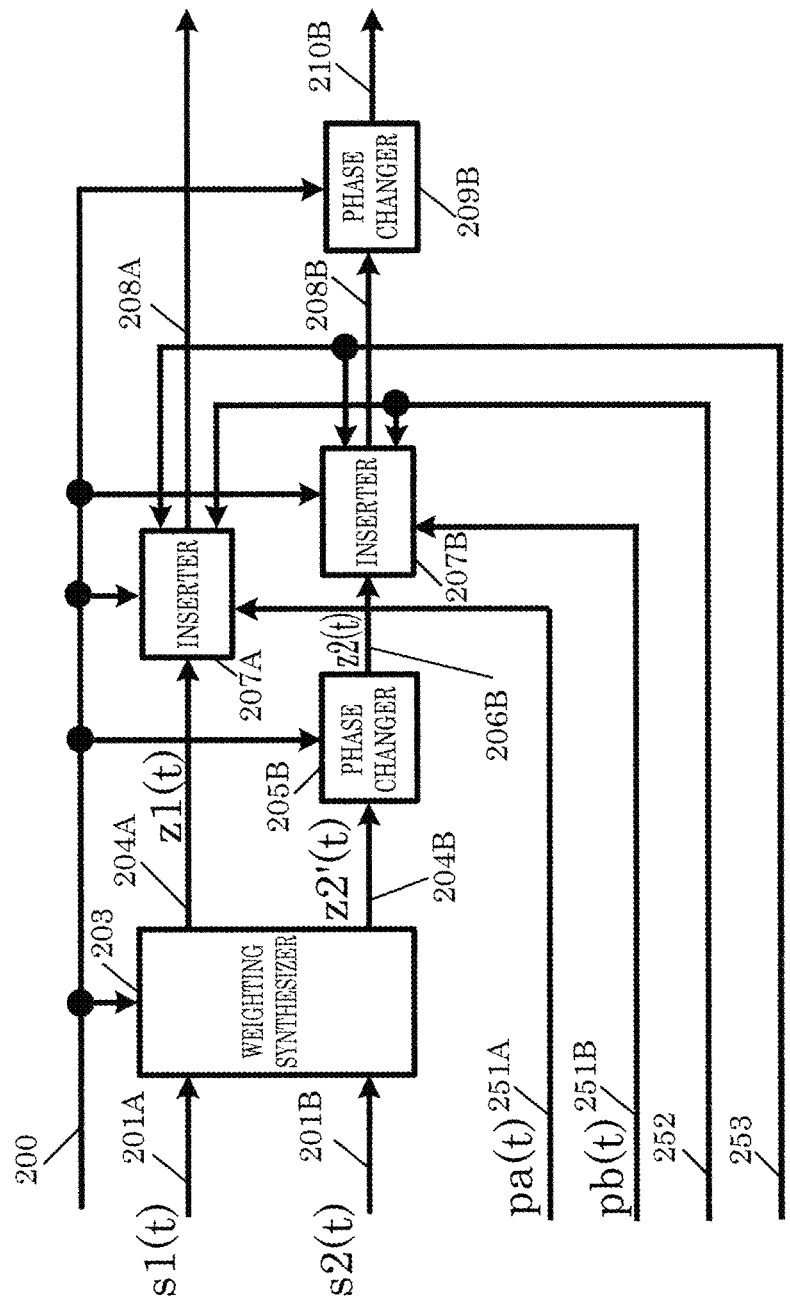
FIG. 2 illustrates one example of a configuration of the signal processor illustrated in FIG. 1.

FIG. 2 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time (s1(t), s2(t), z1(t), and z2'(t) are defined as complex numbers (accordingly, they may be real numbers)).

Weighting synthesizer (precoder) 203 performs the following calculation.

[MATH. 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \qquad \text{Equation (1)}$$

In Equation (1), a, b, c, and d can be defined as complex numbers. Accordingly, a, b, c, and d are complex numbers (and may be real numbers). Note that i is a symbol number.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2(i). Accordingly, z2(i) can be expressed as z2(i)=y(i)×z2'(i) (i is a symbol number (i is an integer that is greater than or equal to 0)).

For example, the phase change value is set as shown below (N is an integer that is greater than or equal to 2, N is a phase change cycle)(when N is set to an odd number greater than or equal to 3, data reception quality may improve).

[MATH. 2]

$$y(i) = e^{j\frac{2\times\pi\times i}{N}} \qquad \text{Equation (2)}$$

(j is an imaginary number unit.)

However, Equation (2) is merely a non-limiting example. Here, phase change value $y(i)=e^{j\times\delta(i)}$.

Here, z1(i) and z2(i) can be expressed with the following equation.

[MATH. 3]

$$\begin{pmatrix} z1(i) \\ z2'(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix} \qquad \text{Equation (3)}$$

$$= \begin{pmatrix} 1 & 0 \\ 0 & e^{j\times\delta(i)} \end{pmatrix} \begin{pmatrix} a & b \\ c & d \end{pmatrix} \begin{pmatrix} s1(i) \\ s2(i) \end{pmatrix}$$

Note that $\delta(i)$ is a real number. z1(i) and z2(i) are transmitted from the transmission device at the same time and using the same frequency (same frequency band).

In Equation (3), the phase change value is not limited to the value used in Equation (2); for example, a method in which the phase is changed cyclically or regularly is conceivable.

The matrix (precoding matrix) in Equation (1) and Equation (3) is as follows.

[MATH. 4]

$$\begin{pmatrix} a & b \\ c & d \end{pmatrix} = F \qquad \text{Equation (4)}$$

For example, using the following matrix for matrix F is conceivable.

[MATH. 5]

$$F = \begin{pmatrix} \beta \times e^{j0} & \beta \times \alpha \times e^{j0} \\ \beta \times \alpha \times e^{j0} & \beta \times e^{j\pi} \end{pmatrix} \qquad \text{Equation (5)}$$

or

[MATH. 6]

$$F = \frac{1}{\sqrt{\alpha^2 + 1}} \begin{pmatrix} e^{j0} & \alpha \times e^{j0} \\ \alpha \times e^{j0} & e^{j\pi} \end{pmatrix} \qquad \text{Equation (6)}$$

or

[MATH. 7]

$$F = \begin{pmatrix} \beta \times e^{j0} & \beta \times \alpha \times e^{j\pi} \\ \beta \times \alpha \times e^{j0} & \beta \times e^{j0} \end{pmatrix} \qquad \text{Equation (7)}$$

or

[MATH. 8]

$$F = \frac{1}{\sqrt{\alpha^2 + 1}} \begin{pmatrix} e^{j0} & \alpha \times e^{j\pi} \\ \alpha \times e^{j0} & e^{j0} \end{pmatrix} \qquad \text{Equation (8)}$$

or

[MATH. 9]

$$F = \begin{pmatrix} \beta \times \alpha \times e^{j0} & \beta \times e^{j\pi} \\ \beta \times e^{j0} & \beta \times \alpha \times e^{j0} \end{pmatrix} \qquad \text{Equation (9)}$$

or

[MATH. 10]

$$F = \frac{1}{\sqrt{\alpha^2 + 1}} \begin{pmatrix} \alpha \times e^{j0} & e^{j\pi} \\ e^{j0} & \alpha \times e^{j0} \end{pmatrix} \qquad \text{Equation (10)}$$

-continued or

[MATH. 11]
$$F = \begin{pmatrix} \beta \times \alpha \times e^{j0} & \beta \times e^{j0} \\ \beta \times e^{j0} & \beta \times \alpha \times e^{j\pi} \end{pmatrix} \quad \text{Equation (11)}$$

or

[MATH. 12]
$$F = \frac{1}{\sqrt{\alpha^2 + 1}} \begin{pmatrix} \alpha \times e^{j0} & e^{j0} \\ e^{j0} & \alpha \times e^{j\pi} \end{pmatrix} \quad \text{Equation (12)}$$

Note that in Equation (5), Equation (6), Equation (7), Equation (8), Equation (9), Equation (10), Equation (11), and Equation (12), $\alpha$ may be a real number and may be an imaginary number, and ß may be a real number and may be an imaginary number. However, $\alpha$ is not 0 (zero). ß is also not 0 (zero).

or

[MATH. 13]
$$F = \begin{pmatrix} \beta \times \cos\theta & \beta \times \sin\theta \\ \beta \times \sin\theta & -\beta \times \cos\theta \end{pmatrix} \quad \text{Equation (13)}$$

or

[MATH. 14]
$$F = \begin{pmatrix} \cos\theta & \sin\theta \\ \sin\theta & -\cos\theta \end{pmatrix} \quad \text{Equation (14)}$$

or

[MATH. 15]
$$F = \begin{pmatrix} \beta \times \cos\theta & -\beta \times \sin\theta \\ \beta \times \sin\theta & \beta \times \cos\theta \end{pmatrix} \quad \text{Equation (15)}$$

or

[MATH. 16]
$$F = \begin{pmatrix} \cos\theta & -\sin\theta \\ \sin\theta & \cos\theta \end{pmatrix} \quad \text{Equation (16)}$$

or

[MATH. 17]
$$F = \begin{pmatrix} \beta \times \sin\theta & -\beta \times \cos\theta \\ \beta \times \cos\theta & \beta \times \sin\theta \end{pmatrix} \quad \text{Equation (17)}$$

or

[MATH. 18]
$$F = \begin{pmatrix} \sin\theta & -\cos\theta \\ \cos\theta & \sin\theta \end{pmatrix} \quad \text{Equation (18)}$$

or

[MATH. 19]
$$F = \begin{pmatrix} \beta \times \sin\theta & \beta \times \cos\theta \\ \beta \times \cos\theta & -\beta \times \sin\theta \end{pmatrix} \quad \text{Equation (19)}$$

or

[MATH. 20]
$$F = \begin{pmatrix} \sin\theta & \cos\theta \\ \cos\theta & -\sin\theta \end{pmatrix} \quad \text{Equation (20)}$$

Note that in Equation (13), Equation (15), Equation (17), and Equation (19). ß may be a real number and may be an imaginary number. However, ß is not 0 (zero) ($\theta$ is a real number).

or

[MATH. 21]
$$F(i) = \begin{pmatrix} \beta \times e^{j\theta_{11}(i)} & \beta \times \alpha \times e^{j(\theta_{11}(i)+\lambda)} \\ \beta \times \alpha \times e^{j\theta_{21}(i)} & \beta \times e^{j(\theta_{21}(i)+\lambda+\pi)} \end{pmatrix} \quad \text{Equation (21)}$$

or

[MATH. 22]
$$F(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Equation (22)}$$

or

[MATH. 23]
$$F(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \quad \text{Equation (23)}$$

or

[MATH. 24]
$$F(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix} \quad \text{Equation (24)}$$

or

[MATH. 25]
$$F(i) = \begin{pmatrix} \beta \times e^{j\theta_{11}} & \beta \times \alpha \times e^{j(\theta_{11}(i)+\lambda(i))} \\ \beta \times \alpha \times e^{j\theta_{21}} & \beta \times e^{j(\theta_{21}(i)+\lambda(i)+\pi)} \end{pmatrix} \quad \text{Equation (25)}$$

or

[MATH. 26]
$$F(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix} \quad \text{Equation (26)}$$

or

[MATH. 27]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \quad \text{Equation (27)}$$

or

[MATH. 28]
$$F(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix} \quad \text{Equation (28)}$$

or

[MATH. 29]
$$F(i) = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \quad \text{Equation (29)}$$

or

[MATH. 30]
$$F(i) = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \quad \text{Equation (30)}$$

-continued or

[MATH. 31]

$$F(i) = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix}$$ Equation (31)

or

[MATH. 32]

$$F(i) = \frac{1}{\sqrt{\alpha^2+1}} \begin{pmatrix} \alpha \times e^{j\theta_{21}} & e^{j(\theta_{21}+\lambda+\pi)} \\ e^{j\theta_{11}} & \alpha \times e^{j(\theta_{11}+\lambda)} \end{pmatrix}$$ Equation (32)

However, $\theta_{11}(i)$, $\theta_{21}(i)$, and $\lambda(i)$ are functions (real numbers) of i (symbol number). $\lambda$ is, for example, a fixed value (real number) (however, $\lambda$ need not 10 be a fixed value). $\alpha$ may be a real number, and, alternatively, may be an imaginary number. ß may be a real number, and, alternatively, may be an imaginary number. However, $\alpha$ is not 0 (zero). ß is also not 0 (zero). Moreover, $\theta_{11}$ and $\theta_{21}$ are real numbers.

Moreover, each exemplary embodiment in the present specification can also be carried out by using a precoding matrix other than these matrices.

Or

[MATH. 33]

$$F(i) = \begin{pmatrix} 1 & 0 \\ 0 & 1 \end{pmatrix}$$ Equation (33)

or

[MATH. 34]

$$F(i) = \begin{pmatrix} \beta & 0 \\ 0 & \beta \end{pmatrix}$$ Equation (34)

or

[MATH. 35]

$$F(i) = \begin{pmatrix} 1 & 0 \\ 0 & -1 \end{pmatrix}$$ Equation (35)

or

[MATH. 36]

$$F(i) = \begin{pmatrix} \beta & 0 \\ 0 & -\beta \end{pmatrix}$$ Equation (36)

Note that in Equation (34) and Equation (36), ß may be a real number and, alternatively, may be an imaginary number. However, ß is not 0 (zero).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j\times r(i)}\times x'(i)$ (j is an imaginary number unit).

Although it will be described later, note that the operation performed by phase changer 209B may be CDD (cyclic delay diversity)(CSD (cycle shift diversity)) disclosed in "Standard conformable antenna diversity techniques for OFDM and its application to the DVB-T system." IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol).

Figure 3:
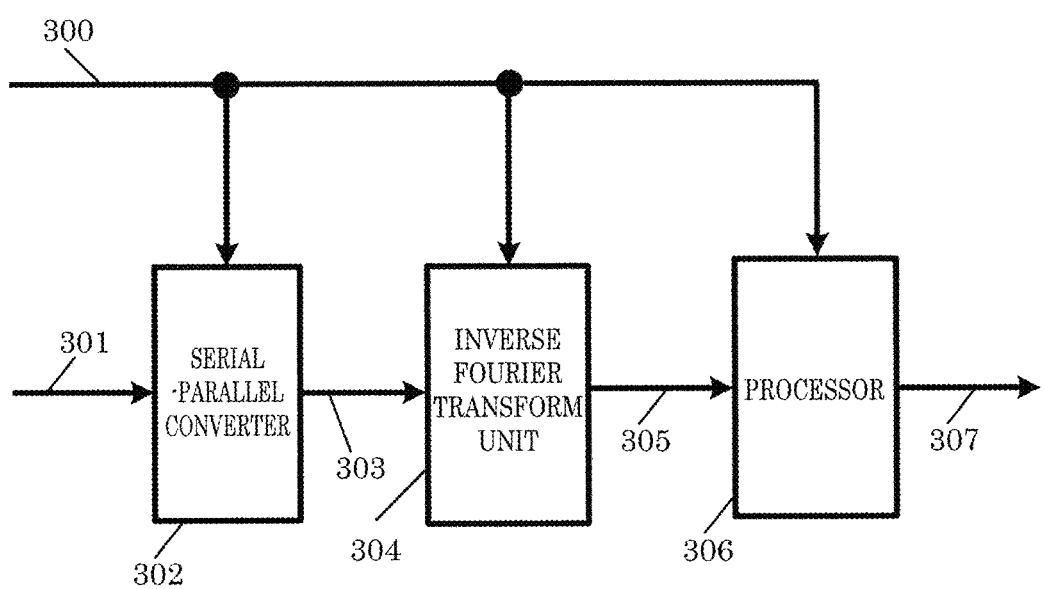
FIG. 3 illustrates one example of a configuration of the radio unit illustrated in FIG. 1.

FIG. 3 illustrates one example of a configuration of radio units 107_A and 107_B illustrated in FIG. 1. Serial-parallel converter 302 receives inputs of signal 301 and control signal 300 (control signal 100 in FIG. 1), applies a serial-parallel conversion based on control signal 300, and outputs serial-parallel converted signal 303.

Inverse Fourier transform unit 304 receives inputs of serial-parallel converted signal 303 and control signal 300, and based on control signal 300, applies, as one example of an inverse Fourier transform, an inverse fast Fourier transform (IFFT), and outputs inverse Fourier transformed signal 305.

Processor 306 receives inputs of inverse Fourier transformed signal 305 and control signal 300, applies processing such as frequency conversion and amplification based on control signal 300, and outputs modulated signal 307.

(For example, when signal 301 is signal-processed signal 106_A illustrated in FIG. 1, modulated signal 307 corresponds to transmission signal 108_A in FIG. 1. Moreover, when signal 301 is signal-processed signal 106_B illustrated in FIG. 1, modulated signal 307 corresponds to transmission signal 108_B in FIG. 1.)

Figure 4:
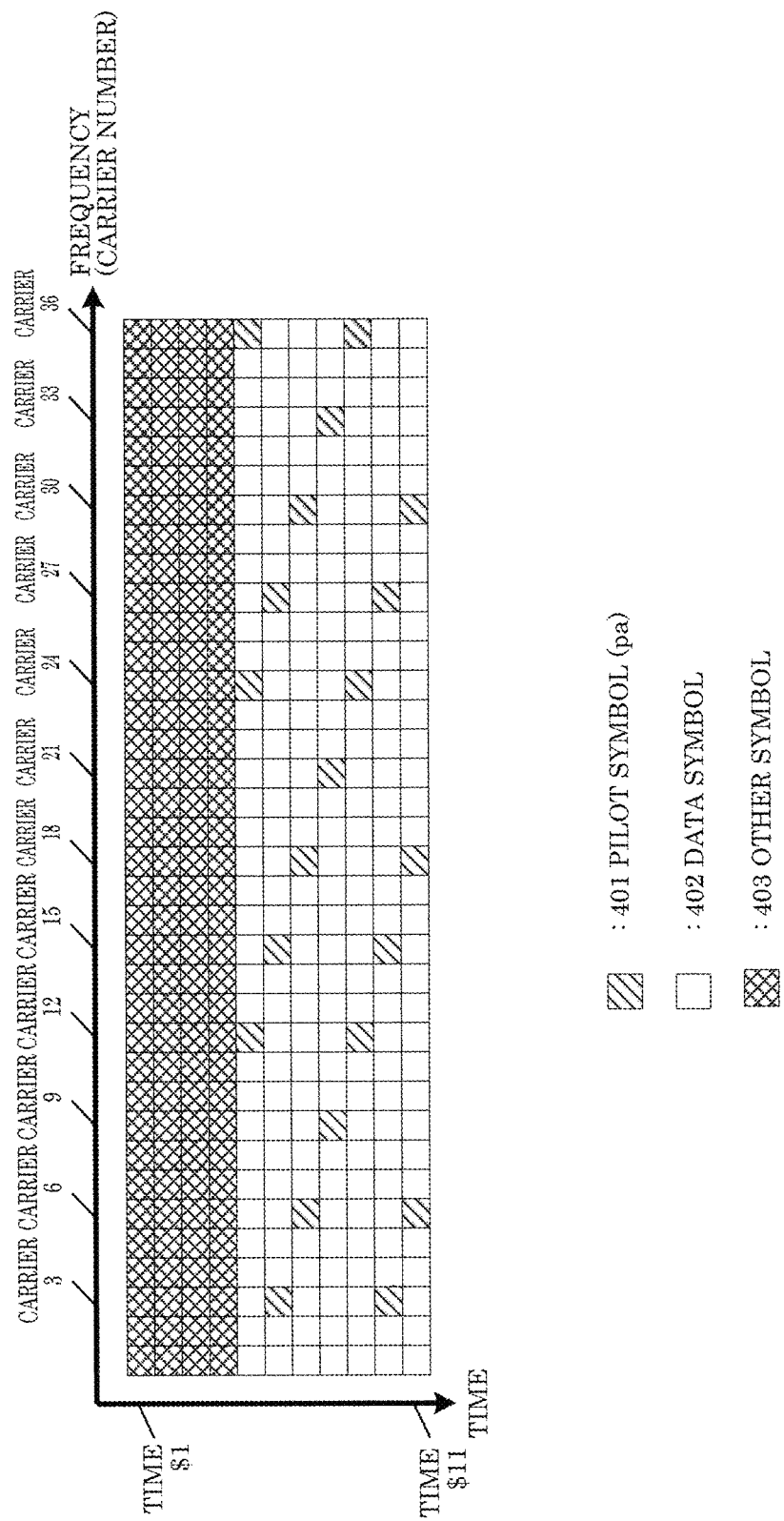
FIG. 4 illustrates one example of a frame configuration of a transmission signal illustrated in FIG. 1.

FIG. 4 illustrates a frame configuration of transmission signal 108_A illustrated in FIG. 1. In FIG. 4, frequency (carriers) is (are) represented on the horizontal axis and time is represented on the vertical axis. Since a multi-carrier transmission scheme such as OFDM is used, symbols are present in the carrier direction. In FIG. 4, symbols from carriers 1 to 36 are shown. Moreover, in FIG. 4, symbols for time $1 through time $11 are shown.

In FIG. 4, 401 is a pilot symbol (pilot signal 251A (pa(t) in FIG. 2)), 402 is a data symbol, and 403 is an other symbol. Here, a pilot symbol is, for example, a PSK (phase shift keying) symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 4 may share the transmission method of the pilot symbol.

Note that mapped signal 201A (mapped signal 105_1 in FIG. 1) is referred to as "stream #1" and mapped signal 201B (mapped signal 105_2 in FIG. 1) is referred to as "stream #2". Note that this also applied to subsequent descriptions.

Data symbol 402 is a symbol that corresponds to baseband signal 208A generated in the signal processing illustrated in FIG. 2. Accordingly, data symbol 402 satisfies "a symbol including both the symbol "stream #1" and the symbol "stream #2", "the symbol "stream #1", or "the symbol "stream #2", as determined by the configuration of the precoding matrix used by weighting synthesizer 203.

Other symbols 403 are symbols corresponding to preamble signal 242 and control information symbol signal 253 illustrated in FIG. 2 (however, the other symbols may include symbols other than a preamble or control information symbol). Here, a preamble may transmit data (control data), and may be configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 4 to demodulate and decode a data symbol.

For example, carriers 1 to 36 from time $1 to time 4 in FIG. 4 are other symbols 403. Then, at time $5, carrier 1 through carrier 11 are data symbols 402. At time $5, carrier 12 is pilot symbol 401, at time $5, carriers 13 to 23 are data symbols 402, at time $5, carrier 24 is pilot symbol 401 . . . at time $6, carriers 1 and 2 are data symbols 402, at time $6, carrier 3 is pilot symbol 401 . . . at time $11, carrier 30 is pilot symbol 401, at time $11, carriers 31 to 36 are data symbols 402.

Figure 5:
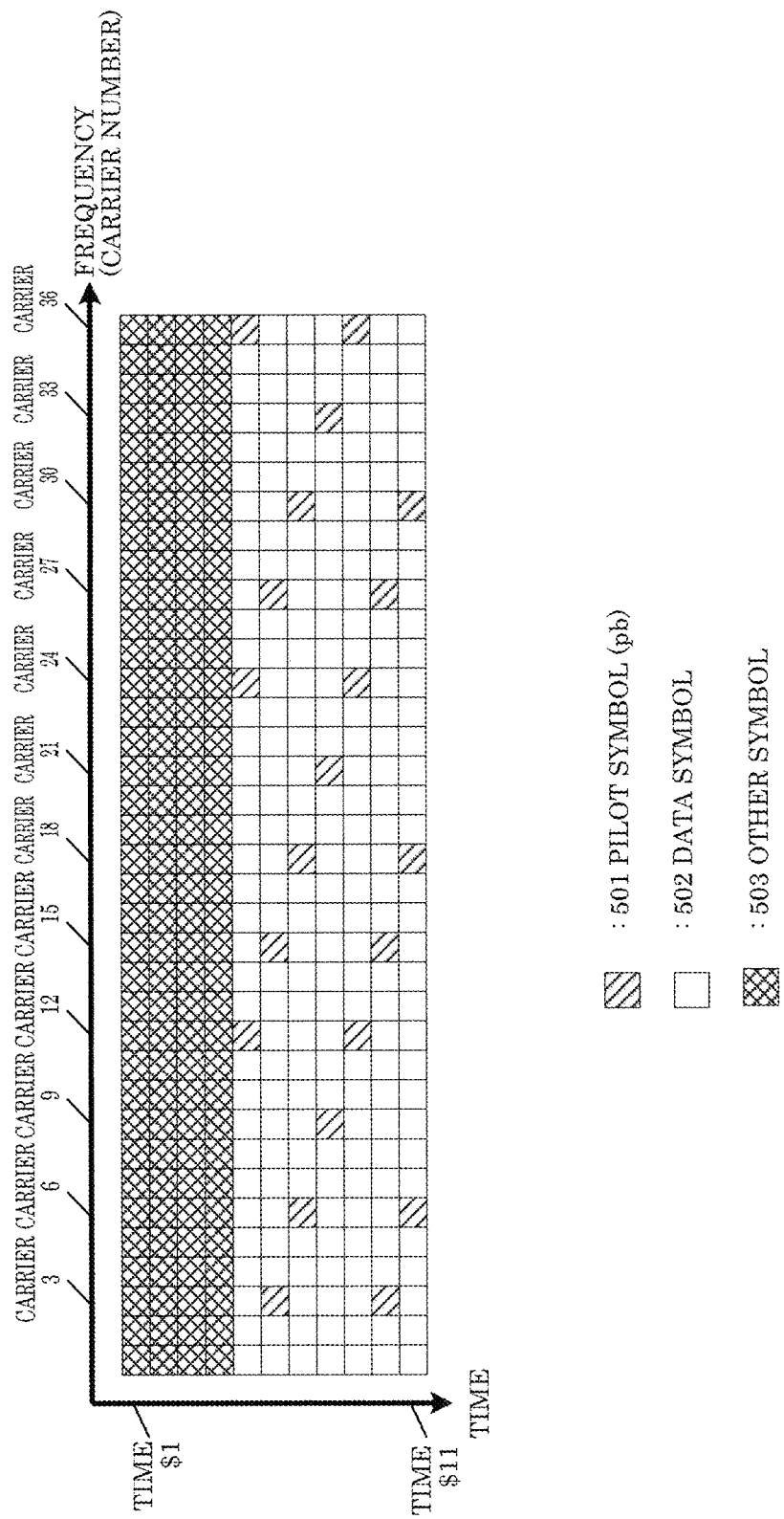
FIG. 5 illustrates one example of a frame configuration of a transmission signal illustrated in FIG. 1.

FIG. 5 illustrates a frame configuration of transmission signal 108_B illustrated in FIG. 1. In FIG. 5, frequency (carriers) is (are) represented on the horizontal axis and time is represented on the vertical axis. Since a multi-carrier transmission scheme such as OFDM is used, symbols are present in the carrier direction. In FIG. 5, symbols from carriers 1 to 36 are shown. Moreover, in FIG. 5, symbols for time $1 through time $11 are shown.

In FIG. 5, 501 is a pilot symbol (pilot signal 251B (pb(t) in FIG. 2)), 502 is a data symbol, and 503 is an other symbol. Here, a pilot symbol is, for example, a PSK symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 5 may share the transmission method of the pilot symbol.

Data symbol 502 is a symbol that corresponds to baseband signal 208B generated in the signal processing illustrated in FIG. 2. Accordingly, data symbol 502 satisfies "a symbol including both the symbol "stream #1" and the symbol "stream #2", "the symbol "stream #1", or "the symbol "stream #2", as determined by the configuration of the precoding matrix used by weighting synthesizer 203.

Other symbols 503 are symbols corresponding to preamble signal 252 and control information symbol signal 253 illustrated in FIG. 2 (however, the other symbols may include symbols other than a preamble or control information symbol). Here, a preamble may transmit data (control data), and is configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 5 to demodulate and decode a data symbol.

For example, carriers 1 to 36 from time $1 to time 4 in FIG. 5 are other symbols 403. Then, at time $5, carrier 1 through carrier 11 are data symbols 402. At time $5, carrier 12 is pilot symbol 401, at time $5, carriers 13 to 23 are data symbols 402, at time $5, carrier 24 is pilot symbol 401 . . . at time $6, carriers 1 and 2 are data symbols 402, at time $6, carrier 3 is pilot symbol 401 . . . at time $11, carrier 30 is pilot symbol 401, at time $11, carriers 31 to 36 are data symbols 402.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

Figure 6:
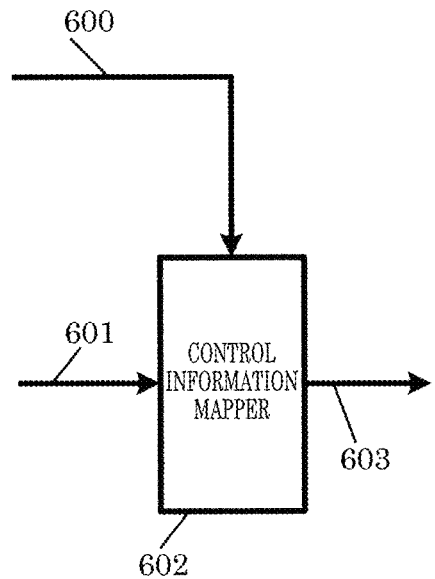
FIG. 6 illustrates one example of a configuration of components relevant to control information generation in FIG. 2.

FIG. 6 illustrates one example of components relating to control information generation for generating control information symbol signal 253 illustrated in FIG. 2.

Control information mapper 602 receives inputs of data 601 related to control information and control signal 600, maps data 601 related to control information in using a modulation scheme based on control signal 600, and outputs control information mapped signal 603. Note that control information mapped signal 603 corresponds to control information symbol signal 253 in FIG. 2.

Figure 7:
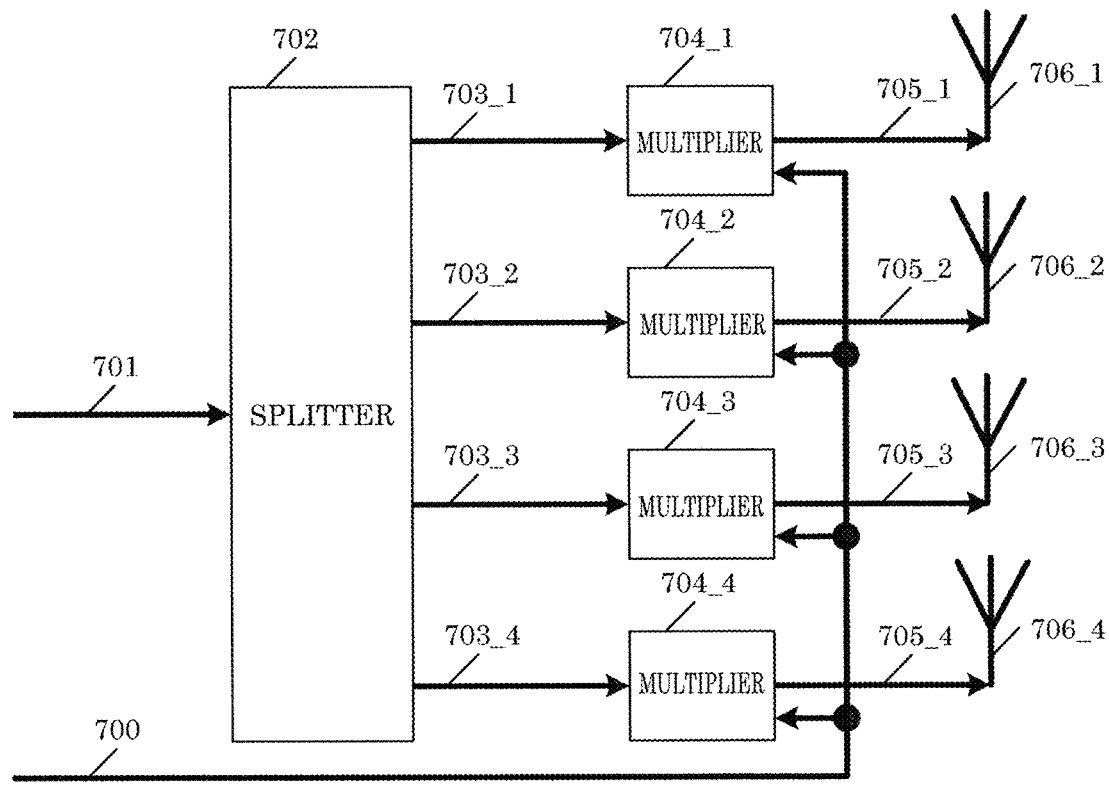
FIG. 7 illustrates one example of a configuration of the antenna unit illustrated in FIG. 1.

FIG. 7 illustrates one example of a configuration of antenna unit #A (109_A), antenna #B (109_B) illustrated in FIG. 1 (antenna unit #A (109_A) and antenna unit #B (109_B) are exemplified as including a plurality of antennas).

Splitter 702 receives an input of transmission signal 701, performs splitting, and outputs transmission signals 703_1, 703_2, 703_3, and 703_4.

Multiplier 704_1 receives inputs of transmission signal 703_1 and control signal 700, and based on the multiplication coefficient included in control signal 700, multiplies a multiplication coefficient with transmission signal 703_1, and outputs multiplied signal 705_1. Multiplied signal 705_1 is output from antenna 706_1 as radio waves.

When transmission signal 703_1 is expressed as Tx1(t) (t is time) and the multiplication coefficient is expressed as W1 (W1 can be defined as a complex number and thus may be a real number), multiplied signal 705_1 can be expressed as Tx1(t)×W1.

Multiplier 704_2 receives inputs of transmission signal 703_2 and control signal 700, and based on the multiplication coefficient included in control signal 700, multiplies a multiplication coefficient with transmission signal 703_2, and outputs multiplied signal 705_2. Multiplied signal 705_2 is output from antenna 706_2 as radio waves.

When transmission signal 703_2 is expressed as Tx2(t) and the multiplication coefficient is expressed as W2 (W2 can be defined as a complex number and thus may be a real number), multiplied signal 705_2 can be expressed as Tx2(t)×W2.

Multiplier 704_3 receives inputs of transmission signal 703_3 and control signal 700, and based on the multiplication coefficient included in control signal 700, multiplies a multiplication coefficient with transmission signal 703_3, and outputs multiplied signal 705_3. Multiplied signal 705_3 is output from antenna 706_3 as radio waves.

When transmission signal 703_3 is expressed as Tx3(t) and the multiplication coefficient is expressed as W3 (W3 can be defined as a complex number and thus may be a real number), multiplied signal 705_3 can be expressed as Tx3(t)×W3.

Multiplier 704_4 receives inputs of transmission signal 703_4 and control signal 700, and based on the multiplication coefficient included in control signal 700, multiplies a multiplication coefficient with transmission signal 703_4, and outputs multiplied signal 705_4. Multiplied signal 705_4 is output from antenna 706_4 as radio waves.

When transmission signal 703_4 is expressed as Tx4(t) and the multiplication coefficient is expressed as W4 (W4 can be defined as a complex number and thus may be a real number), multiplied signal 705_4 can be expressed as Tx4(t)×W4.

Note that "the absolute value of W1, the absolute value of W2, the absolute value of W3, and the absolute value of W4 are equal" may be true. Here, this is the equivalent of having performed a phase change (it goes without saying that the absolute value of W1, the absolute value of W2, the absolute value of W3, and the absolute value of W4 may be unequal).

Moreover, in FIG. 7, the antenna unit is exemplified as including four antennas (and four multipliers), but the number of antennas is not limited to four; the antenna unit may include two or more antennas.

When the configuration of antenna unit #A (109_A) in FIG. 1 is as illustrated in FIG. 7, transmission signal 701 corresponds to transmission signal 108_A in FIG. 1. When the configuration of antenna unit #B (109_B) in FIG. 1 is as illustrated in FIG. 7, transmission signal 701 corresponds to transmission signal 108_B in FIG. 1 and transmission signal 108_B in FIG. 1. However, antenna unit #A (109_A) and antenna unit #B (109_B) need not have the configurations illustrated in FIG. 7; as previously described, the antenna units need not receive an input of control signal 100.

Figure 8:
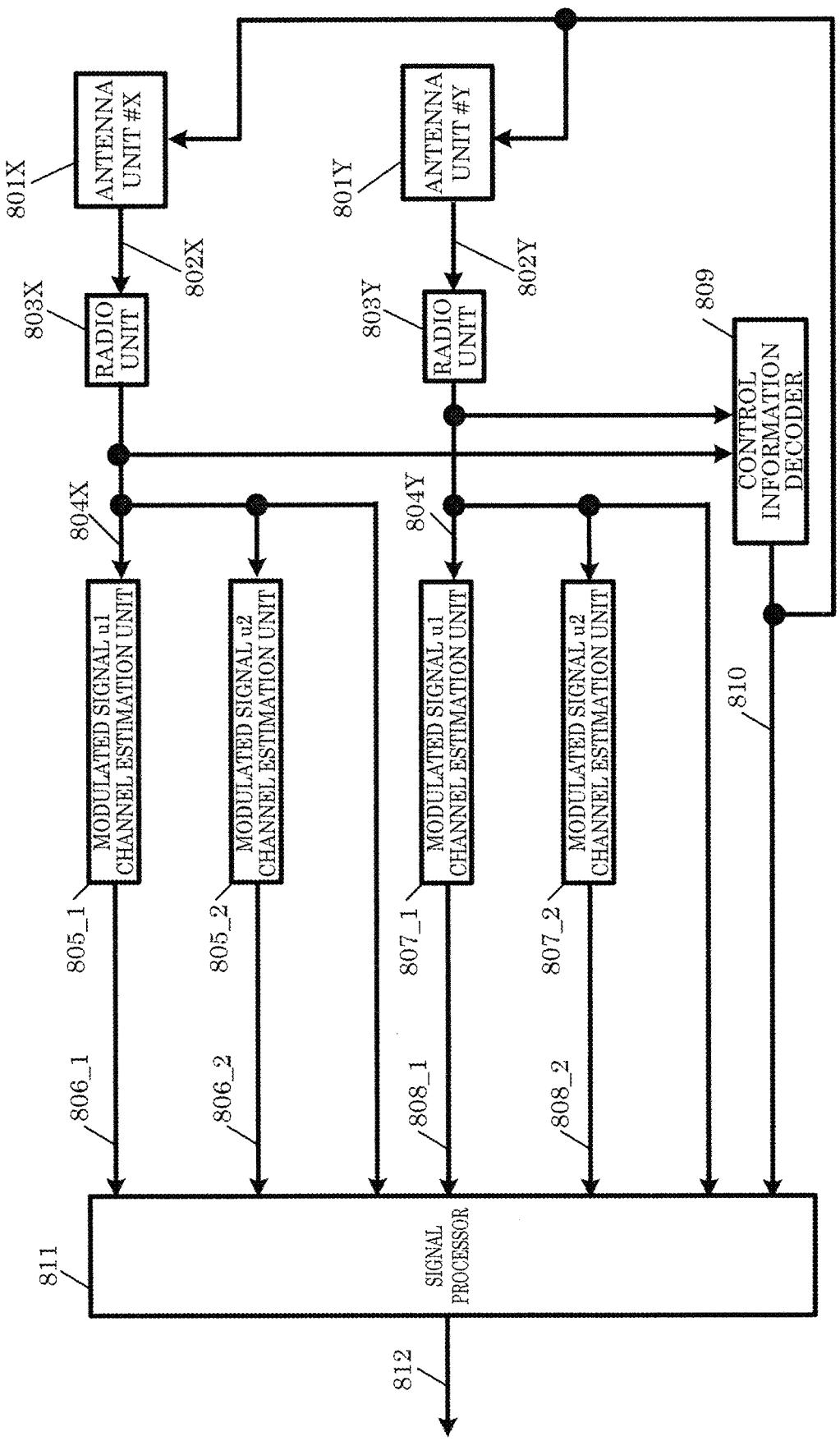
FIG. 8 illustrates one example of a configuration of a reception device according to an embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5.

Radio unit 803X receives an input of reception signal 802X received by antenna unit #X (801X), applies processing such as frequency conversion and a Fourier transform, and outputs baseband signal 804X.

Similarly, radio unit 803Y receives an input of reception signal 802Y received by antenna unit #Y (801Y), applies processing such as frequency conversion and a Fourier transform, and outputs baseband signal 804Y.

Note that FIG. 8 illustrates a configuration in which antenna unit #X (801X) and antenna unit #Y (801Y) receive control signal 810 as an input, but antenna unit #X (801X) and antenna unit #Y (801Y) may be configured to not receive an input of control signal 810. Operations performed when control signal 810 is present as an input will be described in detail later.

Figure 9:
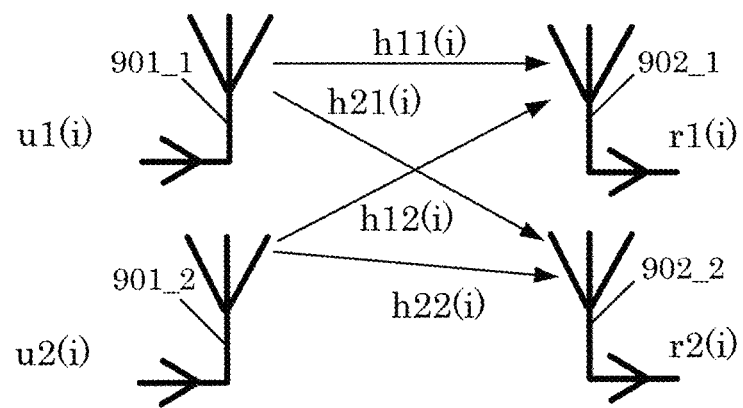
FIG. 9 illustrates one example of the relationship between a transmission device and a reception device.

FIG. 9 illustrates the relationship between the transmission device and the reception device. Antennas 901_1 and 901_2 in FIG. 9 are transmitting antennas, and antenna 901_1 in FIG. 9 corresponds to antenna unit #A (109_A) in FIG. 1. Antenna 901_2 in FIG. 9 corresponds to antenna unit #B (109_B) in FIG. 1.

Antennas 902_1 and 902_2 in FIG. 9 are receiving antennas, and antenna 902_1 in FIG. 9 corresponds to antenna unit #X (801X) in FIG. 8. Antenna 902_2 in FIG. 9 corresponds to antenna unit #Y (801Y) in FIG. 8.

As illustrated in FIG. 9, the signal transmitted from transmitting antenna 901_1 is u1(i), the signal transmitted from transmitting antenna 901_2 is u2(i), the signal received by receiving antenna 902_1 is r1(i), and the signal received by receiving antenna 902_2 is r2(i). Note that i is a symbol number, and, for example, is an integer that is greater than or equal to 0.

The propagation coefficient from transmitting antenna 901_1 to receiving antenna 902_1 is h11(i), the propagation coefficient from transmitting antenna 901_1 to receiving antenna 902_2 is h21(i), the propagation coefficient from transmitting antenna 901_2 to receiving antenna 902_1 is h12(i), and the propagation coefficient from transmitting antenna 901_2 to receiving antenna 902_2 is h22(i). In this case, the following relation equation holds true.

[MATH. 37]

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \qquad \text{Equation (37)}$$

Note that n1(i) and n2(i) are noise.

Channel estimation unit 805_1 of modulated signal u1 in FIG. 8 receives an input of baseband signal 804X, and using the preamble and/or pilot symbol illustrated in FIG. 4 or FIG. 5, performs channel estimation on modulated signal u1, that is to say, estimates h11(i) in Equation (37), and outputs channel estimated signal 806_1.

Channel estimation unit 805_2 of modulated signal u2 receives an input of baseband signal 804X, and using the preamble and/or pilot symbol illustrated in FIG. 4 or FIG. 5, performs channel estimation on modulated signal u2, that is to say, estimates h12(i) in Equation (37), and outputs channel estimated signal 806_2.

Channel estimation unit 807_1 of modulated signal u1 receives an input of baseband signal 804Y, and using the preamble and/or pilot symbol illustrated in FIG. 4 or FIG. 5, performs channel estimation on modulated signal u1, that is to say, estimates h21(i) in Equation (37), and outputs channel estimated signal 808_1.

Channel estimation unit 807_2 of modulated signal u2 receives an input of baseband signal 804Y, and using the preamble and/or pilot symbol illustrated in FIG. 4 or FIG. 5, performs channel estimation on modulated signal u2, that is to say, estimates h22(i) in Equation (37), and outputs channel estimated signal 808_2.

Control information decoder 809 receives inputs of baseband signals 804X and 804Y, demodulates and decodes control information including "other symbols" in FIG. 4 and FIG. 5, and outputs control signal 810 including control information.

Signal processor 811 receives inputs of channel estimated signals 806_1, 806_2, 808_1, and 8082, baseband signals 804X and 804Y, and control signal 810, performs demodulation and decoding using the relationship in Equation (37) or based on control information (for example, information on a modulation scheme or a scheme relating to the error correction code) in control signal 810, and outputs reception data 812.

Note that control signal 810 need not be generated via the method illustrated in FIG. 8. For example, control signal 810 in FIG. 8 may be generated based on information transmitted by a device that is the communication partner (FIG. 1) in FIG. 8, and, alternatively, the device in FIG. 8 may include an input unit, and control signal 810 may be generated based on information input from the input unit.

Figure 10:
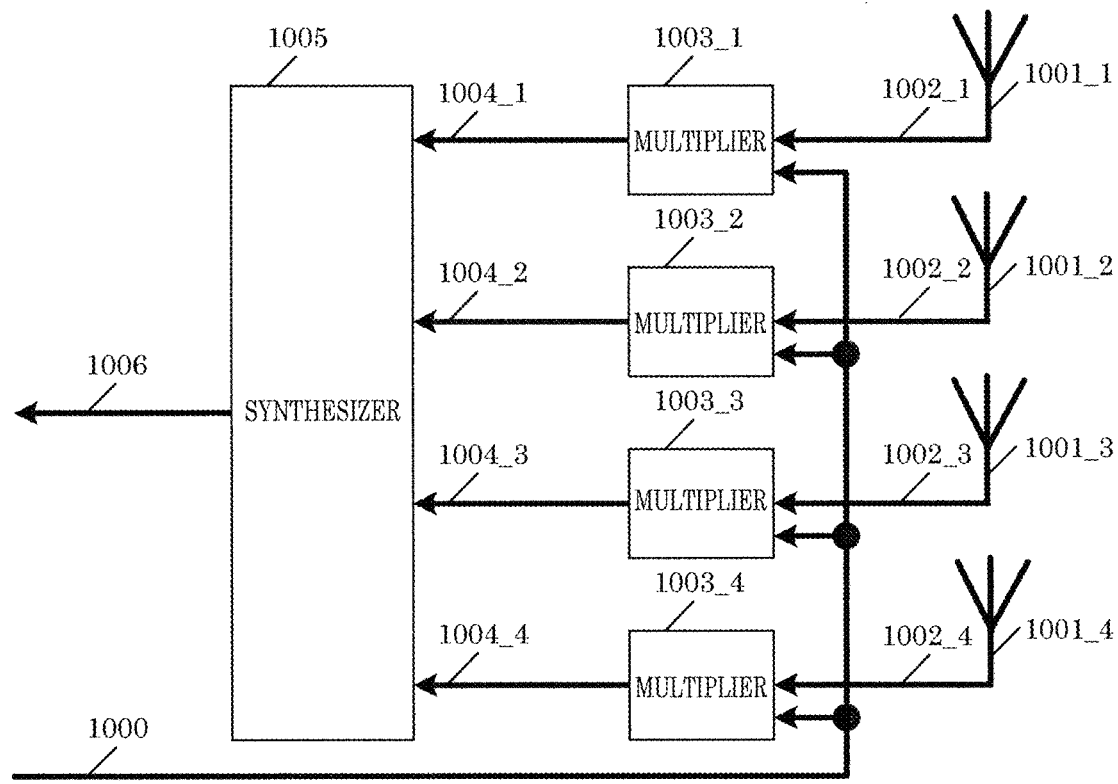
FIG. 10 illustrates one example of a configuration of the antenna unit illustrated in FIG. 8.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas).

Multiplier 1003_1 receives inputs of reception signal 1002_1 received by antenna 1001_1 and control signal 1000, and based on information on a multiplication coefficient included in control signal 1000, multiplies reception signal 1002_1 with the multiplication coefficient, and outputs multiplied signal 1004_1.

When reception signal 1002_1 is expressed as Rx1(t) (t is time) and the multiplication coefficient is expressed as D1 (D1 can be defined as a complex number and thus may be a real number), multiplied signal 1004_1 can be expressed as Rx1(t)×D1.

Multiplier 1003_2 receives inputs of reception signal 1002_2 received by antenna 1001_2 and control signal 1000, and based on information on a multiplication coefficient included in control signal 1000, multiplies reception signal 1002_2 with the multiplication coefficient, and outputs multiplied signal 1004_2.

When reception signal 1002_2 is expressed as Rx2(t) and the multiplication coefficient is expressed as D2 (D2 can be defined as a complex number and thus may be a real number), multiplied signal 1004_2 can be expressed as Rx2(t)×D2.

Multiplier 1003_3 receives inputs of reception signal 1002_3 received by antenna 1001_3 and control signal 1000, and based on information on a multiplication coefficient included in control signal 1000, multiplies reception signal 1002_3 with the multiplication coefficient, and outputs multiplied signal 1004_3.

When reception signal 1002_3 is expressed as Rx3(t) and the multiplication coefficient is expressed as D3 (D3 can be defined as a complex number and thus may be a real number), multiplied signal 1004_3 can be expressed as Rx3(t)×D3.

Multiplier 1003_4 receives inputs of reception signal 1002_4 received by antenna 1001_4 and control signal 1000, and based on information on a multiplication coefficient included in control signal 1000, multiplies reception signal 1002_4 with the multiplication coefficient, and outputs multiplied signal 1004_4.

When reception signal 1002_4 is expressed as Rx4(t) and the multiplication coefficient is expressed as D4 (D4 can be defined as a complex number and thus may be a real number), multiplied signal 1004_4 can be expressed as Rx4(t)×D4.

Synthesizer 1005 receives inputs of multiplied signals 1004_1, 1004_2, 1004_3, and 1004_4, synthesizes multiplied signals 1004_1, 1004_2, 1004_3, and 1004_4, and outputs synthesized signal 1006. Note that synthesized signal 1006 is expressed as Rx1(t)×D1+Rx2(t)×D2+Rx3(t)×D3+Rx4(t)×D4.

In FIG. 10, the antenna unit is exemplified as including four antennas (and four multipliers), but the number of antennas is not limited to four; the antenna unit may include two or more antennas.

When the configuration of antenna unit #X (801X) in FIG. 8 is as illustrated in FIG. 10, reception signal 802X corresponds to synthesized signal 1006 in FIG. 10, and control signal 710 corresponds to control signal 1000 in FIG. 10. When the configuration of antenna unit #Y (801Y) in FIG. 8 is as illustrated in FIG. 10, reception signal 802Y corresponds to synthesized signal 1006 in FIG. 10, and control signal 710 corresponds to control signal 1000 in FIG. 10. However, antenna unit #X (801X) and antenna unit #Y 801Y need not have the configuration illustrated in FIG. 10; as stated before, the antenna unit may not receive an input of control signal 710.

Note that control signal 800 may be generated based on information transmitted by a device that is the communication partner, and, alternatively, the device may include an input unit, and control signal 800 may be generated based on information input from the input unit.

Next, signal processor 106 in the transmission device illustrated in FIG. 1 is inserted as phase changer 205B and phase changer 209B, as illustrated in FIG. 2. The characteristics and advantageous effects of this configuration will be described.

As described with reference to FIG. 4 and FIG. 5, phase changer 205B applies precoding (weighted synthesis) to mapped signal s1(i) (201A) (i is a symbol number; i is an integer greater than or equal to 0) obtained via mapping using the first sequence and mapped signal s2(i) (201B) obtained via mapping using the second sequence, and applies a phase change to one of the obtained weighting synthesized signals 204A and 204B. Weighting synthesized signal 204A and phase-changed signal 206B are then transmitted at the same frequency and at the same time. Accordingly, in FIG. 4 and FIG. 5, a phase change is applied to data symbol 502 in FIG. 5 (in the case of FIG. 2, since phase changer 205B applies this to weighting synthesized signal 204B, a phase change is applied to data symbol 502 in FIG. 5; when a phase change is applied to weighting synthesized signal 204A, a phase change is applied to data symbol 402 in FIG. 4; this will be described later).

Figure 11:
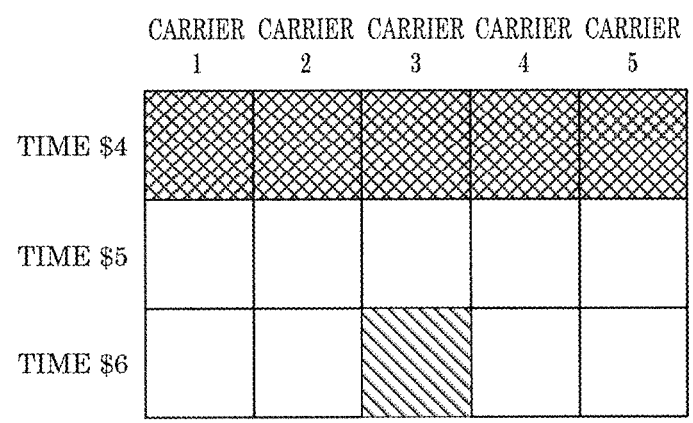
FIG. 11 illustrates part of the frame illustrated in FIG. 5.

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6). "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 2 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 2⁴=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

Figure 12:
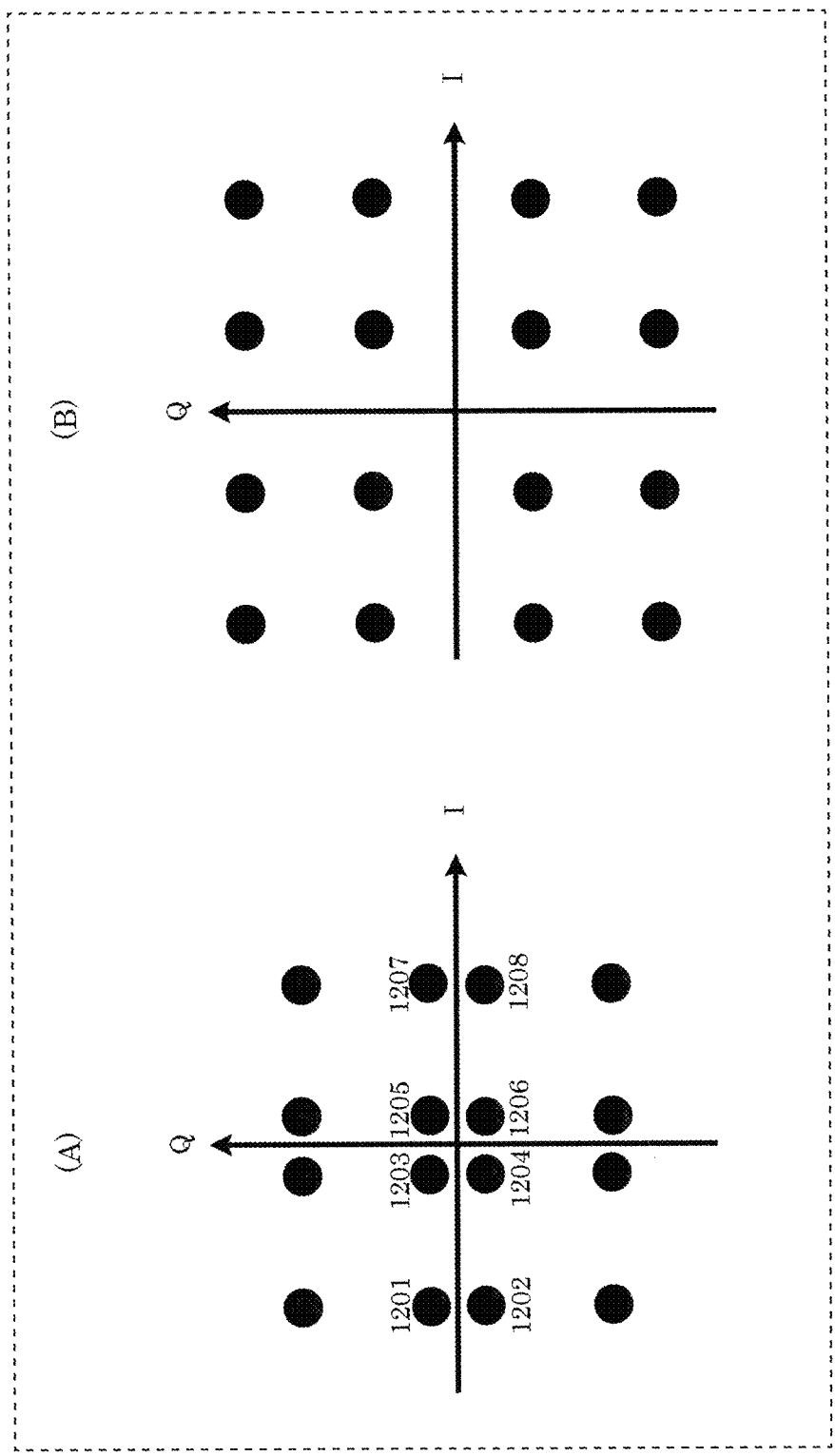
FIG. 12 illustrates one example of a modulation scheme used by the mapper illustrated in FIG. 1.

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changer 205B is omitted from the configuration illustrated in FIG. 2 (in other words, a case in which phase change is not applied by phase changer 205B in FIG. 2).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 2, phase changer 205B is inserted. When phase changer 205B is inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 2, a phase change is not applied by phase changer 205B in FIG. 2 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changer 205B in FIG. 2 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N. and regularly applying a phase change to a pilot symbol and/or a preamble in a cycle M (N and M are integers that are greater than or equal to 2).

As described above, phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j \times \varepsilon(i)} \times x'(i)$ (j is an imaginary number unit). Note that the operation performed by phase changer 209B may be CDD (cyclic delay diversity) (CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 2, since phase changer 209B applies a phase change to baseband signal 208B, a phase change is applied to each symbol in FIG. 5; when a phase change is applied to baseband signal 208A in FIG. 2, a phase change is applied to each symbol in FIG. 4; this will be described later.)

Accordingly, in the frame illustrated in FIG. 5, phase changer 209B illustrated in FIG. 2 applies a phase change to all symbols (in this case, all other symbols 503) for all carriers 1 to 36 at time $1.

Similarly, phase changer 209B illustrated in FIG. 2 applies a phase change to all symbols (in this case, all other symbols 503) for all carriers 1 to 36 at time $2, phase changer 209B illustrated in FIG. 2 applies a phase change to all symbols (in this case, all other symbols 503) for all carriers 1 to 36 at time $3, phase changer 209B illustrated in FIG. 2 applies a phase change to all symbols (in this case, all other symbols 503) for all carriers 1 to 36 at time $4, phase changer 209B illustrated in FIG. 2 applies a phase change to all symbols (in this case, pilot symbols 501 or data symbols 502) for all carriers 1 to 36 at time $5, phase changer 209B illustrated in FIG. 2 applies a phase change to all symbols (in this case, pilot symbols 501 or data symbols 502) for all carriers 1 to 36 at time $6, phase changer 209B illustrated in FIG. 2 applies a phase change to all symbols (in this case, pilot symbols 501 or data symbols 502) for all carriers 1 to 36 at time $7, phase changer 209B illustrated in FIG. 2 applies a phase change to all symbols (in this case, pilot symbols 501 or data symbols 502) for all carriers 1 to 36 at time $8, phase changer 209B illustrated in FIG. 2 applies a phase change to all symbols (in this case, pilot symbols 501 or data symbols 502) for all carriers 1 to 36 at time $9, phase changer 209B illustrated in FIG. 2 applies a phase change to all symbols (in this case, pilot symbols 501 or data symbols 502) for all carriers 1 to 36 at time $10, phase changer 209B illustrated in FIG. 2 applies a phase change to all symbols (in this case, pilot symbols 501 or data symbols 502) for all carriers 1 to 36 at time $11.

Figure 13:
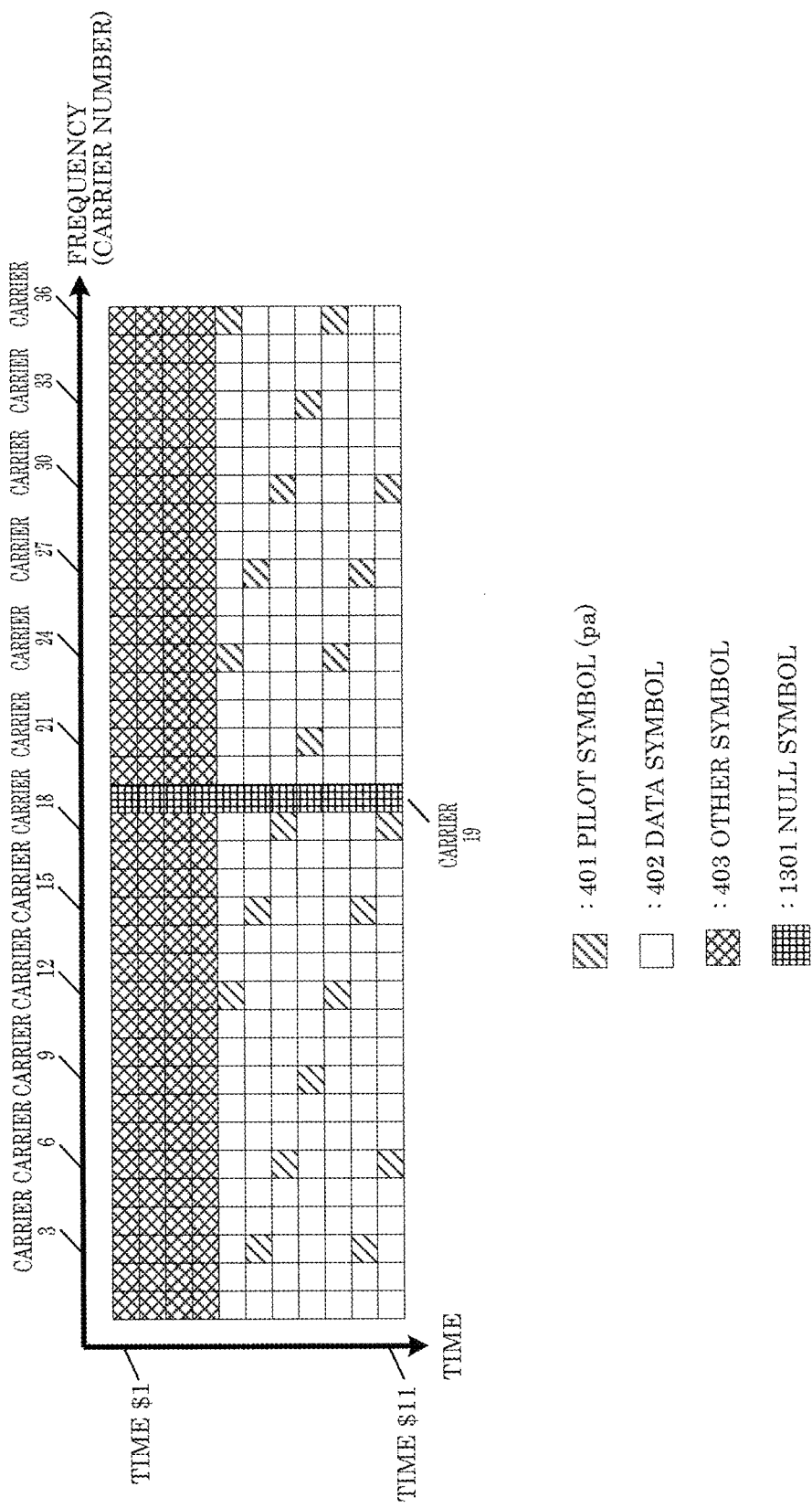
FIG. 13 illustrates one example of a frame configuration of a transmission signal illustrated in FIG. 1.

FIG. 13 illustrates a frame configuration different from the frame configuration illustrated in FIG. 4 of transmission signal 108_A illustrated in FIG. 1. In FIG. 13, objects that operate the same as in FIG. 4 share like reference marks. In FIG. 13, frequency (carriers) is (are) represented on the horizontal axis and time is represented on the vertical axis. Similar to FIG. 4, since a multi-carrier transmission scheme such as OFDM is used, symbols are present in the carrier direction. In FIG. 13, similar to FIG. 4, symbols for carrier 1 to 36 are shown. Moreover, similar to FIG. 4, in FIG. 13 as well, symbols for time $1 through time $11 are shown.

In FIG. 13, in addition to pilot symbols 401 (pilot signal 251A (pat(t)) in FIG. 2), data symbols 402, and other symbols 403, null symbols 1301 are also shown.

Null symbol 1301 has an in-phase component I of zero (0) and a quadrature component Q of zero (0) (note that this symbol is referred to as a "null symbol" here, but this symbol may be referred to as something else).

In FIG. 13, null symbols are inserted in carrier 19 (note that the method in which the null symbols are inserted is not limited to the configuration illustrated in FIG. 13; for example, a null symbol may be inserted at some certain time, a null symbol may be inserted at some certain frequency and time region, a null symbol may be inserted continuously at a time and frequency region, and a null symbol may be inserted discretely at a time and frequency region).

Figure 14:
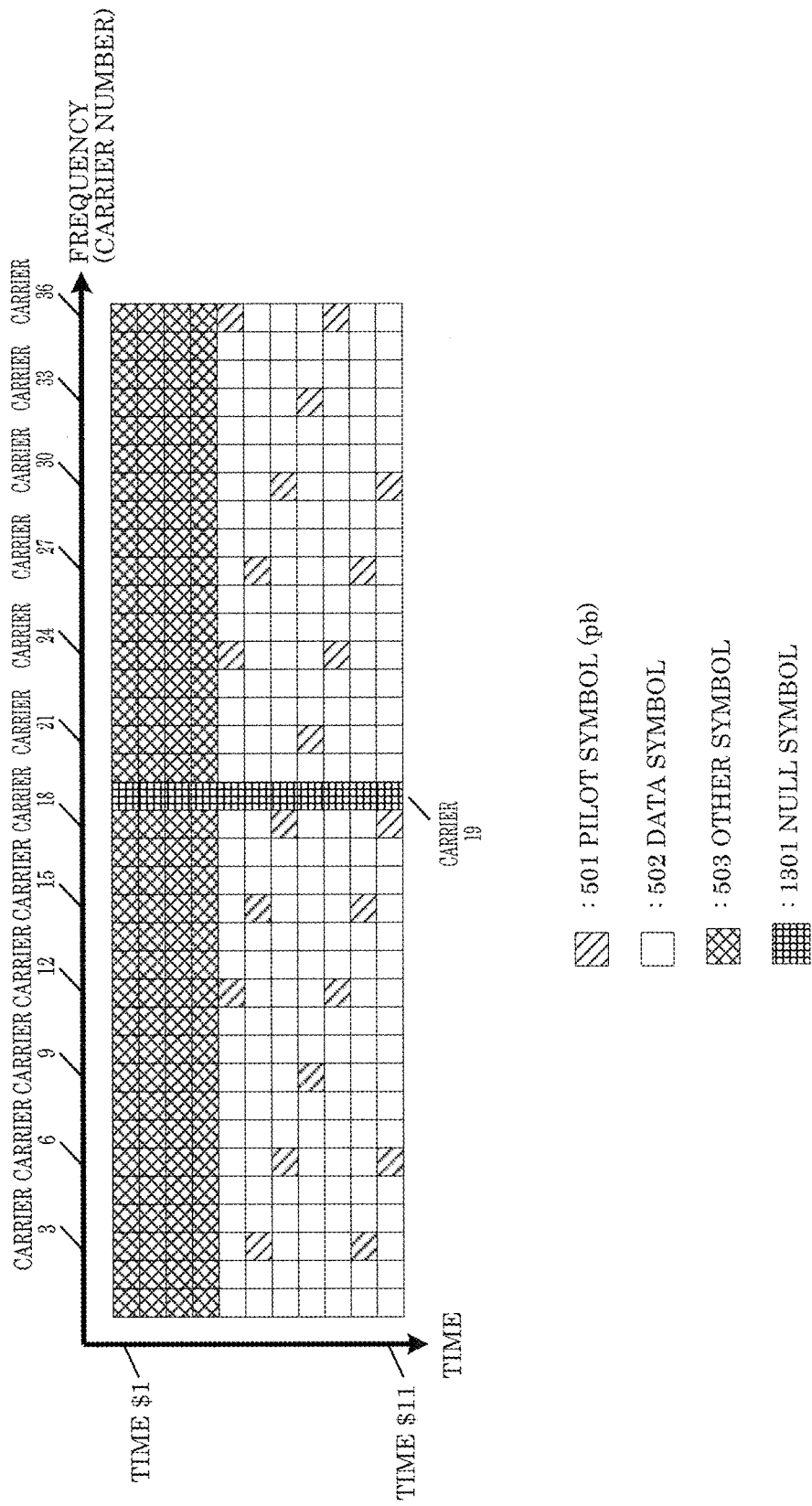
FIG. 14 illustrates one example of a frame configuration of a transmission signal illustrated in FIG. 1.

FIG. 14 illustrates a frame configuration different from the frame configuration illustrated in FIG. 5 of transmission signal 108_B illustrated in FIG. 1. In FIG. 14, objects that operate the same as in FIG. 5 share like reference marks. In FIG. 14, frequency (carriers) is (are) represented on the horizontal axis and time is represented on the vertical axis. Similar to FIG. 5, since a multi-carrier transmission scheme such as OFDM is used, symbols are present in the carrier direction. In FIG. 14, similar to FIG. 5, symbols for carrier 1 to 36 are shown. Moreover, similar to FIG. 5, in FIG. 14 as well, symbols for time $1 through time $11 are shown.

In FIG. 14, in addition to pilot symbols 501 (pilot signal 251B (pb(t)) in FIG. 2), data symbols 502, and other symbols 503, null symbols 1301 are also shown.

Null symbol 1301 has an in-phase component I of zero (0) and a quadrature component Q of zero (0) (note that this symbol is referred to as a "null symbol" here, but this symbol may be referred to as something else).

In FIG. 14, null symbols are inserted in carrier 19 (note that the method in which the null symbols are inserted is not limited to the configuration illustrated in FIG. 14; for example, a null symbol may be inserted at some certain time, a null symbol may be inserted at some certain frequency and time region, a null symbol may be inserted continuously at a time and frequency region, and a null symbol may be inserted discretely at a time and frequency region).

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 2". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{jxE(i)} \times x'(i)$ (j is an imaginary number unit). Note that the operation performed by phase changer 209B may be CDD (cyclic delay diversity) (CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 2, since phase changer 209B applies a phase change to baseband signal 208B, a phase change is applied to each symbol in FIG. 14; when a phase change is applied to baseband signal 208A in FIG. 2, a phase change is applied to each symbol in FIG. 13; this will be described later).

Accordingly, in the frame illustrated in FIG. 14, phase changer 209B illustrated in FIG. 2 applies a phase change to all symbols (in this case, all other symbols 503) for all carriers 1 to 36 at time $1. However, the handling of the phase change with respect to null symbol 1301 is as previously described.

Similarly, "phase changer 209B illustrated in FIG. 2 applies a phase change to all symbols (in this case, all other symbols 503) for all carriers 1 to 36 at time $2, However, the handling of the phase change with respect to null symbol 1301 is as previously described.", "phase changer 209B illustrated in FIG. 2 applies a phase change to all symbols (in this case, all other symbols 503) for all carriers 1 to 36 at time $3, However, the handling of the phase change with respect to null symbol 1301 is as previously described.", "phase changer 209B illustrated in FIG. 2 applies a phase change to all symbols (in this case, all other symbols 503) for all carriers 1 to 36 at time $4, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $5, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $6, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $7, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $8, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $9, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $10, However, the handling of the phase change with respect to null symbol 1301 is as previously described.", "phase changer 209B illustrated in FIG. 2 applies a phase change to all symbols (in this case, pilot symbols 501 or data symbols 502) for all carriers 1 to 36 at time $11. However, the handling of the phase change with respect to null symbol 1301 is as previously described." . . . .

The phase change value of phase changer 209B is expressed as $\Omega(i)$. Baseband signal 208B is x'(i) and phase-changed signal 210B is x(i). Accordingly, x(i)=$\Omega(i)$×x'(i) holds true.

For example, the phase change value is set as follows (Q is an integer that is greater than or equal to 2, and represents the number of phase change cycles).

[MATH. 38]

$$\Omega(i) = e^{j\frac{2\times\pi\times i}{Q}} \qquad \text{Equation (38)}$$

(j is an imaginary number unit.)

However, Equation (38) is merely a non-limiting example.

For example, $\Omega(i)$ may be set so as to implement a phase change that yields a cycle Q.

Moreover, for example, in FIG. 5 and FIG. 14, the same phase change value is applied to the same carriers, and the phase change value may be set on a per carrier basis. For example, the following may be implemented.

Regardless of time, the phase change value may be as follows for carrier 1 in FIG. 5 and FIG. 14.

[MATH. 39]

$$e^{j\times 0\times \pi} \qquad \text{Equation (39)}$$

Regardless of time, the phase change value may be as follows for carrier 2 in FIG. 5 and FIG. 14.

[MATH. 40]

$$e^{j\frac{1\times\pi}{6}} \qquad \text{Equation (40)}$$

Regardless of time, the phase change value may be as follows for carrier 3 in FIG. 5 and FIG. 14.

[MATH. 41]

$$e^{j\frac{2\times\pi}{6}} \qquad \text{Equation (41)}$$

Regardless of time, the phase change value may be as follows for carrier 4 in FIG. 5 and FIG. 14.

[MATH. 42]

$$e^{j\frac{3\times\pi}{6}} \qquad \text{Equation (42)}$$

This concludes the operational example of phase changer 209B illustrated in FIG. 2.

Next, the advantageous effects obtained by phase changer 209B illustrated in FIG. 2 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109_A) or antenna unit #B (109_B) illustrated in FIG. 1.

When transmission according to "case 2" is performed, since only one antenna is used to transmit the control information symbol, compared to when "transmitting a control information symbol using both antenna unit #A (109_A) and antenna unit #B (109_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109_A) and antenna unit #B (109_B)" is more beneficial.

Case 3: transmitting a control information symbol using both antenna unit #A (109_A) and antenna unit #B (109_B) illustrated in FIG. 1. However, phase change by is not performed by phase changer 209B illustrated in FIG. 2.

When transmission according to "case 3" is performed, since the modulated signal transmitted from antenna unit #A 109_A and the modulated signal transmitted from antenna unit #B 109_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 2, phase changer 209B is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly, that data reception quality in the reception device illustrated in FIG. 8 will improve.

For these reasons, in FIG. 2, phase changer 209B is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover. "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changer 209B, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209B was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changer 209B).

However, as illustrated in FIG. 2, in phase changer 209B, when a phase change is applied to data symbols 402 and data symbols 502 (to data symbols 502 in the example above), in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbols for propagation path variation estimation), which are included in other symbols 403 and other symbols 503".

Additionally, as illustrated in FIG. 2, in phase changer 209B, when a phase change is applied to data symbols 402 and data symbols 502 (data symbols 502 in the example above), in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changer 205B" and "symbols that are targets for implementation of a phase change by phase changer 209B" are different is a characteristic point.

As described above, by applying a phase change using phase changer 205B illustrated in FIG. 2, it is possible to achieve the advantageous effect of an improvement in data reception quality of data symbols 402 and data symbols 502 in the reception device in, for example, LOS environments, and by applying a phase change using phase changer 209B illustrated in FIG. 2, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 2, and furthermore, the reception quality of data symbols 402 and data symbols 502 is improved by applying a phase change to data symbols 402 and data symbols 502 using phase changer 209B illustrated in FIG. 2.

Note that FIG. 2 illustrates an example of a configuration in which phase changer 209B is arranged after inserter 207B and phase changer 209B applies a phase change to baseband signal 208B, but a configuration for achieving both the above-described advantageous effects of the phase change by phase changer 205B and the phase change by phase changer 209B is not limited to the example illustrated in FIG. 2. One example of an acceptable variation is one in which phase changer 209B is removed from the configuration illustrated in FIG. 2, baseband signal 208B output from inserter 207B becomes processed signal 106_B, phase changer 209A that performs the same operations as phase changer 209B is inserted after inserter 207A, and phase-changed signal 210A, which is generated by phase changer 209A implementing a phase change on baseband signal 208A, becomes processed signal 106_A. Even with such a configuration, similar to the example illustrated in FIG. 2 and described above, the advantageous effect of an improvement in data reception quality in the reception device of data symbols 402 and data symbols 502 in, for example, LOS environments, is achieved as a result of the phase change implemented by phase changer 205B illustrated in FIG. 2, and furthermore, the reception quality of data symbols 402 and data symbols 502 is improved by applying a phase change to data symbols 402 and data symbols 502 using phase changer 209A.

Furthermore, it is possible to achieve the advantageous effect of an improvement in data reception quality in the reception device of the control information symbols included in "the frames of FIG. 4 and FIG. 5" or "the frames of FIG. 13 and FIG. 14".

(Supplemental Information 1)

In, for example, Embodiment 1, it is described that the operation performed by "phase changer B" may be CDD (CSD) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. Next, supplemental information regarding this point will be given.

Figure 15:
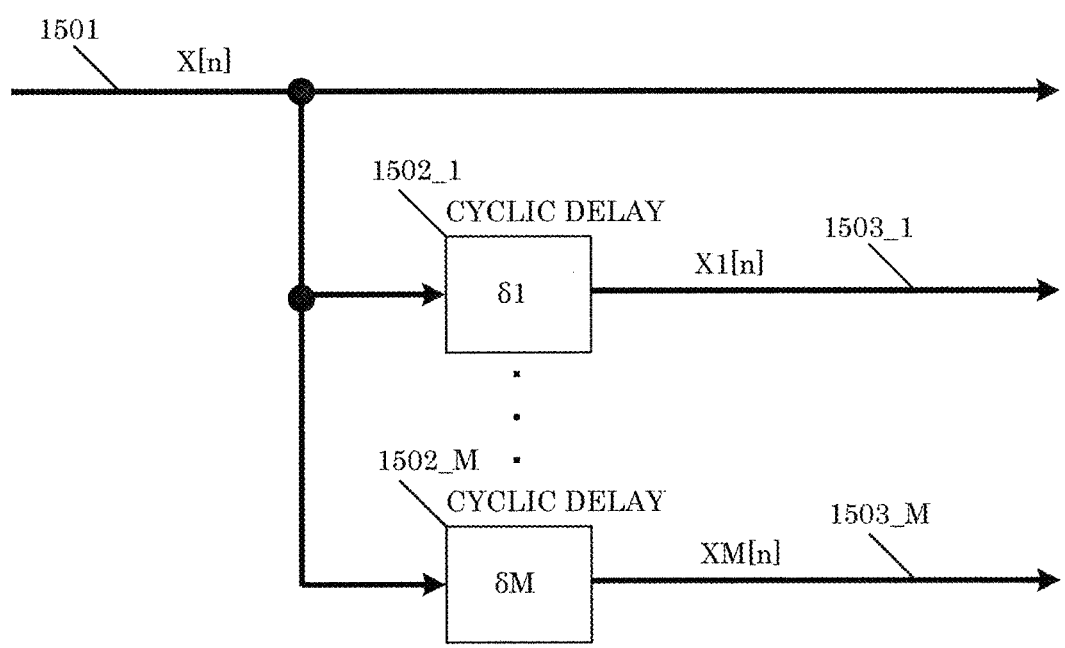
FIG. 15 illustrates one example of a configuration used when CDD is used.

FIG. 15 illustrates a configuration in the case that CDD (CSD) is used. 1501 is a modulated signal when cyclic delay is not implemented, and is expressed as X[n].

Cyclic delayer 1502_1 receives an input of modulated signal 1501, applies a cyclic delay, and outputs a cyclic-delayed signal 1503_1. When cyclic-delayed signal 1503_1 is expressed as X1[n], X1[n] is applied with the following equation.

[MATH. 43]

$$X1[n]=X[(n-\delta1)\bmod N] \quad \text{Equation (43)}$$

Note that δ1 is the cyclic delay amount (δ1 is a real number), and X[n] is configured as N symbols (N is an integer that is greater than or equal to 2). Accordingly, n is an integer that is greater than or equal to 0 and less than or equal to N−1.

Cyclic delayer 1502_M receives an input of modulated signal 1501, applies a cyclic delay, and outputs a cyclic-delayed signal 1503_M. When cyclic-delayed signal 1503_M is expressed as XM[n], XM[n] is applied with the following equation.

[MATH. 44]

$$XM[n]=X[(n-\delta M)\bmod N] \quad \text{Equation (44)}$$

Note that SM is the cyclic delay amount (SM is a real number), and X[n] is configured as N symbols (N is an integer that is greater than or equal to 2). Accordingly, n is an integer that is greater than or equal to 0 and less than or equal to N−1.

Cyclic delayer 1502_i (i is an integer that is greater than or equal to 1 and less than or equal to M (M is an integer that is greater than or equal to 1)) receives an input of modulated signal 1501, applies a cyclic delay, and outputs a cyclic-delayed signal 1503_i. When cyclic-delayed signal 1503_i is expressed as Xi[n], Xi[n] is applied with the following equation.

[MATH. 45]

$$Xi[n]=X[(n-\delta i)\bmod N] \quad \text{Equation (45)}$$

Note that δi is the cyclic delay amount (δi is a real number), and X[n] is configured as N symbols (N is an integer that is greater than or equal to 2). Accordingly, n is an integer that is greater than or equal to 0 and less than or equal to N−1.

Cyclic-delayed signal 1503_i is then transmitted from antenna i (accordingly, cyclic-delayed signal 1503_1, . . . , and cyclic-delayed signal 1503_M are each transmitted from different antennas).

This makes it possible to achieve the diversity effect via cyclic delay (in particular, reduce the adverse effects of delayed radio waves), and in the reception device, achieve an advantageous effect of improved data reception quality.

For example, phase changer 209B in FIG. 2 may be replaced with the cyclic delayer illustrated in FIG. 15, and may perform the same operations performed by phase changer 209B.

Accordingly, in phase changer 209B in FIG. 2, the cyclic delay amount δ (δ is a real number) is applied, and the input signal for phase changer 209B is expressed as Y[n]. When the output signal for phase changer 209B is expressed as Z[n], Z[n] is applied with the following equation.

[MATH. 46]

$$Z[n]=Y[(n-\delta)\bmod N] \quad \text{Equation (46)}$$

Note that Y[n] is configured as N samples (N is an integer that is greater than or equal to 2). Accordingly, n is an integer that is greater than or equal to 0 and less than or equal to N−1.

Next, the relationship between cyclic delay amount and phase change will be described.

For example, consider a case in which CDD (CSD) is applied to OFDM. Note that the carrier arrangement when OFDM is used is as illustrated in FIG. 16.

Figure 16:
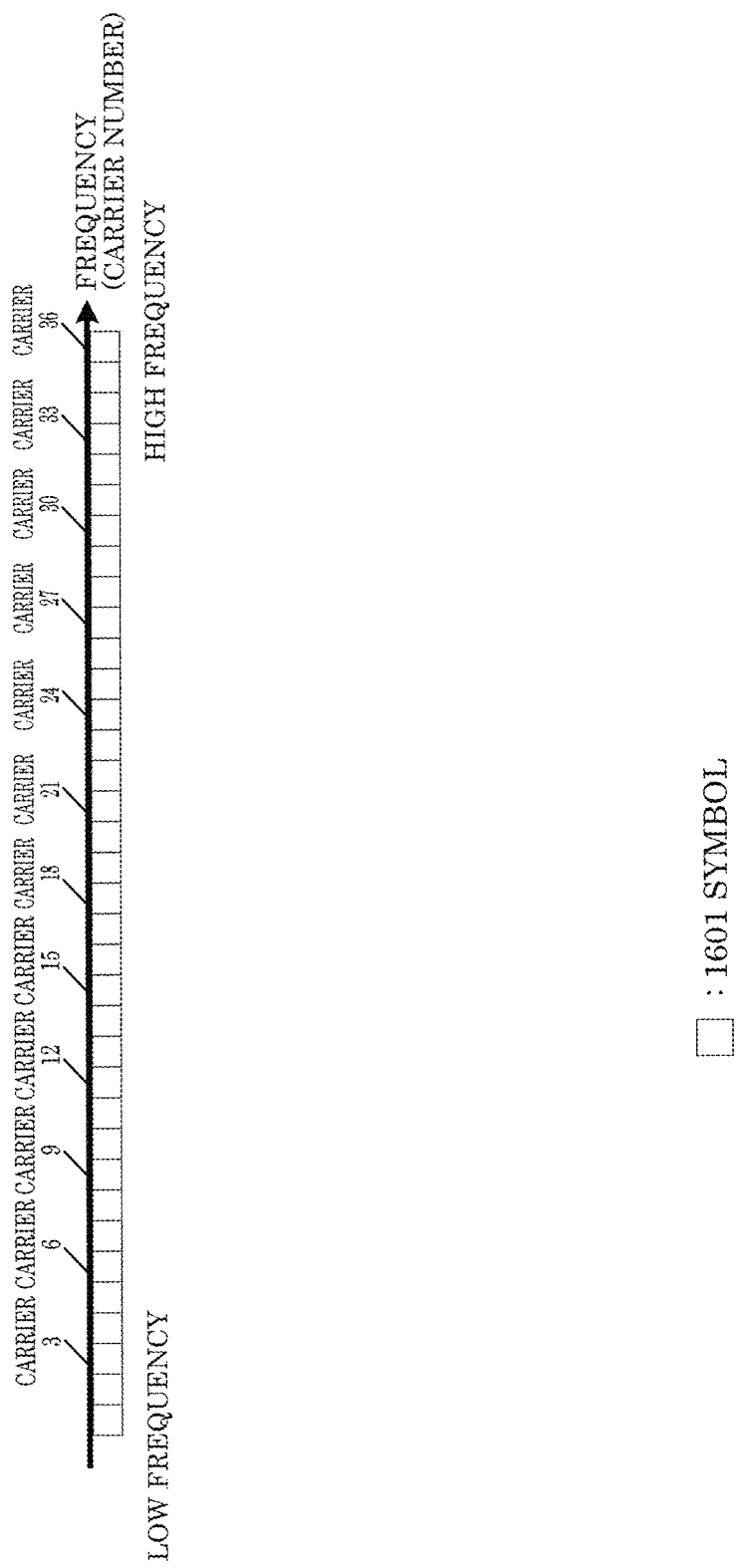
FIG. 16 illustrates one example of a carrier arrangement used when OFDM is used.
Figure 17:
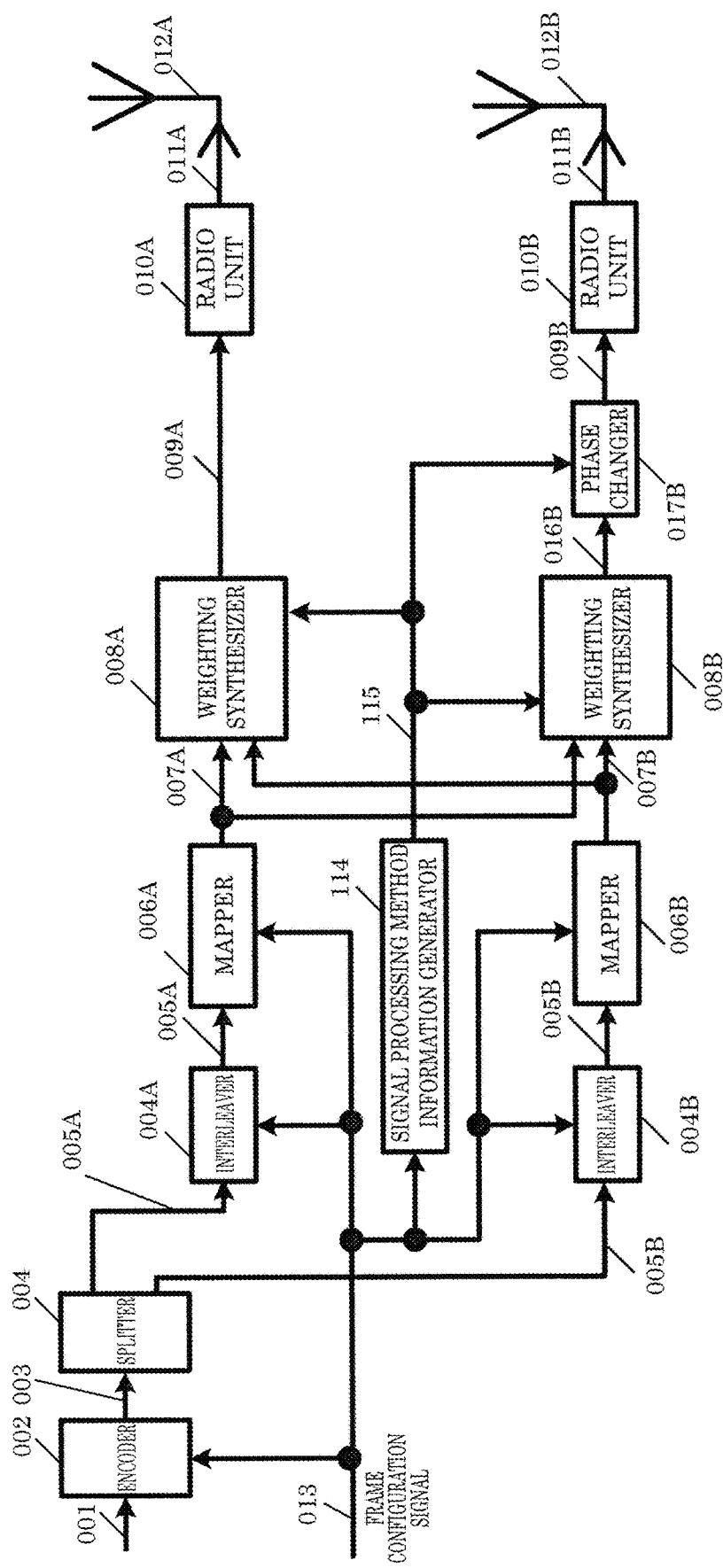
FIG. 17 illustrates an example of a configuration of a transmission device based on the DVB-NGH standard.

In FIG. 16, 1601 is a symbol, frequency (carriers) is (are) represented on the horizontal axis, with increasing frequency from left to right and carriers arranged in ascending order. Accordingly, the carrier of the lowest frequency is "carrier 1", and subsequent carriers are "carrier 2", "carrier 3", "carrier 4", . . . , For example, in phase changer 209B illustrated in FIG. 2, a cyclic delay amount τ is applied. In such as case, phase change value Ω[i] in "carrier i" is expressed as follows.

[MATH. 47]

$$\Omega[i]=e^{j\times\mu\times i} \quad \text{Equation (47)}$$

Note that μ is a value capable of being calculated from cyclic delay amount and/or the size of the fast Fourier transform (FFT).

When the baseband signal for "carrier i", time t before being applied with a phase change (before cyclic delay processing) is expressed as v'[i][t], the signal v[i][t] for "carrier i", time t after being applied with a phase change can be expressed as v[i][t]=Ω[i]×v'[i][t].

(Supplemental Information 2)

As a matter of course, the embodiments may be carried out by combining a plurality of the exemplary embodiments and other contents described in the present specification.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

Regarding the modulation scheme, even when a modulation scheme other than the modulation schemes described in the present specification is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation scheme, uniform mapping or non-uniform mapping may be performed.

Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described in the present specification. Hence, a function of outputting an in-phase component and a quadrature component based on a plurality of bits is a function in a mapper, and performing precoding and phase-change thereafter is one effective function of the present disclosure.

In the present specification, when "∀" and/or "∃" is present, "∀" represents a universal quantifier, and "∃" represents an existential quantifier.

Moreover, in the present specification, when there is a complex plane, the phase unit such as an argument is "radian".

When the complex plane is used, display in a polar form can be made as display by polar coordinates of a complex number. When point (a, b) on the complex plane is associated with complex number z=a+jb (a and b are both real numbers, and j is a unit of an imaginary number), and when this point is expressed by [r, θ] in polar coordinates, a=r×cos θ and b=r×sin θ,

[MATH. 48]

$$r=\sqrt{a^2+b^2} \quad (48)$$

holds true, r is an absolute value of z (r=|z|), and θ is an argument. Then, z=a+jb is expressed by $r \times e^{j\theta}$.

In the present specification, the reception device in the terminal and the antennas may be configured as separate devices. For example, the reception device includes an interface that receives an input, via a cable, of a signal received by an antenna or a signal generated by applying a signal received by an antenna with a frequency conversion, and the reception device performs subsequent processing.

Moreover, data/information obtained by the reception device is subsequently converted into a video or audio, and a display (monitor) displays the video or a speaker outputs the audio. Further, the data/information obtained by the reception device may be subjected to signal processing related to a video or a sound (signal processing may not be performed), and may be output from an RCA terminal (a video terminal or an audio terminal), a Universal Serial Bus (USB), or a High-Definition Multimedia Interface (registered trademark) (HDMI) of the reception device.

In the present specification, it can be considered that the apparatus which includes the transmission device is a communications and broadcast apparatus, such as a broadcast station, a base station, an access point, a terminal or a mobile phone. In such cases, it can be considered that the apparatus that includes the reception device is a communication apparatus such as a television, a radio, a terminal, a personal computer, a mobile phone, an access point, or a base station. Moreover, it can also be considered that the transmission device and reception device according to the present disclosure are each a device having communication functions that is formed so as to be connectable via some interface to an apparatus for executing an application in, for example, a television, a radio, a personal computer or a mobile phone.

Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (channel state information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding method, or encode rate of the error correction encoding method used in the communication, or settings information in an upper layer).

Note that the present disclosure is not limited to each exemplary embodiment, and can be carried out with various modifications. For example, in each embodiment, the present disclosure is described as being performed as a communications device. However, the present disclosure is not limited to this case, and this communications method can also be used as software.

Moreover, in the above description, precoding switching methods in a method for transmitting two modulated signals from two antennas are described, but these examples are not limiting. A precoding switching method in which precoding weight (matrix) is changed similarly in a method in which precoding is performed on four mapped signals to generate four modulated signals and transmitted from four antennas, that is to say, a method in which precoding is performed on N mapped signals to generate N modulated signals and transmitted from N antennas, can also be applied.

The terms "precoding" and "precoding weight" are used in the present specification. The terms used to refer to such signal processing are not important per-se: the signal processing itself is what is important to the present disclosure.

Streams s1(t) and s2(t) may transmit different data, and may transmit the same data.

The transmitting antenna in the transmission device, the receiving antenna in the reception device, and each signal antenna illustrated in the drawings may be configured of a plurality of antennas.

The transmission device needs to notify the reception device of the transmission method (MIMO, SISO, temporal-spatial block code, interleaving method), modulation scheme, and/or error correction encoding method (may be omitted depending on embodiment); this information is present in the frame transmitted by the transmission device; the reception device changes operation upon receipt.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in RAM (Random Access Memory) in a computer, and the computer may be caused to operate according to this program.

Each configuration of each of the above-described embodiments, etc., may be realized as a LSI (large scale integration) circuit, which is typically an integrated circuit. These integrated circuits may be formed as separate chips, or may be formed as one chip so as to include the entire configuration or part of the configuration of each embodiment. LSI is described here, but the integrated circuit may also be referred to as an IC (integrated circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable Field Programmable Gate Array (FPGA) or a reconfigurable processor which is reconfigurable in connection or settings of circuit cells inside the LSI circuit may be used.

Further, when development of a semiconductor technology or another derived technology provides a circuit integration technology which replaces LSI, as a matter of course, functional blocks may be integrated by using this technology. Adaption of biotechnology, for example, is a possibility.

The present disclosure can be widely applied to radio systems that transmit different modulated signals from different antennas. Moreover, the present disclosure can also be applied when MIMO transmission is used in a wired communications system including a plurality of transmission points (for example, a power line communication (PLC) system, an optical transmission system, a digital subscriber line (DSL) system).

Embodiment 2

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number: for example, i is an integer that is greater than or equal to 0). Note that details regarding the signal processing will be described with reference to FIG. 18 later.

Figure 18:
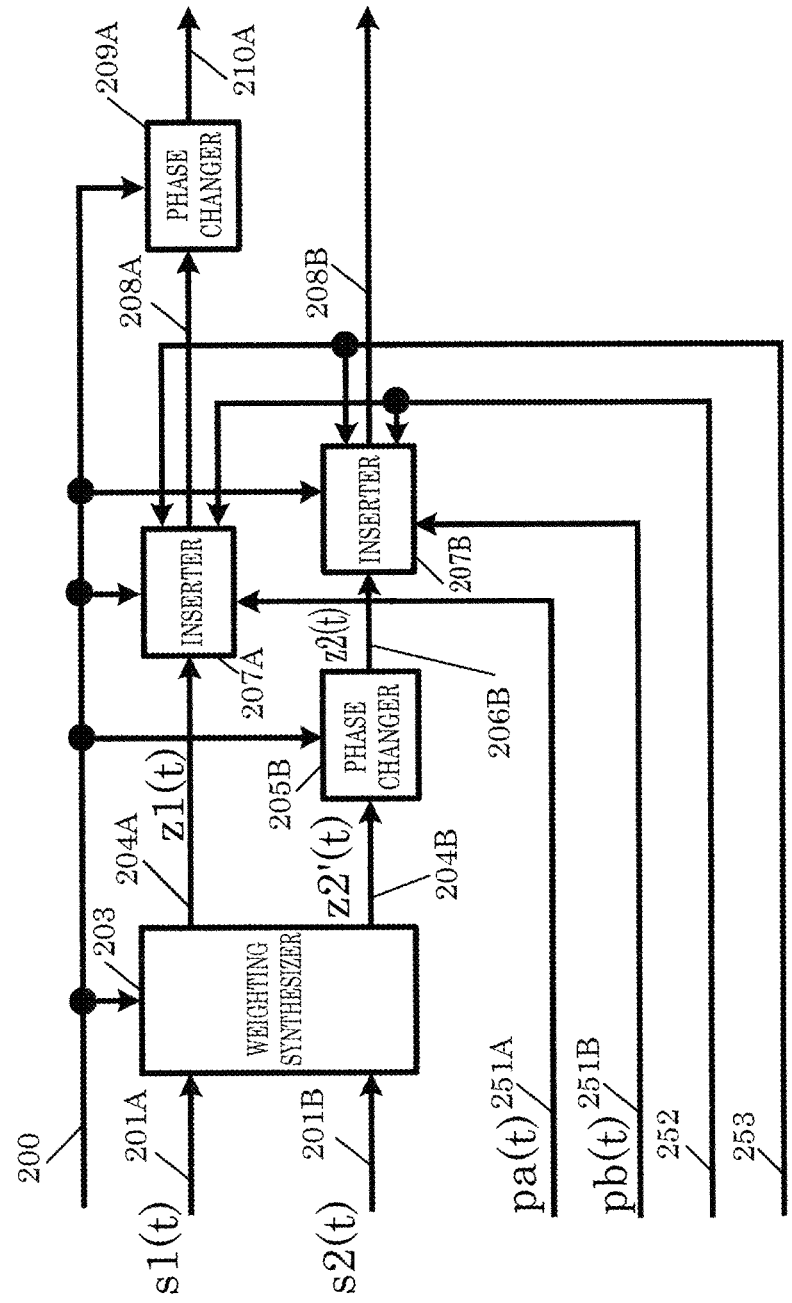
FIG. 18 illustrates one example of a configuration of the signal processor illustrated in FIG. 1.

FIG. 18 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time (s1(t), s2(t), z1(t), and z2'(t) are defined as complex numbers (accordingly, they may be real numbers)). Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (1).

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as $z2(i)=y(i) \times z2'(i)$ (i is a symbol number (i is an integer that is greater than or equal to 0)).

For example, the phase change value is set as shown in Equation (2) (N is an integer that is greater than or equal to 2, N is a phase change cycle)(when N is set to an odd number greater than or equal to 3, data reception quality may improve). However, Equation (2) is merely a non-limiting example. Here, phase change value $y(i)=e^{j \times \delta(i)}$.

Here, z1(i) and z2(i) can be expressed with Equation (3). Note that δ(i) is a real number. z1(i) and z2(i) are transmitted from the transmission device at the same time and using the same frequency (same frequency band). In Equation (3), the phase change value is not limited to the value used in Equation (2); for example, a method in which the phase is changed cyclically or regularly is conceivable.

As described in Embodiment 1, conceivable examples of the (precoding) matrix inserted in Equation (1) and Equation (3) are illustrated in Equation (5) through Equation (36) (however, the precoding matrix is not limited to these examples (the same applies to Embodiment 1)).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times \varepsilon(i)} \times x'(i)$ (j is an imaginary number unit).

As described in Embodiment 1, etc., note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol).

FIG. 3 illustrates one example of a configuration of radio units 107_A and 107_B illustrated in FIG. 1. FIG. 3 is described in Embodiment 1. Accordingly, description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly, description will be omitted from this embodiment.

FIG. 7 illustrates one example of a configuration of antenna unit #A (109_A) and antenna unit #B (109_B) illustrated in FIG. 1 (in this example, antenna unit #A (109_A) and antenna unit #B (109_B) include a plurality of antennas). FIG. 7 is described in Embodiment 1. Accordingly, description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas). FIG. 10 is described in Embodiment 1. Accordingly, description will be omitted from this embodiment.

Next, signal processor 106 in the transmission device illustrated in FIG. 1 is inserted as phase changer 205B and phase changer 209A, as illustrated in FIG. 18. The characteristics and advantageous effects of this configuration will be described.

As described with reference to FIG. 4 and FIG. 5, phase changer 205B applies precoding (weighted synthesis) to mapped signal s1(i) (201A) (i is a symbol number; i is an integer greater than or equal to 0) obtained via mapping using the first sequence and mapped signal s2(i) (201B) obtained via mapping using the second sequence, and applies a phase change to one of the obtained weighting synthesized signals 204A and 204B. Weighting synthesized signal 204A and phase-changed signal 206B are then transmitted at the same frequency and at the same time. Accordingly, in FIG. 4 and FIG. 5, a phase change is applied to data symbol 502 in FIG. 5 (in the case of FIG. 18, since phase changer 205 applies this to weighting synthesized signal 204B, a phase change is applied to data symbol 502 in FIG. 5; when a phase change is applied to weighting synthesized signal 204A, a phase change is applied to data symbol 402 in FIG. 4; this will be described later).

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times \delta 15(i)}$" for (carrier 1, time $5), "$e^{j\times \delta 25(i)}$" for (carrier 2, time $5), "$e^{j\times \delta 35(i)}$" for (carrier 3, time $5), "$e^{j\times \delta 45(i)}$" for (carrier 4, time $5), "$e^{j\times \delta 55(i)}$" (carrier 5, time $5), "$e^{j\times \delta 16(i)}$" for (carrier 1, time $6), "$e^{j\times \delta 26(i)}$" for (carrier 2, time $6), "$e^{j\times \delta 46(i)}$" for (carrier 4, time $6), and "$e^{j\times \delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 18 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 2$^4$=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changer 205B is omitted from the configuration illustrated in FIG. 18 (in other words, a case in which phase change is not applied by phase changer 205B in FIG. 18).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 18, phase changer 205B is inserted. When phase changer 205B is inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 18, a phase change is not applied by phase changer 205B in FIG. 18 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changer 205B in FIG. 18 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M (N and M are integers that are greater than or equal to 2).

As described above, phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j \times \varepsilon(i)} \times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 18, since phase changer 209A applies a phase change to baseband signal 208A, a phase change is applied to each symbol in FIG. 4).

Accordingly, in the frame illustrated in FIG. 4, phase changer 209A illustrated in FIG. 18 applies a phase change to all symbols (in this case, all other symbols 403) for all carriers 1 to 36 at time $1.

Similarly, phase changer 209A illustrated in FIG. 18 applies a phase change to all symbols (in this case, all other symbols 403) for all carriers 1 to 36 at time $2, phase changer 209A illustrated in FIG. 18 applies a phase change to all symbols (in this case, all other symbols 403) for all carriers 1 to 36 at time $3, phase changer 209A illustrated in FIG. 18 applies a phase change to all symbols (in this case, all other symbols 403) for all carriers 1 to 36 at time $4, phase changer 209A illustrated in FIG. 18 applies a phase change to all symbols (in this case, pilot symbols 401 or data symbols 402) for all carriers 1 to 36 at time $5, phase changer 209A illustrated in FIG. 18 applies a phase change to all symbols (in this case, pilot symbols 401 or data symbols 402) for all carriers 1 to 36 at time $6, phase changer 209A illustrated in FIG. 18 applies a phase change to all symbols (in this case, pilot symbols 401 or data symbols 402) for all carriers 1 to 36 at time $7, phase changer 209A illustrated in FIG. 18 applies a phase change to all symbols (in this case, pilot symbols 401 or data symbols 402) for all carriers 1 to 36 at time $8, phase changer 209A illustrated in FIG. 18 applies a phase change to all symbols (in this case, pilot symbols 401 or data symbols 402) for all carriers 1 to 36 at time $9, phase changer 209A illustrated in FIG. 18 applies a phase change to all symbols (in this case, pilot symbols 401 or data symbols 402) for all carriers 1 to 36 at time $10, phase changer 209A illustrated in FIG. 18 applies a phase change to all symbols (in this case, pilot symbols 401 or data symbols 402) for all carriers 1 to 36 at time $11 . . . .

FIG. 13 illustrates a frame configuration different from the frame configuration illustrated in FIG. 4 of transmission signal 108_A illustrated in FIG. 1. FIG. 13 is described in Embodiment 1. Accordingly, description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly, description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 18". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times\varepsilon(i)}\times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 18, since phase changer 209A applies a phase change to baseband signal 208A, a phase change is applied to each symbol in FIG. 13).

Accordingly, in the frame illustrated in FIG. 13, phase changer 209A illustrated in FIG. 18 applies a phase change to all symbols (in this case, all other symbols 403) for all carriers 1 to 36 at time $1. However, the handling of the phase change with respect to null symbol 1301 is as previously described.

Similarly, "phase changer 209A illustrated in FIG. 18 applies a phase change to all symbols (in this case, all other symbols 403) for all carriers 1 to 36 at time $2, However, the handling of the phase change with respect to null symbol 1301 is as previously described.", "phase changer 209A illustrated in FIG. 18 applies a phase change to all symbols (in this case, all other symbols 403) for all carriers 1 to 36 at time $3, However, the handling of the phase change with respect to null symbol 1301 is as previously described.", "phase changer 209A illustrated in FIG. 18 applies a phase change to all symbols (in this case, all other symbols 403) for all carriers 1 to 36 at time $4, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $5, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $6, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $7, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $8, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $9, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $10, However, the handling of the phase change with respect to null symbol 1301 is as previously described.", "phase changer 209A illustrated in FIG. 18 applies a phase change to all symbols (in this case, pilot symbols 401 or data symbols 402) for all carriers 1 to 36 at time $11. However, the handling of the phase change with respect to null symbol 1301 is as previously described." . . . .

The phase change value of phase changer 209A is expressed as $\Omega(i)$. Baseband signal 208A is $x'(i)$ and phase-changed signal 210A is $x(i)$. Accordingly, $x(i)=\Omega(i) \times x'(i)$ holds true.

For example, the phase change value is set to Equation (38) (Q is an integer that is greater than or equal to 2, and represents the number of phase change cycles) (j is an imaginary number unit). However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13.
. . .

This concludes the operational example of phase changer 209A illustrated in FIG. 18.

Next, the advantageous effects obtained by phase changer 209A illustrated in FIG. 18 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109_A) or antenna unit #B (109_B) illustrated in FIG. 1.

When transmission according to "case 2" is performed, since only one antenna is used to transmit the control information symbol, compared to when "transmitting a control information symbol using both antenna unit #A (109_A) and antenna unit #B (109_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109_A) and antenna unit #B (109_B)" is more beneficial.

Case 3: transmitting a control information symbol using both antenna unit #A (109_A) and antenna unit #B (109_B) illustrated in FIG. 1. However, phase change by is not performed by phase changer 209A illustrated in FIG. 18.

When transmission according to "case 3" is performed, since the modulated signal transmitted from antenna unit #A 109_A and the modulated signal transmitted from antenna unit #B 109_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 18, phase changer 209A is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly, that data reception quality in the reception device illustrated in FIG. 8 will improve.

For these reasons, in FIG. 18, phase changer 209A is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changer 209A, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209A was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changer 209A).

However, as illustrated in FIG. 18, in phase changer 209A, when a phase change is applied to data symbols 402 and data symbols 502 (to data symbols 402 in the example above), in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbols for propagation path variation estimation), which are included in other symbols 403 and other symbols 503".

Additionally, as illustrated in FIG. 18, in phase changer 209A, when a phase change is applied to data symbols 402 and data symbols 502 (data symbols 402 in the example above), in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changer 205B" and "symbols that are targets for implementation of a phase change by phase changer 209A" are different is a characteristic point.

As described above, by applying a phase change using phase changer 205B illustrated in FIG. 18, it is possible to achieve the advantageous effect of an improvement in data reception quality of data symbols 402 and data symbols 502 in the reception device in, for example, LOS environments, and by applying a phase change using phase changer 209A illustrated in FIG. 18, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 18, and furthermore, the reception quality of data symbols 402 and data symbols 502 is improved by applying a phase change to data symbols 402 and data symbols 502 using phase changer 209A illustrated in FIG. 18.

Note that Q in Equation (38) may be an integer of −2 or less. In such a case, the value for the phase change cycle is the absolute value of Q. This feature is applicable to Embodiment 1 as well.

Embodiment 3

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 1052, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 19 later.

Figure 19:
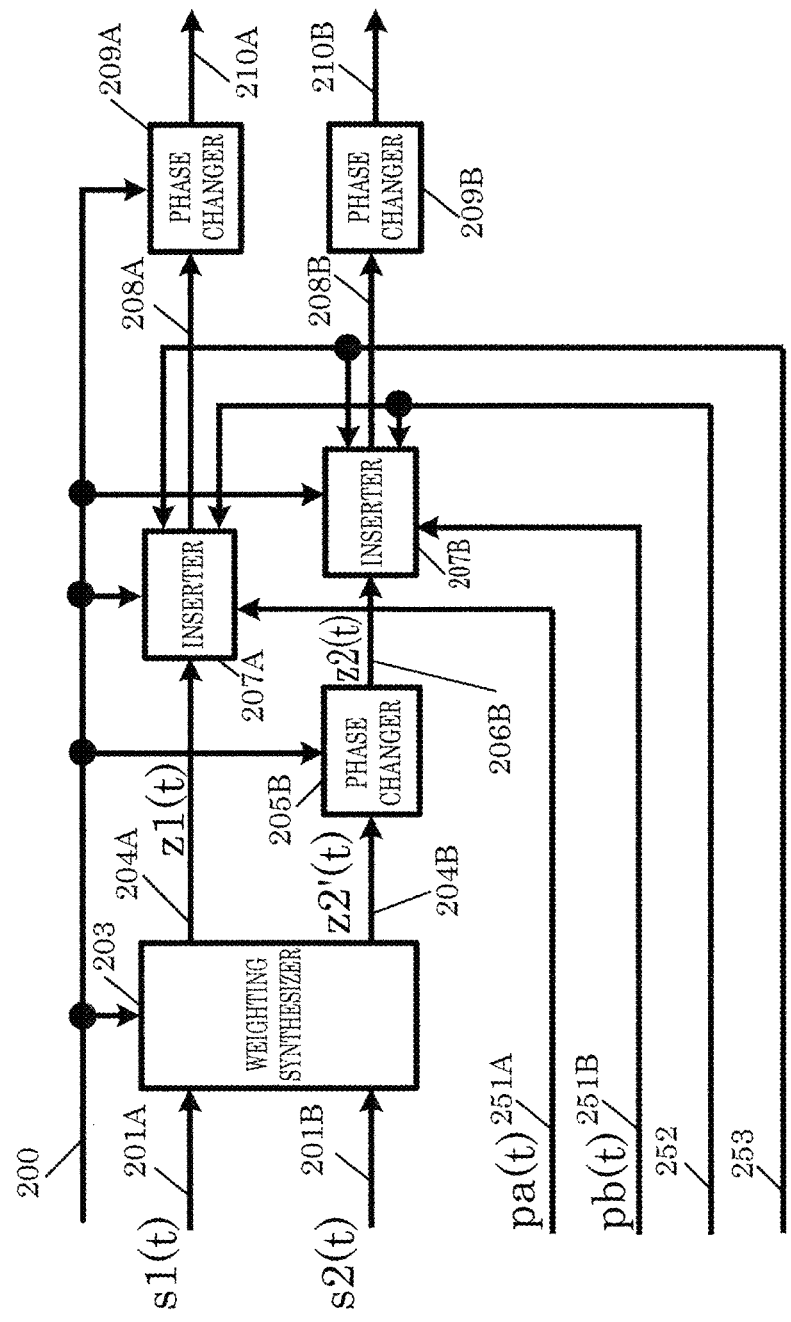
FIG. 19 illustrates one example of a configuration of the signal processor illustrated in FIG. 1.

FIG. 19 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time (s1(t), s2(t), z1(t), and z2'(t) are defined as complex numbers (accordingly, they may be real numbers)).

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (1).

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(i) (i is a symbol number (i is an integer that is greater than or equal to 0)).

For example, the phase change value is set as shown in Equation (2) (N is an integer that is greater than or equal to 2, N is a phase change cycle)(when N is set to an odd number greater than or equal to 3, data reception quality may improve). However, Equation (2) is merely a non-limiting example. Here, phase change value $y(i)=e^{j\times\delta(i)}$.

Here, z1(i) and z2(i) can be expressed with Equation (3). Note that δ(i) is a real number. z1(i) and z2(i) are transmitted from the transmission device at the same time and using the same frequency (same frequency band). In Equation (3), the phase change value is not limited to the value used in Equation (2); for example, a method in which the phase is changed cyclically or regularly is conceivable.

As described in Embodiment 1, conceivable examples of the (precoding) matrix inserted in Equation (1) and Equation (3) are illustrated in Equation (5) through Equation (36) (however, the precoding matrix is not limited to these examples (the same applies to Embodiment 1)).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times\varepsilon(i)}\times x'(i)$ (j is an imaginary number unit).

As described in Embodiment 1, etc., note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol).

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as y'(i). Then, phase-changed signal 210B (y(i)) can be expressed as $y(i)=e^{j\times\tau(i)}\times y'(i)$ (j is an imaginary number unit).

As described in Embodiment 1, etc., note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol).

The characteristic feature here is that the phase changing method via c(i) and the phase changing method via i(i) are different. Alternatively, the characteristic feature here is that the CDD(Cyclic Delay Diversity)(CSD(Cyclic Shift Diversity)) cyclic delay amount value set by phase changer 209A and the CDD(Cyclic Delay Diversity)(CSD(Cyclic Shift Diversity)) cyclic delay amount value set by phase changer 209B are different.

FIG. 3 illustrates one example of a configuration of radio units 107_A and 107_B illustrated in FIG. 1. FIG. 3 is described in Embodiment 1. Accordingly, description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly, description will be omitted from this embodiment.

FIG. 7 illustrates one example of a configuration of antenna unit #A (109_A) and antenna unit #B (109_B) illustrated in FIG. 1 (in this example, antenna unit #A (109_A) and antenna unit #B (109_1B) include a plurality of antennas). FIG. 7 is described in Embodiment 1. Accordingly, description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas). FIG. 10 is described in Embodiment 1. Accordingly, description will be omitted from this embodiment.

Next, signal processor 106 in the transmission device illustrated in FIG. 1 is inserted as phase changer 205B and phase changers 209A, 209B, as illustrated in FIG. 19. The characteristics and advantageous effects of this configuration will be described.

As described with reference to FIG. 4 and FIG. 5, phase changer 205B applies precoding (weighted synthesis) to mapped signal s1(i) (201A) (i is a symbol number; i is an integer greater than or equal to 0) obtained via mapping using the first sequence and mapped signal s2(i) (201B) obtained via mapping using the second sequence, and applies a phase change to one of the obtained weighting synthesized signals 204A and 204B. Weighting synthesized signal 204A and phase-changed signal 206B are then transmitted at the same frequency and at the same time. Accordingly, in FIG. 4 and FIG. 5, a phase change is applied to data symbol 502 in FIG. 5 (in the case of FIG. 19, since phase changer 205 applies this to weighting synthesized signal 204B, a phase change is applied to data symbol 502 in FIG. 5; when a phase change is applied to weighting synthesized signal 204A, a phase change is applied to data symbol 402 in FIG. 4: this will be described later).

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j \times \delta 15(i)}$" for (carrier 1, time $5), "$e^{j \times \delta 25(i)}$" for (carrier 2, time $5), "$e^{j \times \delta 35(i)}$" for (carrier 3, time $5), "$e^{j \times \delta 45(i)}$" for (carrier 4, time $5), "$e^{j \times \delta 55(i)}$" (carrier 5, time $5), "$e^{j \times \delta 16(i)}$" for (carrier 1, time $6), "$e^{j \times \delta 26(i)}$" for (carrier 2, time $6), "$e^{j \times \delta 46(i)}$" for (carrier 4, time $6), and "$e^{j \times \delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 19 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 24=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changer 205B is omitted from the configuration illustrated in FIG. 19 (in other words, a case in which phase change is not applied by phase changer 205B in FIG. 19).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 19, phase changer 205B is inserted. When phase changer 205B is inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 19, a phase change is not applied by phase changer 205B in FIG. 19 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changer 205B in FIG. 19 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M (N and M are integers that are greater than or equal to 2).

As described above, phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times\varepsilon(i)}\times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 19, since phase changer 209A applies a phase change to baseband signal 208A, a phase change is applied to each symbol in FIG. 4).

Accordingly, in the frame illustrated in FIG. 4, phase changer 209A illustrated in FIG. 19 applies a phase change to all symbols (in this case, all other symbols 403) for all carriers 1 to 36 at time $1.

Similarly, phase changer 209A illustrated in FIG. 19 applies a phase change to all symbols (in this case, all other symbols 403) for all carriers 1 to 36 at time $2, phase changer 209A illustrated in FIG. 19 applies a phase change to all symbols (in this case, all other symbols 403) for all carriers 1 to 36 at time $3, phase changer 209A illustrated in FIG. 19 applies a phase change to all symbols (in this case, all other symbols 403) for all carriers 1 to 36 at time $4, phase changer 209A illustrated in FIG. 19 applies a phase change to all symbols (in this case, pilot symbols 401 or data symbols 402) for all carriers 1 to 36 at time $5, phase changer 209A illustrated in FIG. 19 applies a phase change to all symbols (in this case, pilot symbols 401 or data symbols 402) for all carriers 1 to 36 at time $6, phase changer 209A illustrated in FIG. 19 applies a phase change to all symbols (in this case, pilot symbols 401 or data symbols 402) for all carriers 1 to 36 at time $7, phase changer 209A illustrated in FIG. 19 applies a phase change to all symbols (in this case, pilot symbols 401 or data symbols 402) for all carriers 1 to 36 at time $8, phase changer 209A illustrated in FIG. 19 applies a phase change to all symbols (in this case, pilot symbols 401 or data symbols 402) for all carriers 1 to 36 at time $9, phase changer 209A illustrated in FIG. 19 applies a phase change to all symbols (in this case, pilot symbols 401 or data symbols 402) for all carriers 1 to 36 at time $10, phase changer 209A illustrated in FIG. 19 applies a phase change to all symbols (in this case, pilot symbols 401 or data symbols 402) for all carriers 1 to 36 at time $11 . . . .

As described above, phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as y'(i). Then, phase-changed signal 210B (y(i)) can be expressed as $y(i)=e^{j\times\tau(i)}\times y'(i)$ (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 19, since phase changer 209B applies a phase change to baseband signal 208B, a phase change is applied to each symbol in FIG. 5).

Accordingly, in the frame illustrated in FIG. 5, phase changer 209B illustrated in FIG. 19 applies a phase change to all symbols (in this case, all other symbols 503) for all carriers 1 to 36 at time $1.

Similarly, phase changer 209B illustrated in FIG. 19 applies a phase change to all symbols (in this case, all other symbols 503) for all carriers 1 to 36 at time $2, phase changer 209B illustrated in FIG. 19 applies a phase change to all symbols (in this case, all other symbols 503) for all carriers 1 to 36 at time $3, phase changer 209B illustrated in FIG. 19 applies a phase change to all symbols (in this case, all other symbols 503) for all carriers 1 to 36 at time $4, phase changer 209B illustrated in FIG. 19 applies a phase change to all symbols (in this case, pilot symbols 501 or data symbols 502) for all carriers 1 to 36 at time $5, phase changer 209B illustrated in FIG. 19 applies a phase change to all symbols (in this case, pilot symbols 501 or data symbols 502) for all carriers 1 to 36 at time $6, phase changer 209B illustrated in FIG. 19 applies a phase change to all symbols (in this case, pilot symbols 501 or data symbols 502) for all carriers 1 to 36 at time $7, phase changer 209B illustrated in FIG. 19 applies a phase change to all symbols (in this case, pilot symbols 501 or data symbols 502) for all carriers 1 to 36 at time $8, phase changer 209B illustrated in FIG. 19 applies a phase change to all symbols (in this case, pilot symbols 501 or data symbols 502) for all carriers 1 to 36 at time $9, phase changer 209B illustrated in FIG. 19 applies a phase change to all symbols (in this case, pilot symbols 501 or data symbols 502) for all carriers 1 to 36 at time $10, phase changer 209B illustrated in FIG. 19 applies a phase change to all symbols (in this case, pilot symbols 501 or data symbols 502) for all carriers 1 to 36 at time $11 . . . .

FIG. 13 illustrates a frame configuration different from the frame configuration illustrated in FIG. 4 of transmission signal 108_A illustrated in FIG. 1. FIG. 13 is described in Embodiment 1. Accordingly, description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly, description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 19". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times \varepsilon(i)} \times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system." IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 19, since phase changer 209A applies a phase change to baseband signal 208A, a phase change is applied to each symbol in FIG. 13).

Accordingly, in the frame illustrated in FIG. 13, phase changer 209A illustrated in FIG. 19 applies a phase change to all symbols (in this case, all other symbols 403) for all carriers 1 to 36 at time $1. However, the handling of the phase change with respect to null symbol 1301 is as previously described.

Similarly, "phase changer 209A illustrated in FIG. 19 applies a phase change to all symbols (in this case, all other symbols 403) for all carriers 1 to 36 at time $2, However, the handling of the phase change with respect to null symbol 1301 is as previously described.", "phase changer 209A illustrated in FIG. 19 applies a phase change to all symbols (in this case, all other symbols 403) for all carriers 1 to 36 at time $3, However, the handling of the phase change with respect to null symbol 1301 is as previously described.", "phase changer 209A illustrated in FIG. 19 applies a phase change to all symbols (in this case, all other symbols 403) for all carriers 1 to 36 at time $4, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $5, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $6, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $7, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $8, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $9, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $10, However, the handling of the phase change with respect to null symbol 1301 is as previously described.", "phase changer 209A illustrated in FIG. 19 applies a phase change to all symbols (in this case, pilot symbols 401 or data symbols 402) for all carriers 1 to 36 at time $11. However, the handling of the phase change with respect to null symbol 1301 is as previously described." . . . .

The phase change value of phase changer 209A is expressed as $\Omega(i)$. Baseband signal 208A is x'(i) and phase-changed signal 210A is x(i). Accordingly, $x(i)=\Omega(i) \times x'(i)$ holds true.

For example, the phase change value is set to Equation (38) (Q is an integer that is greater than or equal to 2, and represents the number of phase change cycles) (j is an imaginary number unit). However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13.

. . .

This concludes the operational example of phase changer 209A illustrated in FIG. 19.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as y'(i). Then, phase-changed signal 210B (y(i)) can be expressed as $y(i)=e^{j\times\tau(i)}\times y'(i)$ (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 19, since phase changer 209B applies a phase change to baseband signal 208B, a phase change is applied to each symbol in FIG. 14).

Accordingly, in the frame illustrated in FIG. 14, phase changer 209B illustrated in FIG. 19 applies a phase change to all symbols (in this case, all other symbols 503) for all carriers 1 to 36 at time $1. However, the handling of the phase change with respect to null symbol 1301 is as previously described.

Similarly, "phase changer 209B illustrated in FIG. 19 applies a phase change to all symbols (in this case, all other symbols 503) for all carriers 1 to 36 at time $2, However, the handling of the phase change with respect to null symbol 1301 is as previously described.", "phase changer 209B illustrated in FIG. 19 applies a phase change to all symbols (in this case, all other symbols 503) for all carriers 1 to 36 at time $3, However, the handling of the phase change with respect to null symbol 1301 is as previously described.", "phase changer 209B illustrated in FIG. 19 applies a phase change to all symbols (in this case, all other symbols 503) for all carriers 1 to 36 at time $4, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $5, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $6, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $7, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $8, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $9, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $10, However, the handling of the phase change with respect to null symbol 1301 is as previously described.", "phase changer 209B illustrated in FIG. 19 applies a phase change to all symbols (in this case, pilot symbols 501 or data symbols 502) for all carriers 1 to 36 at time $11. However, the handling of the phase change with respect to null symbol 1301 is as previously described." . . . .

The phase change value of phase changer 209B is expressed as Ω(i). Baseband signal 208B is y'(i) and phase-changed signal 210B is y(i). Accordingly, y(i)=Δ(i)×y'(i) holds true.

For example, the phase change value is set as in the following equation (R is an integer that is greater than or equal to 2, and represents the number of phase change cycles. Note that the values for Q and R in Equation (38) may be different values).

[MATH. 49]

$$\Delta(i) = e^{j\frac{2\times\pi\times i}{R}} \qquad \text{Equation (49)}$$

(j is an imaginary number unit.)

However, Equation (49) is merely a non-limiting example.

For example, Δ(i) may be set so as to implement a phase change that yields a cycle R.

Note that the phase changing methods used by phase changer 209A and phase changer 209B may be different. For example, the cycle may be the same and, alternatively, may be different.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14.

. . .
Although the phase change value is described as Equation (39), (40), (41), and (42), the phase changing methods of phase changer 209A and phase changer 209B are different.

This concludes the operational example of phase changer 209B illustrated in FIG. 19.

Next, the advantageous effects obtained by phase changers 209A, 209B illustrated in FIG. 19 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109\_A) or antenna unit #B (109\_B) illustrated in FIG. 1.

When transmission according to "case 2" is performed, since only one antenna is used to transmit the control information symbol, compared to when "transmitting a control information symbol using both antenna unit #A (109\_A) and antenna unit #B (109\_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109\_A) and antenna unit #B (109\_B)" is more beneficial.

Case 3: transmitting a control information symbol using both antenna unit #A (109\_A) and antenna unit #B (109\_B) illustrated in FIG. 1. However, phase change by is not performed by phase changers 209A and 209B illustrated in FIG. 19.

When transmission according to "case 3" is performed, since the modulated signal transmitted from antenna unit #A 109\_A and the modulated signal transmitted from antenna unit #B 109\_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 19, phase changers 209A and 209B are inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109\_A is subjected to with respect to the multipath effect that the modulated signal transmitted from antenna unit #B 109\_B is subjected to, there is a high probability that diversity gain will result, and accordingly, that data reception quality in the reception device illustrated in FIG. 8 will improve.

For these reasons, in FIG. 19, phase changers 209A, 209B are provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changers 209A, 209B, as described above.

Under these circumstances, when this processing is not performed on data symbols 402 and data symbols 502, in the reception device, when data symbols 402 and data symbols 502 are demodulated and decoded, there is a need to perform the demodulation and decoding in which the processing for the phase change by phase changers 209A and 209B was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changers 209A and 209B).

However, as illustrated in FIG. 19, in phase changers 209A, 209B, when a phase change is applied to data symbols 402 and data symbols 502, in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbol for estimating propagation path fluctuation), which are included in other symbols 403 and other symbols 503".

Additionally, as illustrated in FIG. 19, in phase changers 209A, 209B, when a phase change is applied to data symbols 402 and data symbols 502, in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changer 205B" and "symbols that are targets for implementation of a phase change by phase changers 209A, 209B" are different is a characteristic point.

As described above, by applying a phase change using phase changer 205B illustrated in FIG. 19, it is possible to achieve the advantageous effect of an improvement in data reception quality of data symbols 402 and data symbols 502 in the reception device in, for example, LOS environments, and by applying a phase change using phase changers 209A, 209B illustrated in FIG. 19, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 19, and furthermore, the reception quality of data symbols 402 and data symbols 502 is improved by applying a phase change to data symbols 402 and data symbols 502 using phase changers 209A, 209B illustrated in FIG. 19.

Note that Q in Equation (38) may be an integer of −2 or less. In such a case, the value for the phase change cycle is the absolute value of Q. This feature is applicable to Embodiment 1 as well.

Note that R in Equation (49) may be an integer of −2 or less. In such a case, the value for the phase change cycle is the absolute value of R.

Moreover, taking into consideration the descriptions provided in Supplemental Information 1, the cyclic delay amount set in phase changer 209A and the cyclic delay amount set in phase changer 209B may be different values.

Embodiment 4

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 20 later.

Figure 20:
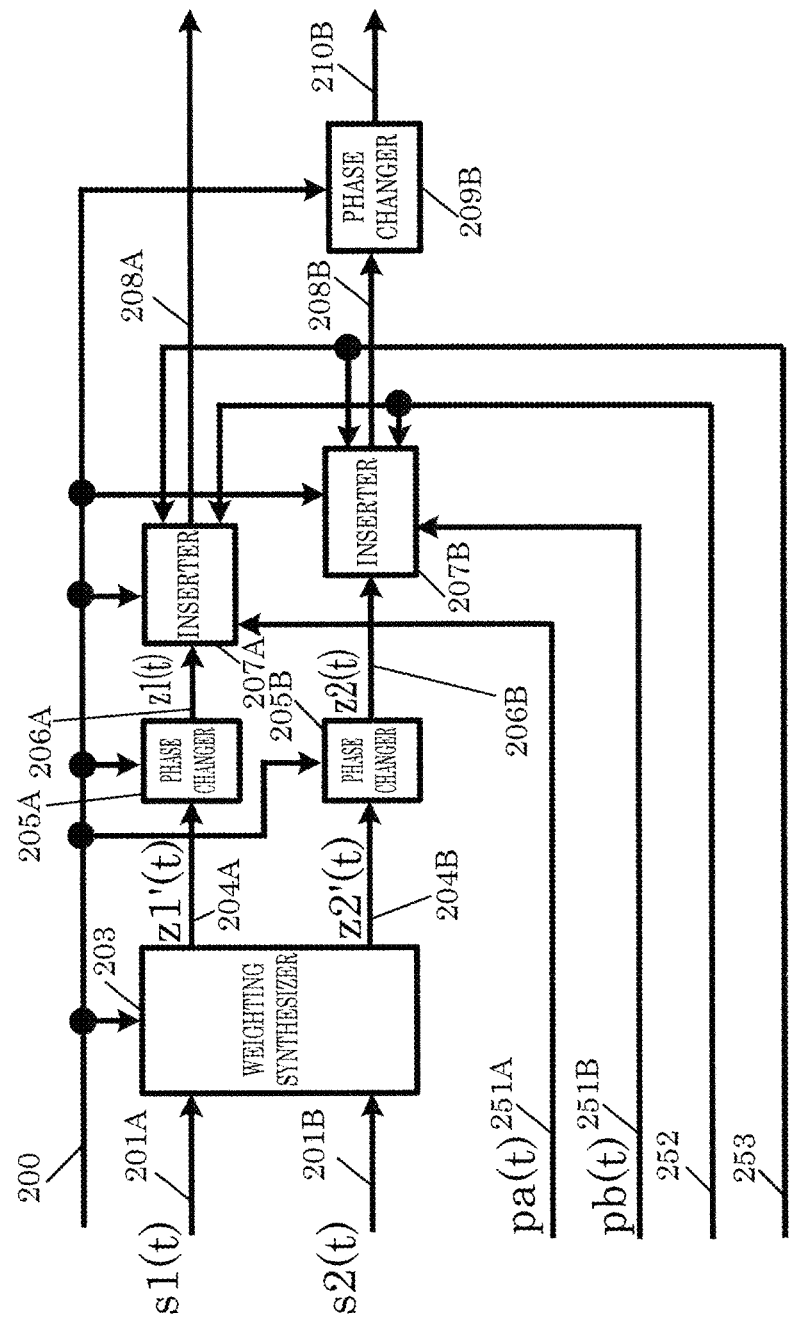
FIG. 20 illustrates one example of a configuration of the signal processor illustrated in FIG. 1.

FIG. 20 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1'(t), and weighted signal 204B is expressed as z2'(t). Note that one example of t is time (s1(t), s2(t), z1'(t), and z2'(t) are defined as complex numbers (accordingly, they may be real numbers)).

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the following calculation.

[MATH. 50]

$$\begin{pmatrix} z1'(i) \\ z2'(i) \end{pmatrix} = \begin{pmatrix} a & b \\ c & d \end{pmatrix} \begin{pmatrix} s1(i) \\ s2(i) \end{pmatrix}$$ Equation (50)

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t), and z1(t) is defined as a complex number (and may be a real number).

Next, specific operations performed by phase changer 205A will be described. In phase changer 205A, for example, a phase change of w(i) is applied to z1'(i). Accordingly, z1(i) can be expressed as z1(i)=w(i)×z1'(i) (i is a symbol number (i is an integer that is greater than or equal to 0)).

For example, the phase change value is set as follows.

[MATH. 51]

$$w(i) = e^{j\frac{2\times\pi\times i}{M}}$$ Equation (51)

(M is an integer that is greater than or equal to 2, M is a phase change cycle)(when M is set to an odd number greater than or equal to 3, data reception quality may improve).

However, Equation (51) is merely a non-limiting example. Here, phase change value is expressed as $w(i)=e^{j\times\lambda(i)}$.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(V (i is a symbol number (i is an integer that is greater than or equal to 0)).

For example, the phase change value is set as shown in Equation (2) (N is an integer that is greater than or equal to 2, N is a phase change cycle, N≠M)(when N is set to an odd number greater than or equal to 3, data reception quality may improve). However, Equation (2) is merely a non-limiting example. Here, phase change value $y(i)=e^{j\times\delta(i)}$.

Here, z1(i) and z2(i) can be expressed with the following equation.

[MATH. 52]

$$\begin{pmatrix} z1(i) \\ z2(i) \end{pmatrix} = \begin{pmatrix} w(i) & 0 \\ 0 & y(i) \end{pmatrix} \begin{pmatrix} a & b \\ c & d \end{pmatrix} \begin{pmatrix} s1(i) \\ s2(i) \end{pmatrix}$$ Equation (52)

$$= \begin{pmatrix} e^{j\times\lambda(i)} & 0 \\ 0 & e^{j\times\delta(i)} \end{pmatrix} \begin{pmatrix} a & b \\ c & d \end{pmatrix} \begin{pmatrix} s1(i) \\ s2(i) \end{pmatrix}$$

Note that δ(i) and λ(i) are real numbers. z1(i) and z2(i) are transmitted from the transmission device at the same time and using the same frequency (same frequency band). In Equation (52), the phase change value is not limited to the value used in Equations (2) and (52); for example, a method in which the phase is changed cyclically or regularly is conceivable.

As described in Embodiment 1, conceivable examples of the (precoding) matrix inserted in Equation (50) and Equation (52) are illustrated in Equation (5) through Equation (36) (however, the precoding matrix is not limited to these examples (the same applies to Embodiment 1)).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j\times\varepsilon(i)}\times x'(i)$ (j is an imaginary number unit).

As described in Embodiment 1, etc., note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol).

FIG. 3 illustrates one example of a configuration of radio units 107_A and 107_B illustrated in FIG. 1. FIG. 3 is described in Embodiment 1. Accordingly, description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly, description will be omitted from this embodiment.

FIG. 7 illustrates one example of a configuration of antenna unit #A (109_A) and antenna unit #B (109_B) illustrated in FIG. 1 (in this example, antenna unit #A (109_A) and antenna unit #B (109_B) include a plurality of antennas). FIG. 7 is described in Embodiment 1. Accordingly, description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas). FIG. 10 is described in Embodiment 1. Accordingly, description will be omitted from this embodiment.

Next, signal processor 106 in the transmission device illustrated in FIG. 1 is inserted as phase changers 205A, 205B and phase changer 209A, as illustrated in FIG. 20. The characteristics and advantageous effects of this configuration will be described.

As described with reference to FIG. 4 and FIG. 5, phase changers 205A, 205B apply precoding (weighted synthesis) to mapped signal s1(i) (201A) (i is a symbol number: i is an integer greater than or equal to 0) obtained via mapping using the first sequence and mapped signal s2(i) (201B) obtained via mapping using the second sequence, and applies a phase change to one of the obtained weighting synthesized signals 204A and 204B. Phase-changed signal 206A and phase-changed signal 206B are then transmitted at the same frequency and at the same time. Accordingly, in FIG. 4 and FIG. 5, a phase change is applied to data symbol 402 in FIG. 4 and data symbol 502 in FIG. 5.

For example, FIG. 11 illustrates an extraction of carrier 1 through carrier 5 and time $4 through time $6 from the frame illustrated in FIG. 4. Note that in FIG. 11, similar to FIG. 4, 401 is a pilot symbol, 402 is a data symbol, and 403 is an other symbol.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times\lambda 15(i)}$" for (carrier 1, time $5), "$e^{j\times\lambda 25(i)}$" for (carrier 2, time $5), "$e^{j\times\lambda 35(i)}$" for (carrier 3, time $5), "$e^{j\times\lambda 45(i)}$" for (carrier 4, time $5), "$e^{j\times\lambda 55(i)}$" (carrier 5, time $5), "$e^{j\times\lambda 16(i)}$" for (carrier 1, time $6), "$e^{j \times \lambda 26(i)}$" for (carrier 2, time $6), "$e^{j \times \lambda 46(i)}$" for (carrier 4, time $6), and "$e^{j \times \lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205A).

One example of the phase change that phase changer 205A applies to the data symbols is the method given in Equation (50) in which phase change is applied to the data symbols regularly (such as at each cycle N) (however, the phase change method implemented on the data symbols is not limited to this example).

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j \times \delta 15(i)}$" for (carrier 1, time $5), "$e^{j \times \delta 25(i)}$" for (carrier 2, time $5), "$e^{j \times \delta 35(i)}$" for (carrier 3, time $5), "$e^{j \times \delta 45(i)}$" for (carrier 4, time $5), "$e^{j \times \delta 55(i)}$" (carrier 5, time $5), "$e^{j \times \delta 16(i)}$" for (carrier 1, time $6), "$e^{j \times \delta 26(i)}$" for (carrier 2, time $6), "$e^{j \times \delta 46(i)}$" for (carrier 4, time $6), and "$e^{j \times \delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 18 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 2$^4$=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changers 205A and 205B are omitted from the configuration illustrated in FIG. 20 (in other words, a case in which phase change is not applied by phase changers 205A and 205B in FIG. 20).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 20, phase changers 205A, 205B are inserted. When phase changers 205A, 205B are inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 20, a phase change is not applied by phase changers 205A, 205B in FIG. 20 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changers 205A, 205B in FIG. 20 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M (N and M are integers that are greater than or equal to 2).

As described above, phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j\times\varepsilon(i)}\times x'(i)$ (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 20, since phase changer 209B applies a phase change to baseband signal 208B, a phase change is applied to each symbol in FIG. 5).

Accordingly, in the frame illustrated in FIG. 5, phase changer 209B illustrated in FIG. 20 applies a phase change to all symbols (in this case, all other symbols 503) for all carriers 1 to 36 at time $1.

Similarly, phase changer 209B illustrated in FIG. 20 applies a phase change to all symbols (in this case, all other symbols 503) for all carriers 1 to 36 at time $2, phase changer 209B illustrated in FIG. 20 applies a phase change to all symbols (in this case, all other symbols 503) for all carriers 1 to 36 at time $3, phase changer 209B illustrated in FIG. 20 applies a phase change to all symbols (in this case, all other symbols 503) for all carriers 1 to 36 at time $4, phase changer 209B illustrated in FIG. 20 applies a phase change to all symbols (in this case, pilot symbols 501 or data symbols 502) for all carriers 1 to 36 at time $5, phase changer 209B illustrated in FIG. 20 applies a phase change to all symbols (in this case, pilot symbols 501 or data symbols 502) for all carriers 1 to 36 at time $6, phase changer 209B illustrated in FIG. 20 applies a phase change to all symbols (in this case, pilot symbols 501 or data symbols 502) for all carriers 1 to 36 at time $7, phase changer 209B illustrated in FIG. 20 applies a phase change to all symbols (in this case, pilot symbols 501 or data symbols 502) for all carriers 1 to 36 at time $8, phase changer 209B illustrated in FIG. 20 applies a phase change to all symbols (in this case, pilot symbols 501 or data symbols 502) for all carriers 1 to 36 at time $9, phase changer 209B illustrated in FIG. 20 applies a phase change to all symbols (in this case, pilot symbols 501 or data symbols 502) for all carriers 1 to 36 at time $10, phase changer 209B illustrated in FIG. 20 applies a phase change to all symbols (in this case, pilot symbols 501 or data symbols 502) for all carriers 1 to 36 at time $11 . . . .

FIG. 13 illustrates a frame configuration different from the frame configuration illustrated in FIG. 4 of transmission signal 108_A illustrated in FIG. 1. FIG. 13 is described in Embodiment 1. Accordingly, description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly, description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 20". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j\times\varepsilon(i)}\times x'(i)$ (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system,"

IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 20, since phase changer 209B applies a phase change to baseband signal 208B, a phase change is applied to each symbol in FIG. 14).

Accordingly, in the frame illustrated in FIG. 14, phase changer 209B illustrated in FIG. 20 applies a phase change to all symbols (in this case, all other symbols 503) for all carriers 1 to 36 at time $1. However, the handling of the phase change with respect to null symbol 1301 is as previously described.

Similarly, "phase changer 209B illustrated in FIG. 20 applies a phase change to all symbols (in this case, all other symbols 503) for all carriers 1 to 36 at time $2, However, the handling of the phase change with respect to null symbol 1301 is as previously described.", "phase changer 209B illustrated in FIG. 20 applies a phase change to all symbols (in this case, all other symbols 503) for all carriers 1 to 36 at time $3, However, the handling of the phase change with respect to null symbol 1301 is as previously described.", "phase changer 209B illustrated in FIG. 20 applies a phase change to all symbols (in this case, all other symbols 503) for all carriers 1 to 36 at time $4, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $5, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $6, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $7, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $8, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $9, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $10, However, the handling of the phase change with respect to null symbol 1301 is as previously described.", "phase changer 209B illustrated in FIG. 20 applies a phase change to all symbols (in this case, pilot symbols 501 or data symbols 502) for all carriers 1 to 36 at time $11. However, the handling of the phase change with respect to null symbol 1301 is as previously described." . . .

The phase change value of phase changer 209B is expressed as $\Omega(i)$. Baseband signal 208B is $x'(i)$ and phase-changed signal 210B is $x(i)$. Accordingly, $x(i)=\Omega(i) \times x'(i)$ holds true.

For example, the phase change value is set to Equation (38) (Q is an integer that is greater than or equal to 2, and represents the number of phase change cycles) (j is an imaginary number unit). However, Equation (38) is merely a non-limiting example.

For example, $\Omega(i)$ may be set so as to implement a phase change that yields a cycle Q.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14.

. . .

This concludes the operational example of phase changer 209B illustrated in FIG. 20.

Next, the advantageous effects obtained by phase changer 209B illustrated in FIG. 20 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109_A) or antenna unit #B (109_3) illustrated in FIG. 1.

When transmission according to "case 2" is performed, since only one antenna is used to transmit the control information symbol, compared to when "transmitting a control information symbol using both antenna unit #A (109_A) and antenna unit #B (109_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109_A) and antenna unit #B (109_B)" is more beneficial.

Case 3: transmitting a control information symbol using both antenna unit #A (109_A) and antenna unit #B (109_3) illustrated in FIG. 1. However, phase change by is not performed by phase changer 209B illustrated in FIG. 20.

When transmission according to "case 3" is performed, since the modulated signal transmitted from antenna unit #A 109_A and the modulated signal transmitted from antenna unit #B 109_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 20, phase changer 209B is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly, that data reception quality in the reception device illustrated in FIG. 8 will improve.

For these reasons, in FIG. 20, phase changer 209B is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changer 209B, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209B was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changer 209B).

However, as illustrated in FIG. 20, in phase changer 209B, when a phase change is applied to data symbols 402 and data symbols 502 (to data symbols 502 in the example above), in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbols for propagation path variation estimation), which are included in other symbols 403 and other symbols 503".

Additionally, as illustrated in FIG. 20, in phase changer 209B, when a phase change is applied to data symbols 402 and data symbols 502 (to data symbols 502 in the example above), in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changers 205A, 205B" and "symbols that are targets for implementation of a phase change by phase changer 209B" are different is a characteristic point.

As described above, by applying a phase change using phase changers 205A, 205B illustrated in FIG. 20, it is possible to achieve the advantageous effect of an improvement in data reception quality of data symbols 402 and data symbols 502 in the reception device in, for example, LOS environments, and by applying a phase change using phase changer 209B illustrated in FIG. 20, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A, 205B illustrated in FIG. 20, and furthermore, the reception quality of data symbols 402 and data symbols 502 is improved by applying a phase change to data symbols 402 and data symbols 502 using phase changer 209B illustrated in FIG. 20.

Note that Q in Equation (38) may be an integer of −2 or less. In such a case, the value for the phase change cycle is the absolute value of Q. This feature is applicable to Embodiment 1 as well.

Embodiment 5

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 1052, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 21 later.

Figure 21:
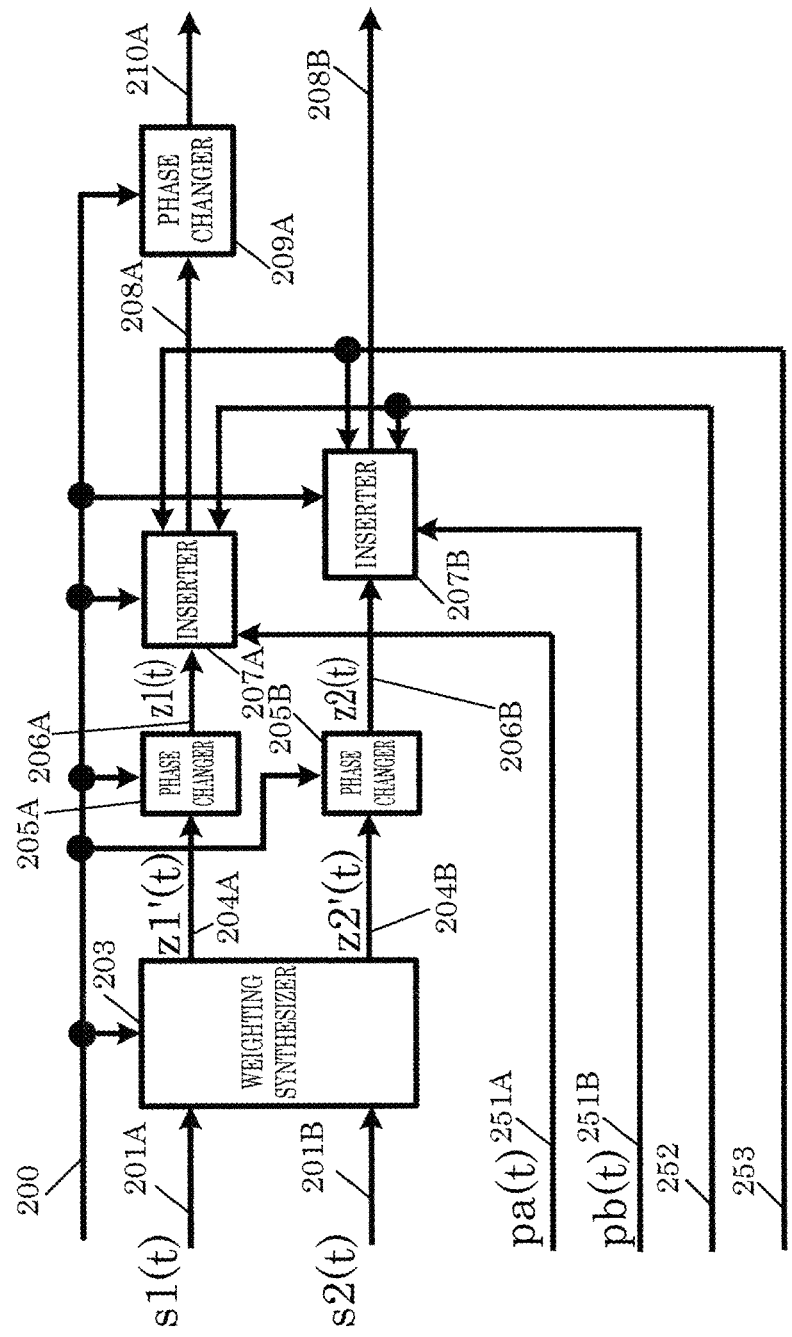
FIG. 21 illustrates one example of a configuration of the signal processor illustrated in FIG. 1.

FIG. 21 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1'(t), and weighted signal 204B is expressed as z2'(t). Note that one example of t is time (s1(t), s2(t), z1'(t), and z2'(t) are defined as complex numbers (accordingly, they may be real numbers)).

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (49).

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t), and z1(t) is defined as a complex number (and may be a real number).

Next, specific operations performed by phase changer 205A will be described. In phase changer 205A, for example, a phase change of w(i) is applied to z1'(i). Accordingly, z1(i) can be expressed as z1(i)=w(i)×z1'(i) (i is a symbol number (i is an integer that is greater than or equal to 0)).

For example, the phase change value is set as indicated in Equation (50).

(M is an integer that is greater than or equal to 2, M is a phase change cycle)(when M is set to an odd number greater than or equal to 3, data reception quality may improve). However, Equation (50) is merely a non-limiting example. Here, phase change value is expressed as $w(i)=e^{j\times\lambda(i)}$.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(i) (i is a symbol number (i is an integer that is greater than or equal to 0)).

For example, the phase change value is set as shown in Equation (2) (N is an integer that is greater than or equal to 2, N is a phase change cycle, N #M)(when N is set to an odd number greater than or equal to 3, data reception quality may improve). However, Equation (2) is merely a non-limiting example. Here, phase change value $y(i)=e^{j\times\delta(i)}$.

Here, z1(i) and z2(i) can be expressed with Equation (51).

Note that δ(i) and Δ(i) are real numbers. z1(i) and z2(i) are transmitted from the transmission device at the same time and using the same frequency (same frequency band). In Equation (51), the phase change value is not limited to the value used in Equations (2) and (51); for example, a method in which the phase is changed cyclically or regularly is conceivable.

As described in Embodiment 1, conceivable examples of the (precoding) matrix inserted in Equation (49) and Equation (51) are illustrated in Equation (5) through Equation (36) (however, the precoding matrix is not limited to these examples (the same applies to Embodiment 1)).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i)=e^{j\times\varepsilon(i)}\times x'(i)$ (j is an imaginary number unit).

As described in Embodiment 1, etc., note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol).

FIG. 3 illustrates one example of a configuration of radio units 107_A and 107_B illustrated in FIG. 1. FIG. 3 is described in Embodiment 1. Accordingly, description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly, description will be omitted from this embodiment.

FIG. 7 illustrates one example of a configuration of antenna unit #A (109_A) and antenna unit #B (109_B) illustrated in FIG. 1 (in this example, antenna unit #A (109_A) and antenna unit #B (109_B) include a plurality of antennas). FIG. 7 is described in Embodiment 1. Accordingly, description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas). FIG. 10 is described in Embodiment 1. Accordingly, description will be omitted from this embodiment.

Next, signal processor 106 in the transmission device illustrated in FIG. 1 is inserted as phase changers 205A, 205B and phase changer 209B, as illustrated in FIG. 21. The characteristics and advantageous effects of this configuration will be described.

As described with reference to FIG. 4 and FIG. 5, phase changers 205A, 205B apply precoding (weighted synthesis) to mapped signal s1(i) (201A) (i is a symbol number; i is an integer greater than or equal to 0) obtained via mapping using the first sequence and mapped signal s2(i) (201B) obtained via mapping using the second sequence, and applies a phase change to one of the obtained weighting synthesized signals 204A and 204B. Phase-changed signal 206A and phase-changed signal 206B are then transmitted at the same frequency and at the same time. Accordingly, in FIG. 4 and FIG. 5, a phase change is applied to data symbol 402 in FIG. 4 and data symbol 502 in FIG. 5.

For example, FIG. 11 illustrates an extraction of carrier 1 through carrier 5 and time $4 through time $6 from the frame illustrated in FIG. 4. Note that in FIG. 11, similar to FIG. 4, 401 is a pilot symbol, 402 is a data symbol, and 403 is an other symbol.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times\lambda 15(i)}$" for (carrier 1, time $5), "$e^{j\times\lambda 25(i)}$" for (carrier 2, time $5), "$e^{j\times\lambda 35(i)}$" for (carrier 3, time $5), "$e^{j\times\lambda 45(i)}$" for (carrier 4, time $5), "$e^{j\times\lambda 55(i)}$" (carrier 5, time $5), "$e^{j\times\lambda 16(i)}$" for (carrier 1, time $6), "$e^{j\times\lambda 26(i)}$" for (carrier 2, time $6), "$e^{j\times\lambda 46(i)}$" for (carrier 4, time $6), and "$e^{j\times\lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5). (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205A).

One example of the phase change that phase changer 205A applies to the data symbols is the method given in Equation (50) in which phase change is applied to the data symbols regularly (such as at each cycle N) (however, the phase change method implemented on the data symbols is not limited to this example).

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6), "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 18 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 24=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changers 205A and 205B are omitted from the configuration illustrated in FIG. 21 (in other words, a case in which phase change is not applied by phase changers 205A and 205B in FIG. 21).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 21, phase changers 205A, 205B are inserted. When phase changers 205A, 205B are inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 21, a phase change is not applied by phase changers 205A, 205B in FIG. 21 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changers 205A, 205B in FIG. 21 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M (N and M are integers that are greater than or equal to 2).

As described above, phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x(i). Then, phase-changed signal 210A (x(i)) can be expressed as $x(i)=e^{j \times \varepsilon(i)} \times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols)) (in the case of FIG. 21, since phase changer 209A applies a phase change to baseband signal 208A, a phase change is applied to each symbol in FIG. 4).

Accordingly, in the frame illustrated in FIG. 4, phase changer 209A illustrated in FIG. 21 applies a phase change to all symbols (in this case, all other symbols 403) for all carriers 1 to 36 at time $1.

Similarly, phase changer 209A illustrated in FIG. 21 applies a phase change to all symbols (in this case, all other symbols 403) for all carriers 1 to 36 at time $2, phase changer 209A illustrated in FIG. 21 applies a phase change to all symbols (in this case, all other symbols 403) for all carriers 1 to 36 at time $3, phase changer 209A illustrated in FIG. 21 applies a phase change to all symbols (in this case, all other symbols 403) for all carriers 1 to 36 at time $4, phase changer 209A illustrated in FIG. 21 applies a phase change to all symbols (in this case, pilot symbols 401 or data symbols 402) for all carriers 1 to 36 at time $5, phase changer 209A illustrated in FIG. 21 applies a phase change to all symbols (in this case, pilot symbols 401 or data symbols 402) for all carriers 1 to 36 at time $6, phase changer 209A illustrated in FIG. 21 applies a phase change to all symbols (in this case, pilot symbols 401 or data symbols 402) for all carriers 1 to 36 at time $7, phase changer 209A illustrated in FIG. 21 applies a phase change to all symbols (in this case, pilot symbols 401 or data symbols 402) for all carriers 1 to 36 at time $8, phase changer 209A illustrated in FIG. 21 applies a phase change to all symbols (in this case, pilot symbols 401 or data symbols 402) for all carriers 1 to 36 at time $9, phase changer 209A illustrated in FIG. 21 applies a phase change to all symbols (in this case, pilot symbols 401 or data symbols 402) for all carriers 1 to 36 at time $10, phase changer 209A illustrated in FIG. 21 applies a phase change to all symbols (in this case, pilot symbols 401 or data symbols 402) for all carriers 1 to 36 at time $11 . . . .

FIG. 13 illustrates a frame configuration different from the frame configuration illustrated in FIG. 4 of transmission signal 108_A illustrated in FIG. 1. FIG. 13 is described in Embodiment 1. Accordingly, description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly, description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 21". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i)=e^{j\times\varepsilon(i)}\times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system." IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 21, since phase changer 209A applies a phase change to baseband signal 208A, a phase change is applied to each symbol in FIG. 13).

Accordingly, in the frame illustrated in FIG. 13, phase changer 209A illustrated in FIG. 21 applies a phase change to all symbols (in this case, all other symbols 403) for all carriers 1 to 36 at time $1. However, the handling of the phase change with respect to null symbol 1301 is as previously described.

Similarly, "phase changer 209A illustrated in FIG. 21 applies a phase change to all symbols (in this case, all other symbols 403) for all carriers 1 to 36 at time $2, However, the handling of the phase change with respect to null symbol 1301 is as previously described.", "phase changer 209A illustrated in FIG. 21 applies a phase change to all symbols (in this case, all other symbols 403) for all carriers 1 to 36 at time $3, However, the handling of the phase change with respect to null symbol 1301 is as previously described.", "phase changer 209A illustrated in FIG. 21 applies a phase change to all symbols (in this case, all other symbols 403) for all carriers 1 to 36 at time $4, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $5, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $6, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $7, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $8, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $9, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $10, However, the handling of the phase change with respect to null symbol 1301 is as previously described.", "phase changer 209A illustrated in FIG. 21 applies a phase change to all symbols (in this case, pilot symbols 401 or data symbols 402) for all carriers 1 to 36 at time $11. However, the handling of the phase change with respect to null symbol 1301 is as previously described." . . . .

The phase change value of phase changer 209A is expressed as Ω(i). Baseband signal 208A is x'(i) and phase-changed signal 210A is x(i). Accordingly, x(i)=Ω(i)×x'(i) holds true.

For example, the phase change value is set to Equation (38) (Q is an integer that is greater than or equal to 2, and represents the number of phase change cycles) (j is an imaginary number unit). However, Equation (38) is merely a non-limiting example.

For example, Ω(i) may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13.

This concludes the operational example of phase changer 209A illustrated in FIG. 21.

Next, the advantageous effects obtained by phase changer 209A illustrated in FIG. 21 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109_A) or antenna unit #B (109_3) illustrated in FIG. 1.

When transmission according to "case 2" is performed, since only one antenna is used to transmit the control information symbol, compared to when "transmitting a control information symbol using both antenna unit #A (109_A) and antenna unit #B (109_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109_A) and antenna unit #B (109_B)" is more beneficial.

Case 3: transmitting a control information symbol using both antenna unit #A (109_A) and antenna unit #B (109_1B) illustrated in FIG. 1. However, phase change by is not performed by phase changer 209A illustrated in FIG. 21.

When transmission according to "case 3" is performed, since the modulated signal transmitted from antenna unit #A 109_A and the modulated signal transmitted from antenna unit #B 109_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 21, phase changer 209A is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly, that data reception quality in the reception device illustrated in FIG. 8 will improve.

For these reasons, in FIG. 21, phase changer 209A is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changer 209A, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209A was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changer 209A).

However, as illustrated in FIG. 21, in phase changer 209A, when a phase change is applied to data symbols 402 and data symbols 502 (to data symbols 402 in the example above), in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbols for propagation path variation estimation), which are included in other symbols 403 and other symbols 503".

Additionally, as illustrated in FIG. 21, in phase changer 209A, when a phase change is applied to data symbols 402 and data symbols 502 (data symbols 402 in the example above), in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changers 205A, 205B" and "symbols that are targets for implementation of a phase change by phase changer 209A" are different is a characteristic point.

As described above, by applying a phase change using phase changers 205A, 205B illustrated in FIG. 21, it is possible to achieve the advantageous effect of an improvement in data reception quality of data symbols 402 and data symbols 502 in the reception device in, for example, LOS environments, and by applying a phase change using phase changer 209A in FIG. 21, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A and 205B illustrated in FIG. 21, and furthermore, the reception quality of data symbols 402 and data symbols 502 is improved by applying a phase change to data symbols 402 and data symbols 502 using phase changer 209A illustrated in FIG. 21.

Note that Q in Equation (38) may be an integer of −2 or less. In such a case, the value for the phase change cycle is the absolute value of Q. This feature is applicable to Embodiment 1 as well.

Embodiment 6

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 1052, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 22 later.

Figure 22:
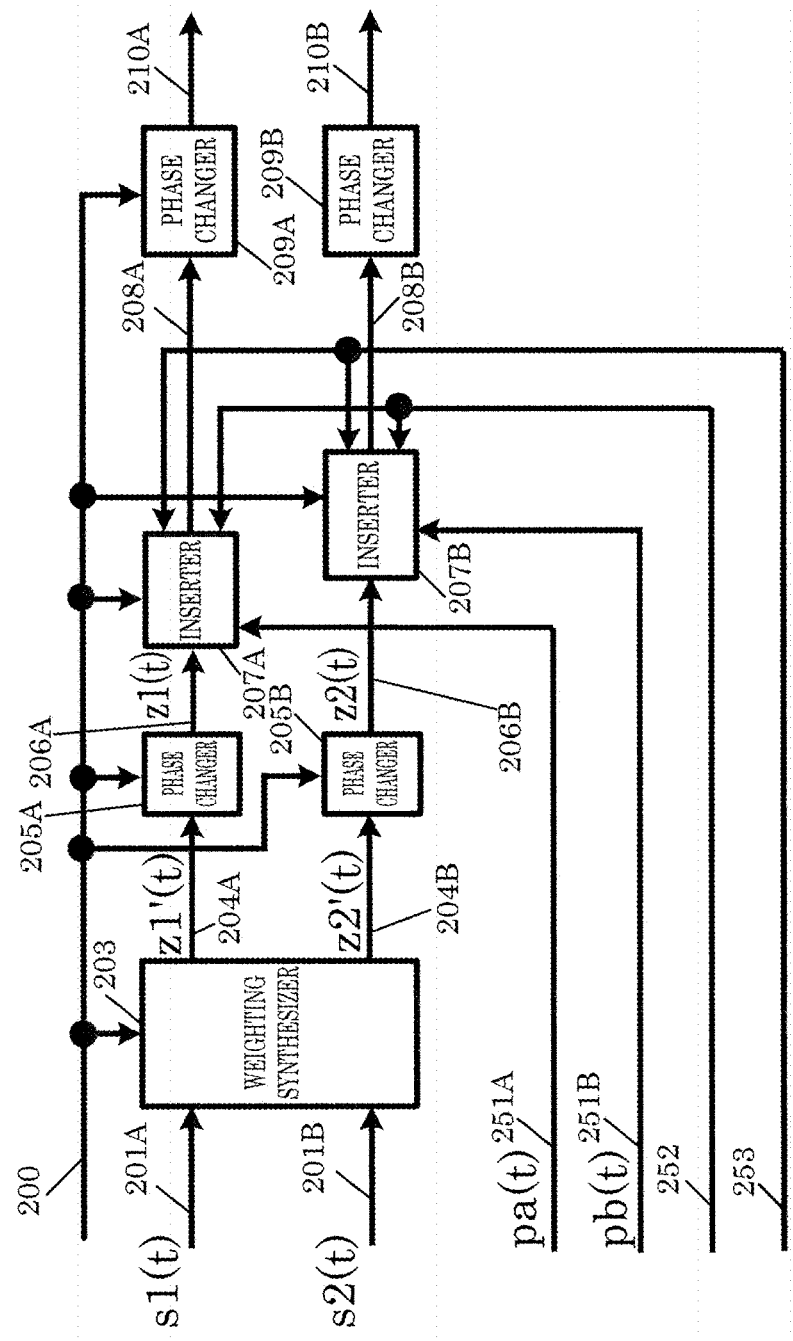
FIG. 22 illustrates one example of a configuration of the signal processor illustrated in FIG. 1.

FIG. 22 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1'(t), and weighted signal 204B is expressed as z2'(t). Note that one example of t is time (s1(t), s2(t), z1'(t), and z2'(t) are defined as complex numbers (accordingly, they may be real numbers)).

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (49).

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t), and z1(t) is defined as a complex number (and may be a real number).

Next, specific operations performed by phase changer 205A will be described. In phase changer 205A, for example, a phase change of w(i) is applied to z1'(i). Accordingly, z1(i) can be expressed as z1(i)=w(i)×z1'(i) (i is a symbol number (i is an integer that is greater than or equal to 0)).

For example, the phase change value is set as indicated in Equation (50).

(M is an integer that is greater than or equal to 2, M is a phase change cycle)(when M is set to an odd number greater than or equal to 3, data reception quality may improve). However, Equation (50) is merely a non-limiting example. Here, phase change value is expressed as $w(i)=e^{j\times\lambda(i)}$.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(i) (i is a symbol number (i is an integer that is greater than or equal to 0)).

For example, the phase change value is set as shown in Equation (2) (N is an integer that is greater than or equal to 2, N is a phase change cycle, N≠M)(when N is set to an odd number greater than or equal to 3, data reception quality may improve). However, Equation (2) is merely a non-limiting example. Here, phase change value $y(i)=e^{j\times\delta(i)}$.

Here, z1(i) and z2(i) can be expressed with Equation (51).

Note that δ(i) and λ(i) are real numbers. z1(i) and z2(i) are transmitted from the transmission device at the same time and using the same frequency (same frequency band). In Equation (51), the phase change value is not limited to the value used in Equations (2) and (51); for example, a method in which the phase is changed cyclically or regularly is conceivable.

As described in Embodiment 1, conceivable examples of the (precoding) matrix inserted in Equation (49) and Equation (51) are illustrated in Equation (5) through Equation (36) (however, the precoding matrix is not limited to these examples (the same applies to Embodiment 1)).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t))(251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as $x(i) = e^{j \times \varepsilon(i)} \times x'(i)$ (j is an imaginary number unit).

As described in Embodiment 1, etc., note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol).

FIG. 3 illustrates one example of a configuration of radio units 107_A and 107_B illustrated in FIG. 1. FIG. 3 is described in Embodiment 1. Accordingly, description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5: FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly, when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly, description will be omitted from this embodiment.

FIG. 7 illustrates one example of a configuration of antenna unit #A (109_A) and antenna unit #B (109_B) illustrated in FIG. 1 (in this example, antenna unit #A (109_A) and antenna unit #B (109_B) include a plurality of antennas). FIG. 7 is described in Embodiment 1. Accordingly, description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X (801X) and antenna unit #Y (801Y) illustrated in FIG. 8 (antenna unit #X (801X) and antenna unit #Y (801Y) are exemplified as including a plurality of antennas). FIG. 10 is described in Embodiment 1. Accordingly, description will be omitted from this embodiment.

Next, signal processor 106 in the transmission device illustrated in FIG. 1 is inserted as phase changers 205A, 205B and phase changer 209B, as illustrated in FIG. 22. The characteristics and advantageous effects of this configuration will be described.

As described with reference to FIG. 4 and FIG. 5, phase changers 205A, 205B apply precoding (weighted synthesis) to mapped signal s1(i) (201A) (i is a symbol number; i is an integer greater than or equal to 0) obtained via mapping using the first sequence and mapped signal s2(i) (201B) obtained via mapping using the second sequence, and applies a phase change to one of the obtained weighting synthesized signals 204A and 204B. Phase-changed signal 206A and phase-changed signal 206B are then transmitted at the same frequency and at the same time. Accordingly, in FIG. 4 and FIG. 5, a phase change is applied to data symbol 402 in FIG. 4 and data symbol 502 in FIG. 5.

For example, FIG. 11 illustrates an extraction of carrier 1 through carrier 5 and time $4 through time $6 from the frame illustrated in FIG. 4. Note that in FIG. 11, similar to FIG. 4, 401 is a pilot symbol, 402 is a data symbol, and 403 is an other symbol.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j \times \lambda 15(i)}$" for (carrier 1, time $5), "$e^{j \times \lambda 25(i)}$" for (carrier 2, time $5), "$e^{j \times \lambda 35(i)}$" for (carrier 3, time $5), "$e^{j \times \lambda 45(i)}$" for (carrier 4, time $5), "$e^{j \times \lambda 55(i)}$" (carrier 5, time $5), "$e^{j \times \lambda 16(i)}$" for (carrier 1, time $6), "$e^{j\times\lambda 26(i)}$" for (carrier 2, time $6), "$e^{j\times\lambda 46(i)}$" for (carrier 4, time $6), and "$e^{j\times\lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205A).

One example of the phase change that phase changer 205A applies to the data symbols is the method given in Equation (50) in which phase change is applied to the data symbols regularly (such as at each cycle N) (however, the phase change method implemented on the data symbols is not limited to this example).

For example, FIG. 11 illustrates an extraction of carrier 1 through carrier 5 and time $4 through time $6 from the frame illustrated in FIG. 5. Note that in FIG. 11, similar to FIG. 5, 501 is a pilot symbol, 502 is a data symbol, and 503 is an other symbol.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly, the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6), "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6). In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols (in other words, data symbols that perform MIMO transmission (transmit a plurality of streams) are subject to phase change by phase changer 205B).

One example of the phase change that phase changer 205B applies to the data symbols is the method given in Equation (2) in which phase change is applied to the data symbols regularly (such as at each cycle N) (however, the phase change method implemented on the data symbols is not limited to this example).

With this, when the environment is one in which the direct waves are dominant, such as in an LOS environment, it is possible to achieve improved data reception quality in the reception device with respect to the data symbols that perform MIMO transmission (transmit a plurality of streams). Next, the advantageous effects of this will be described.

For example, the modulation scheme used by mapper 104 in FIG. 1 is quadrature phase shift keying (QPSK) (mapped signal 201A in FIG. 18 is a QPSK signal, and mapped signal 201B is a QPSK signal; in other words, two QPSK streams are transmitted). Accordingly, for example, using channel estimated signals 806_1 and 806_2, 16 candidate signal points are obtained by signal processor 811 illustrated in FIG. 8 (2-bit transmission is possible with QPSK. Accordingly, since there are two streams, 4-bit transmission is achieved. Thus, there are 24=16 candidate signal points) (note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2).

FIG. 12 illustrates an example of the state resulting from such a case. In (A) and (B) in FIG. 12, in-phase I is represented on the horizontal axis and quadrature Q is represented on the vertical axis, and 16 candidate signal points are present in the illustrated in-phase I-quadrature Q planes (among the 16 candidate signal points, one is a signal point that is transmitted by the transmission device; accordingly, this is referred to as "16 candidate signal points").

When the environment is one in which the direct waves are dominant, such as in an LOS environment, consider a first case in which phase changers 205A and 205B are omitted from the configuration illustrated in FIG. 22 (in other words, a case in which phase change is not applied by phase changers 205A, 205B in FIG. 22).

In the first case, since phase change is not applied, there is a possibility that the state illustrated in (A) in FIG. 12 will be realized. When the state falls into the state illustrated in (A) in FIG. 12, as illustrated by "signal points 1201 and 1202", "signal points 1203, 1204, 1205, and 1206", and "signal points 1207, 1208", the signal points become dense (the distances between some signal points shorten). Accordingly, in the reception device illustrated in FIG. 8, data reception quality may deteriorate.

In order to remedy this phenomenon, in FIG. 22, phase changers 205A, 205B are inserted. When phase changers 205A, 205B are inserted, due to symbol number i, there is a mix of symbol numbers whose signal points are dense (the distances between some signal points shorten), such as in (A) in FIG. 12, and symbol numbers whose "distance between signal points is long", such as in (B) in FIG. 12. With respect to this state, since error correction code is introduced, high error correction performance is achieved, and in the reception device illustrated in FIG. 8, high data reception quality can be achieved.

Note that in FIG. 22, a phase change is not applied by phase changers 205A, 205B in FIG. 22 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12" can be realized.

However, even if a phase change is applied by phase changers 205A, 205B in FIG. 22 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense (the distances between some signal points shorten), such as in (A) in FIG. 12, and symbol numbers whose "distance between signal points is long", such as in (B) in FIG. 12"can be realized." In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M (N and M are integers that are greater than or equal to 2).

As described above, phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x(i). Then, phase-changed signal 210A (x(i)) can be expressed as $x(i)=e^{j\times \varepsilon(i)}\times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols)) (in the case of FIG. 22, since phase changer 209A applies a phase change to baseband signal 208A, a phase change is applied to each symbol in FIG. 4).

Accordingly, in the frame illustrated in FIG. 4, phase changer 209A illustrated in FIG. 22 applies a phase change to all symbols (in this case, all other symbols 403) for all carriers 1 to 36 at time $1.

Similarly, phase changer 209A illustrated in FIG. 22 applies a phase change to all symbols (in this case, all other symbols 403) for all carriers 1 to 36 at time $2, phase changer 209A illustrated in FIG. 22 applies a phase change to all symbols (in this case, all other symbols 403) for all carriers 1 to 36 at time $3, phase changer 209A illustrated in FIG. 22 applies a phase change to all symbols (in this case, all other symbols 403) for all carriers 1 to 36 at time $4, phase changer 209A illustrated in FIG. 22 applies a phase change to all symbols (in this case, pilot symbols 401 or data symbols 402) for all carriers 1 to 36 at time $5, phase changer 209A illustrated in FIG. 22 applies a phase change to all symbols (in this case, pilot symbols 401 or data symbols 402) for all carriers 1 to 36 at time $6, phase changer 209A illustrated in FIG. 22 applies a phase change to all symbols (in this case, pilot symbols 401 or data symbols 402) for all carriers 1 to 36 at time $7, phase changer 209A illustrated in FIG. 22 applies a phase change to all symbols (in this case, pilot symbols 401 or data symbols 402) for all carriers 1 to 36 at time $8, phase changer 209A illustrated in FIG. 22 applies a phase change to all symbols (in this case, pilot symbols 401 or data symbols 402) for all carriers 1 to 36 at time $9, phase changer 209A illustrated in FIG. 22 applies a phase change to all symbols (in this case, pilot symbols 401 or data symbols 402) for all carriers 1 to 36 at time $10, phase changer 209A illustrated in FIG. 22 applies a phase change to all symbols (in this case, pilot symbols 401 or data symbols 402) for all carriers 1 to 36 at time $11 . . . .

As described above, phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as y'(i). Then, phase-changed signal 210B (y(i)) can be expressed as $y(i)=e^{j\times \eta(i)}\times y'(i)$ (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol (accordingly, in such a case, symbols subject to symbol number i include data symbols, pilot symbols, control information symbols, and preambles (other symbols))(in the case of FIG. 22, since phase changer 209B applies a phase change to baseband signal 208B, a phase change is applied to each symbol in FIG. 5).

Accordingly, in the frame illustrated in FIG. 5, phase changer 209B illustrated in FIG. 22 applies a phase change to all symbols (in this case, all other symbols 503) for all carriers 1 to 36 at time $1.

Similarly, phase changer 209B illustrated in FIG. 22 applies a phase change to all symbols (in this case, all other symbols 503) for all carriers 1 to 36 at time $2, phase changer 209B illustrated in FIG. 22 applies a phase change to all symbols (in this case, all other symbols 503) for all carriers 1 to 36 at time $3, phase changer 209B illustrated in FIG. 22 applies a phase change to all symbols (in this case, all other symbols 503) for all carriers 1 to 36 at time $4, phase changer 209B illustrated in FIG. 22 applies a phase change to all symbols (in this case, pilot symbols 501 or data symbols 502) for all carriers 1 to 36 at time $5, phase changer 209B illustrated in FIG. 22 applies a phase change to all symbols (in this case, pilot symbols 501 or data symbols 502) for all carriers 1 to 36 at time $6, phase changer 209B illustrated in FIG. 22 applies a phase change to all symbols (in this case, pilot symbols 501 or data symbols 502) for all carriers 1 to 36 at time $7, phase changer 209B illustrated in FIG. 22 applies a phase change to all symbols (in this case, pilot symbols 501 or data symbols 502) for all carriers 1 to 36 at time $8, phase changer 209B illustrated in FIG. 22 applies a phase change to all symbols (in this case, pilot symbols 501 or data symbols 502) for all carriers 1 to 36 at time $9, phase changer 209B illustrated in FIG. 22 applies a phase change to all symbols (in this case, pilot symbols 501 or data symbols 502) for all carriers 1 to 36 at time $10, phase changer 209B illustrated in FIG. 22 applies a phase change to all symbols (in this case, pilot symbols 501 or data symbols 502) for all carriers 1 to 36 at time $11 . . . .

FIG. 13 illustrates a frame configuration different from the frame configuration illustrated in FIG. 4 of transmission signal 108_A illustrated in FIG. 1. FIG. 13 is described in Embodiment 1. Accordingly, description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly, description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 22". Accordingly, when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i (i is an integer that is greater than or equal to 0), and is expressed as x'(i). Then, phase-changed signal 210A (x(i)) can be expressed as $x(i) = e^{j\varepsilon(i)} \times x'(i)$ (j is an imaginary number unit). Note that the operation performed by phase changer 209A may be CDD (cyclic delay diversity)(CSD (cycle shift diversity)) disclosed in "Standard conformable antenna diversity techniques for OFDM and its application to the DVB-T system," IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209A is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 22, since phase changer 209A applies a phase change to baseband signal 208A, a phase change is applied to each symbol in FIG. 13).

Accordingly, in the frame illustrated in FIG. 13, phase changer 209A illustrated in FIG. 22 applies a phase change to all symbols (in this case, all other symbols 403) for all carriers 1 to 36 at time $1. However, the handling of the phase change with respect to null symbol 1301 is as previously described.

Similarly, "phase changer 209A illustrated in FIG. 22 applies a phase change to all symbols (in this case, all other symbols 403) for all carriers 1 to 36 at time $2, However, the handling of the phase change with respect to null symbol 1301 is as previously described.", "phase changer 209A illustrated in FIG. 22 applies a phase change to all symbols (in this case, all other symbols 403) for all carriers 1 to 36 at time $3, However, the handling of the phase change with respect to null symbol 1301 is as previously described.", "phase changer 209A illustrated in FIG. 22 applies a phase change to all symbols (in this case, all other symbols 403) for all carriers 1 to 36 at time $4, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $5, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $6, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $7, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $8, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $9, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $10, However, the handling of the phase change with respect to null symbol 1301 is as previously described.", "phase changer 209A illustrated in FIG. 22 applies a phase change to all symbols (in this case, pilot symbols 401 or data symbols 402) for all carriers 1 to 36 at time $11. However, the handling of the phase change with respect to null symbol 1301 is as previously described." . . . .

The phase change value of phase changer 209A is expressed as Ω(i). Baseband signal 208A is x'(i) and phase-changed signal 210A is x(i). Accordingly, x(i)=Ω(i)×x'(i) holds true.

For example, the phase change value is set to Equation (38) (Q is an integer that is greater than or equal to 2, and represents the number of phase change cycles) (j is an imaginary number unit). However, Equation (38) is merely a non-limiting example.

For example, Ω(i) may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13.

. . .

This concludes the operational example of phase changer 209A illustrated in FIG. 22.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as y'(i). Then, phase-changed signal 210B (x(i)) can be expressed as y(i)=$e^{j \times \eta(i)}$×y'(i) (j is an imaginary number unit). Note that the operation performed by phase changer 209B may be CDD (cyclic delay diversity)(CSD (cycle shift diversity)) disclosed in "Standard conformable antenna diversity techniques for OFDM and its application to the DVB-T system." IEEE Globecom 2001, pp. 3100-3105, November 2001, and in IEEE P802.11n (D3.00) Draft STANDARD for Information Technology-Telecommunications and information exchange between systems-Local and metropolitan area networks-Specific requirements—Part 11: Wireless LAN Medium Access Control (MAC) and Physical Layer (PHY) specifications, 2007. One characteristic of phase changer 209B is that it applies a phase change to a symbol present along the frequency axis (i.e., applies a phase change to, for example, a data symbol, a pilot symbol, and/or a control information symbol). Here, a null symbol may be considered as a target for application of a phase change (accordingly, in such a case, symbols subject to symbol number i include data symbols, pilot symbols, control information symbols, preambles (other symbols), and null symbols). However, even if a phase change is applied to a null symbol, the signals before and after the phase change are the same (in-phase component I is zero (0) and the quadrature component Q is zero (0)). Accordingly, it is possible to construe a null symbol as not a target for a phase change (in the case of FIG. 22, since phase changer 209B applies a phase change to baseband signal 208B, a phase change is applied to each symbol in FIG. 14).

Accordingly, in the frame illustrated in FIG. 14, phase changer 209B illustrated in FIG. 22 applies a phase change to all symbols (in this case, all other symbols 503) for all carriers 1 to 36 at time $1. However, the handling of the phase change with respect to null symbol 1301 is as previously described.

Similarly, "phase changer 209B illustrated in FIG. 22 applies a phase change to all symbols (in this case, all other symbols 503) for all carriers 1 to 36 at time $2, However, the handling of the phase change with respect to null symbol 1301 is as previously described.", "phase changer 209B illustrated in FIG. 22 applies a phase change to all symbols (in this case, all other symbols 503) for all carriers 1 to 36 at time $3, However, the handling of the phase change with respect to null symbol 1301 is as previously described.", "phase changer 209B illustrated in FIG. 22 applies a phase change to all symbols (in this case, all other symbols 503) for all carriers 1 to 36 at time $4, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $5, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $6, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $7, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $8, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $9, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $10, However, the handling of the phase change with respect to null symbol 1301 is as previously described.", "phase changer 209B illustrated in FIG. 22 applies a phase change to all symbols (in this case, pilot symbols 501 or data symbols 502) for all carriers 1 to 36 at time $11. However, the handling of the phase change with respect to null symbol 1301 is as previously described." . . . .

The phase change value of phase changer 209B is expressed as Δ(i). Baseband signal 208B is y'(i) and phase-changed signal 210B is y(i). Accordingly, y(i)=Δ(i)×y'(i) holds true.

For example, the phase change value is set as shown in Equation (49) (R is an integer that is greater than or equal to 2, and represents the number of phase change cycles. Note that the values for Q and R in Equation (38) may be different values).

For example, Δ(i) may be set so as to implement a phase change that yields a cycle R.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14.

. . .

This concludes the operational example of phase changer 209B illustrated in FIG. 20.

Next, the advantageous effects obtained by phase changers 209A, 209B illustrated in FIG. 22 will be described.

The other symbols 403, 503 in "the frames of FIG. 4 and FIG. 5" or "the frames of FIG. 13 and FIG. 14" include a control information symbol. As previously described, when an other symbol 503 in FIG. 5 at the same time and same frequency (in the same carrier) as an other symbol 403 transmits control information, it transmits the same data (same control information).

However, consider the following cases.

Case 2: transmitting a control information symbol using either antenna unit #A (109_A) or antenna unit #B (109_3) illustrated in FIG. 1.

When transmission according to "case 2" is performed, since only one antenna is used to transmit the control information symbol, compared to when "transmitting a control information symbol using both antenna unit #A (109_A) and antenna unit #B (109_B)" is performed, spatial diversity gain is less. Accordingly, in "case 2", data reception quality deteriorates even when received by the reception device illustrated in FIG. 8. Accordingly, from the perspective of improving data reception quality, "transmitting a control information symbol using both antenna unit #A (109_A) and antenna unit #B (109_B)" is more beneficial.

Case 3: transmitting a control information symbol using both antenna unit #A (109_A) and antenna unit #B (109_3) illustrated in FIG. 1. However, phase change by is not performed by phase changers 209A and 209B illustrated in FIG. 22.

When transmission according to "case 3" is performed, since the modulated signal transmitted from antenna unit #A 109_A and the modulated signal transmitted from antenna unit #B 109_B are the same (or exhibit a specific phase shift), depending on the radio wave propagation environment, the reception device illustrated in FIG. 8 may receive an inferior reception signal, and both modulated signal may be subjected to the same multipath effect. Accordingly, in the reception device illustrated in FIG. 8, data reception quality deteriorates.

In order to remedy this phenomenon, in FIG. 22, phase changers 209A and 209B are inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly, that data reception quality in the reception device illustrated in FIG. 8 will improve.

For these reasons, in FIG. 22, phase changers 209A, 209B are provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams (perform MIMO transmission) at the same time and using the same frequency (frequency band) via data symbols 402 and data symbols 502. In order to demodulate these data symbols, symbols for signal detection, symbols for frequency and time synchronization, and symbols for channel estimation (symbols for propagation path variation estimation), which are included in other symbols 403 and other symbols 503, are used.

Here, "symbols for signal detection, symbols for frequency and time synchronization, and symbols for channel estimation (symbols for propagation path variation estimation), which are included in other symbols 403 and other symbols 503" are applied with a phase change by phase changers 209A, 209B, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209A was performed, and there is a probability that this processing will be complicated (this is because "symbols for signal detection, symbols for frequency and time synchronization, and symbols for channel estimation (symbols for propagation path variation estimation), which are included in other symbols 403 and other symbols 503" are applied with a phase change by phase changers 209A and 209B).

However, as illustrated in FIG. 22, in phase changers 209A, 209B, when a phase change is applied to data symbols 402 and data symbols 502, in the reception device, there is the advantage that data symbols 402 and data symbols 502 can (easily) be demodulated and decoded using the channel estimation signal (propagation path fluctuation signal) estimated by using "symbols for signal detection, symbols for frequency and time synchronization, and symbols for channel estimation (symbol for estimating propagation path fluctuation), which are included in other symbols 403 and other symbols 503".

Additionally, as illustrated in FIG. 22, in phase changers 209A, 209B, when a phase change is applied to data symbols 402 and data symbols 502, in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changers 205A, 205B" and "symbols that are targets for implementation of a phase change by phase changers 209A, 209B" are different is a characteristic point.

As described above, by applying a phase change using phase changer 205B illustrated in FIG. 22, it is possible to achieve the advantageous effect of an improvement in data reception quality of data symbols 402 and data symbols 502 in the reception device in, for example, LOS environments, and by applying a phase change using phase changers 209A, 209B illustrated in FIG. 22, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A, 205B illustrated in FIG. 22, and furthermore, the reception quality of data symbols 402 and data symbols 502 is improved by applying a phase change to data symbols 402 and data symbols 502 using phase changers 209A and 209B illustrated in FIG. 22.

Note that Q in Equation (38) may be an integer of −2 or less. In such a case, the value for the phase change cycle is the absolute value of Q. This feature is applicable to Embodiment 1 as well.

Note that R in Equation (49) may be an integer of −2 or less. In such a case, the value for the phase change cycle is the absolute value of R.

Moreover, taking into consideration the descriptions provided in Supplemental Information 1, the cyclic delay amount set in phase changer 209A and the cyclic delay amount set in phase changer 209B may be different values.

Embodiment 7

In this embodiment, an example of a communications system that employs the transmission method and reception method described in Embodiments 1 to 6 will be described.

Figure 23:
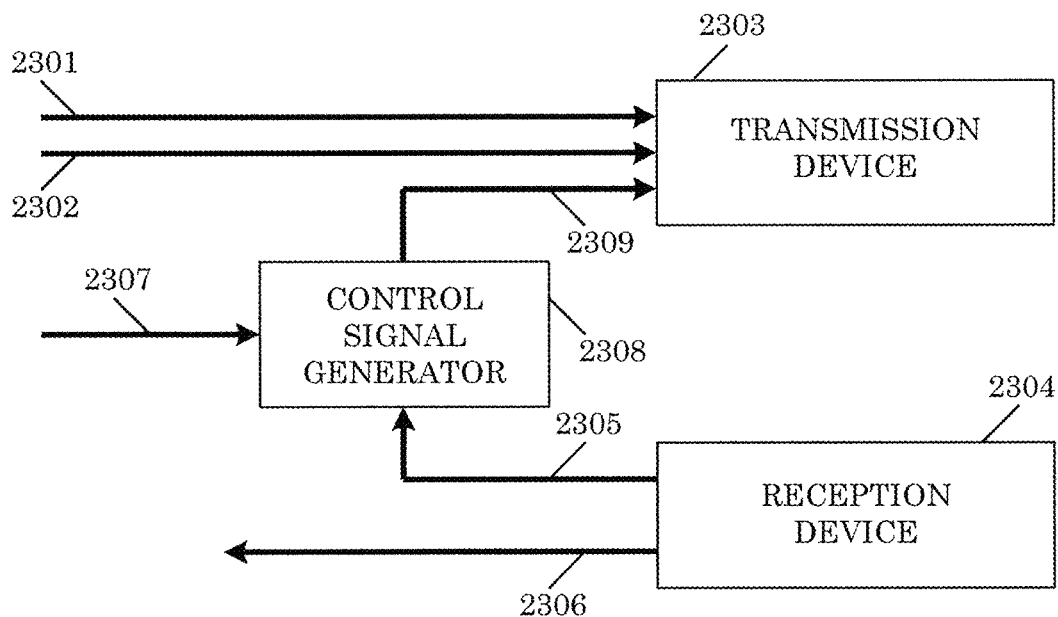
FIG. 23 illustrates one example of a configuration of a base station.

FIG. 23 illustrates one example of a configuration of a base station (or access point or the like) according to this embodiment.

Transmission device 2303 receives inputs of data 2301, signal group 2302, and control signal 2309, generates a modulated signal corresponding to data 2301 and signal group 2302, and transmits the modulated signal from an antenna.

One example of a configuration of transmission device 2303 is as is shown in FIG. 1, where data 2301 corresponds to 101 in FIG. 1, signal group 2302 corresponds to 110 in FIG. 1, and control signal 2309 corresponds to 100 in FIG. 1.

Reception device 2304 receives a modulated signal transmitted by the communication partner such as a terminal, performs signal processing, demodulation, and decoding on the modulated signal, and outputs control information signal 2305 from the communication partner and reception data 2306.

One example of a configuration of reception device 2304 is as shown in FIG. 8, where reception data 2306 corresponds to reception data 812 in FIG. 8, and control information signal 2305 from the communication partner corresponds to control signal 810 in FIG. 8.

Control signal generator 2308 receives inputs of control information signal 2305 from the communication partner and settings signal 2307, and generates and outputs control signal 2309 based on these inputs.

Figure 24:
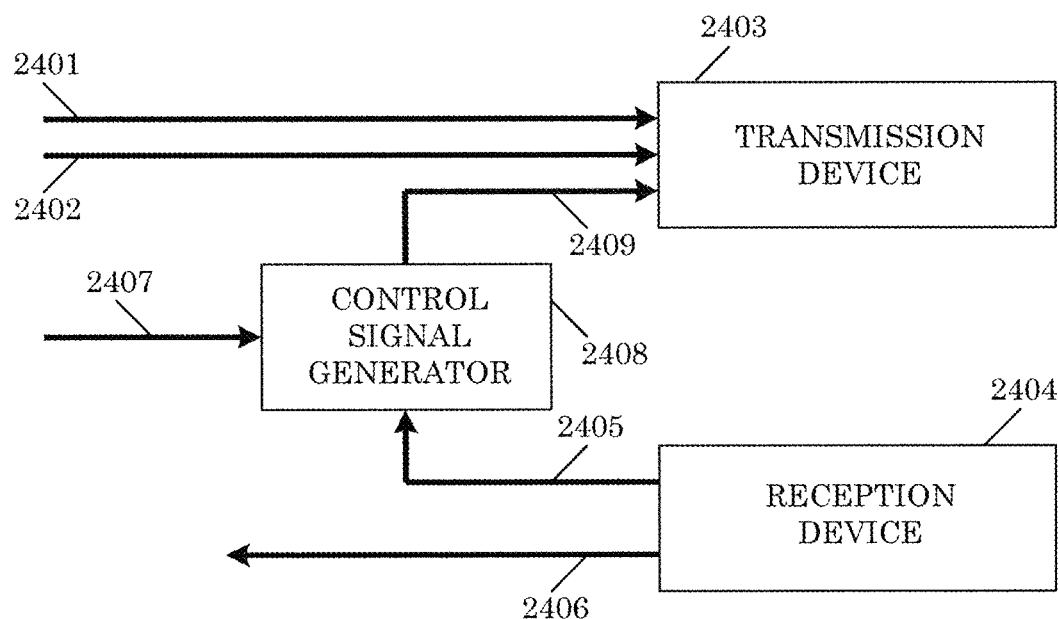
FIG. 24 illustrates one example of a configuration of a terminal.

FIG. 24 illustrates one example of a configuration of a terminal, which is the communication partner of the base station illustrated in FIG. 23.

Transmission device 2403 receives inputs of data 2401, signal group 2402, and control signal 2409, generates a modulated signal corresponding to data 2401 and signal group 2402, and transmits the modulated signal from an antenna.

One example of a configuration of transmission device 2403 is as is shown in FIG. 1, where data 2401 corresponds to data 101 in FIG. 1, signal group 2402 corresponds to signal group 110 in FIG. 1, and control signal 2409 corresponds to control signal 110 in FIG. 1.

Reception device 2404 receives a modulated signal transmitted by the communication partner such as a base station, performs signal processing, demodulation, and decoding on the modulated signal, and outputs control information signal 2405 from the communication partner and reception data 2406.

One example of a configuration of reception device 2404 is as shown in FIG. 8, where reception data 2406 corresponds to reception data 812 in FIG. 8, and control information signal 2405 from the communication partner corresponds to control signal 810 in FIG. 8.

Control signal generator 2408 receives inputs of control information signal 2305 from the communication partner and settings signal 2407, and generates and outputs control signal 2409 based on this information.

Figure 25:
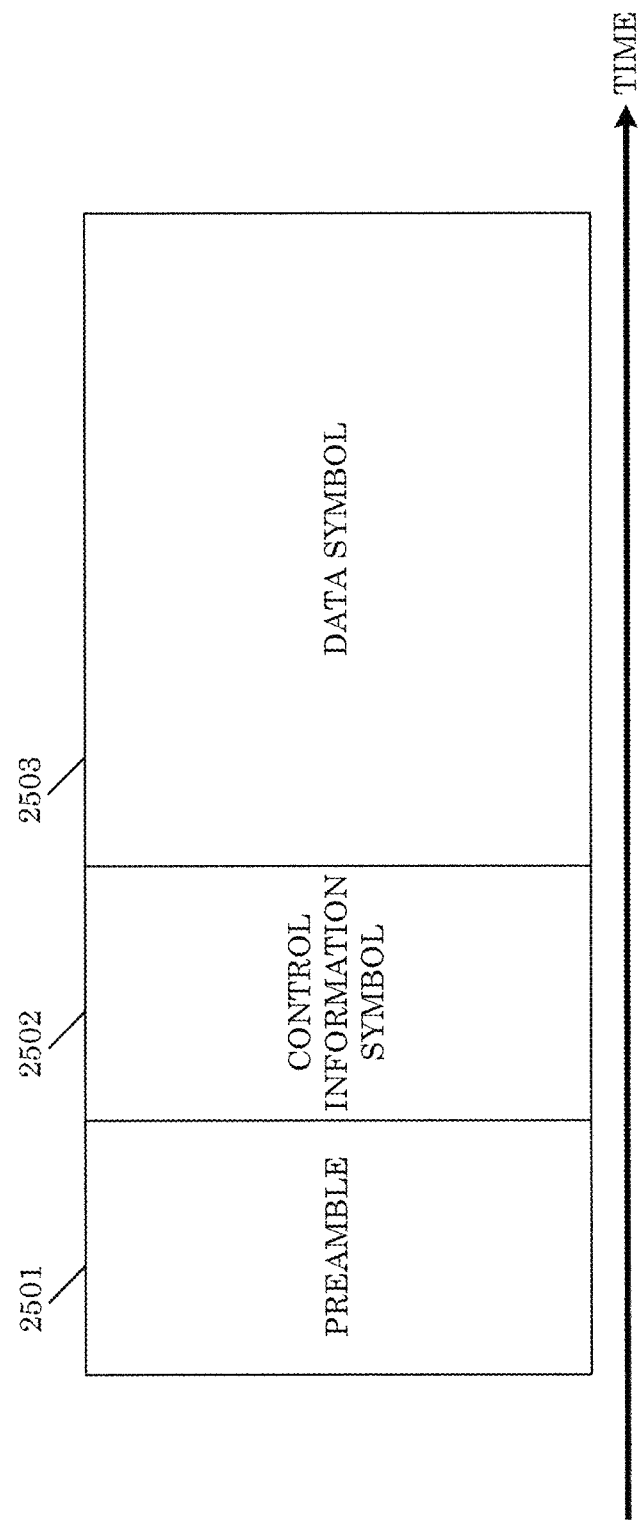
FIG. 25 illustrates one example of a frame configuration of a modulated signal.

FIG. 25 illustrates one example of a frame configuration of a modulated signal transmitted by the terminal illustrated in FIG. 24. Time is represented on the horizontal axis. 2501 is a preamble, and is a symbol, such as a PSK symbol, for the communication partner (for example, a base station) to perform signal detection, frequency synchronization, time synchronization, frequency offset estimation, and/or channel estimation. Preamble 2501 may include a training symbol for directionality control. Note that, here, the terminology "preamble" is used, but different terminology may be used.

2502 is a control information symbol, and 2503 is a data symbol including data to be transmitted to the communication partner.

2502 is a control information symbol that includes, for example: information on an error correction encoding method used to generate data symbol 2503 (such as information on the code length (block length) and/or encode rate); modulation scheme information, and control information for notifying the communication partner.

Note that FIG. 25 is merely one non-limiting example of a frame configuration. Moreover other symbols, such as a pilot symbol and/or reference symbol, may be included in the symbols illustrated in FIG. 25. In FIG. 25, frequency is represented on the vertical axis and symbols are present along the frequency axis (carrier direction).

As examples of a frame configuration transmitted by the base station illustrated in FIG. 23 have been described with reference to FIG. 4, FIG. 5, FIG. 13, and FIG. 14, further description is herein omitted. Note that other symbols 403, 503 may include a training symbol for performing directionality control. Accordingly, in this embodiment, the base station covers a case in which a plurality of modulated signals are transmitted using a plurality of antennas.

Next, operations performed by a base station in a communications system such as described above will be described in detail.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG.

Figure 32:
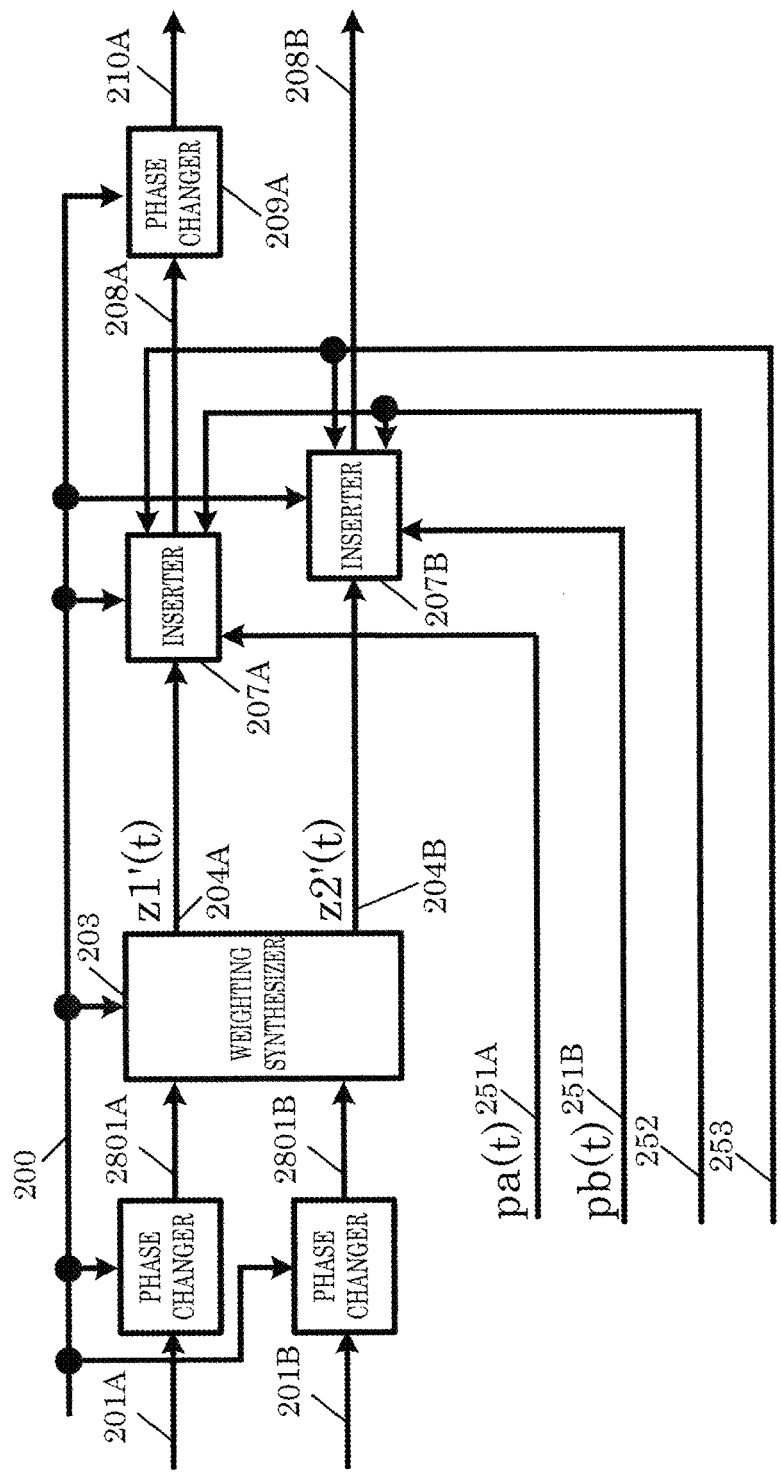
FIG. 32 illustrates one example of a configuration of the signal processor illustrated in FIG. 1.
Figure 33:
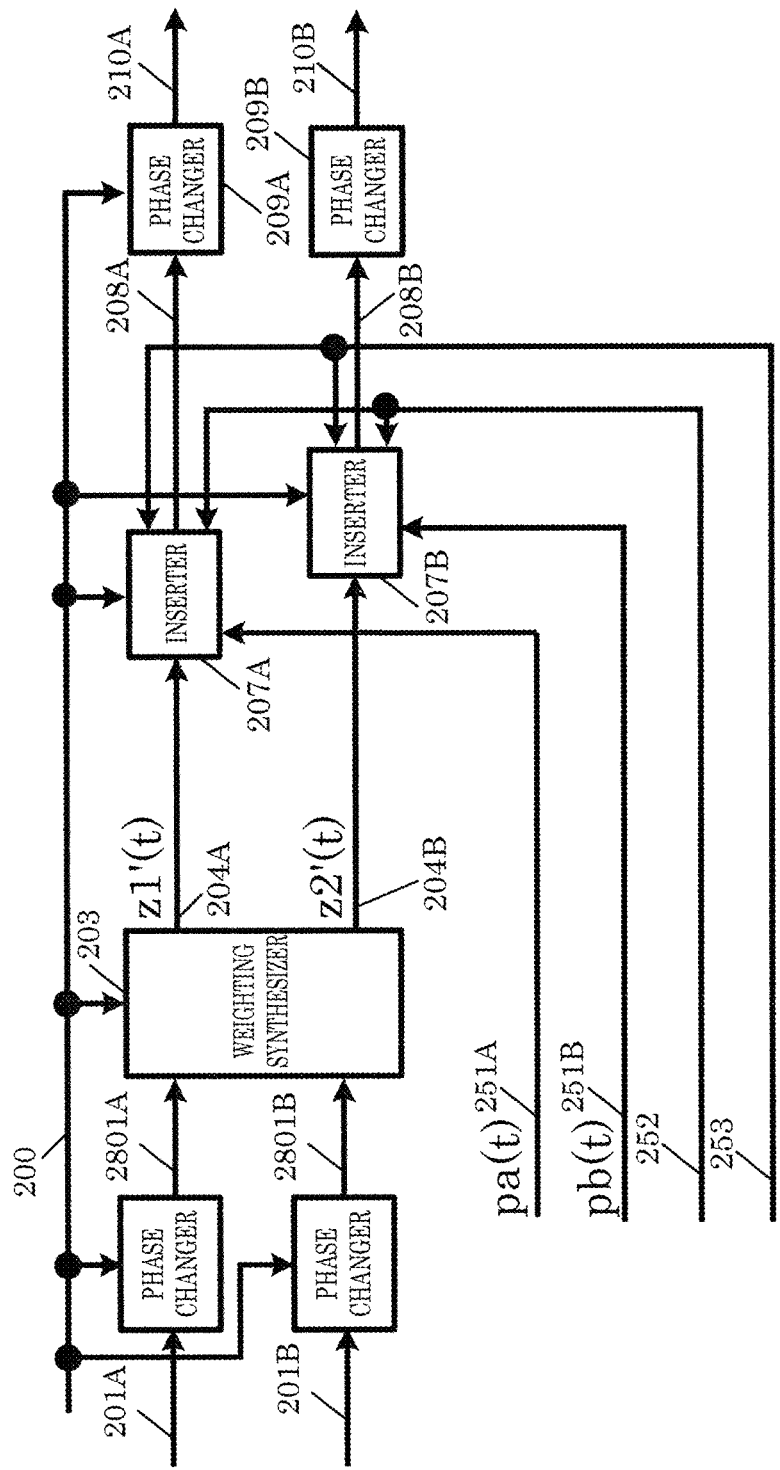
FIG. 33 illustrates one example of a configuration of the signal processor illustrated in FIG. 1.

32, and FIG. 33. Note that FIG. 28, FIG. 29, FIG. 30, FIG. 31, FIG. 32, and FIG. 33 will be described later. Here, operation performed by phase changers 205A, 205B may be switched depending on the communications environment or the settings. Control information relating to operations performed by phase changers 205A. 205B is transmitted by the base station as a part of the control information transmitted via control information symbols, namely, other symbols 403, 503 in the frame configurations illustrated in FIG. 4, FIG. 5, FIG. 13, and FIG. 14.

Here, control information relating to operations performed by phase changers 205A, 205B is expressed as u0, u1. The relationship between [u0 u1] and phase changers 205A and 205B is illustrated in Table 1 (note that u0, u1 are transmitted by the base station as some of the control information symbols, namely, other symbols 403, 503. The terminal obtains [u0 u1] included in control information symbols, namely, other symbols 403, 503, becomes aware of operations performed by phase changers 205A, 205B from [u0 u1], and demodulates and decodes data symbols).

TABLE 1

| u0 u1 | phase changer operations |
|---|---|
| 00 | no phase change |
| 01 | change phase change value on a per-symbol basis (cyclically/regularly) |
| 10 | implement phase change using specified phase change value (set) |
| 11 | reserve |

Interpretation of Table 1 is as follows.

When the settings in the base station are configured such that phase changers 205A 205B do not implement a phase change, u0 is set to 0 (u0=0) and u1 is set to 0 (u1=0). Accordingly, phase changer 205A outputs signal (206A) without implementing a phase change on input signal (204A). Similarly, phase changer 205B outputs a signal (206B) without implementing a phase change on the input signal (204B).

When the settings in the base station are configured such that phase changers 205A, 205B implement a phase change cyclically/regularly on a per-symbol basis, u0 is set to 0 (u0=0) and u1 is set to 1 (u1=1). Note that since the method used by phase changers 205A 205B to implement a phase change cyclically/regularly on a per-symbol basis is described in detail in Embodiments 1 through 6, detailed description thereof is omitted. When signal processor 106 illustrated in FIG. 1 is configured as illustrated in any one of FIG. 20, FIG. 21, and FIG. 22, u0 is also set to 0 (u0=0) and u1 is also set to 1 (u1=1) when the settings in the base station are configured such that phase changer 205A implements a phase change cyclically/regularly on a per-symbol basis and phase changer 205B does not implement a phase change cyclically/regularly on a per-symbol basis, and when the settings in the base station are configured such that phase changer 205A does not implement a phase change cyclically/regularly on a per-symbol basis and phase changer 205B implements a phase change cyclically/regularly on a per-symbol basis.

When the settings in the base station are configured such that phase changers 205A, 205B implement phase change using a specific phase change value, u0 is set to 1 (u0=1) and u1 is set to 0 (u1=0). Next, implementation of a phase change using a specific phase change value will be described.

For example, in phase changer 205A, a phase change is implemented using a specific phase change value. Here, the input signal (204A) is expressed as z1(i) (i is a symbol number). Accordingly, when a phase change is implemented using a specific phase change value, output signal (206A) is expressed as $e^{j\alpha} \times z1(i)$ ($\alpha$ is the specific phase change value, and is a real number). Here, the amplitude may be changed. In such a case, output signal (206A) is expressed as $A \times e^{j\alpha} \times z1(i)$ (A is a real number).

Similarly, in phase changer 206A, a phase change is implemented using a specific phase change value. Here, input signal (204B) is expressed as z2(t) (i is a symbol number). Accordingly, when a phase change is implemented using a specific phase change value, output signal (206B) is expressed as $e^{j\beta} \times z2(i)$ ($\alpha$ is the specific phase change value, and is a real number). Here, the amplitude may be changed. In such a case, output signal 206B is expressed as $B \times e^{j\beta} \times z2(i)$ (B is a real number).

Note that when signal processor 106 illustrated in FIG. 1 is configured as illustrated in any one of FIG. 20, FIG. 21, FIG. 22, FIG. 31, FIG. 32, and FIG. 33, u0 is also set to 1 (u0=1) and u1 is also set to 0 (u1=0) when the settings in the base station are configured such that phase changer 205A implements a phase change using a specific phase change value and phase changer 205B does not implement a phase change using a specific phase change value, and when the settings in the base station are configured such that phase changer 205A does not implement a phase change using a specific phase change value and phase changer 205B implements a phase change using a specific phase change value.

Next, an example of a method for setting a specific phase change value will be described. Hereinafter, a first method and a second method will be described.

First Method:

The base station transmits a training symbol. The terminal, which is the communication partner, uses the training symbol to transmit information on the specific phase change value (set) to the base station. The base station implements a phase change based on the information on the specific phase change value (set) obtained from the terminal.

Another alternative example is as follows. The base station transmits a training symbol. The terminal, which is the communication partner, transmits, to the base station, information relating to the reception result of the training symbol (e.g., information relating to a channel estimation value). Based on the information relating to the reception result of the training symbol from the terminal, the base station calculates a suitable value for the specific phase change value (set) and implements a phase change.

Note that it is necessary for the base station to notify the terminal of the information relating to the specific phase change value (set) set in the settings, and in this case, the control information symbols, namely, other symbols 403, 503 illustrated in FIG. 4, FIG. 5, FIG. 13, and FIG. 14 transmit information relating to the specific phase change value (set) set in the settings by the base station.

Figure 26:
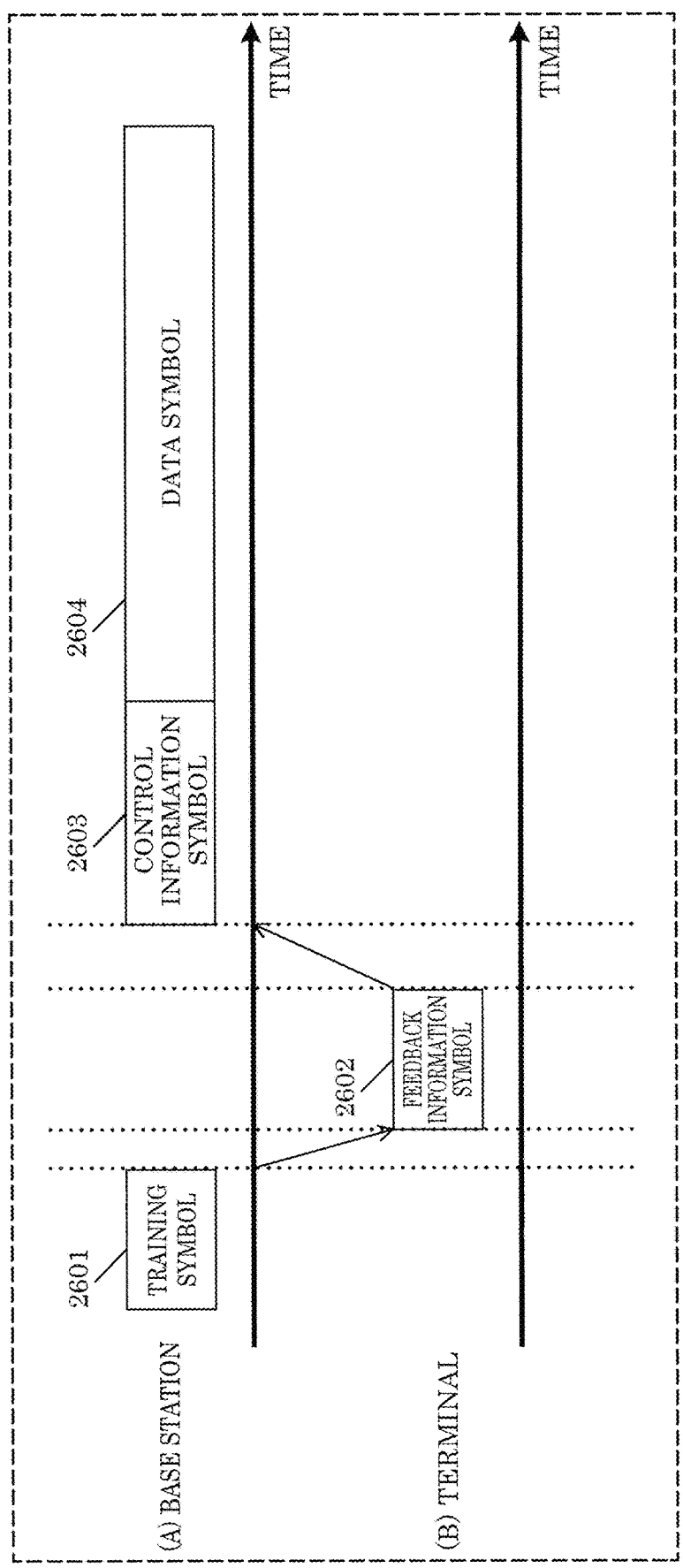
FIG. 26 illustrates one example of transmission between a base station and a terminal.

Next, an implementation example of the first method will be described with reference to FIG. 26. In FIG. 26, (A) illustrates symbols transmitted by the base station arranged on the time axis, which is the horizontal axis. In FIG. 26, (B) illustrates symbols transmitted by the terminal arranged on the time axis, which is the horizontal axis.

Hereinafter, FIG. 26 will be described in detail. First, the terminal requests communication with the base station.

Then, the base station transmits at least training symbol 2601 for estimating the specific phase change value (set) to be used by the base station for the transmission of data symbol 2604. Note that the terminal may perform other estimation using training symbol 2601, and training symbol 2601 may use PSK modulation, for example. The training symbol is then transmitted from a plurality of antennas, just like the pilot symbol described in Embodiments 1 through 6.

The terminal receives training symbol 2601 transmitted by the base station, calculates, using training symbol 2601, a suitable specific phase change value (set) for phase changer 205A and/or phase changer 205B included in the base station to use upon implementing a phase change, and transmits feedback information symbol 2602 including the calculated value.

The base station receives feedback information symbol 2602 transmitted by the terminal, and demodulates and decodes the symbol to obtain information on the suitable specific phase change value (set). Based on this information, the phase change value (set) used in the implementation of the phase change by phase changer 205A and/or phase changer 205B in the base station is set.

The base station then transmits control information symbol 2603 and data symbol 2604. Here, at least data symbol 2604 is implemented with a phase change using the set phase change value (set).

Note that regarding data symbol 2604, the base station transmits a plurality of modulated signals from a plurality of antennas, just as described in Embodiments 1 through 6. However, unlike Embodiments 1 through 6, phase changer 205A and/or phase changer 205B implement a phase change using the specific phase change value (set) described above.

The frame configurations of the base station and terminal illustrated in FIG. 26 are mere non-limiting examples; other symbols may be included. Training symbol 2601, feedback information symbol 2602, control information symbol 2603, and data symbol 2604 may each include another symbol such as a pilot symbol. Moreover, control information symbol 2603 includes information relating to the specific phase change value (set) used upon transmitting data symbol 2604, and the terminal becomes capable of demodulating and decoding data symbol 2604 as a result of obtaining this information.

Similar to as described in Embodiments 1 through 6, for example, when the base station transmits a modulated signal having a frame configuration such as illustrated in FIG. 4, FIG. 5, FIG. 13, or FIG. 14, the subject of the phase change implemented using the specific phase change value (set) by phase changer 205A and/or phase changer 205B, as described above, are data symbols (402, 502). The symbol that is subject to phase change implemented by phase changer 209A and/or phase changer 209B is, just as described in Embodiments 1 through 6, "pilot symbol 401, 501", "other symbol 403, 503".

However, in phase changer 205A and/or phase changer 205B, if a phase change is applied to "pilot symbol 401, 501", "other symbol 403, 503" as well, demodulating and decoding is possible.

A note regarding the recitation "specific phase change value (set)" follows. In the examples illustrated in FIG. 2, FIG. 18, FIG. 19, FIG. 31, FIG. 32, and FIG. 33, phase changer 205A is omitted, and phase changer 205B is included. Accordingly, in such a case, there is a need to prepare a specific phase change value to be used by phase changer 205B. On the other hand, in the examples illustrated in FIG. 20, FIG. 21. FIG. 22, FIG. 31, FIG. 32, and FIG. 33, phase changer 205A and phase changer 205B are included. In such a case, there is a need to prepare a specific phase change value #A to be used by phase changer 205A and a specific phase change value #B to be used by phase changer 205B. Accordingly, the terminology "specific phase change value (set)" is used.

Second Method:

The base station starts transmission of a frame to the terminal. In this case, for example, the base station sets the specific phase change value (set) based on a random value, implements a phase change using the specific phase change value, and transmits the modulated signal.

Thereafter, the terminal transmits, to the base station, information indicating that the frame (or packet) could not be obtained, and the base station receives this information.

In this case, for example, the base station sets the specific phase change value (set) based on a random value, and transmits the modulated signal. Here, at least a data symbol including the frame (packet) data that the terminal could not obtain is transmitted via a modulated signal implemented with a phase change based on the newly set specific phase change value (set). In other words, when the base station performs transmission two (or more) times as a result of, for example, retransmitting the first frame (packet) data, the specific phase change value (set) used for the first transmission and the specific phase change value (set) used for the second transmission may be different. This makes it possible to achieve the advantageous effect that the frame (or packet) is highly likely to be obtained by the terminal upon the second transmission when retransmission is performed.

Thereafter, when the base station receives, from the terminal, information indicating that a frame (or packet) could not be obtained, the base station changes the specific change value (set) based on, for example, a random number.

Note that it is necessary for the base station to notify the terminal of the information relating to the specific phase change value (set) set in the settings, and in this case, the control information symbols, namely, other symbols 403, 503 illustrated in FIG. 4, FIG. 5, FIG. 13, and FIG. 14 transmit information relating to the specific phase change value (set) set in the settings by the base station.

Note that in the above description of the second method, the specific phase change value (set) is set by the base station based on a random value, but the method for setting the specific phase change value (set) is not limited to this example. So long as the specific phase change value (set) is set to a new value upon setting the specific phase change value (set), any method may be used to set the specific phase change value (set). Take the following for example.

For example, the specific phase change value (set) is set based on some rule.

The specific phase change value (set) may be set randomly.

The specific phase change value (set) may be set based on information obtained from the communication partner.

The specific phase change value (set) may be set in any of these ways (however, the method is not limited to these examples).

Figure 27:
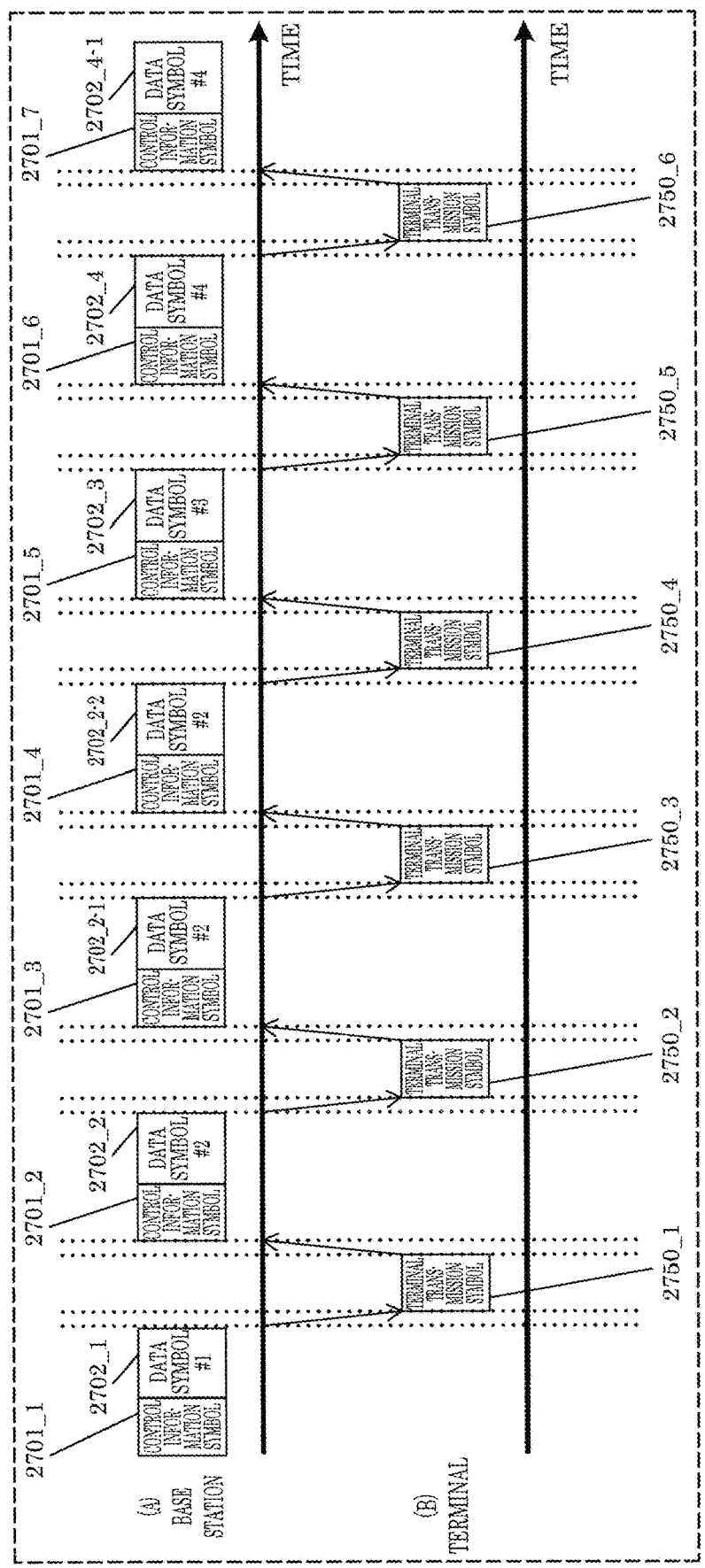
FIG. 27 illustrates one example of transmission between a base station and a terminal.

Next, an implementation example of the second method will be described with reference to FIG. 27. In FIG. 27, (A) illustrates symbols transmitted by the base station arranged on the time axis, which is the horizontal axis. In FIG. 27, (B) illustrates symbols transmitted by the terminal arranged on the time axis, which is the horizontal axis.

Hereinafter, FIG. 27 will be described in detail.

Note that in order to describe FIG. 27, descriptions of FIG. 28, FIG. 29, FIG. 30, FIG. 31, FIG. 32, and FIG. 33 will also be described.

Examples of the configuration of signal processor 106 illustrated in FIG. 1 are given in FIG. 2, FIG. 18, FIG. 19, FIG. 20, FIG. 21, and FIG. 22, and variations on those configurations are illustrated in FIG. 28, FIG. 29, FIG. 30, FIG. 31, FIG. 32, and FIG. 33.

Figure 28:
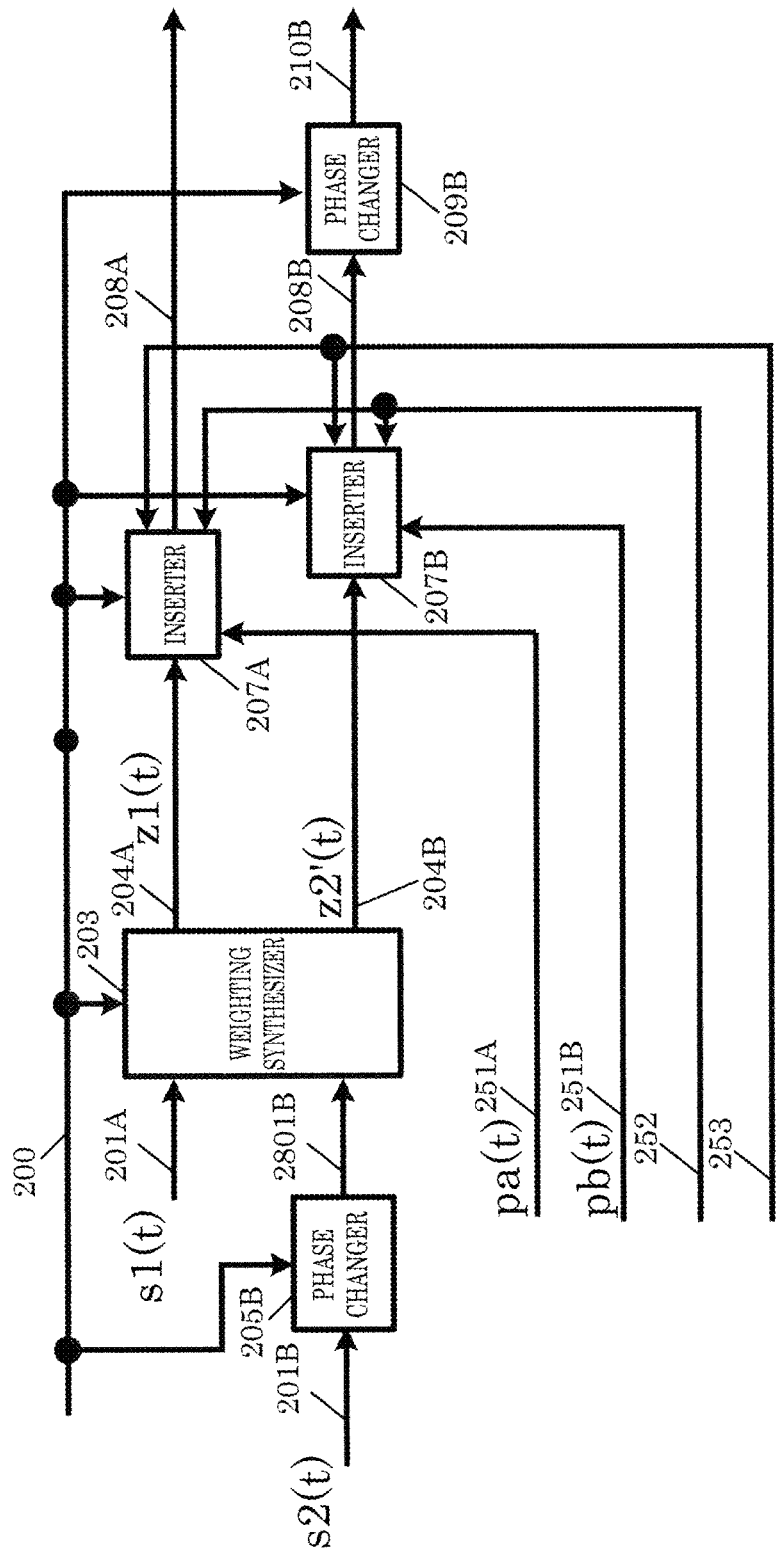
FIG. 28 illustrates one example of a configuration of the signal processor illustrated in FIG. 1.

FIG. 28 is an example in which the configuration in FIG. 2 is modified by moving phase changer 205B in front of weighting synthesizer 203. Next, operations in FIG. 28 different from those with respect to FIG. 2 will be described.

Phase changer 205B receives inputs of mapped signal 201B (s2(t)) and control signal 200, and based on control signal 200, applies a phase change to mapped signal 201B, and outputs phase-changed signal 2801B.

In phase changer 205B, for example, a phase change of y(i) is applied to s2(i). Accordingly, when phase-changed signal 2801B is expressed as s2'(i), s2'(i) can be expressed as s2'(i)=y(i)×s2(i) (i is a symbol number (i is an integer that is greater than or equal to 0)). Note that the application method for phase change value y(i) is as described in Embodiment 1.

Weighting synthesizer 203 receives inputs of mapped signal 201A (s1(i)), phase-changed signal 2801B (s2'(i)), and control signal 200, performs weighting synthesis (precoding) based on control signal 200, and outputs weighting synthesized signal 204A and weighting synthesized signal 204B. More specifically, weighting synthesizer 203 multiplies a precoding matrix with the vectors of mapped signal 201A (s1(i)) and phase-changed signal 2801B (s2'(i)) to obtain weighting synthesized signal 204A and weighting synthesized signal 204B. Note that the configuration example for the precoding matrix is as described in Embodiment 1 (subsequent description is the same as made with reference to FIG. 2, and as such, is omitted).

Figure 29:
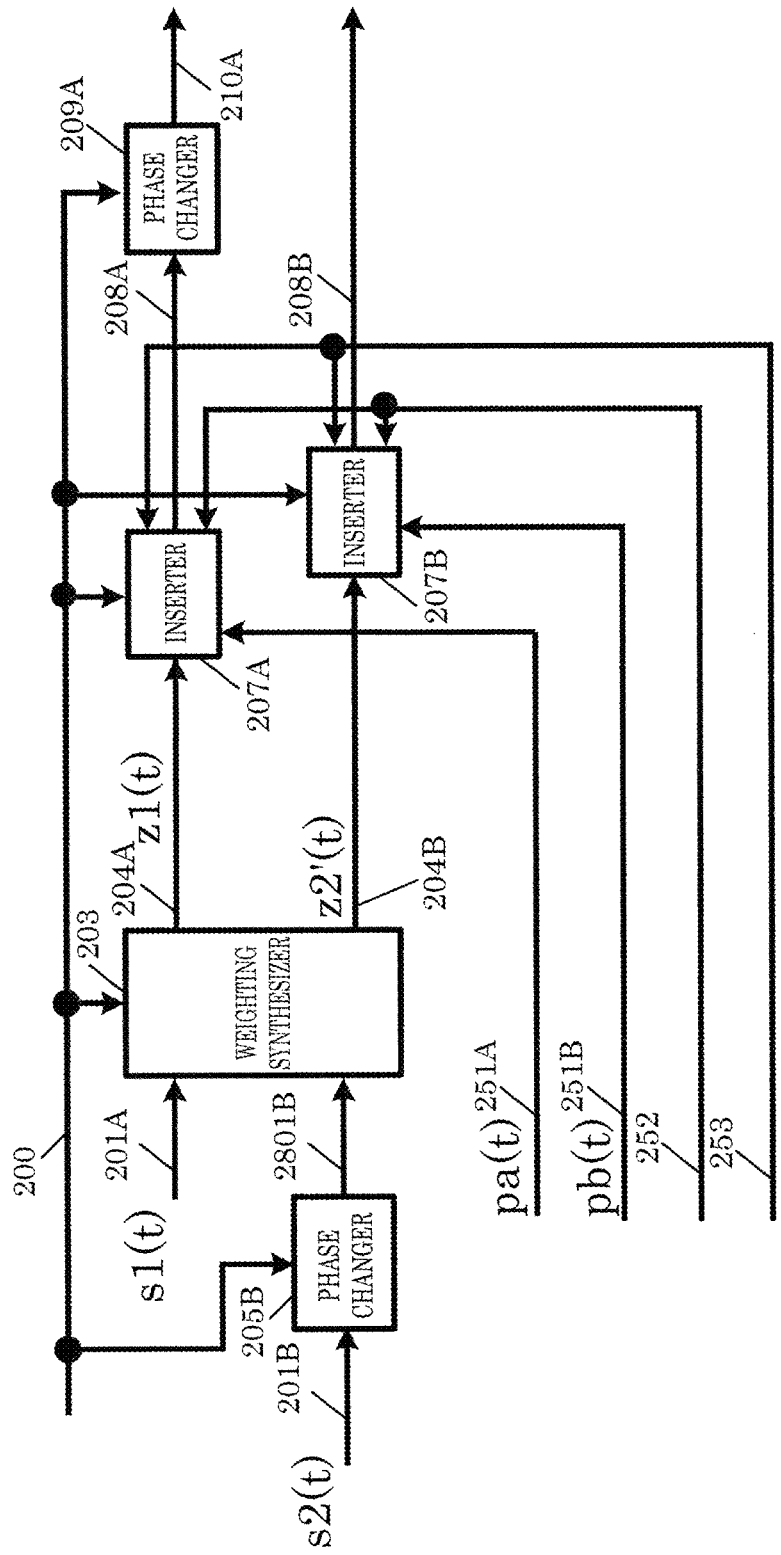
FIG. 29 illustrates one example of a configuration of the signal processor illustrated in FIG. 1.

FIG. 29 is an example in which the configuration in FIG. 18 is modified by moving phase changer 205B in front of weighting synthesizer 203. In this case, the operations performed by phase changer 205B and weighting synthesizer 203 are the same as described with reference to FIG. 28, and as such, description will be omitted. Moreover, operations down the line of weighting synthesizer 203 are also the same as made with reference to FIG. 18, and as such, description thereof is omitted.

Figure 30:
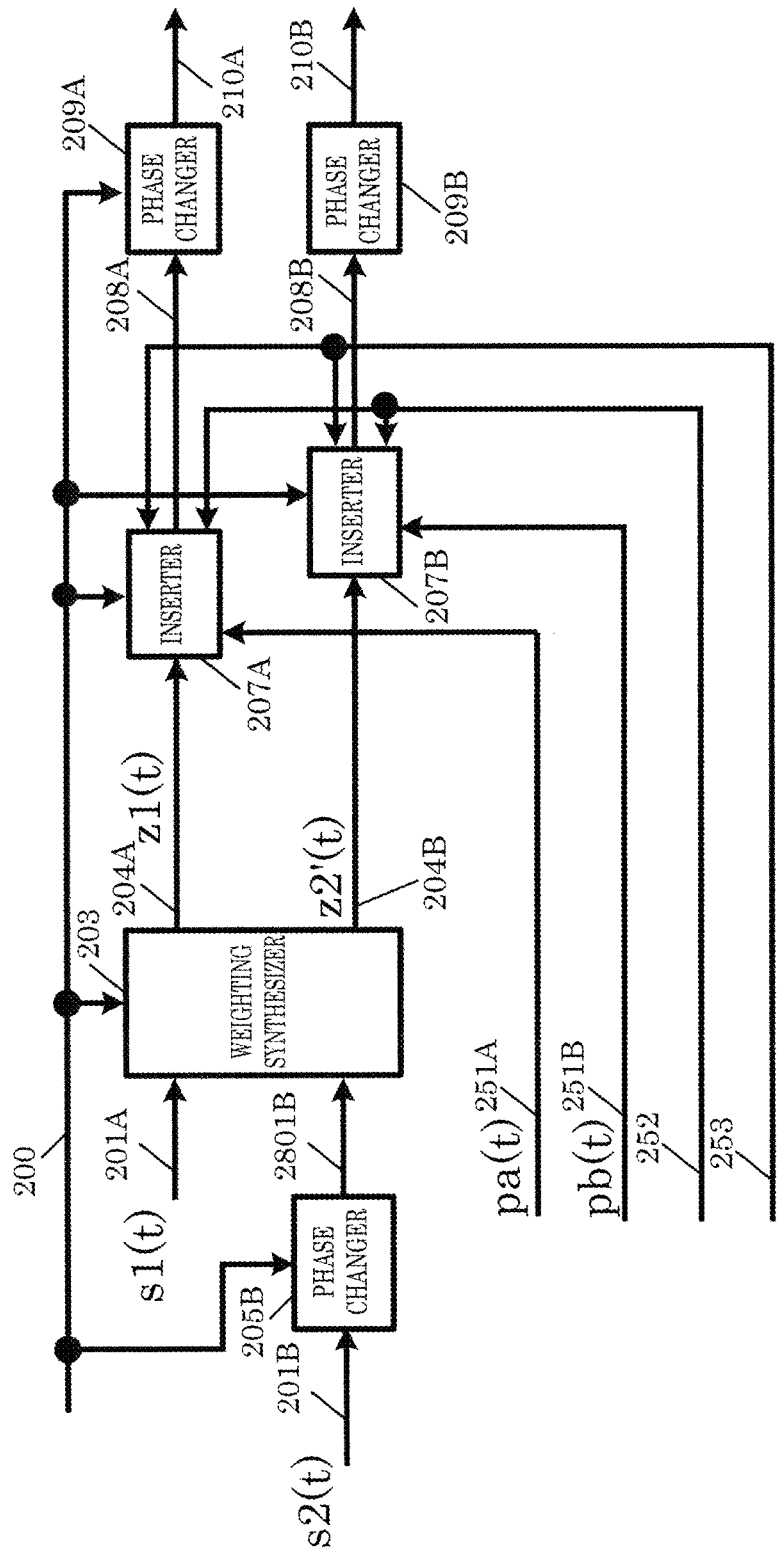
FIG. 30 illustrates one example of a configuration of the signal processor illustrated in FIG. 1.

FIG. 30 is an example in which the configuration in FIG. 19 is modified by moving phase changer 205B in front of weighting synthesizer 203. In this case, the operations performed by phase changer 205B and weighting synthesizer 203 are the same as described with reference to FIG. 28, and as such, description will be omitted. Moreover, operations down the line of weighting synthesizer 203 are also the same as made with reference to FIG. 19, and as such, description thereof is omitted.

Figure 31:
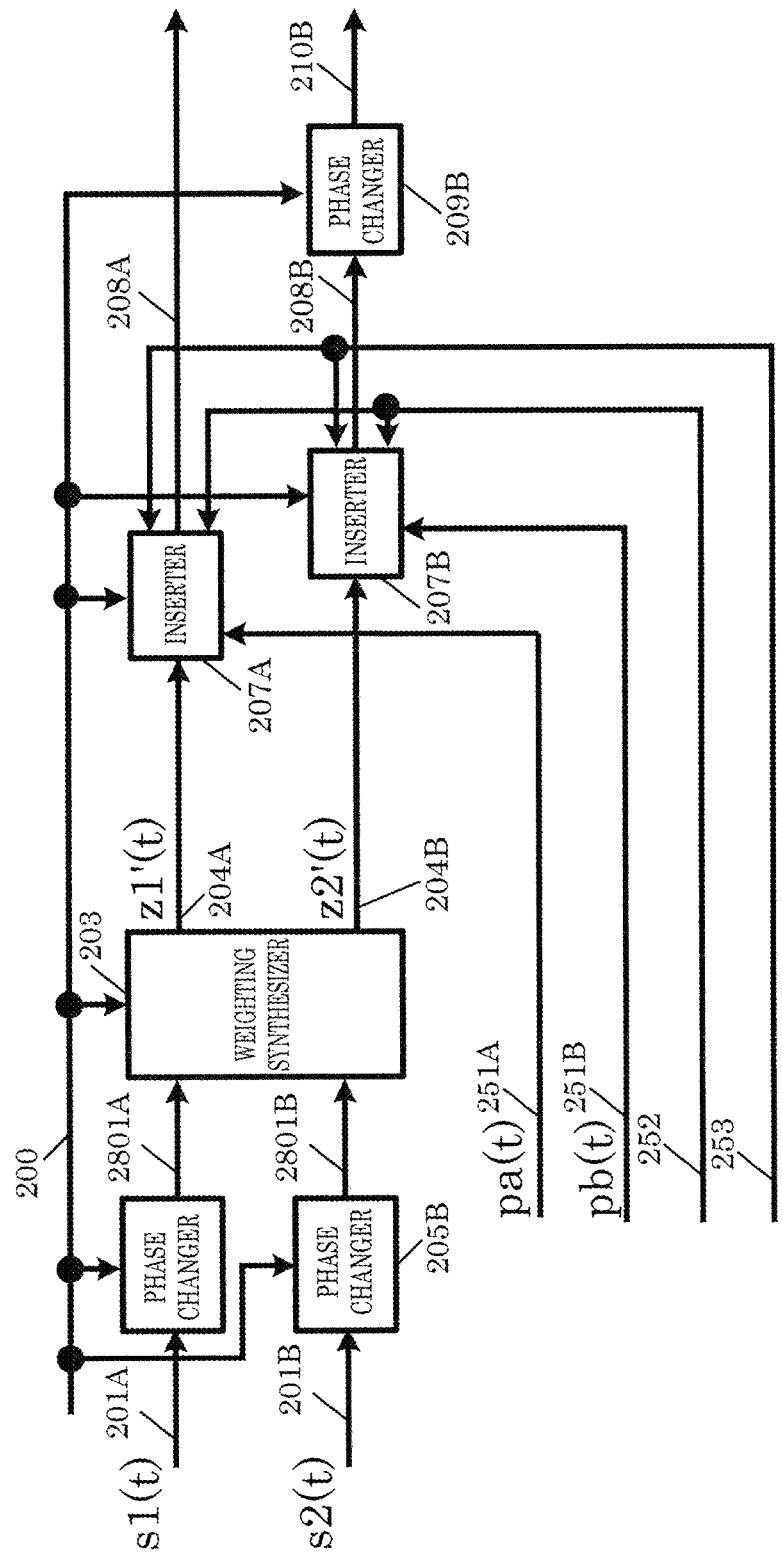
FIG. 31 illustrates one example of a configuration of the signal processor illustrated in FIG. 1.

FIG. 31 is an example in which the configuration in FIG. 20 is modified by moving phase changer 205A in front of weighting synthesizer 203 and moving phase changer 205B in front of weighting synthesizer 203.

Phase changer 205A receives inputs of mapped signal 201A (s1(t)) and control signal 200, and based on control signal 200, applies a phase change to mapped signal 201A, and outputs phase-changed signal 2801A.

In phase changer 205A, for example, a phase change of w(i) is applied to s1(i). Accordingly, when phase-changed signal 2901A is expressed as s1'(i), s1'(i) can be expressed as s1'(i)=w(i)×s1(i) (i is a symbol number (i is an integer that is greater than or equal to 0)). Note that the application method for phase change value w(i) is as described in Embodiment 1.

In phase changer 205B, for example, a phase change of y(i) is applied to s2(i). Accordingly, when phase-changed signal 2801B is expressed as s2'(i), s2'(i) can be expressed as s2'(i)=y(i)×s2(i) (i is a symbol number (i is an integer that is greater than or equal to 0)). Note that the application method for phase change value y(i) is as described in Embodiment 1.

Weighting synthesizer 203 receives inputs of mapped signal 2801A (s1'(i)), phase-changed signal 2801B (s2'(i)), and control signal 200, performs weighting synthesis (precoding) based on control signal 200, and outputs weighting synthesized signal 204A and weighting synthesized signal 204B. More specifically, weighting synthesizer 203 multiplies a precoding matrix with the vectors of mapped signal 2801A (s1'(i)) and phase-changed signal 2801B (s2'(i)) to obtain weighting synthesized signal 204A and weighting synthesized signal 204B. Note that the configuration example for the precoding matrix is as described in Embodiment 1 (subsequent description is the same as made with reference to FIG. 20, and as such, is omitted).

FIG. 32 is an example in which the configuration in FIG. 21 is modified by moving phase changer 205A in front of weighting synthesizer 203 and moving phase changer 205B in front of weighting synthesizer 203. In this case, the operations performed by phase changer 205A, phase changer 205B, and weighting synthesizer 203 are the same as described with reference to FIG. 31, and as such, description will be omitted. Moreover, operations down the line of weighting synthesizer 203 are also the same as made with reference to FIG. 21, and as such, description thereof is omitted.

FIG. 33 is an example in which the configuration in FIG. 22 is modified by moving phase changer 205A in front of weighting synthesizer 203 and moving phase changer 205B in front of weighting synthesizer 203. In this case, the operations performed by phase changer 205A, phase changer 205B, and weighting synthesizer 203 are the same as described with reference to FIG. 31, and as such, description will be omitted. Moreover, operations down the line of weighting synthesizer 203 are also the same as made with reference to FIG. 22, and as such, description thereof is omitted.

In FIG. 27, the terminal requests communication with the base station.

In this case, the base station determines the phase change value to be implemented by phase changer 205A and/or phase changer 205B to be a first specific phase change value (set) by using a random number, for example. Then, the base station implements a phase change via phase changer 205A and/or phase changer 205B based on the determined first specific phase change value (set). Here, control information symbol 2701_1 includes information on the first specific phase change value (set).

A note regarding the terminology "first specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly, in such a case, there is a need to prepare a first specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a first specific phase change value #A to be used by phase changer 205A and a first specific phase change value #B to be used by phase changer 205B. Accordingly, the terminology "first specific phase change value (set)" is used.

The base station then transmits control information symbol 2701_1 and data symbol #1 (2702_1). Here, at least data symbol #1 (2702_1) is implemented with a phase change using the determined first specific phase change value (set).

The terminal receives control information symbol 2701_1 and data symbol #1 (2702_1) transmitted by the base station, and demodulates and decodes data symbol #1 (2702_1) based at least on information on the first specific phase change value (set) included in control information symbol 2701_1. As a result, the terminal determines that the data included in data symbol #1 (2702_1) is obtained without error. The terminal then transmits, to the base station, terminal transmission symbol 2750_1 including at least information indicating that the data included in data symbol #1 (2702_1) was obtained without error.

The base station receives terminal transmission symbol 2750_1 transmitted by the terminal, and based at least on the information that is included in terminal transmission symbol 2750_1 and indicates that the data included in data symbol #1 (2702_1) was obtained without error, determines the phase change (set) to be implemented by phase changer 205A and/or phase changer 205B to be the first specific phase change value (set), just as in the case where data symbol #1 (2702_1) is transmitted (since the base station obtained the data included in data symbol #1 (2702_1) without error, the terminal can determine that it is highly probable that data can be obtained without error when the next data symbol is transmitted and the first specific phase change value (set) is used (this makes it possible to achieve an advantageous effect that it is highly probable that the terminal can achieve a high data reception quality)). Then, the base station implements a phase change via phase changer 205A and/or phase changer 205B based on the determined first specific phase change value (set). Here, control information symbol 2701_2 includes information on the first specific phase change value (set).

The base station then transmits control information symbol 2701_2 and data symbol #2 (2702_2). Here, at least data symbol #2 (27022) is implemented with a phase change using the determined first specific phase change value (set).

The terminal receives control information symbol 2701_2 and data symbol #2 (2702_2) transmitted by the base station, and demodulates and decodes data symbol #2 (2702_2) based at least on information on the first specific phase change value (set) included in control information symbol 2701_2. As a result, the terminal determines that the data included in data symbol #2 (2702_2) is not successfully obtained. The terminal then transmits, to the base station, terminal transmission symbol 2750_2 including at least information indicating that the data included in data symbol #2 (2702_2) was not successfully obtained.

The base station receives terminal transmission symbol 2750_2 transmitted by the terminal, and based at least on the information that is included in terminal transmission symbol 2750_2 and indicates that the data included in data symbol #2 (2702_2) was not successfully obtained, determines the phase change (set) to be implemented by phase changer 205A and/or phase changer 205B to be changed from the first specific phase change value (set) (since the base station did not obtain the data included in data symbol #2 (2702_2) successfully, the terminal can determine that it is highly probable that data can be obtained without error when the next data symbol is transmitted and the phase change value is changed from the first specific phase change value (set) (this makes it possible to achieve an advantageous effect that it is highly probable that the terminal can achieve a high data reception quality)). Accordingly, the base station determines the phase change value (set) to be implemented by phase changer 205A and/or phase changer 205B to be changed from the first specific phase change value (set) to a second specific phase change value (set), by using a random number, for example. Then, the base station implements a phase change via phase changer 205A and/or phase changer 205B based on the determined second specific phase change value (set). Here, control information symbol 2701_3 includes information on the second specific phase change value (set).

A note regarding the terminology "second specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly, in such a case, there is a need to prepare a second specific phase change value to be used by phase changer 205B. On the other hand, in the examples illustrated in FIG. 20, FIG. 21. FIG. 22, FIG. 31, FIG. 32, and FIG. 33, phase changer 205A and phase changer 205B are included. In such a case, there is a need to prepare a second specific phase change value #A to be used by phase changer 205A and a second specific phase change value #B to be used by phase changer 205B. Accordingly, the terminology "second specific phase change value (set)" is used.

The base station then transmits control information symbol 2701_3 and data symbol #2 (2702_2-1). Here, at least data symbol #2 (2702_2-1) is implemented with a phase change using the determined second specific phase change value (set).

Note that regarding "data symbol #2 (2702_2) present immediately behind control information symbol 2701_2" and "data symbol #2 (2702_2-1) present immediately behind control information symbol 2701_3", the modulation scheme of "data symbol #2 (2702_2) present immediately behind control information symbol 2701_2" and the modulation scheme of "data symbol #2 (2702_2-1) present immediately behind control information symbol 2701_3" may be the same or different.

Moreover, all or some data included in "data symbol #2 (2702_2) present immediately behind control information symbol 2701_2" is included in "data symbol #2 (2702_2-1) present immediately behind control information symbol 2701_3" (because "data symbol #2 (2702_2-1) present immediately behind control information symbol 2701_3" is a retransmission symbol).

The terminal receives control information symbol 2701_3 and data symbol #2 (2702_2) transmitted by the base station, and demodulates and decodes data symbol #2 (2702_2-1) based at least on information on the second specific phase change value (set) included in control information symbol 2701_3. As a result, the terminal determines that the data included in data symbol #2 (2702_2-1) is not successfully obtained. The terminal then transmits, to the base station, terminal transmission symbol 2750_3 including at least information indicating that the data included in data symbol #2 (2702_2-1) was not successfully obtained.

The base station receives terminal transmission symbol 2750_3 transmitted by the terminal, and based at least on the information that is included in terminal transmission symbol 2750_3 and indicates that the data included in data symbol #2 (2702_2-1) was not successfully obtained, determines the phase change (set) to be implemented by phase changer A and phase changer B to be changed from the second specific phase change value (set) (since the base station did not obtain the data included in data symbol #2 (2702_2-1) successfully, the terminal can determine that it is highly probable that data can be obtained without error when the next data symbol is transmitted and the phase change value is changed from the second specific phase change value (set) (this makes it possible to achieve an advantageous effect that it is highly probable that the terminal can achieve a high data reception quality)). Accordingly, the base station determines the phase change value (set) to be implemented by phase changer 205A and/or phase changer 205B to be changed from the second specific phase change value (set) to a third specific phase change value (set), by using a random number, for example. Here, control information symbol 2701_4 includes information on the third specific phase change value (set).

A note regarding the terminology "third specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly, in such a case, there is a need to prepare a third specific phase change value to be used by phase changer 205B. On the other hand, in the examples illustrated in FIG. 20, FIG. 21. FIG. 22, FIG. 31, FIG. 32, and FIG. 33, phase changer 205A and phase changer 205B are included. In such a case, there is a need to prepare a third specific phase change value #A to be used by phase changer 205A and a third specific phase change value #B to be used by phase changer 205B. Accordingly, the terminology "third specific phase change value (set)" is used.

The base station then transmits control information symbol 2701_4 and data symbol #2 (2702_2-2). Here, at least data symbol #2 (2702_2-2) is implemented with a phase change using the determined third specific phase change value (set).

Note that regarding "data symbol #2 (2702_2-1) present immediately behind control information symbol 2701_3" and "data symbol #2 (2702_2-2) present immediately behind control information symbol 2701_4", the modulation scheme of "data symbol #2 (2702_2-1) present immediately behind control information symbol 2701_3" and the modulation scheme of "data symbol #2 (2702_2-2) present immediately behind control information symbol 2701_4" may be the same or different.

Moreover, all or some data included in "data symbol #2 (2702_2-1) present immediately behind control information symbol 2701_3" is included in "data symbol #2 (2702_2-2) present immediately behind control information symbol 2701_4" (because "data symbol #2 (2702_2-2) present immediately behind control information symbol 2701_4" is a retransmission symbol).

The terminal receives control information symbol 2701_4 and data symbol #2 (2702_2-2) transmitted by the base station, and demodulates and decodes data symbol #2 (2702_2-2) based at least on information on the third specific phase change value (set) included in control information symbol 2701_4. As a result, the terminal determines that the data included in data symbol #2 (2702_2-2) is obtained without error. The terminal then transmits, to the base station, terminal transmission symbol 2750_4 including at least information indicating that the data included in data symbol #2 (2702_2-2) was obtained without error.

The base station receives terminal transmission symbol 2750_4 transmitted by the terminal, and based at least on the information that is included in terminal transmission symbol 2750_4 and indicates that the data included in data symbol #2 (2702_2-2) was obtained without error, determines the phase change (set) to be implemented by phase changer 205A and/or phase changer 205B to be the third specific phase change value (set), just as in the case where data symbol #2 (2702_2-2) is transmitted (since the base station obtained the data included in data symbol #2 (2702_2-2) without error, the terminal can determine that it is highly probable that data can be obtained without error when the next data symbol is transmitted and the third specific phase change value (set) is used (this makes it possible to achieve an advantageous effect that it is highly probable that the terminal can achieve a high data reception quality)). Then, the base station implements a phase change via phase changer 205A and/or phase changer 205B based on the determined third specific phase change value (set). Here, control information symbol 2701_5 includes information on the third specific phase change value (set).

The base station then transmits control information symbol 2701_5 and data symbol #3 (2702_3). Here, at least data symbol #3 (2702_3) is implemented with a phase change using the determined third specific phase change value (set).

The terminal receives control information symbol 2701_5 and data symbol #3 (2702_3) transmitted by the base station, and demodulates and decodes data symbol #3 (2702_3) based at least on information on the third specific phase change value (set) included in control information symbol 2701_5. As a result, the terminal determines that the data included in data symbol #3 (2702_3) is obtained without error. The terminal then transmits, to the base station, terminal transmission symbol 2750_5 including at least information indicating that the data included in data symbol #3 (2702_3) was obtained without error.

The base station receives terminal transmission symbol 2750_5 transmitted by the terminal, and based at least on the information that is included in terminal transmission symbol 2750_5 and indicates that the data included in data symbol #3 (2702_3) was obtained without error, determines the phase change (set) to be implemented by phase changer 205A and/or phase changer 205B to be the third specific phase change value (set), just as in the case where data symbol #3 (2702_3) is transmitted (since the base station obtained the data included in data symbol #3 (2702_3) without error, the terminal can determine that it is highly probable that data can be obtained without error when the next data symbol is transmitted and the third specific phase change value (set) is used (this makes it possible to achieve an advantageous effect that it is highly probable that the terminal can achieve a high data reception quality)). Then, the base station implements a phase change via phase changer 205A and/or phase changer 205B based on the determined third specific phase change value (set). Here, control information symbol 2701_6 includes information on the third specific phase change value (set).

The base station then transmits control information symbol 2701_6 and data symbol #4 (2702_4). Here, at least data symbol #4 (2702_4) is implemented with a phase change using the determined third specific phase change value (set).

The terminal receives control information symbol 2701_6 and data symbol #4 (2702_4) transmitted by the base station, and demodulates and decodes data symbol #4 (2702_4) based at least on information on the third specific phase change value (set) included in control information symbol 2701_6. As a result, the terminal determines that the data included in data symbol #4 (2702_4) is not successfully obtained. The terminal then transmits, to the base station, terminal transmission symbol 2750_6 including at least information indicating that the data included in data symbol #4 (2702_4) was not successfully obtained.

The base station receives terminal transmission symbol 2750_6 transmitted by the terminal, and based at least on the information that is included in terminal transmission symbol 2750_6 and indicates that the data included in data symbol #4 (2702_4) was not successfully obtained, determines the phase change (set) to be implemented by phase changer 205A and/or phase changer 205B to be changed from the third specific phase change value (set) (since the base station did not obtain the data included in data symbol #4 (2702_4) successfully, the terminal can determine that it is highly probable that data can be obtained without error when the next data symbol is transmitted and the phase change value is changed from the third specific phase change value (set)(this makes it possible to achieve an advantageous effect that it is highly probable that the terminal can achieve a high data reception quality)). Accordingly, the base station determines the phase change value (set) to be implemented by phase changer 205A and/or phase changer 205B to be changed from the third specific phase change value (set) to a fourth specific phase change value (set), by using a random number, for example. Then, the base station implements a phase change via phase changer 205A and/or phase changer 205B based on the determined fourth specific phase change value (set). Here, control information symbol 2701_7 includes information on the fourth specific phase change value (set).

A note regarding the terminology "fourth specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly, in such a case, there is a need to prepare a fourth specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a fourth specific phase change value #A to be used by phase changer 205A and a fourth specific phase change value #B to be used by phase changer 205B. Accordingly, the terminology "fourth specific phase change value (set)" is used.

Note that regarding "data symbol #4 (2702_4) present immediately behind control information symbol 2701_6" and "data symbol #4 (2702_4-1) present immediately behind control information symbol 2701_7", the modulation scheme of "data symbol #4 (2702_4) present immediately behind control information symbol 2701_6" and the modulation scheme of "data symbol #4 (2702_4-1) present immediately behind control information symbol 2701_7" may be the same or different.

Moreover, "data symbol #4 (2702_4-1) present immediately behind control information symbol 2701_7" includes all or some data included in "data symbol #4 (2702_4) present immediately behind control information symbol 2701_6" (because "data symbol #4 (2702_4-1) present immediately behind control information symbol 2701_7" is a retransmission symbol).

The terminal receives control information symbol 2701_7 and data symbol #4 (2702_4-1) transmitted by the base station, and demodulates and decodes data symbol #4 (2702_4-1) based at least on information on the fourth specific phase change value (set) included in control information symbol 2701_7.

Note that regarding data symbol #1 (2702_1), data symbol #2 (2702_2), data symbol #3 (2702_3), and data symbol #4 (2702_4), the base station transmits a plurality of modulated signals from a plurality of antennas, just as described in Embodiments 1 through 6. However, unlike Embodiments 1 through 6, phase changer 205A and/or phase changer 205B implement a phase change using the specific phase change value described above.

The frame configurations of the base station and terminal illustrated in FIG. 27 are mere non-limiting examples; other symbols may be included. Moreover, control information symbol 2701_1, 2701_2, 2701_3, 2701_4, 2701_5, 2701_6, data symbol #1 (2702_1), data symbol #2 (2702_2), data symbol #3 (2702_3), and data symbol #4 (2702_4) may each include other symbols, such as a pilot symbol. Moreover, control information symbol 2701_1, 2701_2, 2701_3, 2701_4, 27015, and 2701_6 include information relating to the specific phase change value (set) used upon transmitting data symbol #1 (2702_1), data symbol #2 (2702_2), data symbol #3 (2702_3), and data symbol #4 (27024), and the terminal becomes capable of demodulating and decoding data symbol #1 (2702_1), data symbol #2 (2702_2), data symbol #3 (2702_3), and data symbol #4 (2702_4) as a result of obtaining this information.

Note that in the above description, the base station determines the value (set) for the specific phase change value (set) by using a "random number", but the determination of the value for the specific phase change value (set) is not limited to this method. The base station may regularly change the value (set) for the specific phase change value (set) (any method may be used to determine the value for the specific phase change value (set); when the specific phase change value (set) needs to be changed, the specific phase change value (set) before and after the change may be different).

Similar to as described in Embodiments 1 through 6, for example, when the base station transmits a modulated signal having a frame configuration such as illustrated in FIG. 4, FIG. 5, FIG. 13, or FIG. 14, the subject of the phase change implemented using the specific phase change value by phase changer 205A and/or phase changer 205B, as described above, are data symbols (402, 502). The symbol that is subject to phase change implemented by phase changer 209A and/or phase changer 209B is, just as described in Embodiments 1 through 6, "pilot symbol 401, 501", "other symbol 403, 503".

However, in phase changer 205A and/or phase changer 205B, if a phase change is applied to "pilot symbol 401, 501", "other symbol 403, 503" as well, demodulating and decoding is possible.

Even if this transmission method is implemented independently, the method of implementation of a phase change using a specific phase change value described above can achieve an advantageous effect in that high data reception quality can be achieved with the terminal.

Moreover, examples of the configuration of signal processor 106 illustrated in FIG. 1 and included in the transmission device of the base station are given in FIG. 2, FIG. 18, FIG. 19, FIG. 20, FIG. 21, FIG. 22, FIG. 23, FIG. 28, FIG. 29, FIG. 30, FIG. 31, FIG. 32, and FIG. 33, but phase change need not be implemented in phase changer 209A and phase changer 209B. In other words, in FIG. 2, FIG. 18, FIG. 19, FIG. 20, FIG. 21, FIG. 22, FIG. 23, FIG. 28, FIG. 29, FIG. 30, FIG. 31, FIG. 32, and FIG. 33, phase changer 209A and phase changer 209B may be removed. In such cases, signal 208A corresponds to signal 106_A in FIG. 1, and signal 208B corresponds to signal 106_B in FIG. 1.

When [u0 u1], which is described above and used to control operations performed by phase changers 205A, 205B included in the base station, is set to [01] (i.e., u0=0, u1=1), that is to say, when phase changers 205A, 205B implement a phase change cyclically/regularly on a per-symbol basis, control information for setting the phase change in detail is set to u2, u3. The relationship between [u2 u3] and the phase change implemented by phase changers 205A and 205B in detail is illustrated in Table 2 (note that u2, u3 are, for example, transmitted by the base station as some of the control information symbols, namely, other symbols 403, 503. The terminal obtains [u2 u3] included in control information symbols, namely, other symbols 403, 503, becomes aware of operations performed by phase changers 205A, 205B from [u2 u3], and demodulates and decodes data symbols. Also, the control information for "detailed phase change" is 2-bit information, but the number of bits may be other than 2 bits).

TABLE 2

| u2 u3 | phase change method when [u0 u1] = [01] |
|---|---|
| 00 | method 01_1 |
| 01 | method 01_2 |
| 10 | method 01_3 |
| 11 | method 01_4 |

A first example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.
Method 01_1:

Phase changer 205A sets the coefficient used in the multiplication for the phase change to y1(i) (i indicates a symbol number and is an integer that is greater than or equal to 0). Here, y1(i) is expressed as follows.

[MATH. 53]

$$y1(i) = e^{j\frac{2\times \pi \times i}{9}}$$
Equation (53)

Phase changer 205B does not implement a phase change.

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.
Method 01_2:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows.

[MATH. 54]

$$y2(i) = e^{j\frac{2\times \pi \times i}{9}}$$
Equation (54)

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.
Method 01_3:

Phase changer 205A sets the coefficient used in the multiplication for the phase change to y1(i) (i indicates a symbol number and is an integer that is greater than or equal to 0). Here, y1(i) is expressed as follows.

[MATH. 55]

$$y1(i) = e^{j\frac{2\times \pi \times i}{9}}$$
Equation (55)

Phase changer 205B sets the coefficient used in the multiplication for the phase change to y2(i) (i indicates a symbol number and is an integer that is greater than or equal to 0). Here, y2(i) is expressed as follows.

[MATH. 56]

$$y2(i) = e^{-j\frac{2\times \pi \times i}{7}}$$
Equation (56)

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.
Method 01_4:

Phase changer 205A sets the coefficient used in the multiplication for the phase change to y1(i) (i indicates a symbol number and is an integer that is greater than or equal to 0). Here, y1(i) is expressed as follows.

[MATH. 57]

$$y1(i) = e^{-j\frac{2\times \pi \times i}{7}}$$
Equation (57)

Phase changer 205B sets the coefficient used in the multiplication for the phase change to y2(i) (i indicates a symbol number and is an integer that is greater than or equal to 0). Here, y2(i) is expressed as follows.

[MATH. 58]

$$y2(i) = e^{j\frac{2\times \pi \times i}{9}}$$
Equation (58)

A second example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.
Method 01_1:

Phase changer 205A sets the coefficient used in the multiplication for the phase change to y1(i) (i indicates a symbol number and is an integer that is greater than or equal to 0). Here, y1(i) is expressed as follows.

[MATH. 59]

$$y1(i) = e^{j\frac{2\times \pi \times i}{3}}$$
Equation (59)

Phase changer 205B does not implement a phase change.
When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A sets the coefficient used in the multiplication for the phase change to y1(i) (i indicates a symbol number and is an integer that is greater than or equal to 0). Here, y1(i) is expressed as follows.

[MATH. 60]

$$y1(i) = e^{j\frac{2\times\pi\times i}{5}} \quad \text{Equation (60)}$$

Phase changer 205B does not implement a phase change.

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 01_3:

Phase changer 205A sets the coefficient used in the multiplication for the phase change to y1(i) (i indicates a symbol number and is an integer that is greater than or equal to 0). Here, y1(i) is expressed as follows.

[MATH. 61]

$$y1(i) = e^{j\frac{2\times\pi\times i}{7}} \quad \text{Equation (61)}$$

Phase changer 205B does not implement a phase change.

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 01_4:

Phase changer 205A sets the coefficient used in the multiplication for the phase change to y1(i) (i indicates a symbol number and is an integer that is greater than or equal to 0). Here, y1(i) is expressed as follows.

[MATH. 62]

$$y1(i) = e^{j\frac{2\times\pi\times i}{9}} \quad \text{Equation (62)}$$

Phase changer 205B does not implement a phase change.

A third example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 01_1:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows.

[MATH. 63]

$$y2(i) = e^{j\frac{2\times\pi\times i}{3}} \quad \text{Equation (63)}$$

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows.

[MATH. 64]

$$y2(i) = e^{j\frac{2\times\pi\times i}{5}} \quad \text{Equation (64)}$$

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 01_3:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows.

[Math. 65]

$$y2(i) = e^{j\frac{2\times\pi\times i}{7}} \quad \text{Equation (65)}$$

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 01_4:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows.

[Math. 66]

$$y2(i) = e^{j\frac{2\times\pi\times i}{9}} \quad \text{Equation (66)}$$

A fourth example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 01_1:

Phase changer 205A sets the coefficient used in the multiplication for the phase change to y1(i) (i indicates a symbol number and is an integer that is greater than or equal to 0). Here, y1(i) is expressed as follows.

[Math. 67]

$$y1(i) = e^{j\frac{2\times\pi\times i}{5}}$$  Equation (67)

Phase changer 205B sets the coefficient used in the multiplication for the phase change to y2(i) (i indicates a symbol number and is an integer that is greater than or equal to 0). Here, y2(i) is expressed as follows.

[Math. 68]

$$y2(i) = e^{-j\frac{2\times\pi\times i}{3}}$$  Equation (68)

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A sets the coefficient used in the multiplication for the phase change to y1(i) (i indicates a symbol number and is an integer that is greater than or equal to 0). Here, y1(i) is expressed as follows.

[Math. 69]

$$y1(i) = e^{j\frac{2\times\pi\times i}{7}}$$  Equation (69)

Phase changer 205B sets the coefficient used in the multiplication for the phase change to y2(i) (i indicates a symbol number and is an integer that is greater than or equal to 0). Here, y2(i) is expressed as follows.

[Math. 70]

$$y2(i) = e^{-j\frac{2\times\pi\times i}{3}}$$  Equation (70)

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 01_3:

Phase changer 205A sets the coefficient used in the multiplication for the phase change to y1(i) (i indicates a symbol number and is an integer that is greater than or equal to 0). Here, y1(i) is expressed as follows.

[Math. 71]

$$y1(i) = e^{j\frac{2\times\pi\times i}{7}}$$  Equation (71)

Phase changer 205B sets the coefficient used in the multiplication for the phase change to y2(i) (i indicates a symbol number and is an integer that is greater than or equal to 0). Here, y2(i) is expressed as follows.

[Math. 72]

$$y2(i) = e^{-j\frac{2\times\pi\times i}{5}}$$  Equation (72)

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 01_4:

Phase changer 205A sets the coefficient used in the multiplication for the phase change to y1(i) (i indicates a symbol number and is an integer that is greater than or equal to 0). Here, y1(i) is expressed as follows.

[Math. 73]

$$y1(i) = e^{j\frac{2\times\pi\times i}{9}}$$  Equation (73)

Phase changer 205B sets the coefficient used in the multiplication for the phase change to y2(i) (i indicates a symbol number and is an integer that is greater than or equal to 0). Here, y2(i) is expressed as follows.

[Math. 74]

$$y2(i) = e^{-j\frac{2\times\pi\times i}{5}}$$  Equation (74)

Although first through fourth examples are given above, the detailed phase change method employed by phase changer 205A, phase changer 205B is not limited to these examples.

<1> In phase changer 205A, a phase change is implemented cyclically/regularly on a per-symbol basis.

<2> In phase changer 205B, a phase change is implemented cyclically/regularly on a per-symbol basis.

<3> In phase changer 205A and phase changer 205B, a phase change is implemented cyclically/regularly on a per-symbol basis.

So long as a method according to one or more of <1>, <2>, and <3> is set in detail according to [u2 u3], it may be implemented in the same manner as described above.

When [u0 u1], which is described above and used to control operations performed by phase changers 205A, 205B included in the base station, is set to [10] (i.e., u0=1, u1=0), that is to say, when phase changers 205A, 205B implement a phase change using a specific phase change value (set), control information for setting the phase change in detail is set to u4, u5. The relationship between [u4 u5] and the phase change implemented by phase changers 205A, 205B in detail is illustrated in Table 3 (note that u4, u5 are, for example, transmitted by the base station as some of the control information symbols, namely, other symbols 403, 503. The terminal obtains [u4 u5] included in control information symbols, namely, other symbols 403, 503, becomes aware of operations performed by phase changers 205A, 205B from [u4 u5], and demodulates and decodes data symbols. Also, the control information for "detailed phase change" is 2-bit information, but the number of bits may be other than 2 bits).

TABLE 3

| u4 u5 | phase change method when [u0 u1] = [10] |
|---|---|
| 00 | method 10_1 |
| 01 | method 10_2 |
| 10 | method 10_3 |
| 11 | method 10_4 |

A first example of an interpretation of Table 3 is as follows. When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[Math. 75]

$$y1(i) = e^{j\frac{\pi}{4}} \qquad \text{Equation (75)}$$

Phase changer 205B does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A does not implement a phase change.

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[Math. 76]

$$y2(i) = e^{j\frac{\pi}{3}} \qquad \text{Equation (76)}$$

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[Math. 77]

$$y1(i) = e^{j\frac{\pi}{4}} \qquad \text{Equation (77)}$$

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[Math. 78]

$$y2(i) = e^{-j\frac{\pi}{8}} \qquad \text{Equation (78)}$$

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 79]

$$y1(i) = e^{-j\frac{2\times\pi}{7}} \qquad \text{Equation (79)}$$

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[Math. 80]

$$y2(i) = e^{j\frac{2\times\pi}{9}} \qquad \text{Equation (80)}$$

A second example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 81]

$$y1(i) = e^{j0} \qquad \text{Equation (81)}$$

(In the case of Equation (81), phase changer 205A does not implement a phase.). Phase changer 205B does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 82]

$$y1(i) = e^{j\frac{\pi}{8}} \qquad \text{Equation (82)}$$

Phase changer 205B does not implement a phase change.

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 83]

$$y1(i) = e^{j\frac{\pi}{4}} \qquad \text{Equation (83)}$$

Phase changer 205B does not implement a phase change.

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 84]

$$y1(i) = e^{j\frac{3\times\pi}{8}} \qquad \text{Equation (84)}$$

Phase changer 205B does not implement a phase change.

A third example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 85]

$$y2(i) = e^{j0} \qquad \text{Equation (85)}$$

In the case of Equation (85), phase changer 205B does not implement a phase. Phase changer 205A does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 86]

$$y2(i) = e^{j\frac{\pi}{8}} \qquad \text{Equation (86)}$$

Phase changer 205A does not implement a phase change.

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 87]

$$y2(i) = e^{j\frac{\pi}{4}} \qquad \text{Equation (87)}$$

Phase changer 205A does not implement a phase change.

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 88]

$$y2(i) = e^{j\frac{3\times\pi}{8}} \qquad \text{Equation (88)}$$

Phase changer 205A does not implement a phase change.

A fourth example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 89]

$$y1(i) = e^{j\frac{\pi}{8}}$$ Equation (89)

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 90]

$$y2(i) = e^{j0}$$ Equation (90)

(In the case of Equation (90), phase changer 205B does not implement a phase.)

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 91]

$$y1(i) = e^{j\frac{\pi}{8}}$$ Equation (91)

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 92]

$$y2(i) = e^{-j\frac{\pi}{8}}$$ Equation (92)

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 93]

$$y1(i) = e^{j\frac{\pi}{4}}$$ Equation (93)

Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 94]

$$y2(i) = e^{-j\frac{\pi}{8}}$$ Equation (94)

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i) (i indicates a symbol number and is an integer that is greater than or equal to 0). Here, y1(i) is expressed as follows (this acts as a fixed phase value independent of symbol number).

[MATH. 95]

$$y1(i) = e^{j0}$$ Equation (95)

(In the case of Equation (95), phase changer 205A does not implement a phase.). Phase changer 205B sets the coefficient used in the multiplication for the phase change to y2(i) (i indicates a symbol number and is an integer that is greater than or equal to 0). Here, y2(i) is expressed as follows (this acts as a fixed phase value independent of symbol number).

[MATH. 96]

$$y2(i) = e^{-j\frac{\pi}{4}}$$ Equation (96)

Although first through fourth examples are given above, the detailed phase change method employed by phase changer 205A, phase changer 205B is not limited to these examples.

<4> In phase changer 205A, phase change is implemented using a specific phase change value.
<5> In phase changer 205B, phase change is implemented using a specific phase change value.
<6> In phase changer 205A and phase changer 205B, phase change is implemented using a specific phase change value.

So long as a method according to one or more of <4>, <5>, and <6> is set in detail according to [u4 u5], it may be implemented in the same manner as described above.

Moreover, in phase changers 205A, 205B included in the base station, a combination of the method of implementing a phase change cyclically/regularly on a per-symbol basis and the method of implementing a phase change using a specific phase change value may be used. A mode in which phase changers 205A, 205B use a combination of the method of implementing a phase change cyclically/regularly on a per-symbol basis and the method of implementing a phase change using a specific phase change value is indicated as "reserve" in Table 1, and is allotted as [u0 u1]=[11] (i.e., u0=1, u1=1).

When [u0 u1], which is described above and used to control operations performed by phase changers 205A, 205B included in the base station, is set to [11] (i.e., u0=1, u1=1), that is to say, when phase changers 205A, 205B implement a phase change using a combination the method of implementing a phase change cyclically/regularly on a per-symbol basis and the method of implementing a phase change using a specific phase change value, control information for setting the phase change in detail is set to u6, u7. The relationship between [u6 u7] and the phase change implemented by phase changers 205A, 205B in detail is illustrated in Table 4 (note that u6, u7 are, for example, transmitted by the base station as some of the control information symbols, namely, other symbols 403, 503. The terminal obtains [u6 u7] included in control information symbols, namely, other symbols 403, 503, becomes aware of operations performed by phase changers 205A, 205B from [u6 u7], and demodulates and decodes data symbols. Also, the control information for "detailed phase change" is 2-bit information, but the number of bits may be other than 2 bits).

TABLE 4

| u6 u7 | phase change method when [u0 u1] = [10] |
|---|---|
| 00 | method 11_1 |
| 01 | method 11_2 |
| 10 | method 11_3 |
| 11 | method 11_4 |

A first example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.
Method 11_1:
Phase changer 205A sets the coefficient used in the multiplication for the phase change to y1(i) (i indicates a symbol number and is an integer that is greater than or equal to 0). Here, y1(i) is expressed as follows.

[MATH. 97]

$$y1(i) = e^{j\frac{2\times\pi\times i}{9}}$$

Equation (97)

Phase changer 205B sets the coefficient used in the multiplication for the phase change to y2(i) (i indicates a symbol number and is an integer that is greater than or equal to 0). Here, y2(i) is expressed as follows.

[MATH. 98]

$$y2(i) = e^{j0}$$

Equation (98)

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.
Method 11_2:
Phase changer 205A sets the coefficient used in the multiplication for the phase change to y1(i) (i indicates a symbol number and is an integer that is greater than or equal to 0). Here, y1(i) is expressed as follows.

[MATH. 99]

$$y1(i) = e^{j\frac{2\times\pi\times i}{9}}$$

Equation (99)

Phase changer 205B sets the coefficient used in the multiplication for the phase change to y2(i) (i indicates a symbol number and is an integer that is greater than or equal to 0). Here, y2(i) is expressed as follows.

[MATH. 100]

$$y2(i) = e^{j\frac{\pi}{4}}$$

Equation (100)

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.
Method 11_3:
Phase changer 205A sets the coefficient used in the multiplication for the phase change to y1(i) (i indicates a symbol number and is an integer that is greater than or equal to 0). Here, y1(i) is expressed as follows.

[MATH. 101]

$$y1(i) = e^{j0}$$

Equation (101)

Phase changer 205B sets the coefficient used in the multiplication for the phase change to y2(i) (i indicates a symbol number and is an integer that is greater than or equal to 0). Here, y2(i) is expressed as follows.

[MATH. 102]

$$y2(i) = e^{j\frac{2\times\pi\times i}{9}}$$

Equation (102)

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.
Method 11_4:
Phase changer 205A sets the coefficient used in the multiplication for the phase change to y1(i) (i indicates a symbol number and is an integer that is greater than or equal to 0). Here, y1(i) is expressed as follows.

[MATH. 103]

$$y1(i) = e^{j\frac{\pi}{4}}$$

Equation (103)

Phase changer 205B sets the coefficient used in the multiplication for the phase change to y2(i) (i indicates a symbol number and is an integer that is greater than or equal to 0). Here, y2(i) is expressed as follows.

[MATH. 104]
$$y2(i) = e^{j\frac{2\times\pi\times i}{9}}$$ Equation (104)

A second example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.
Method 11_1:

Phase changer 205A sets the coefficient used in the multiplication for the phase change to y1(i) (i indicates a symbol number and is an integer that is greater than or equal to 0). Here, y1(i) is expressed as follows.

[MATH. 105]
$$y1(i) = e^{j\frac{2\times\pi\times i}{9}}$$ Equation (105)

Phase changer 205B sets the coefficient used in the multiplication for the phase change to y2(i) (i indicates a symbol number and is an integer that is greater than or equal to 0). Here, y2(i) is expressed as follows.

[MATH. 106]
$$y2(i)e^{j0}$$ Equation (106)

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.
Method 11_2:

Phase changer 205A sets the coefficient used in the multiplication for the phase change to y1(i) (i indicates a symbol number and is an integer that is greater than or equal to 0). Here, y1(i) is expressed as follows.

[MATH. 107]
$$y1(i) = e^{j\frac{2\times\pi\times i}{9}}$$ Equation (107)

Phase changer 205B sets the coefficient used in the multiplication for the phase change to y2(i) (i indicates a symbol number and is an integer that is greater than or equal to 0). Here, y2(i) is expressed as follows.

[MATH. 108]
$$y2(i) = e^{j\frac{\pi}{8}}$$ Equation (108)

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.
Method 11_3:

Phase changer 205A sets the coefficient used in the multiplication for the phase change to y1(i) (i indicates a symbol number and is an integer that is greater than or equal to 0). Here, y1(i) is expressed as follows.

[MATH. 109]
$$y1(i) = e^{j\frac{2\times\pi\times i}{9}}$$ Equation (109)

Phase changer 205B sets the coefficient used in the multiplication for the phase change to y2(i) (i indicates a symbol number and is an integer that is greater than or equal to 0). Here, y2(i) is expressed as follows.

[MATH. 110]
$$y2(i) = e^{j\frac{\pi}{4}}$$ Equation (110)

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.
Method 11_4:

Phase changer 205A sets the coefficient used in the multiplication for the phase change to y1(i) (i indicates a symbol number and is an integer that is greater than or equal to 0). Here, y1(i) is expressed as follows.

[MATH. 111]
$$y1(i) = e^{j\frac{2\times\pi\times i}{9}}$$ Equation (111)

Phase changer 205B sets the coefficient used in the multiplication for the phase change to y2(i) (i indicates a symbol number and is an integer that is greater than or equal to 0). Here, y2(i) is expressed as follows.

[MATH. 112]
$$y2(i) = e^{j\frac{3\times\pi}{8}}$$ Equation (112)

A third example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.
Method 11_1:

Phase changer 205A sets the coefficient used in the multiplication for the phase change to y1(i) (i indicates a symbol number and is an integer that is greater than or equal to 0). Here, y1(i) is expressed as follows.

[MATH. 113]

$$y1(i) = e^{j\frac{2\times\pi\times i}{3}} \qquad \text{Equation (113)}$$

Phase changer 205B sets the coefficient used in the multiplication for the phase change to y2(i) (i indicates a symbol number and is an integer that is greater than or equal to 0). Here, y2(i) is expressed as follows.

[MATH. 114]

$$y2(i) = e^{j\frac{\pi}{4}} \qquad \text{Equation (114)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.
Method 11_2:

Phase changer 205A sets the coefficient used in the multiplication for the phase change to y1(i) (i indicates a symbol number and is an integer that is greater than or equal to 0). Here, y1(i) is expressed as follows.

[MATH. 115]

$$y1(i) = e^{j\frac{2\times\pi\times i}{5}} \qquad \text{Equation (115)}$$

Phase changer 205B sets the coefficient used in the multiplication for the phase change to y2(i) (i indicates a symbol number and is an integer that is greater than or equal to 0). Here, y2(i) is expressed as follows.

[MATH. 116]

$$y2(i) = e^{j\frac{\pi}{4}} \qquad \text{Equation (116)}$$

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.
Method 11_3:

Phase changer 205A sets the coefficient used in the multiplication for the phase change to y1(i) (i indicates a symbol number and is an integer that is greater than or equal to 0). Here, y1(i) is expressed as follows.

[MATH. 117]

$$y1(i) = e^{j\frac{2\times\pi\times i}{7}} \qquad \text{Equation (117)}$$

Phase changer 205B sets the coefficient used in the multiplication for the phase change to y2(i) (i indicates a symbol number and is an integer that is greater than or equal to 0). Here, y2(i) is expressed as follows.

[MATH. 118]

$$y2(i) = e^{j\frac{\pi}{4}} \qquad \text{Equation (118)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.
Method 11_4:

Phase changer 205A sets the coefficient used in the multiplication for the phase change to y1(i) (i indicates a symbol number and is an integer that is greater than or equal to 0). Here, y1(i) is expressed as follows.

[MATH. 119]

$$y1(i) = e^{j\frac{2\times\pi\times i}{9}} \qquad \text{Equation (119)}$$

Phase changer 205B sets the coefficient used in the multiplication for the phase change to y2(i) (i indicates a symbol number and is an integer that is greater than or equal to 0). Here, y2(i) is expressed as follows.

[MATH. 120]

$$y2(i) = e^{j\frac{\pi}{4}} \qquad \text{Equation (120)}$$

A fourth example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.
Method 11_1:

Phase changer 205A sets the coefficient used in the multiplication for the phase change to y1(i) (i indicates a symbol number and is an integer that is greater than or equal to 0). Here, y1(i) is expressed as follows.

[MATH. 121]

$$y1(i) = e^{j0} \qquad \text{Equation (121)}$$

Phase changer 205B sets the coefficient used in the multiplication for the phase change to y2(i) (i indicates a symbol number and is an integer that is greater than or equal to 0). Here, y2(i) is expressed as follows.

[MATH. 122]

$$y2(i) = e^{j\frac{2\times\pi\times i}{9}} \qquad \text{Equation (122)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i) (i indicates a symbol number and is an integer that is greater than or equal to 0). Here, y1(i) is expressed as follows.

[MATH. 123]

$$y1(i) = e^{j\frac{\pi}{8}} \quad \text{Equation (123)}$$

Phase changer 205B sets the coefficient used in the multiplication for the phase change to y2(i) (i indicates a symbol number and is an integer that is greater than or equal to 0). Here, y2(i) is expressed as follows.

[MATH. 124]

$$y2(i) = e^{j\frac{2\times\pi\times i}{9}} \quad \text{Equation (124)}$$

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i) (i indicates a symbol number and is an integer that is greater than or equal to 0). Here, y1(i) is expressed as follows.

[MATH. 125]

$$y1(i) = e^{j\frac{\pi}{4}} \quad \text{Equation (125)}$$

Phase changer 205B sets the coefficient used in the multiplication for the phase change to y2(i) (i indicates a symbol number and is an integer that is greater than or equal to 0). Here, y2(i) is expressed as follows.

[MATH. 126]

$$y2(i) = e^{j\frac{2\times\pi\times i}{9}} \quad \text{Equation (126)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i) (i indicates a symbol number and is an integer that is greater than or equal to 0). Here, y1(i) is expressed as follows.

[MATH. 127]

$$y1(i) = e^{j\frac{3\times\pi}{8}} \quad \text{Equation (127)}$$

Phase changer 205B sets the coefficient used in the multiplication for the phase change to y2(i) (i indicates a symbol number and is an integer that is greater than or equal to 0). Here, y2(i) is expressed as follows.

[MATH. 128]

$$y2(i) = e^{j\frac{2\times\pi\times i}{9}} \quad \text{Equation (128)}$$

A fifth example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 11_1:

Phase changer 205A sets the coefficient used in the multiplication for the phase change to y1(i) (i indicates a symbol number and is an integer that is greater than or equal to 0). Here, y1(i) is expressed as follows.

[MATH. 129]

$$y1(i) = e^{j\frac{\pi}{4}} \quad \text{Equation (129)}$$

Phase changer 205B sets the coefficient used in the multiplication for the phase change to y2(i) (i indicates a symbol number and is an integer that is greater than or equal to 0). Here, y2(i) is expressed as follows.

[MATH. 130]

$$y2(i) = e^{j\frac{2\times\pi\times i}{3}} \quad \text{Equation (130)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i) (i indicates a symbol number and is an integer that is greater than or equal to 0). Here, y1(i) is expressed as follows.

[MATH. 131]

$$y1(i) = e^{j\frac{\pi}{4}}$$ Equation (131)

Phase changer 205B sets the coefficient used in the multiplication for the phase change to y2(i) (i indicates a symbol number and is an integer that is greater than or equal to 0). Here, y2(i) is expressed as follows.

[MATH. 132]

$$y2(i) = e^{j\frac{2\times\pi\times i}{5}}$$ Equation (132)

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.
Method 11_3:

Phase changer 205A sets the coefficient used in the multiplication for the phase change to y1(i) (i indicates a symbol number and is an integer that is greater than or equal to 0). Here, y1(i) is expressed as follows.

[MATH. 133]

$$y1(I) = e^{j\frac{\pi}{4}}$$ Equation (133)

Phase changer 205B sets the coefficient used in the multiplication for the phase change to y2(i) (i indicates a symbol number and is an integer that is greater than or equal to 0). Here, y2(i) is expressed as follows.

[MATH. 134]

$$y2(i) = e^{j\frac{2\times\pi\times i}{7}}$$ Equation (134)

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.
Method 11_4:

Phase changer 205A sets the coefficient used in the multiplication for the phase change to y1(i) (i indicates a symbol number and is an integer that is greater than or equal to 0). Here, y1(i) is expressed as follows.

[MATH. 135]

$$y1(i) = e^{j\frac{\pi}{4}}$$ Equation (135)

Phase changer 205B sets the coefficient used in the multiplication for the phase change to y2(i) (i indicates a symbol number and is an integer that is greater than or equal to 0). Here, y2(i) is expressed as follows.

[MATH. 136]

$$y2(i) = e^{j\frac{2\times\pi\times i}{9}}$$ Equation (136)

Although first through fifth examples are given above, the detailed phase change method employed by phase changer 205A, phase changer 205B is not limited to these examples.

<7> In phase changer 205A, phase change is implemented cyclically/regularly on a per-symbol basis, and in phase changer 205B, phase change is implemented using a specific phase change value (set).

<8> In phase changer 205B, phase change is implemented using a specific phase change value (set), and in phase changer 205B, phase change is implemented cyclically/regularly on a per-symbol basis.

<3> In phase changer 205A and phase changer 205B, a phase change is implemented cyclically/regularly on a per-symbol basis.

So long as a method according to one or more of <7> and <8> is set in detail according to [u2 u3], it may be implemented in the same manner as described above.

In weighting synthesizer 203 included in the base station, the matrix used for the weighting synthesis may be changed. Control information for setting the weighting synthesis matrix shall be referred to as u8, u9. The relationship between [u8 u9] and the weighting synthesis matrix to be used in detail by weighting synthesizer 203 is given in Table 5 (note that u8, u9 are, for example, transmitted by the base station as some of the control information symbols, namely, other symbols 403, 503. The terminal obtains [u8 u9] included in control information symbols, namely, other symbols 403, 503, becomes aware of operations performed by weighting synthesizer 203 from [u8 u9], and demodulates and decodes data symbols. Also, the control information for identifying "detailed weighting matrix" is 2-bit information, but the number of bits may be other than 2 bits).

TABLE 5

| u8 u9 | phase change method when [u0 u1] = [10] |
|---|---|
| 00 | precoding using matrix 1 |
| 01 | precoding using matrix 2 |
| 10 | precoding using matrix 3 |
| 11 | determine precoding method based on information from communication partner |

When [u8 u9]=[00] (i.e., u8=0, u9=0), in weighting synthesizer 203 in the base station, precoding that uses matrix 1 is performed.

When [u8 u9]=[01] (i.e., u8=0, u9=1), in weighting synthesizer 203 in the base station, precoding that uses matrix 2 is performed.

When [u8 u9]=[10] (i.e., u8=1, u9=0), in weighting synthesizer 203 in the base station, precoding that uses matrix 3 is performed.

When [u8 u9]=[11] (i.e., u8=1, u9=1), the base station obtains, from the communication partner, for example, feedback information, and based on the feedback information, in weighting synthesizer 203 of the base station, calculates a precoding matrix to be used, and performs precoding using the calculated (precoding) matrix.

As described above, weighting synthesizer 203 in the base station switches between precoding matrices. The terminal, which is the communication partner of the base station, obtains u8, u9 included in the control information symbol, and based on u8, u9, can demodulate and decode the data symbols. With this, since a suitable precoding matrix can be set based on the communications situation such as the state of the radio wave propagation environment, the terminal can achieve an advantageous effect of achieving a high data reception quality.

Although identification methods such as those for phase changers 205A, 205B in the base station indicated in Table 1 have been described, settings such as those in Table 6 may be used instead of those in Table 1.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33. Here, operation performed by phase changers 205A, 205B may be switched depending on the communications environment or the settings. Control information relating to operations performed by phase changers 205A, 205B is transmitted by the base station as a part of the control information transmitted via control information symbols, namely, other symbols 403, 503 in the frame configurations illustrated in FIG. 4, FIG. 5, FIG. 13, and FIG. 14.

Here, control information relating to operations performed by phase changers 205A, 205B is expressed as u10. The relationship between [u10] and phase changers 205A, 205B is illustrated in Table 6.

TABLE 6

| u10 | change phase change value on a per-symbol basis (cyclically/regularly) |
|---|---|
| 0 | OFF |
| 1 | ON |

(Note that u10 is transmitted by the base station as some of the control information symbols, namely, other symbols 403, 503. The terminal obtains [u10] included in control information symbols, namely, other symbols 403, 503, becomes aware of operations performed by phase changers 205A, 205B from [u10], and demodulates and decodes data symbols.)

Interpretation of Table 6 is as follows.

When the settings in the base station are configured such that phase changers 205A, 205B do not implement a phase change, u10 is set to 0 (u10=0). Accordingly, phase changer 205A outputs signal (206A) without implementing a phase change on input signal (204A). Similarly, phase changer 205B outputs a signal (206B) without implementing a phase change on the input signal (204B).

When the settings in the base station are configured such that phase changers 205A, 205B implement a phase change cyclically/regularly on a per-symbol basis, u10 is set to 1 (u10=1). Note that since the method used by phase changers 205A, 205B to implement a phase change cyclically/regularly on a per-symbol basis is described in detail in Embodiments 1 through 6, detailed description thereof is omitted. When signal processor 106 illustrated in FIG. 1 is configured as illustrated in any one of FIG. 20, FIG. 21, and FIG. 22, u10 is also set to 1 (u10=1) when the settings in the base station are configured such that phase changer 205A implements a phase change cyclically/regularly on a per-symbol basis and phase changer 205B does not implement a phase change cyclically/regularly on a per-symbol basis, and when the settings in the base station are configured such that phase changer 205A does not implement a phase change cyclically/regularly on a per-symbol basis and phase changer 205B implements a phase change cyclically/regularly on a per-symbol basis.

With this, the terminal can achieve an advantageous effect of achieving a high data reception quality by turning the operation of the phase change performed by phase changers 205A, 205B on and off based on the communications situation such as the state of the radio wave propagation environment.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33. Here, operations performed by phase changers 209A, 209B may be switched depending on the communications environment or the settings. Control information relating to operations performed by phase changers 209A, 209B is transmitted by the base station as a part of the control information transmitted via control information symbols, namely, other symbols 403, 503 in the frame configurations illustrated in FIG. 4, FIG. 5, FIG. 13, and FIG. 14.

Here, control information relating to operations performed by phase changers 209A, 209B is expressed as u11. The relationship between [u11] and phase changers 209A, 209B is illustrated in Table 7.

TABLE 7

| u11 | phase change (or cyclic delay diversity) |
|---|---|
| 0 | OFF |
| 1 | ON |

(Note that u11 is transmitted by the base station as some of the control information symbols, namely, other symbols 403, 503. The terminal obtains [u11] included in control information symbols, namely, other symbols 403, 503, becomes aware of operations performed by phase changers 209A, 209B from [u11], and demodulates and decodes data symbols.) Interpretation of Table 7 is as follows.

When the settings in the base station are configured such that phase changers 209A, 209B do not implement a phase change, u11 is set to 0 (u11=0). Accordingly, phase changer 209A outputs a signal (210A) without implementing a phase change on the input signal (208A). Similarly, phase changer 209B outputs a signal (210B) without implementing a phase change on the input signal (208B).

When the settings in the base station are configured such that phase changers 209A, 209B implement a phase change cyclically/regularly on a per-symbol basis (or apply cyclic delay diversity), u11 is set to 1 (u11=1). Note that since the method used by phase changers 209A, 209B to implement a phase change cyclically/regularly on a per-symbol basis is described in detail in Embodiments 1 through 6, detailed description thereof is omitted. When signal processor 106 illustrated in FIG. 1 is configured as illustrated in any one of FIG. 19 and FIG. 22, u11 is also set to 1 (u11=1) when the settings in the base station are configured such that phase changer 209A implements a phase change cyclically/regularly on a per-symbol basis and phase changer 209B does not implement a phase change cyclically/regularly on a per-symbol basis, and when the settings in the base station are configured such that phase changer 209A does not implement a phase change cyclically/regularly on a per-symbol basis and phase changer 209B implements a phase change cyclically/regularly on a per-symbol basis.

With this, the terminal can achieve an advantageous effect of achieving a high data reception quality by turning the operation of the phase change performed by phase changers 209A, 209B on and off based on the communications situation such as the state of the radio wave propagation environment.

Next, an example of switching the operations performed by phase changers 205A, 205B shown in Table 1 will be given.

For example, the base station and the terminal may communicate as illustrated in FIG. 27. Note that communication based on FIG. 27 has been described above, and as such, description will be partially omitted.

First, the terminal requests communication with the base station.

The base station then selects "implement phase change using a specific phase change value (set)" in Table 1, whereby phase changer 205A and/or phase changer 205B perform signal processing equivalent to "implement phase change using a specific phase change value (set)", and transmit data symbol #1 (2702_1).

The terminal receives control information symbol 2701_1 and data symbol #1 (2702_1) transmitted by the base station, and demodulates and decodes data symbol #1 (2702_1) based at least on the transmission method included in control information symbol 2701_1. As a result, the terminal determines that the data included in data symbol #1 (2702_1) is obtained without error. The terminal then transmits, to the base station, terminal transmission symbol 2750_1 including at least information indicating that the data included in data symbol #1 (2702_1) was obtained without error.

The base station receives terminal transmission symbol 2750_1 transmitted by the terminal, and based at least on the information that is included in terminal transmission symbol 2750_1 and indicates that the data included in data symbol #1 (2702_1) was obtained without error, determines the phase change (set) to be implemented by phase changer 205A and/or phase changer 205B to be "implement a phase change using the specific phase change value (set)", just as in the case where data symbol #1 (2702_1) is transmitted (since the base station obtained the data included in data symbol #1 (2702_1) without error, the terminal can determine that it is highly probable that data can be obtained without error when the next data symbol is transmitted and "implement a phase change using the specific phase change value (set)" is used (this makes it possible to achieve an advantageous effect that it is highly probable that the terminal can achieve a high data reception quality)). Then, the base station implements a phase change via phase changer 205A and/or phase changer 205B based on the determined "implement a phase change at a specific phase change value (set)".

The base station then transmits control information symbol 2701_2 and data symbol #2 (2702_2). Here, at least data symbol #2 (2702_2) is implemented with a phase change in accordance with "implement a phase change using the specific phase change value (set)".

The terminal receives control information symbol 2701_2 and data symbol #2 (2702_2) transmitted by the base station, and demodulates and decodes data symbol #2 (2702_2) based at least on information on transmission method included in control information symbol 2701_2. As a result, the terminal determines that the data included in data symbol #2 (2702_2) is not successfully obtained. The terminal then transmits, to the base station, terminal transmission symbol 2750_2 including at least information indicating that the data included in data symbol #2 (2702_2) was not successfully obtained.

The base station receives terminal transmission symbol 2750_2 transmitted by the terminal, and based at least on the information that is included in terminal transmission symbol 2750_2 and indicates that the data included in data symbol #2 (2702_2) was not successfully obtained, determines the phase change to be implemented by phase changer 205A and/or phase changer 205B to be changed to "(cyclically/regularly) change the phase change value on a per symbol basis" (since the base station did not obtain the data included in data symbol #2 (2702_2) successfully, the terminal can determine that it is highly probable that data can be obtained without error when the phase change method is changed to "(cyclically/regularly) change the phase change value on a per symbol basis" when the next data symbol is transmitted (this makes it possible to achieve an advantageous effect that it is highly probable that the terminal can achieve a high data reception quality)). Accordingly, the base station implements a phase change via phase changer 205A and/or phase changer 205B based on "(cyclically/regularly) change the phase change value on a per symbol basis". Here, the base station transmits control information symbol 2701_3 and data symbol #2 (2702_2-1), but at least with respect to data symbol #2 (2702_2-1), a phase change is performed based on "(cyclically/regularly) change the phase change value on a per symbol basis".

The terminal receives control information symbol 2701_3 and data symbol #2 (2702_2) transmitted by the base station, and demodulates and decodes data symbol #2 (2702_2-1) based at least on information on the first specific phase change value (set) included in control information symbol 2701_3. As a result, the terminal determines that the data included in data symbol #2 (2702_2-1) is not successfully obtained. The terminal then transmits, to the base station, terminal transmission symbol 2750_3 including at least information indicating that the data included in data symbol #2 (2702_2-1) was not successfully obtained.

The base station receives terminal transmission symbol 2750_3 transmitted by the terminal, and based at least on the information that is included in terminal transmission symbol 2750_3 and indicates that the data included in data symbol #2 2702_2-1 was not successfully obtained, determines to set the phase change to be implemented by phase changer A and phase changer B to once again be "(cyclically/regularly) change the phase change value on a per symbol basis". Accordingly, the base station implements a phase change via phase changer 205A and/or phase changer 205B based on "(cyclically/regularly) change the phase change value on a per symbol basis". Here, the base station transmits control information symbol 2701_4 and data symbol #2 (2702_2-2), but at least with respect to data symbol #2 (2702_2-2), a phase change is performed based on "(cyclically/regularly) change the phase change value on a per symbol basis".

The terminal receives control information symbol 2701_4 and data symbol #2 (2702_2-2) transmitted by the base station, and demodulates and decodes data symbol #2 (2702_2-2) based at least on information on the transmission method included in control information symbol 2701_4. As a result, the terminal determines that the data included in data symbol #2 (2702_2-2) is obtained without error. The terminal then transmits, to the base station, terminal transmission symbol 2750_4 including at least information indicating that the data included in data symbol #2 (2702_2-2) was obtained without error.

The base station receives terminal transmission symbol 2750_4 transmitted by the terminal, and based at least on the information that is included in terminal transmission symbol 2750_4 and indicates that the data included in data symbol #2 (2702-2) was obtained without error, determines the phase change (set) to be implemented by phase changer 205A and/or phase changer 205B to be "implement a phase change at a specific phase change value (set)". Then, the base station implements a phase change via phase changer 205A and/or phase changer 205B based on the "implement a phase change at a specific phase change value (set)".

The base station then transmits control information symbol 2701_5 and data symbol #3 (2702_3). Here, at least data symbol #3 (2702_3) is implemented with a phase change based on the "implement a phase change at a specific phase change value (set)".

The terminal receives control information symbol 2701_5 and data symbol #3 (2702_3) transmitted by the base station, and demodulates and decodes data symbol #3 (2702_3) based at least on information on the transmission method included in control information symbol 2701_5. As a result, the terminal determines that the data included in data symbol #3 (2702_3) is obtained without error. The terminal then transmits, to the base station, terminal transmission symbol 2750_5 including at least information indicating that the data included in data symbol #3 (2702_3) was obtained without error.

The base station receives terminal transmission symbol 2750_5 transmitted by the terminal, and based at least on the information that is included in terminal transmission symbol 2750_5 and indicates that the data included in data symbol #3 (2702_3) was obtained without error, determines the method to be implemented by phase changer 205A and/or phase changer 205B to be the method "implement a phase change at a specific phase change value (set)". The base station then transmits data symbol #4 (2702_4) based on "implement a phase change at a specific phase change value (set)".

The terminal receives control information symbol 2701_6 and data symbol #4 (2702_4) transmitted by the base station, and demodulates and decodes data symbol #4 (2702_4) based at least on information on the transmission method included in control information symbol 2701_6. As a result, the terminal determines that the data included in data symbol #4 (2702_4) is not successfully obtained. The terminal then transmits, to the base station, terminal transmission symbol 2750_6 including at least information indicating that the data included in data symbol #4 (2702_4) was not successfully obtained.

The base station receives terminal transmission symbol 2750_6 transmitted by the terminal, and based at least on the information that is included in terminal transmission symbol 2750_6 and indicates that the data included in data symbol #4 (2702_4) was not successfully obtained, determines the phase change (set) to be implemented by phase changer 205A and/or phase changer 205B to be changed to "(cyclically/regularly) change the phase change value on a per symbol basis". Accordingly, the base station implements a phase change via phase changer 205A and/or phase changer 205B based on "(cyclically/regularly) change the phase change value on a per symbol basis". Here, the base station transmits control information symbol 2701_7 and data symbol #4 (2702_4-1), but at least with respect to data symbol #4 (2702_4-1), a phase change is performed based on "(cyclically/regularly) change the phase change value on a per symbol basis".

The terminal receives control information symbol 2701_7 and data symbol #4 (2702_4-1) transmitted by the base station, and demodulates and decodes data symbol #4 (2702_4-1) based on information on the transmission method included in control information symbol 2701_7.

Note that regarding data symbol #1 (2702_1), data symbol #2 (2702_2), data symbol #3 (2702_3), and data symbol #4 (2702_4), the base station transmits a plurality of modulated signals from a plurality of antennas, just as described in Embodiments 1 through 6.

The frame configurations of the base station and terminal illustrated in FIG. 27 are mere non-limiting examples; other symbols may be included. Moreover, control information symbol 2701_1, 2701_2, 2701_3, 2701_4, 2701_5, 2701_6, data symbol #1 (2702_1), data symbol #2 (2702_2), data symbol #3 (2702_3), and data symbol #4 (2702_4) may each include other symbols, such as a pilot symbol. Moreover, control information symbol 2701_1, 2701_2, 2701_3, 2701_4, 2701_5, and 2701_6 include information relating to the specific phase change value (set) used upon transmitting data symbol #1 (2702_1), data symbol #2 (2702_2), data symbol #3 (2702_3), and data symbol #4 (2702_4), and the terminal becomes capable of demodulating and decoding data symbol #1 (2702_1), data symbol #2 (2702_2), data symbol #3 (2702_3), and data symbol #4 (2702_4) as a result of obtaining this information.

Note that the switching of the transmission method based on Table 1 described in this embodiment of the base station with reference to FIG. 27 is not limited to the above description. The above description is merely one example. The switching of the transmission method based on Table 1 may be performed more flexibly.

As described above, by switching the transmission method, switching the phase change method, and switching implementation of the phase change on or off in a more flexible manner in accordance with, for example, the communications network, the reception device of the communication partner can achieve an advantageous effect of an improvement in data reception quality.

Note that a method for switching the precoding matrix based on, for example, information from the communication partner, may be allotted to "reserve" in Table 1 according to this embodiment, which is associated with u0=1 and u1=1. In other words, when the base station selects the MIMO transmission method, the base station may be allowed to also select a method for selecting a precoding matrix based on information from the communication partner.

In this embodiment, the configuration of signal processor 106 illustrated in FIG. 1 was exemplified using FIG. 28, FIG. 29, FIG. 30, FIG. 31, FIG. 32, and FIG. 33, but for Embodiments 1 through 6 as well, signal processor 106 illustrated in FIG. 1 can be configured as illustrated in FIG. 28, FIG. 29, FIG. 30, FIG. 31, FIG. 32, and FIG. 33.

(Supplemental Information 3)

The method used to map each symbol in the mapper described in the present specification may be switched regularly/cyclically, for example.

For example, a modulation scheme that has 16 signal points in an in-phase I-quadrature Q plane for transmitting 4 bits is implemented. Here, the arrangement of the 16 signal points for transmitting the four bits in the in-phase I-quadrature Q plane may be changed on a per-symbol basis.

Moreover, in Embodiments 1 through 6, a case in which a multi-carrier scheme such as OFDM is implemented is described, but a single-carrier scheme may be implemented in the same manner.

Moreover, the embodiments according to the present specification may be implemented in the same manner even when a spread spectrum communication method is implemented.

(Supplemental Information 4)

In each embodiment disclosed in the present specification, an example of the configuration of the transmission device is given in FIG. 1, and examples of the configuration of signal processor 106 illustrated in FIG. 1 are given in FIG. 2, FIG. 18, FIG. 19, FIG. 20, FIG. 21, FIG. 22. FIG. 28, FIG. 29. FIG. 30, FIG. 31, FIG. 32, and FIG. 33. However, the configuration of transmission device is not limited to the configuration illustrated in FIG. 1, and the configuration of signal processor 106 is not limited to the examples illustrated in FIG. 2, FIG. 18, FIG. 19, FIG. 20, FIG. 21, FIG. 22, FIG. 28, FIG. 29, FIG. 30, FIG. 31, FIG. 32, and FIG. 33. In other words, the transmission device and signal processor 106 included in the transmission device may be configured in any manner so long as the transmission device can generate a signal equivalent to either of the processed signal 106_A or 106_B described in the above embodiments according to the present specification and transmit the signal using a plurality of antenna units.

Hereinafter, a different configuration example of the transmission device and signal processor 106 included in the transmission device that meet this requirement will be given.

One example of a different configuration is one in which mapper 104 illustrated in FIG. 1 generates, as mapped signal 105_1, 105_2, a signal equivalent to weighting synthesized signal 204A, 204B illustrated in any one of FIG. 2, FIG. 18, FIG. 19, FIG. 20, FIG. 21, and FIG. 22, based on encoded data 103 and control signal 100. Signal processor 106 includes a configuration in which weighting synthesizer 203 is removed from a configuration illustrated in any one of FIG. 2, FIG. 18, FIG. 19, FIG. 20, FIG. 21, and FIG. 22. Mapped signal 105_1 is input into phase changer 205A or inserter 207A, and mapped signal 105_2 is input into phase changer 205B or inserter 207B.

Another example of a different configuration is one in which, when the weighting synthesis (precoding) processing is expressed as (precoding) matrix F illustrated in Equation (33) or Equation (34), weighting synthesizer 203 illustrated in FIG. 2 does not perform signal processing for weighting synthesis on mapped signal 201A, 201B, outputs mapped signal 201A as weighting synthesized signal 204A, and outputs mapped signal 201B as weighting synthesized signal 204B. In such a case, weighting synthesizer 203 performs, based on control signal 200, control of switching between (i) performing signal processing corresponding to weighting synthesis to generate weighting synthesized signal 204A, 204B, and (ii) outputting mapped signal 201A as weighting synthesized signal 204A and outputting mapped signal 201B as weighting synthesized signal 204B without performing signal processing for weighting synthesis. Moreover, when the only weighting synthesis (precoding) processing that is performed is the processing expressed as (precoding) matrix F in Equation (33) or Equation (34), weighting synthesizer 203 may be omitted.

In the present specification, even if the specifics of the transmission device configuration are different, by generating a signal equivalent to any one of signal-processed signal 106_A. 106_B described above in any of the embodiments of the present specification and transmitting the signal using a plurality of antenna units, when the reception device is in an environment in which direct waves are dominant, in particular when in an LOS environment, it is possible to achieve an advantageous effect in which the reception quality of the reception device that is performing MIMO data symbol transferring (transfer via a plurality of streams) can be improved (other advantageous effects described in the present specification are also achievable).

Note that in signal processor 106 illustrated in FIG. 1, a phase change may be provided both before and after weighting synthesizer 203. More specifically, signal processor 106 includes, before weighting synthesizer 203, one or both of phase changer 205A_1 that generates phase-changed signal 2801A by applying a phase change to mapped signal 201A, and phase changer 205B_1 that generates phase-changed signal 2801B by applying a phase change to mapped signal 201B. Signal processor 106 further includes, before inserter 207A, 207B, one or both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B.

Here, when signal processor 106 includes phase changer 205A_1, one input of weighting synthesizer 203 is phase-changed signal 2801A, and when signal processor 106 does not include phase changer 205A_1, one input of weighting synthesizer 203 is mapped signal 201A. When signal processor 106 includes phase changer 205B_1, the other input of weighting synthesizer 203 is phase-changed signal 2801B, and when signal processor 106 does not include phase changer 205B_1, the other input of weighting synthesizer 203 is mapped signal 201B. When signal processor 106 includes phase changer 205A_2, the input of inserter 207A is phase-changed signal 206A, and when signal processor 106 does not include phase changer 205A_2, the input of inserter 207A is weighting synthesized signal 204A. When signal processor 106 includes phase changer 205B_2, the input of inserter 207B is phase-changed signal 206B, and when signal processor 106 does not include phase changer 205B_2, the input of inserter 207B is weighting synthesized signal 204B.

Moreover, the transmission device illustrated in FIG. 1 may include a second signal processor that implements different signal processing on processed signal 106_A, 106_B, i.e., the output of signal processor 106. Here, radio unit 107_A receives an input of signal A processed with second signal processing and performs predetermined processing on the input signal, and radio unit 107_B receives an input of signal B processed with second signal processing and performs predetermined processing on the input signal, where signal A and signal B processed with second signal processing are two signals output from a second signal processor.

Embodiment A1

Hereinafter, a case in which the base station (AP) and the terminal communicate with each other will be described.

Here, the base station (AP) can transmit a plurality of modulated signals including a plurality of streams of data using a plurality of antennas.

For example, the base station (AP) includes the transmission device illustrated in FIG. 1 in order to transmit a plurality of modulated signals including a plurality of streams of data using a plurality of antennas.

Moreover, the base station (AP) includes, as the configuration of signal processor 106 illustrated in FIG. 1, a configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33.

The following will describe a case in which the transmission device described above implements phase change on at least one modulated signal after precoding. In this embodiment, the base station (AP) is capable switching between implementing and not implementing a phase change, based on a control signal. Accordingly, the following holds true.

<When Phase Change is Implemented>

The base station (AP) implements a phase change on at least one modulated signal. A plurality of modulated signals are transmitted from a plurality of antennas (note that the transmission method of implementing a phase change on at least one modulated signal and transmitting a plurality of modulated signals using a plurality of antennas is as described in the plurality of embodiments according to the present specification).

<When Phase Change is Not Implemented>

The base station (AP) performs precoding (weighting synthesis) described in the present specification on a plurality of streams of modulated signals (baseband signals), and transmits the generated plurality of modulated signals using a plurality of antennas (here, a phase change is not implemented). However, as described above in the present specification, the precoder (weighting synthesizer) is not required to perform precoding, and a configuration in which precoding is never performed and a precoder (weighting synthesizer) is not included is also acceptable.

Note that the base station (AP) transmits control information for notifying the terminal, which is the communication partner, whether or not phase change is to be implemented, using a preamble, for example.

Figure 34:
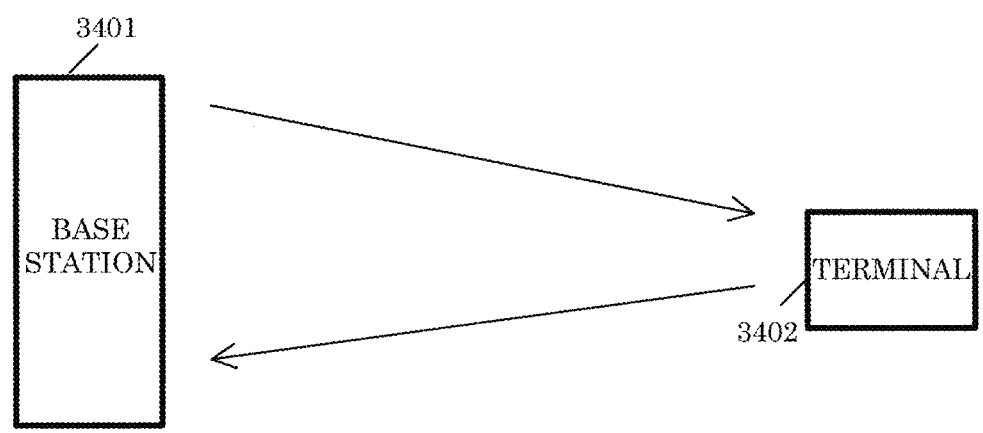
FIG. 34 illustrates one example of the system configuration in a state in which transmission is being performed between a base station and a terminal.

FIG. 34 illustrates one example of a system configuration in a state in which base station (AP) 3401 and terminal 3402 are communicating.

As illustrated in FIG. 34, base station (AP) 3401 transmits a modulated signal and terminal 3402, which is the communication partner, receives the modulated signal. Terminal 3402 then transmits a modulated signal, and base station 3401, which is the communication partner, receives the modulated signal.

Figure 35:
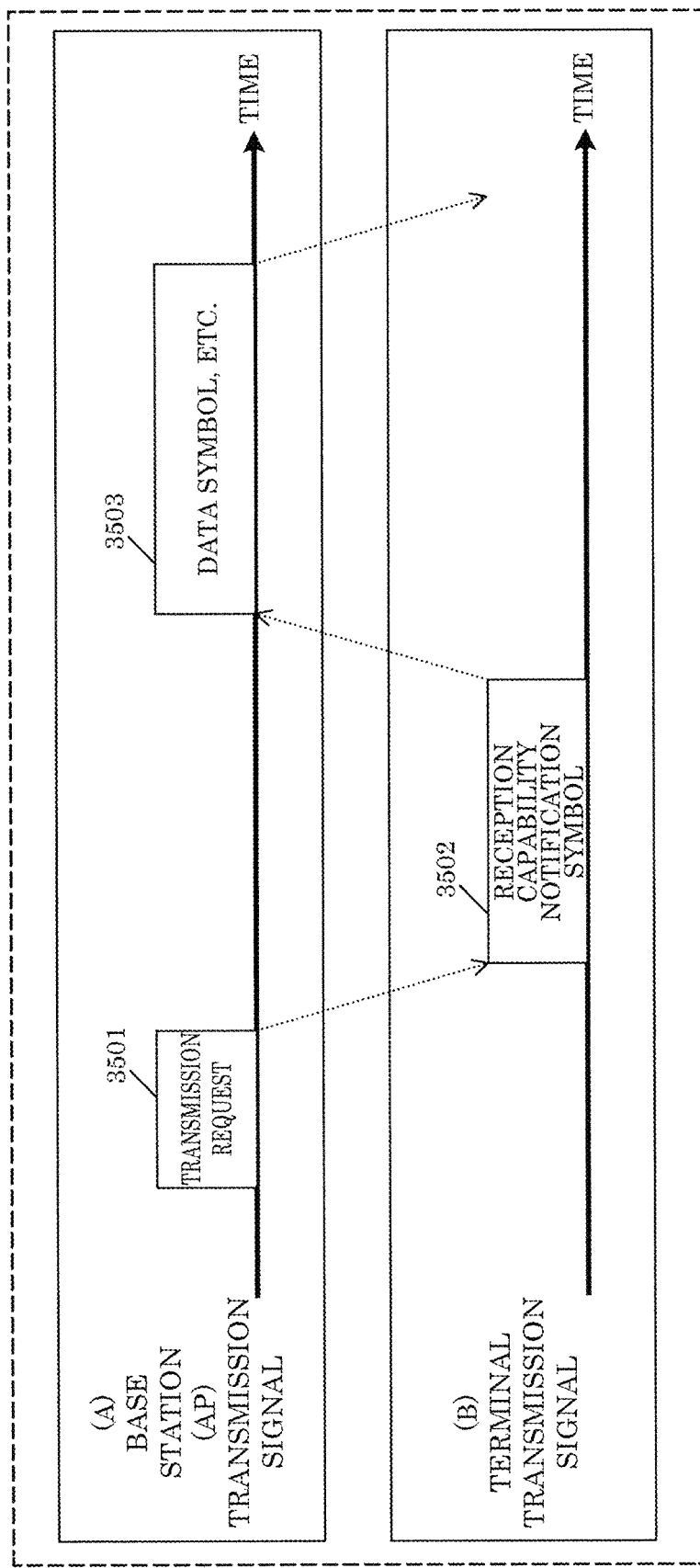
FIG. 35 illustrates one example of communication between a base station and a terminal.

FIG. 35 illustrates one example of communication between base station (AP) 3401 and terminal 3402.

In FIG. 35, (A) illustrates the temporal state of a signal transmitted by base station (AP) 3401. Time is represented on the horizontal axis. In FIG. 35, (B) illustrates the temporal state of a signal transmitted by terminal 3402. Time is represented on the horizontal axis.

First, base station (AP) 3401 transmits transmission request 3501 including requested information indicating a request to transmit a modulated signal, for example.

Terminal 3402 receives transmission request 3501 transmitted by base station (AP) 3401, which is requested information indicating a request to transmit a modulated signal, and, for example, transmits reception capability notification symbol 3502 including information indicating the reception ability of terminal 3402 (or a receivable scheme).

Base station (AP) 3401 receives reception capability notification symbol 3502 transmitted by terminal 3402, and based on the information included in reception capability notification symbol 3502, determines an error correction encoding method, modulation scheme (or modulation scheme set), and a transmission method, and transmits modulated signal 3503 that includes, for example, data symbols, and is generated by mapping and implementing other signal processing (such as precoding, phase change) on information (data) to be transmitted within the error correction encoding and modulation scheme, based on the determined schemes and methods.

Note that, for example, data symbols 3503 may include a control information symbol. In such a case, when transmitting the data symbols using a transmission method of transmitting a plurality of modulated signals including a plurality of streams of data using a plurality of antennas, a control symbol may be transmitted that includes information for notifying the communication partner of whether a phase change was implemented on at least one modulated signal or not (this allows the communication partner to easily change demodulation methods).

Terminal 3402 obtains data upon receiving, for example, data symbols 3503 transmitted by base station 3401.

Figure 36:
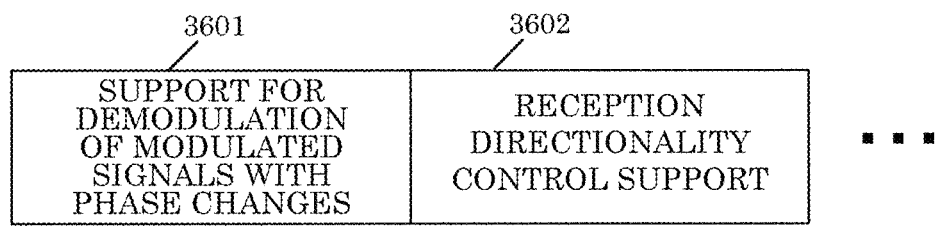
FIG. 36 illustrates an example of data included in a reception capability notification symbol transmitted by the terminal illustrated in FIG. 35.

FIG. 36 illustrates an example of data included in reception capability notification symbol 3502 transmitted by the terminal illustrated in FIG. 35.

FIG. 36 illustrates data 3601 indicating information relating to support for demodulation of modulated signals with phase changes, and data 3602 indicating information relating to reception directionality control support.

Note that in data 3601 indicating information relating to support for demodulation of modulated signals with phase changes, "supported" indicates, for example, the following state.

"Demodulation of modulated signals with phase changes is supported" means, when base station (AP) 3401 applies a phase change to at least one modulated signal and a plurality of modulated signals are transmitted using a plurality of antennas (note that the transmission method of implementing a phase change on at least one modulated signal and transmitting a plurality of modulated signals using a plurality of antennas is as described in the plurality of embodiments according to the present specification), terminal 3402 can receive and demodulate the modulated signals (in other words, demodulation taking into consideration phase change can be performed to obtain data).

In data 3601 indicating information relating to support for demodulation of modulated signals with phase changes, "not supported" indicates, for example, the following state.

"Demodulation of modulated signals with phase changes is not supported" means, when base station (AP) 3401 applies a phase change to at least one modulated signal and a plurality of modulated signals are transmitted using a plurality of antennas (note that the transmission method of implementing a phase change on at least one modulated signal and transmitting a plurality of modulated signals using a plurality of antennas is as described in the plurality of embodiments according to the present specification), even if terminal 3402 receives the modulated signals, demodulation of the modulated signals is not possible (in other words, demodulation taking into consideration phase change cannot be performed).

For example, when terminal 3402 supports phase change, as described above, data 3601 indicating information relating to support for demodulation of modulated signals with phase changes is set to "0", and terminal 3402 transmits reception capability notification symbol 3502. Moreover, when terminal 3402 does not support phase change, as described above, data 3601 indicating information relating to support for demodulation of modulated signals with phase changes is set to "1", and terminal 3402 transmits reception capability notification symbol 3502.

Then, base station (AP) 3401 receives data 3601 transmitted by terminal 3402 indicating information relating to support for demodulation of modulated signals with phase changes. When the reception indicates "supported" with regard to phase change (in other words, "0" is received as data 3601 indicating information relating to support for demodulation of modulated signals with phase changes) and base station (AP) 3401 determines to transmit a plurality of streams of modulated signals using a plurality of antennas, base station (AP) 3401 may transmit the modulated signals using either <method #1> or <method #2> described below. Alternatively, base station (AP) 3401 transmits the modulated signals using <method #2>.

<Method #1>

Base station (AP) 3401 performs precoding (weighting synthesis) described in the present specification on a plurality of streams of modulated signals (baseband signals), and transmits the generated plurality of modulated signals using a plurality of antennas (here, a phase change is not implemented). However, as described in the present specification, the precoder (weighting synthesizer) need not perform a precoding process.

<Method #2>

Base station (AP) 3401 implements a phase change on at least one modulated signal. A plurality of modulated signals are transmitted from a plurality of antennas (note that the transmission method of implementing a phase change on at least one modulated signal and transmitting a plurality of modulated signals using a plurality of antennas is as described in the plurality of embodiments according to the present specification).

Here, what is important is that <method #2> is included as a transmission method selectable by base station (AP) 3401. Accordingly, base station (AP) 3401 may transmit modulated signals using a method other than <method #1> and <method #2>.

Then, base station (AP) 3401 receives data 3601 transmitted by terminal 3402 indicating information relating to support for demodulation of modulated signals with phase changes. When the reception indicates "not supported" with regard to phase change (in other words, "1" is received as data 3601 indicating information relating to support for demodulation of modulated signals with phase changes) and base station (AP) 3401 determines to transmit a plurality of streams of modulated signals using a plurality of antennas, base station (AP) 3401 may transmit the modulated signals using <method #1>.

Here, <method #2> is not included as a transmission method selectable by base station (AP) 3401. Accordingly, base station (AP) 3401 may transmit modulated signals using a transmission method that is different from <method #1> and is not <method #2>.

Note that reception capability notification symbol 3502 may include data indicating information other than data 3601 indicating information relating to support for demodulation of modulated signals with phase changes. For example, the reception device of terminal 3402 may include data 3602 indicating information relating to reception directionality control support. Accordingly, the configuration of reception capability notification symbol 3502 is not limited to the configuration illustrated in FIG. 36.

For example, when base station (AP) 3401 includes a function of transmitting a modulated signal using a method other than <method #1> and <method #2>, the reception device in terminal 3402 may include data indicating information relating to support of that method other than <method #1> and <method #2>.

For example, when terminal 3402 can perform reception directionality control, "0" is set as data 3602 indicating information relating to reception directionality control support. When terminal 3402 cannot perform reception directionality control, "1" is set as data 3602 indicating information relating to reception directionality control support.

Terminal 3402 transmits information on data 3602 relating to reception directionality control support. Base station (AP) 3401 receives this information, and when it is determined that terminal 3402 supports reception directionality control, base station (AP) 3401 and terminal 3402 transmits, for example, a training symbol, reference symbol, and/or control information symbol for reception directionality control for terminal 3402.

Figure 37:
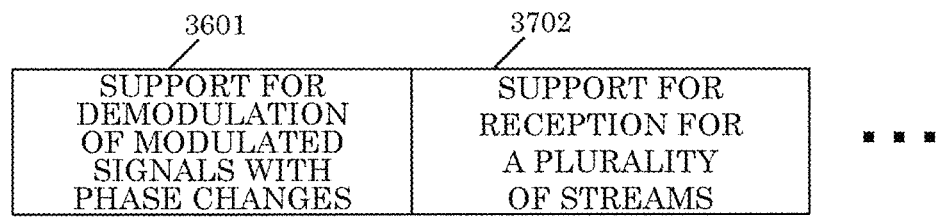
FIG. 37 illustrates an example of data included in a reception capability notification symbol transmitted by the terminal illustrated in FIG. 35.

FIG. 37 illustrates an example of data included in reception capability notification symbol 3502 transmitted by the terminal illustrated in FIG. 35, different from the example illustrated in FIG. 36. Note that components that perform the same operations as in FIG. 36 share like reference numerals. Accordingly, since data 3601 indicating information relating to support for demodulation of modulated signals with phase changes in FIG. 37 has already been described, repeated description will be omitted.

Next, data 3702 indicating information relating to support for reception for a plurality of streams in FIG. 37 will be described.

In data 3702 indicating information relating to support for reception for a plurality of streams, "supported" indicates, for example, the following state.

When base station (AP) 3401 that supports reception for a plurality of streams transmits a plurality of modulated signals from a plurality of antennas to transmit a plurality of streams, this means the terminal can receive and demodulate the plurality of modulated signals transmitted by the base station. However, for example, when base station (AP) 3401 transmits a plurality of modulated signals from a plurality of antennas, whether a phase change has been implemented or not is not distinguished. In other words, when base station (AP) 3401 defines a plurality of transmission methods for transmitting a plurality of modulated signals from a plurality of antennas to transmit a plurality of streams, the terminal may depend on at least one transmission method with which demodulation is possible.

In data 3702 indicating information relating to support for reception for a plurality of streams. "not supported" indicates, for example, the following state.

When base station (AP) 3401 does not support reception for a plurality of streams and a plurality of transmission methods are defined as transmission methods for transmitting, from a plurality of antennas, a plurality of modulated signals for transmitting a plurality of streams, terminal 3402 cannot demodulate the modulated signals even if transmitted by base station using any one of the transmission methods.

For example, when terminal 3402 supports reception for a plurality of streams, data 3702 relating to support for reception for a plurality of streams is set to "0". When the terminal (3402) does not support reception for a plurality of streams, data 3702 relating to support for reception for a plurality of streams is set to "1".

Accordingly, when terminal 3402 has data 3702 relating to support for reception for a plurality of streams set to "0", data 3601 relating to support for demodulation of modulated signals with phase changes is valid, and in such a case, base station (AP) 3401 determines the transmission method to use to transmit data based on data 3601 relating to support for demodulation of modulated signals with phase changes and data 3702 relating to support for reception for a plurality of streams.

When terminal 3402 has data 3702 relating to support for reception for a plurality of streams set to "1", data 3601 indicating information relating to support for demodulation of modulated signals with phase changes is null, and in such a case, base station (AP) 3401 determines the transmission method to use to transmit data based on data 3702 relating to support for reception for a plurality of streams.

With this, as a result of terminal 3402 transmitting reception capability notification symbol 3502 and base station (AP) 3401 determining a transmission method to use to transmit data based on this symbol, there is an advantageous point that data can be actually transmitted to the terminal (since it is possible to reduce instances in which data is transmitted using a transmission method via which demodulation cannot be performed by terminal 3402), and, accordingly, an advantages effect that data transfer efficiency of base station (AP) 3401 can be improved.

Moreover, when data 3601 indicating information relating to support for demodulation of modulated signals with phase changes is present as reception capability notification symbol 3502 and terminal 3402 that supports demodulation of modulated signals with phase changes and base station (AP) 3401 communicate, base station (AP) 3401 can accurate select the mode "transmit modulated signal using transmission method that implements a phase change", whereby an advantageous effect that terminal 3402 can obtain a high reception quality even in an environment in which direct waves are dominant can be achieved. Moreover, when a terminal that does not support the demodulation of modulated signals with phase changes and base station (AP) 3401 communicate, base station (AP) 3401 can accurately select a transmission method via which reception is possible by terminal 3402, which makes it possible to achieve an advantageous effect that it is possible to improve data transfer efficiency.

Note that in FIG. 35, (A) illustrates a signal transmitted by base station (AP) 3401 and (B) illustrates a signal transmitted by terminal 3402, but these examples are not limiting. For example, (A) in FIG. 35 may illustrate a signal transmitted by terminal 3402 and (B) may illustrate a signal transmitted by base station (AP) 3401.

Moreover, in FIG. 35, (A) may illustrate a signal transmitted by terminal #1 and (B) may illustrate a signal transmitted by terminal #2. In other words, FIG. 35 may illustrate communication between terminals.

Moreover, in FIG. 35, (A) may illustrate a signal transmitted by base station (AP) #1 and (B) may illustrate a signal transmitted by base station (AP) #2. In other words, FIG. 35 may illustrate communication between base stations (APs).

Note that these are non-limiting examples; communication between communication devices is acceptable.

Moreover, the data symbol in the transmission of, for example, data symbol 3503 in (A) in FIG. 35 may be a multi-carrier scheme signal such as an OFDM signal, and may be a single-carrier scheme signal. Similarly, reception capability notification symbol 3502 in FIG. 35 may be a multi-carrier scheme signal such as an OFDM signal, and may be a single-carrier scheme signal.

For example, when reception capability notification symbol 3502 in FIG. is a single-carrier scheme symbol, in the case of FIG. 35, terminal 3402 can achieve an advantageous effect that power consumption can be reduced.

Embodiment A2

Next, a different example will be given.

Figure 38:
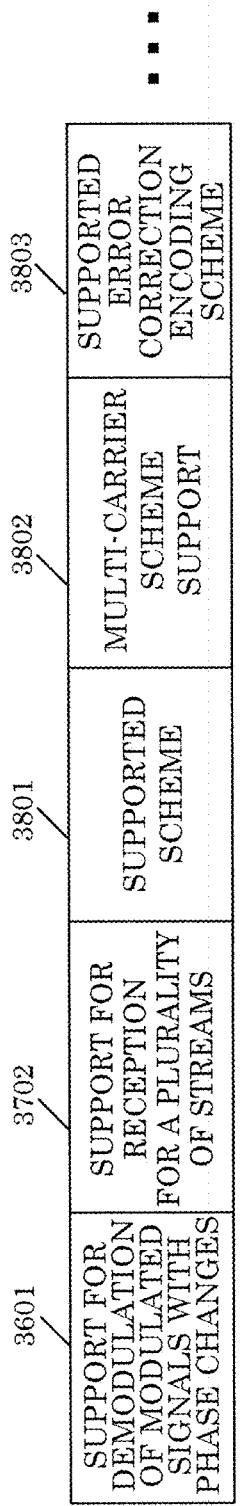
FIG. 38 illustrates an example of data included in a reception capability notification symbol transmitted by the terminal illustrated in FIG. 35.

FIG. 38 illustrates an example of data included in reception capability notification symbol (3502) transmitted by the terminal illustrated in FIG. 35, different from the examples illustrated in FIG. 36 and FIG. 37. Note that components that perform the same operations as in FIG. 36 and FIG. 37 share like reference numerals. Moreover, duplicate description of components that perform the same operations as in FIG. 36 and FIG. 37 will be omitted.

First, data 3801 relating to "supported scheme" in FIG. 38 will be described. Transmission of a modulated signal from the base station (AP) to the terminal and transmission of a modulated signal from the terminal to the base station (AP) in FIG. 34 are transmission of a modulated signal under a specific frequency (frequency band) communications scheme. Communications scheme #A and communications scheme #B are examples of such a specific frequency (frequency band) communications scheme.

For example, data 3801 relating to "supported scheme" is 2-bit data. When the terminal supports only "communications scheme #A", data 3801 relating to "supported scheme" is set to "01" (when data 3801 relating to "supported scheme" is set to "01", even if the base station (AP) transmits a "communications scheme #B" modulated signal, the terminal cannot demodulate and obtain the data). When the terminal supports only "communications scheme #B", data 3801 relating to "supported scheme" is set to "10" (when data 3801 relating to "supported scheme" is set to "10", even if the base station (AP) transmits a "communications scheme #A" modulated signal, the terminal cannot demodulate and obtain the data). When the terminal supports both communications scheme #A and communications scheme #B, data 3801 relating to "supported scheme" is set to "11".

Note that communications scheme #A does not include support for a scheme that transmits a plurality of modulated signals including a plurality of streams using a plurality of antennas (there is no selection of "a scheme that transmits a plurality of modulated signals including a plurality of streams using a plurality of antennas" for communications scheme #A). Communications scheme #B does include support for a scheme that transmits a plurality of modulated signals including a plurality of streams using a plurality of antennas (selection of "a transmission method that transmits a plurality of modulated signals including a plurality of streams using a plurality of antennas" for communications scheme #B is possible).

Next, data 3802 relating to multi-carrier scheme support in FIG. 38 will be described. "Single-carrier scheme" and "multi-carrier scheme such as OFDM" are selectable for communications scheme #A as a transmission method for a modulated signal. Moreover, "single-carrier scheme" and "multi-carrier scheme such as OFDM" are selectable for communications scheme #B as a transmission method for a modulated signal.

For example, data 3802 relating to "multi-carrier scheme compatibility" is 2-bit data. When the terminal supports only "single-carrier scheme", data 3802 relating to multi-carrier scheme support is set to "01" (when data 3802 relating to multi-carrier scheme support is set to "01", even if the base station (AP) transmits a "multi-carrier scheme such as OFDM" modulated signal, the terminal cannot demodulate and obtain the data). When the terminal supports only "multi-carrier scheme such as OFDM", data 3802 relating to multi-carrier scheme support is set to "10" (when data 3802 relating to multi-carrier scheme support is set to "10", even if the base station (AP) transmits a "single-carrier scheme" modulated signal, the terminal cannot demodulate and obtain the data). When the terminal supports both a single-carrier scheme and a multi-carrier scheme such as OFDM, data 3802 relating to multi-carrier scheme support is set to "11".

Next, data 3803 relating to "supported error correction encoding scheme" in FIG. 38 will be described. For example, "error correction encoding scheme #C" is an error correction encoding method that supports one or more encode rates for a code length (block length) of c-bits (c is an integer that is greater than or equal to 1), and "error correction encoding scheme #D" is an error correction encoding method that supports one or more encode rates for a code length (block length) of d-bits (d is an integer that is greater than or equal to 1; d is greater than c (d>c)). Note that the method that supports one or more encode rates may be a method that uses a different error correction code for each encode rate, and may be a method that supports one or more encode rates via puncturing. Moreover, a combination of these methods may be used for support with one or more encode rates.

Note that the only selectable choice for communications scheme #A is error correction encoding scheme #C, whereas error correction encoding scheme #C and error correction encoding scheme #D are selectable choices for communications scheme #B.

For example, data 3803 relating to "supported error correction encoding scheme" is 2-bit data. When the terminal supports only "error correction encoding scheme #C", data 3803 relating to "supported error correction encoding scheme" is set to "01" (when data 3803 relating to "supported error correction encoding scheme" is set to "01", even if the base station (AP) uses error correction encoding scheme #D to generate and transmit a modulated signal, the terminal cannot demodulate and decode the modulated signal to obtain the data). When the terminal supports only "error correction encoding scheme #D", data 3803 relating to "supported error correction encoding scheme" is set to "10" (when data 3803 relating to "supported error correction encoding scheme" is set to "10", even if the base station (AP) uses error correction encoding scheme #C to generate and transmit a modulated signal, the terminal cannot demodulate and decode the modulated signal to obtain the data). When the terminal supports both error correction encoding scheme #C and error correction encoding scheme #D, data 3803 relating to "supported error correction encoding scheme" is set to "11".

The base station (AP) receives, for example, reception capability notification symbol 3502 configured as illustrated in FIG. 38 and transmitted by the terminal, and base station (AP) determines a method for generating a modulated signal including a data symbol for the terminal based on information in reception capability notification symbol 3502, and transmits a modulated signal to the terminal.

Next, the characteristic points in such a case will be described.

Example 11

When the terminal performs transmission when data 3801 relating to "supported scheme" is set to "01" (communications scheme #A), the base station (AP) that receives this data determines that data 3803 relating to "supported error correction encoding scheme" is null, and when the base station (AP) generates the modulated signal for the terminal, error correction encoding is performed using error correction encoding scheme #C (since "error correction encoding scheme #D" cannot be selected in communications scheme #A).

Example 2

When the terminal performs transmission when data 3801 relating to "supported scheme" is set to "01" (communications scheme #A), the base station (AP) that receives this data determines that data 3601 relating to support for demodulation of modulated signals with phase changes and data 3702 relating to support for reception for a plurality of streams are null, and when the base station (AP) generates the modulated signal for the terminal, a single stream of a modulated signal is generated and transmitted (since "a scheme that transmits a plurality of modulated signals including a plurality of streams using a plurality of antennas" is not supported in communications scheme #A).

In addition to the above examples, for example, consider a case in which the following constraints are in place.

[Constraint Condition 1]

In "communications scheme #B", with a single-carrier scheme, in "a scheme that transmits a plurality of modulated signals including a plurality of streams using a plurality of antennas", a scheme in which "among a plurality of modulated signals, a phase change is implemented on at least one modulated signal" is not supported (but another scheme may be supported). Additionally, in a multi-carrier scheme such as an OFDM scheme, at least a scheme in which "among a plurality of modulated signals, a phase change is implemented on at least one modulated signal" is supported (but another scheme may be supported).

The following applies in such a case.

Example 31

When the terminal performs transmission under when "data 3802 relating to multi-carrier scheme support is set to "01" (single-carrier scheme)", the base station (AP) that receives this data determines that data 3601 relating to support for demodulation of modulated signals with phase changes is null, and when the base station (AP) generates the modulated signal for the terminal, the base station (AP) does not use the scheme in which "among a plurality of modulated signals, a phase change is implemented on at least one modulated signal".

Note that FIG. 38 is one example of a "reception capability notification symbol" (3502) that is transmitted by the terminal. As described with reference to FIG. 38, when the terminal transmits information on a plurality of reception abilities (for example, 3601, 3702, 3801, 3802, and 3803 in FIG. 38), when the base station (AP) determines a method for generating the modulated signal for the terminal based on a "reception capability notification symbol" (3502), there are cases in which the base station (AP) is required to determine whether a portion of the information on the plurality of reception abilities is null or not. Taking this into consideration, when the terminal bundles and transfers the information on the plurality of reception abilities as a "reception capability notification symbol" (3502), the base station (AP) can achieve an advantageous effect in which the generation of the modulated signal for the terminal can be determined easily, with low delay.

Embodiment A3

In this embodiment, an operational example in which a single-carrier scheme is implemented in an embodiment described in the present specification will be given.

Figure 39:
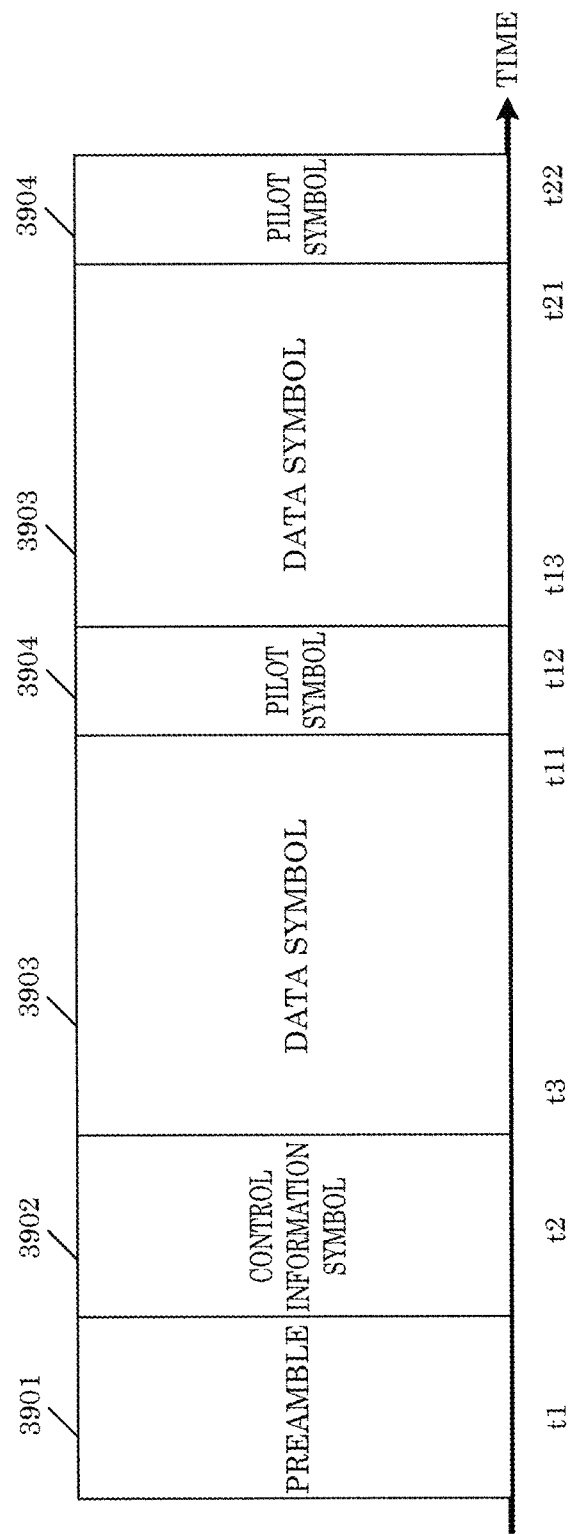
FIG. 39 illustrates one example of a frame configuration of a transmission signal illustrated in FIG. 1.

FIG. 39 illustrates an example of a frame configuration of transmission signal 106_A illustrated in FIG. 1. In FIG. 39, time is represented on the horizontal axis. The frame configuration illustrated in FIG. 39 is an example of a frame configuration when a single-carrier scheme is used. Symbols are present along the time axis. In FIG. 39, symbols from time t1 to t22 are shown.

Preamble 3901 in FIG. 39 corresponds to preamble signal 252 in, for example, FIG. 2, FIG. 18, FIG. 19, FIG. 20, FIG. 21, FIG. 28, FIG. 29, FIG. 30, FIG. 31, FIG. 32, and FIG. 33. Here, a preamble may transmit data (for control purposes), and may be configured as, for example, a symbol for signal detection, a signal for performing frequency and time synchronization, a symbol for performing channel estimation, or a symbol for frame synchronization (a symbol for performing propagation path fluctuation estimation).

Control information symbol 3902 in FIG. 39 is a symbol that corresponds to control information symbol signal 253 in, for example, FIG. 2, FIG. 18, FIG. 19, FIG. 20, FIG. 21, FIG. 28, FIG. 29, FIG. 30, FIG. 31, FIG. 32, and FIG. 33, and is a symbol including control information for realizing demodulation and decoding of data symbols by the reception device that received the frame illustrated in FIG. 39.

Pilot symbol 3904 illustrated in FIG. 39 is a symbol corresponding to pilot signal 251A (pa(t)) such as in FIG. 2, FIG. 18, FIG. 19, FIG. 20, FIG. 21, FIG. 28, FIG. 29, FIG. 30, FIG. 31, FIG. 32, FIG. 33. Pilot symbol 3904 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 39 may share the pilot symbol transmission method.

3903 in FIG. 39 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 3903 is a symbol corresponding to a data symbol included in baseband signal 208A generated by signal processing illustrated in, for example, FIG. 2, FIG. 18, FIG. 19, FIG. 20, FIG. 21, FIG. 28, FIG. 29, FIG. 30, FIG. 31, FIG. 32, and FIG. 33. Accordingly, data symbol 3903 is either (i) a symbol including both the symbol "stream #1" and the symbol "stream #2", or (ii) either one of symbol "stream #1" and the symbol "stream #2". This is determined by the precoding matrix configuration used by weighting synthesizer 203 (in other words, data symbol 3903 corresponds to weighting synthesized signal 204A (z1(i))).

Note that, although not illustrated in FIG. 39, the frame may include symbols other than a preamble, control information symbol, data symbol, and pilot symbol. Moreover, not each of preamble 3901, control information symbol 3902, and pilot symbol 3904 need be present in the frame.

For example, in FIG. 39, the transmission device transmits preamble 3901 at time t1, transmits control information symbol 3902 at time t2, transmits data symbols 3903 from time t3 to time t11, transmits pilot symbol 3904 at time t12, transmits data symbols 3903 from time t13 to time t21, and transmits pilot symbol 3904 at time t22.

Figure 40:
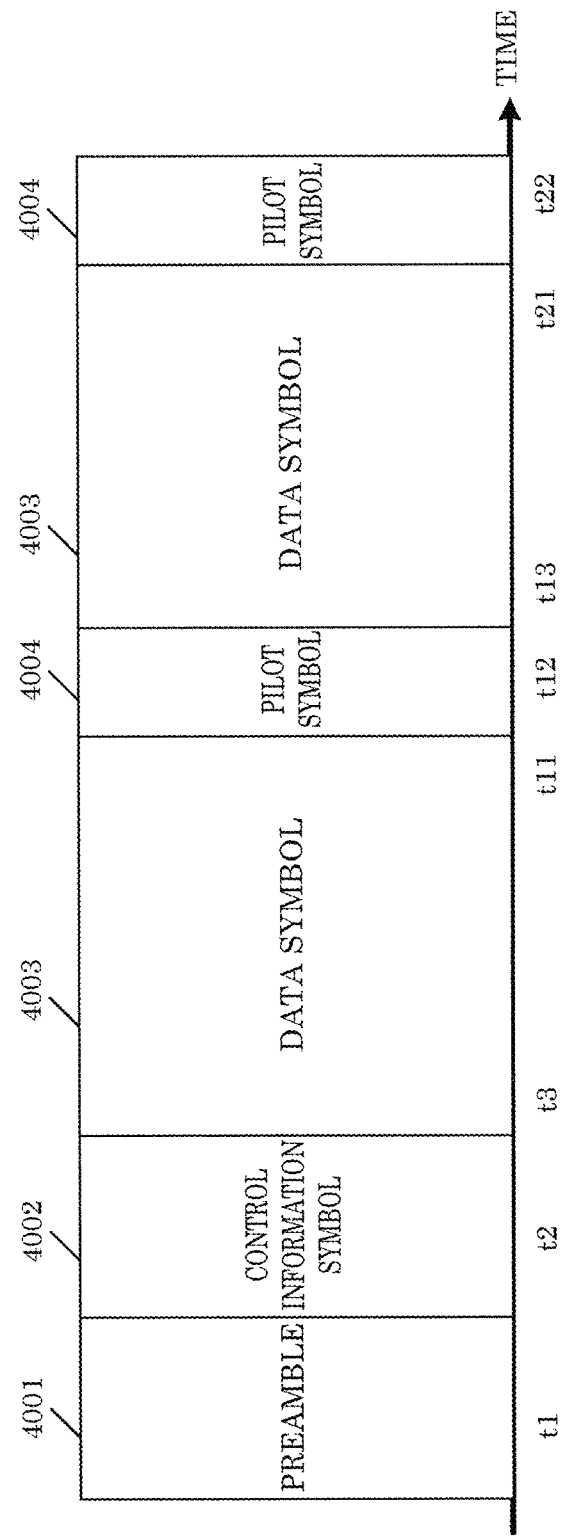
FIG. 40 illustrates one example of a frame configuration of a transmission signal illustrated in FIG. 1.

FIG. 40 illustrates an example of a frame configuration of transmission signal 106_B illustrated in FIG. 1. In FIG. 40, time is represented on the horizontal axis. The frame configuration illustrated in FIG. 40 is an example of a frame configuration when a single-carrier scheme is used. Symbols are present along the time axis. In FIG. 40, symbols from time t1 to t22 are shown.

Preamble 4001 in FIG. 40 corresponds to preamble signal 252 in, for example, FIG. 2, FIG. 18, FIG. 19, FIG. 20, FIG. 21, FIG. 28, FIG. 29, FIG. 30, FIG. 31, FIG. 32, and FIG. 33. Here, a preamble may transmit data (for control purposes), and may be configured as, for example, a symbol for signal detection, a signal for performing frequency and time synchronization, a symbol for performing channel estimation, or a symbol for frame synchronization (a symbol for performing propagation path fluctuation estimation).

Control information symbol 1102 in FIG. 40 is a symbol that corresponds to control information symbol signal 253 in, for example, FIG. 2, FIG. 18, FIG. 19, FIG. 20, FIG. 21, FIG. 28, FIG. 29, FIG. 30, FIG. 31, FIG. 32, and FIG. 33, and is a symbol including control information for realizing demodulation and decoding of data symbols by the reception device that received the frame illustrated in FIG. 40.

Pilot symbol 4004 illustrated in FIG. 40 is a symbol corresponding to pilot signal 251B (pb(t)) such as in FIG. 2, FIG. 18, FIG. 19, FIG. 20, FIG. 21, FIG. 28, FIG. 29, FIG. 30, FIG. 31, FIG. 32, FIG. 33. Pilot symbol 4004 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 40 may share the pilot symbol transmission method.

4003 in FIG. 40 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 4003 is a symbol corresponding to a data symbol included in baseband signal 208B generated by signal processing illustrated in, for example, FIG. 2, FIG. 18, FIG. 19, FIG. 20, FIG. 21, FIG. 28, FIG. 29, FIG. 30, FIG. 31, FIG. 32, and FIG. 33. Accordingly, data symbol 4003 is either (i) a symbol including both the symbol "stream #1" and the symbol "stream #2", or (ii) either one of symbol "stream #1" and the symbol "stream #2". This is determined by the precoding matrix configuration used by weighting synthesizer 203 (in other words, data symbol 4003 corresponds to phase-changed signal 206B (z2(i))).

Note that, although not illustrated in FIG. 40, the frame may include symbols other than a preamble, control information symbol, data symbol, and pilot symbol. Moreover, not each of preamble 4001, control information symbol 4002, and pilot symbol 4004 need be present in the frame.

For example, in FIG. 40, the transmission device transmits preamble 4001 at time t1, transmits control information symbol 4002 at time t2, transmits data symbols 4003 from time t3 to time t11, transmits pilot symbol 4004 at time t12, transmits data symbols 4003 from time t13 to time t21, and transmits pilot symbol 4004 at time t22.

When a symbol is present at time tp in FIG. 39 and a symbol is present at time tp in FIG. 40 (where p is an integer that is greater than or equal to 1), the symbol at time tp in FIG. 39 and the symbol at time tp in FIG. 40 are transmitted at the same time and same frequency or at the same time and same frequency band. For example, the data symbol at time t3 in FIG. 39 and the data symbol at time t3 in FIG. 40 are transmitted at the same time and at the same frequency, or at the same time and at the same frequency band. Note that the frame configuration is not limited to the configurations illustrated in FIG. 39 and FIG. 40: FIG. 39 and FIG. 40 are mere examples of frame configurations.

Moreover, a method in which the preamble and control information symbol in FIG. 39 and FIG. 40 transmit the same data (same control information) may be used.

Note that this is under the assumption that the frame of FIG. 39 and the frame of FIG. 40 are received at the same time by the reception device, but even when the frame of FIG. 39 or the frame of FIG. 40 has been received, the reception device can obtain the data transmitted by the transmission device.

Note that a combination of the single-carrier scheme transmission method, transmission device described in this embodiment and the embodiments described in the specification may be implemented.

Embodiment A4

In this embodiment, using the example described in Embodiment A2, an operational example of the terminal will be given.

FIG. 24 illustrates one example of a configuration of a terminal. As this example has already been described, repeated description will be omitted.

Figure 41:
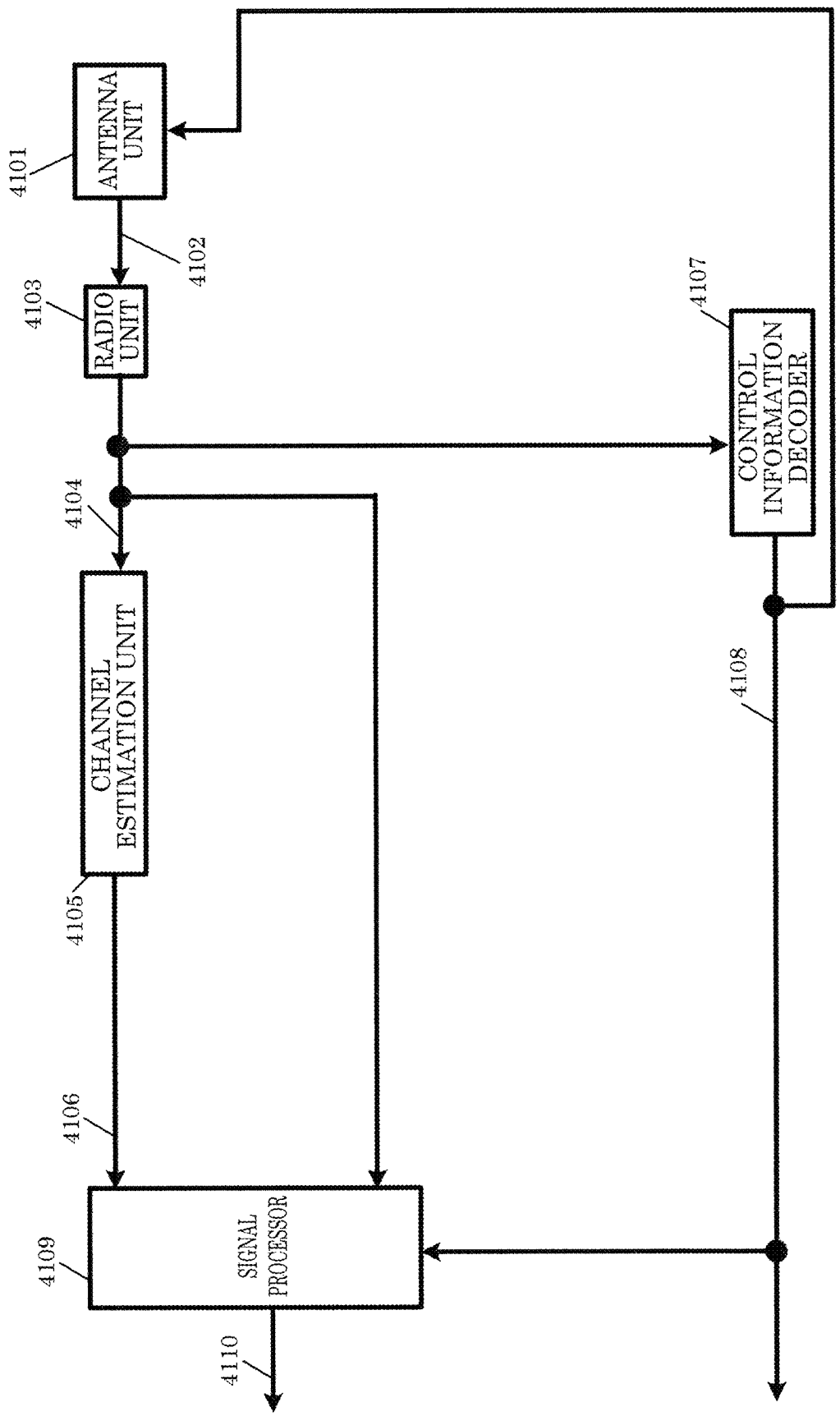
FIG. 41 illustrates one example of a configuration of a reception device included in the terminal in FIG. 24.

FIG. 41 illustrates one example of a configuration of reception device 2404 in the terminal illustrated in FIG. 24. Radio unit 4103 receives an input of reception signal 4102 received by antenna unit 4101, performs processing such as frequency conversion, and outputs baseband signal 4104.

Control information decoder 4107 receives an input of baseband signal 4104, demodulates the control information symbol, and outputs control information 4108.

Channel estimator 4105 receives an input of baseband signal 4104, extracts preamble and pilot symbol, performs channel fluctuation estimation, and outputs channel estimation signal 4106.

Signal processor 4109 receives inputs of baseband signal 4104, channel estimation signal 4106, and control information 4108, demodulates and performs error correction decoding on a data symbol based on control information 4108, and outputs reception data 4110.

Figure 42:
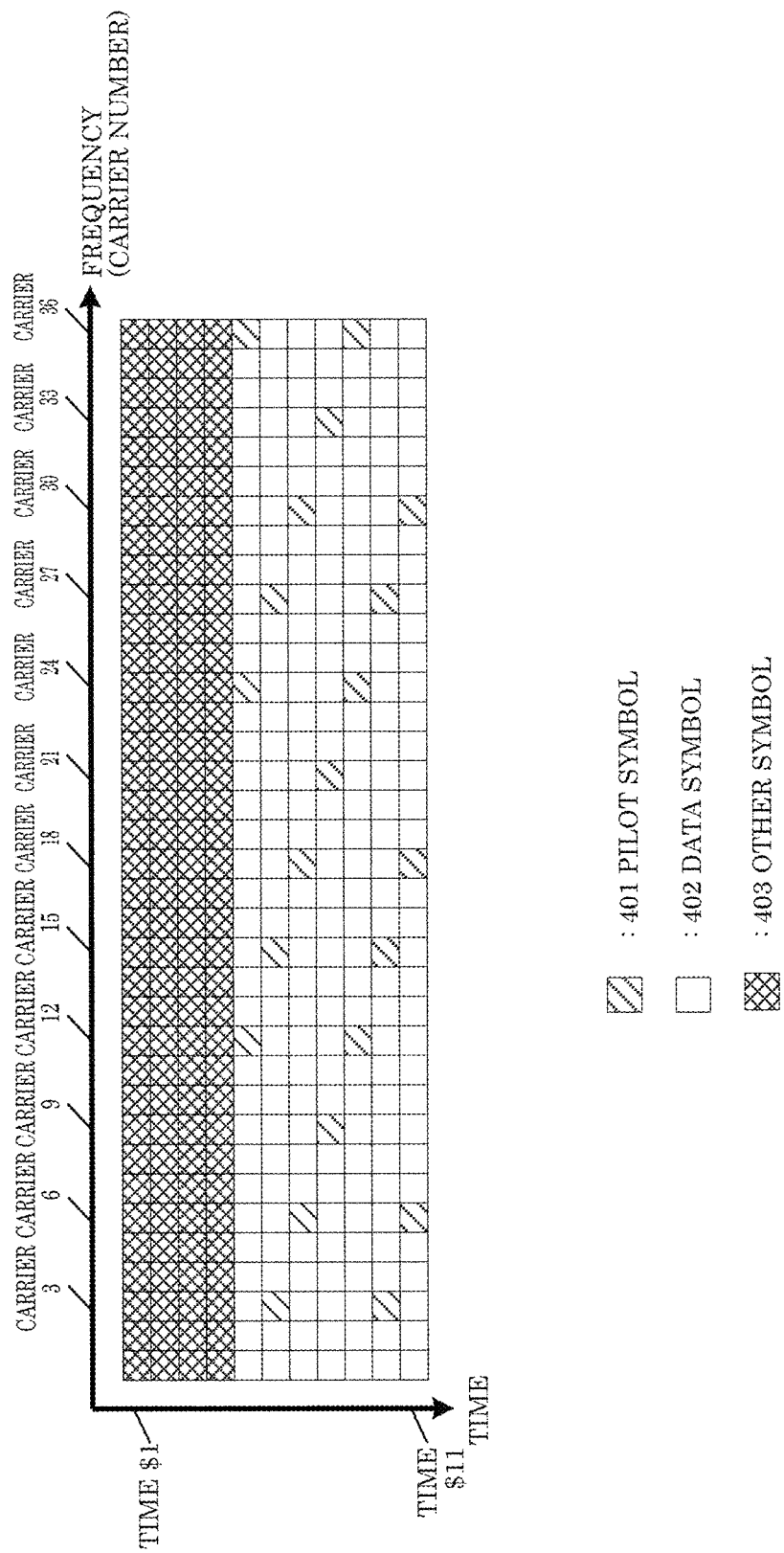
FIG. 42 illustrates one example of a frame configuration when a base station or AP uses a multi-carrier transmission scheme and transmits a single modulated signal.

FIG. 42 illustrates an example of a frame configuration upon single modulated signal transmission by a base station or AP, which is the communication partner of the terminal, using a multi-carrier transmission scheme such as OFDM. In FIG. 42, components that operate the same as in FIG. 4 share like reference marks.

In FIG. 42, frequency is represented on the horizontal axis, and symbols for carrier 1 through carrier 36 are shown in FIG. 42. Moreover, in FIG. 42, time is represented on the vertical axis, and symbols for time $1 through time $11 are shown.

For example, the transmission device in the base station illustrated in FIG. 1 may transmit a single stream modulated signal having the frame configuration illustrated in FIG. 42.

Figure 43:
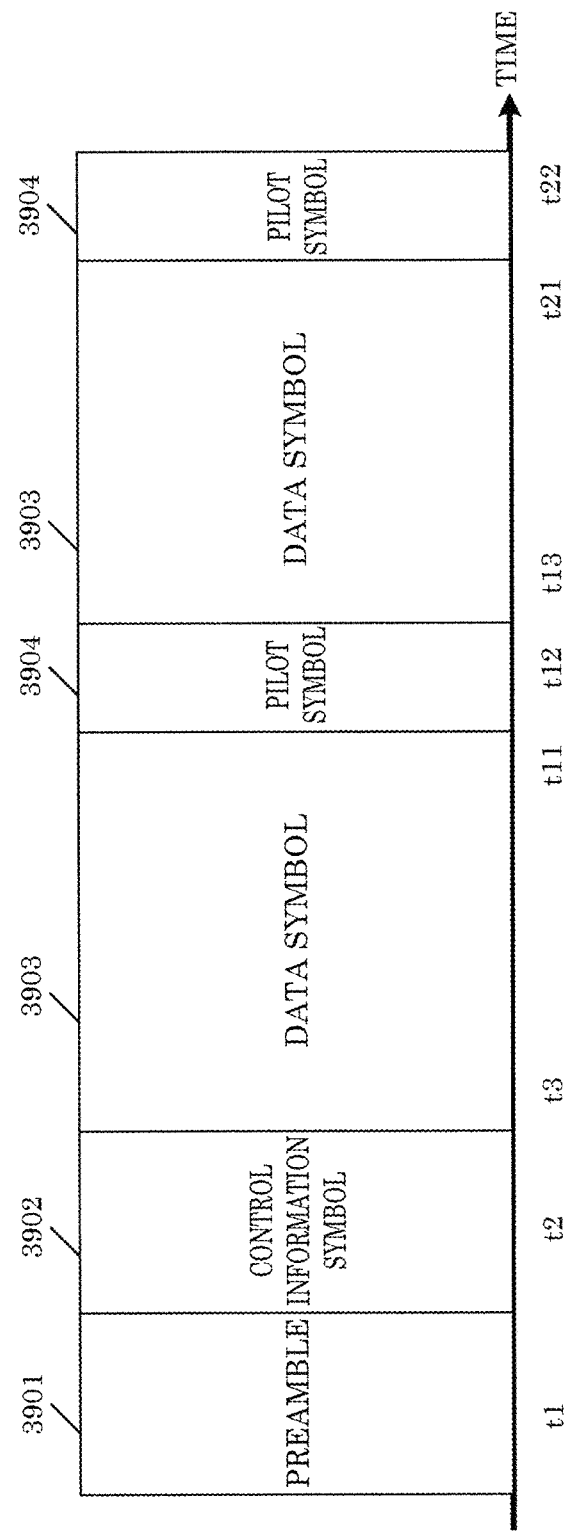
FIG. 43 illustrates one example of a frame configuration when a base station or AP uses a single-carrier transmission scheme and transmits a single modulated signal.

FIG. 43 illustrates an example of a frame configuration upon single modulated signal transmission by a base station or AP, which is the communication partner of the terminal, using a single-carrier transmission scheme. In FIG. 43, components that operate the same as in FIG. 39 share like reference marks.

In FIG. 43, time is represented on the horizontal axis, and symbols from time t1 to time t22 are shown in FIG. 43.

For example, the transmission device in the base station illustrated in FIG. 1 may transmit a single stream modulated signal having the frame configuration illustrated in FIG. 43.

For example, the transmission device in the base station illustrated in FIG. 1 may transmit a plurality of streams of a plurality of modulated signals having the frame configuration illustrated in FIG. 4 and/or FIG. 5.

Furthermore, for example, the transmission device in the base station illustrated in FIG. 1 may transmit a plurality of streams of a plurality of modulated signals having the frame configuration illustrated in FIG. 39 and/or FIG. 40.

The reception device of the terminal has the configuration illustrated in FIG. 41. For example, the reception device of the terminal supports the following.

For example, the reception device of the terminal supports reception under "communications scheme #A" described in Embodiment A2.

Accordingly, even if the communication partner transmits a plurality of streams of a plurality of modulated signals, the terminal does not support reception of such.

Thus, when the communication partner transmits a plurality of streams of a plurality of modulated signals and phase change is implemented, the terminal does not support reception of such.

The terminal supports only single-carrier schemes.

The terminal supports only decoding of "error correction encoding scheme #C" as an error correction encoding scheme.

Therefore, based on the rules described in Embodiment A2, a terminal having the configuration illustrated in FIG. 41 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A is supported from supported scheme 3801.

Accordingly, based on information 3601 relating to support for demodulation of modulated signals with phase changes in FIG. 38 being null and communications scheme #A being supported, control signal generator 2308 in the base station determines to not transmit a phase-changed modulated signal, and outputs control signal 2309 including such information. This is because communications scheme #A does not support transmission or reception of a plurality of modulated signals for a plurality of streams.

Based on information 3702 relating to support for reception for a plurality of streams in FIG. 38 being null and communications method #A being supported, control signal generator 2308 in the base station determines to not transmit a phase-changed modulated signal, and outputs control signal 2309 including such information. This is because communications scheme #A does not support transmission or reception of a plurality of modulated signals for a plurality of streams.

Based on information 3803 relating to supported error correction encoding scheme in FIG. 38 being null and communications method #A being supported, control signal generator 2308 in the base station determines to use error correction encoding scheme #C, and outputs control signal 2309 including such information. This is because communications scheme #A supports error correction encoding scheme #C.

For example, as illustrated in FIG. 41, since this is supported by communications method #A, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the communications method #A modulated signal being accurately transmitted.

As a second example, the reception device of the terminal has the configuration illustrated in FIG. 41, and supports the following.

For example, the reception device of the terminal supports reception under "communications scheme #B" described in Embodiment A2.

Accordingly, since the reception device has the configuration illustrated in FIG. 41, even if the communication partner transmits a plurality of streams of a plurality of modulated signals, the terminal does not support reception of such.

Thus, when the communication partner transmits a plurality of streams of a plurality of modulated signals and phase change is implemented, the terminal does not support reception of such.

The terminal supports a single-carrier scheme and a multi-carrier scheme such as OFDM.

The terminal supports decoding of "error correction encoding scheme #C", "error correction encoding scheme #D" as an error correction encoding scheme.

Therefore, based on the rules described in Embodiment A2, a terminal having the configuration illustrated in FIG. 41 that supports the above transmits reception capability notification symbol 3502 illustrated in FIG. 38.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #B is supported from supported scheme 3801.

Moreover, based on information 3702 relating to support for reception for a plurality of streams illustrated in FIG. 38, control signal generator 2308 in the base station knows that the terminal, which is the communication partner, cannot demodulate the plurality of modulated signals for the plurality of streams.

Accordingly, based on information 3601 relating to support for demodulation of modulated signals with phase changes in FIG. 38 being null, control information signal generator 2308 in the base station determines to not transmit a phase-changed modulated signal, and outputs control signal 2309 including such information. This is because the terminal does not support "reception for a plurality of streams".

Based on information 3802 relating to multi-carrier scheme support in FIG. 38, control signal generator 2308 in the base station outputs control signal 2309 including information indicating that the terminal, which is the communication partner, supports a multi-carrier scheme and/or a single-carrier scheme.

Then, based on information 3803 relating to supported error correction encoding scheme in FIG. 38, control signal generator 2308 in the base station outputs control signal 2309 including information indicating that the terminal, which is the communication partner, supports error correction encoding scheme #C and/or error correction encoding scheme #D.

Accordingly, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a third example, the reception device of the terminal has the configuration illustrated in FIG. 41, and, for example, supports the following.

The reception device of the terminal supports reception under "communications scheme #A" and "communications scheme #B" described in Embodiment A2.

Accordingly, even if the communication partner transmits a plurality of streams of a plurality of modulated signals using either one of "communications scheme #A" or "communications scheme #B", the terminal does not support reception of such.

Thus, when the communication partner transmits a plurality of streams of a plurality of modulated signals and phase change is implemented, the terminal does not support reception of such.

Single-carrier schemes are supported in either one of "communications scheme #A" or "communications scheme #B".

Regarding error correction encoding schemes, the terminal supports decoding of "error correction encoding scheme #C" as "communications scheme #A", and "error correction encoding scheme #C" and "error correction encoding scheme #D" as "communications scheme #B".

Therefore, based on the rules described in Embodiment A2, a terminal having the configuration illustrated in FIG. 41 that supports the above generates reception capability notification symbol 3502 illustrated in FIG. 38 and, for example, transmits reception capability notification symbol 3502 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Moreover, based on information 3702 relating to support for reception for a plurality of streams illustrated in FIG. 38, control signal generator 2308 in the base station knows that the terminal does not support reception for a plurality of streams.

Accordingly, based on information 3601 relating to support for demodulation of modulated signals with phase changes in FIG. 38 being null and communications scheme #A being supported, control signal generator 2308 in the base station determines to not transmit a phase-changed modulated signal, and outputs control signal 2309 including such information. This is because terminal A does not support transmission or reception of a plurality of modulated signals for a plurality of streams.

Control signal generator 2308 in the base station knows whether the terminal supports a single-carrier scheme and knows whether the terminal supports a multi-carrier scheme such as OFDM from information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a fourth example, the reception device of the terminal has the configuration illustrated in FIG. 41, and, for example, supports the following.

The reception device of the terminal supports reception under "communications scheme #A" and "communications scheme #B" described in Embodiment A2.

Accordingly, even if the communication partner transmits a plurality of streams of a plurality of modulated signals using either one of "communications scheme #A" or "communications scheme #B", the terminal does not support reception of such.

Thus, when the communication partner transmits a plurality of streams of a plurality of modulated signals and phase change is implemented, the terminal does not support reception of such.

The terminal supports a single-carrier scheme as "communications scheme #A", and supports both a single-carrier scheme and a multi-carrier scheme such as OFDM as "communications scheme #B".

Regarding error correction encoding schemes, the terminal supports decoding of "error correction encoding scheme #C" as "communications scheme #A", and "error correction encoding scheme #C" and "error correction encoding scheme #D" as "communications scheme #B".

Therefore, based on the rules described in Embodiment A2, a terminal having the configuration illustrated in FIG. 41 that supports the above generates reception capability notification symbol 3502 illustrated in FIG. 38 and, for example, transmits reception capability notification symbol 3502 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Moreover, based on information 3702 relating to support for reception for a plurality of streams illustrated in FIG. 38, control signal generator 2308 in the base station knows that the terminal does not support reception for a plurality of streams.

Accordingly, based on information 3601 relating to support for demodulation of modulated signals with phase changes in FIG. 38 being null and communications scheme #A being supported, control signal generator 2308 in the base station determines to not transmit a phase-changed modulated signal, and outputs control signal 2309 including such information. This is because terminal A does not support transmission or reception of a plurality of modulated signals for a plurality of streams.

Control signal generator 2308 in the base station knows whether the terminal supports a single-carrier scheme and knows whether the terminal supports a multi-carrier scheme such as OFDM from information 3802 relating to multi-carrier scheme support in FIG. 38.

Here, information 3802 relating to multi-carrier scheme support is required to have a configuration such as the following.

Information 3802 relating to multi-carrier scheme support is 4-bit information, and the 4 bits are expressed as g0, g1, g2, and g3.

When the terminal supports single-carrier demodulation for communications scheme #A, (g0, g1)=(0, 0) is transmitted, when the terminal supports multi-carrier scheme demodulation such as OFDM for communications scheme #A, (g0, g1)=(0, 1) is transmitted, and when the terminal supports single-carrier demodulation and multi-carrier scheme demodulation such as OFDM for communications scheme #A, (g0, g1)=(1, 1) is transmitted.

When the terminal supports single-carrier demodulation for communications scheme #B, (g2, g3)=(0, 0) is transmitted, when the terminal supports multi-carrier scheme demodulation such as OFDM for communications scheme #B, (g2, g3)=(0, 1) is transmitted, and when the terminal supports single-carrier demodulation and multi-carrier scheme demodulation such as OFDM for communications scheme #B, (g2, g3)=(1, 1) is transmitted.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a fifth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

Thus, when the communication partner transmits a plurality of streams of modulated signals and phase change is implemented, the terminal supports reception of such.

The terminal supports only single-carrier schemes.

The terminal supports only decoding of "error correction encoding scheme #" as an error correction encoding scheme.

Therefore, based on the rules described in Embodiment A2, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Accordingly, based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports demodulation of modulated signals with phase changes based on information 3601 relating to support for demodulation of modulated signals with phase changes in FIG. 38.

Control signal generator 2308 in the base station knows that the terminal supports only single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a sixth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

When the communication partner transmits a plurality of streams of modulated signals and phase change is implemented, the terminal does not support reception of such.

Only single-carrier scheme is supported.

The terminal supports decoding of "error correction encoding scheme #C" and decoding of "error correction encoding scheme #D" as an error correction encoding scheme.

Therefore, based on the rules described in Embodiment A2, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Accordingly, based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal does not support demodulation of modulated signals with phase changes based on information 3601 relating to support for demodulation of modulated signals with phase changes in FIG. 38. Accordingly, the base station or AP transmits a modulated signal without implementing a phase change upon transmission of a plurality of streams of modulated signals to the terminal.

Control signal generator 2308 in the base station knows that the terminal supports only single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a seventh example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

The terminal supports a single-carrier scheme as "communications scheme #A", and supports both a single-carrier scheme and a multi-carrier scheme such as OFDM as "communications scheme #B". However, only in the case of a communications scheme #B multi-carrier scheme such as OFDM, implementation of a phase change by the communication partner upon transmitting a plurality of streams of modulated signals is possible.

Thus, when the communication partner transmits a plurality of streams of modulated signals and phase change is implemented, the terminal supports reception of such.

The terminal supports decoding of "error correction encoding scheme #C" and decoding of "error correction encoding scheme #D" as an error correction encoding scheme.

Therefore, based on the rules described in Embodiment A2 and this embodiment, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Accordingly, based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal does not support demodulation of modulated signals with phase changes based on information 3601 relating to support for demodulation of modulated signals with phase changes in FIG. 38. Accordingly, the base station or AP transmits a modulated signal without implementing a phase change upon transmission of a plurality of streams of modulated signals to the terminal. Note that as described above, when the terminal obtains information indicating "demodulation of modulated signals with phase changes is supported" from information 3601 relating to "support for demodulation of modulated signals with phase changes", the terminal understands that this is only when the scheme is "communications scheme #B".

Control signal generator 2308 in the base station knows that the terminal supports single-carrier schemes as "communications scheme #A" and supports single-carrier schemes and multi-carrier schemes such as OFDM as "communications scheme #B" based on information 3802 relating to multi-carrier scheme support in FIG. 38 (here, as described above, a configuration is acceptable in which the terminal notifies status regarding (i) support of a single-carrier scheme of "communications scheme #A" and support of a multi-carrier scheme such as OFDM, and (ii) support of a single-carrier scheme of "communications scheme #B" and support of a multi-carrier scheme such as OFDM to the base station or AP).

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As an eighth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

Accordingly, in a single-carrier scheme of "communications scheme #B", even if the communication partner transmits a plurality of streams of a plurality of modulated signals, the terminal supports reception of such. However, in a multi-carrier scheme such as OFDM of "communications scheme #B", even if the communication partner transmits a plurality of streams of a plurality of modulated signals, the terminal does not support reception of such. Moreover, in the case of a single-carrier scheme of "communications scheme #A", when the communication partner transmits a single stream, the terminal supports reception of such (but does not support reception of a multi-carrier scheme such as OFDM).

Thus, when the communication partner transmits a plurality of streams of modulated signals and phase change is implemented, the terminal supports reception of such.

The terminal supports decoding of "error correction encoding scheme #C" and decoding of "error correction encoding scheme #D" as an error correction encoding scheme.

Therefore, based on the rules described in Embodiment A2, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from the reception capability notification symbol 3502, and the terminal knows that communications scheme #A and communications scheme #B are supported from supported scheme 3801.

Moreover, based on information 3702 relating to support for reception for a plurality of streams in FIG. 38, control signal generator 2308 in the base station knows that even when the base station transmits a plurality of streams of a plurality of modulated signals, the terminal supports reception of such in the case of a single-carrier scheme of "communications scheme #B", and that even when the base station transmits a plurality of streams of a plurality of modulated signals, the terminal does not support reception of such in the case of a multi-carrier scheme such as OFDM of "communications scheme #B". Moreover, based on information 3702 relating to support for reception for a plurality of streams in FIG. 38, control signal generator 2308 in the base station knows that in "communications scheme #A" and "communications scheme #B", even if the base station transmits a single stream of a modulated signal, the terminal supports reception of such.

Here, information 3702 relating to support for reception for a plurality of streams is required to have a configuration such as the following.

Information 3702 relating to support for reception for a plurality of streams is 2-bit information, and the 2 bits are expressed as h0 and h1.

In the case of a single-carrier scheme of "communications scheme #B", when the communication partner transmits a plurality of streams of modulated signals and the terminal supports demodulation, h0=1 is transmitted, and when the terminal does not support demodulation, h0=0 is transmitted.

In the case of a multi-carrier scheme such as OFDM of "communications scheme #B", when the communication partner transmits a plurality of streams of modulated signals and the terminal supports demodulation, h1=1 is transmitted, and when the terminal does not support demodulation, h1=0 is transmitted.

Control signal generator 2308 in the base station then knows that the terminal supports demodulation of modulated signals with phase changes based on information 3601 relating to support for demodulation of modulated signals with phase changes in FIG. 38.

Control signal generator 2308 in the base station knows that the terminal supports only single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a ninth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream of a modulated signal, the terminal supports reception of such.

In "communications scheme #B", the base station or AP can transmit a plurality of modulated signals for a plurality of streams in the case of a single-carrier scheme and a multi-carrier scheme such as OFDM. However, only in the case of a communications scheme #B multi-carrier scheme such as OFDM, implementation of a phase change by the communication partner upon transmitting a plurality of streams of modulated signals is possible. Thus, when the communication partner transmits a plurality of streams of modulated signals and phase change is implemented, the terminal supports reception of such.

The terminal supports decoding of "error correction encoding scheme #C" and decoding of "error correction encoding scheme #D" as an error correction scheme.

Therefore, based on the rules described in Embodiment A2, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such, and in "communications scheme #A" and "communications scheme #B", even if the communication partner transmits a single stream modulated signal, the terminal supports reception of such.

Moreover, based on information 3802 relating to multi-carrier scheme support in FIG. 38, control signal generator 2308 in the base station knows whether the terminal supports a single-carrier scheme, supports a multi-carrier scheme such as OFDM, or supports both a single-carrier scheme and a multi-carrier scheme such as OFDM.

When the terminal supports a single-carrier scheme, upon control signal generator 2308 in the base station knowing this, control signal generator 2308 in the base station ignores information 3601 relating to support for demodulation of modulated signals with phase changes in FIG. 38, and this is interpreted as not supporting demodulation (since, in the case of single-carrier scheme, phase-change is not supported). When the terminal supports a multi-carrier scheme such as OFDM or supports both a multi-carrier scheme such as OFDM and a single-carrier scheme, based on information 3601 relating to support for demodulation of modulated signals with phase changes in FIG. 38, control signal generator 2308 in the base station obtains information indicating that the terminal supports a multi-carrier scheme such as OFDM or information indicating that it is not.

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a tenth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

In "communications scheme #B", the base station or AP can transmit a plurality of modulated signals for a plurality of streams in the case of a single-carrier scheme and a multi-carrier scheme such as OFDM.

Then, in the case of a single-carrier scheme, when the communication partner transmits a plurality of streams of modulated signals, whether to implement a phase change or not can be set, and in the case of a multi-carrier scheme such as OFDM, when the communication partner transmits a plurality of streams of modulated signals, whether to implement a phase change or not can be set.

The terminal supports decoding of "error correction encoding scheme #C" and decoding of "error correction encoding scheme #D" as an error correction scheme.

Therefore, based on the rules described in Embodiment A2, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such, and in "communications scheme #A" and "communications scheme #B", even if the communication partner transmits a single stream modulated signal, the terminal supports reception of such.

Moreover, based on information 3802 relating to multi-carrier scheme support in FIG. 38, control signal generator 2308 in the base station knows whether the terminal supports a single-carrier scheme, supports a multi-carrier scheme such as OFDM, or supports both a single-carrier scheme and a multi-carrier scheme such as OFDM.

Control signal generator 2308 in the base station then knows whether the terminal supports phase change, based on information 3601 relating to support for demodulation of modulated signals with phase changes in FIG. 38.

Here, information 3802 relating to support for demodulation of modulated signals with phase changes is required to have a configuration such as the following.

Information 3802 relating to support for demodulation of modulated signals with phase changes is 2-bit information, and the 2 bits are expressed as k0 and k1.

In the case of a single-carrier scheme of "communications scheme #B", when the communication partner transmits a plurality of streams for a plurality of modulated signals and a phase change has been implemented, when the terminal supports demodulation, k0=1 is transmitted, and when the terminal does not support demodulation, k0=0 is transmitted.

In the case of a multi-carrier scheme such as OFDM of "communications scheme #B", when the communication partner transmits a plurality of streams for a plurality of modulated signals and a phase change has been implemented, when the terminal supports demodulation, k1=1 is transmitted, and when the terminal does not support demodulation, k1=0 is transmitted.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As described above, the base station or AP obtains, from the terminal, which is the communication partner of the base station or AP, information relating to a scheme in which demodulation is supported by the terminal, and based on that information, determines the number of modulated signals, the communications method of the modulated signals, and the signal processing method of the modulated signals, for example, and as a result, the base station or AP can accurately generate and transmit a modulated signal receivable by the terminal, which makes it possible to achieve an advantageous effect of an improvement in data transmission efficiency in the system including the base station or AP and terminal.

Here, for example, as illustrated in FIG. 38, by configuring a reception capability notification symbol of a plurality of items of information, the base station or AP can easily determine the validity of information included in the reception capability notification symbol, and as a result, it is possible to rapidly determine, for example, a modulated signal scheme and signal processing method to be used for transmission.

Then, based on information on the reception ability symbol transmitted by the terminals, the base station or AP can improve data transmission efficiency by transmitting modulated signals to each terminal using a suitable transmission method.

Note that the method of configuring the information on the reception capability notification symbol described in this embodiment is merely one non-limiting example. Moreover, the order in which and timing at which the terminal transmits the reception capability notification symbols to the base station or AP described in this embodiment are merely non-limiting examples.

Embodiment A5

In the present specification, one example of a configuration of a transmission device, such as a base station, access point, broadcast station, illustrated in FIG. 1 was described. In this embodiment, another example of a configuration of a transmission device, such as a base station, access point, broadcast station that is illustrated in FIG. 44 and different from FIG. 1 will be described.

Figure 44:
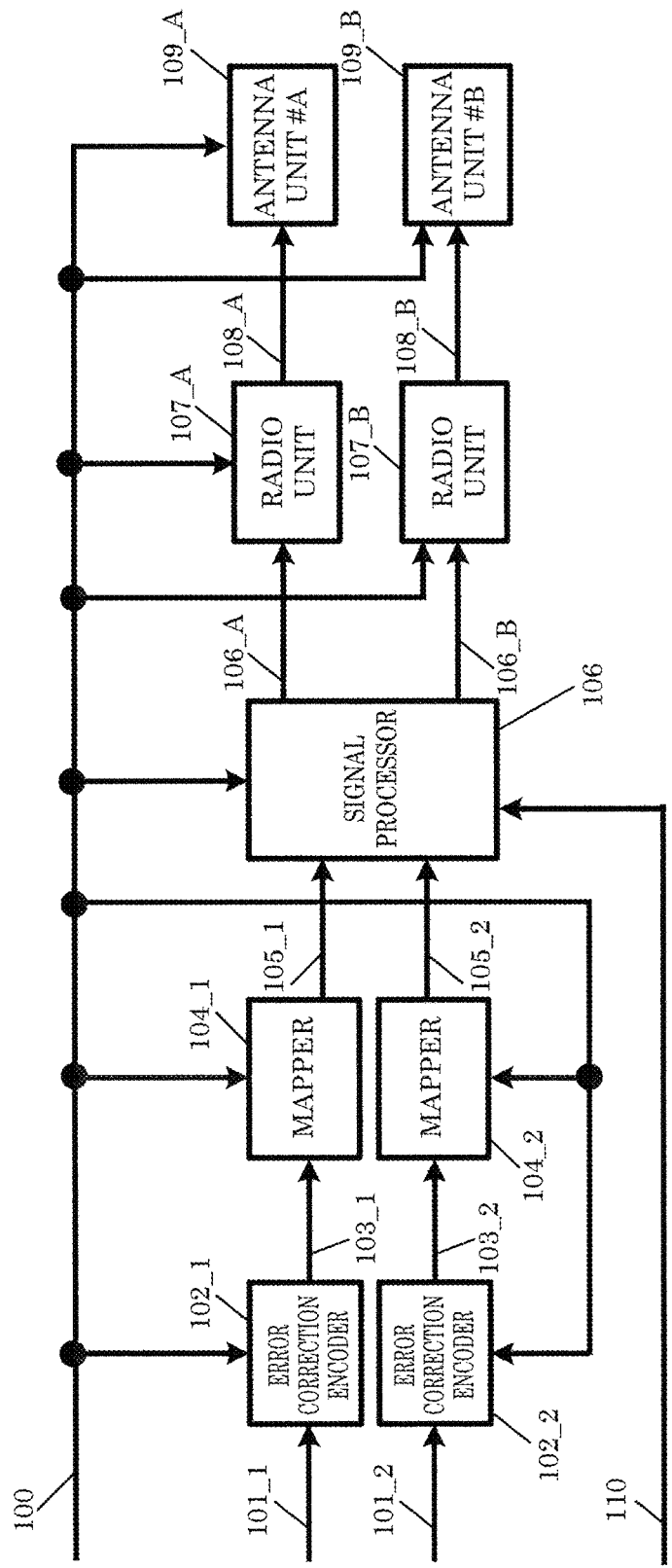
FIG. 44 illustrates one example of a configuration of a transmission device included in, for example, a base station, access point, or broadcast station.

In FIG. 44, components that operate the same as in FIG. 1 share like reference marks. Accordingly, repeated description will be omitted. In FIG. 44, the point of difference from FIG. 1 is the inclusion of a plurality of error correction encoders. In FIG. 44, there are two error correction encoders (note that the number of error correction encoders is not limited to one in the case of FIG. 1 or two in the case of FIG. 44; for example, three or more may be provided, and the mapper may use the data output by each of the error correction encoders to perform mapping).

In FIG. 44, error correction encoder 102_1 receives inputs of first data 101_1 and control signal 100, error correction encodes first data 101_1 based on information on the error correction encoding method included in control signal 100, and outputs encoded data 103_1.

Mapper 104_1 receives inputs of encoded data 103_1 and control signal 100, and based on information on the modulation scheme included in control signal 100, performs mapping on encoded data 103_1, and outputs mapped signal 105_1.

Error correction encoder 102_1 receives inputs of second data 101_2 and control signal 100, error correction encodes second data 101_2 based on information on the error correction encoding method included in control signal 100, and outputs encoded data 103_2.

Mapper 104_2 receives inputs of encoded data 103_2 and control signal 100, and based on information on the modulation scheme included in control signal 100, performs mapping on encoded data 103_2, and outputs mapped signal 105_2.

Then, even when operations described in this embodiment are performed with respect to the configuration of the transmission device illustrated in FIG. 44, implementation just like in FIG. 1 is possible and the same advantageous effects are also obtainable.

Note that, for example, the transmission device such as a base station, AP, or broadcast station may switch between transmitting a modulated signal with the configuration illustrated in FIG. 1 and transmitting a modulated signal with the configuration illustrated in FIG. 44.

Embodiment A6

Examples of configurations of signal processor 106 described with reference to, for example FIG. 1, are illustrated in FIG. 20, FIG. 21, and FIG. 22. Next, an example of operations performed by phase changers 205A, 205B illustrated in FIG. 20, FIG. 21, and FIG. 22 will be given.

As described in Embodiment 4, the phase change value of phase changer 205A is expressed as w(i), and the phase change value of phase changer 205B is expressed as y(i). Here, z1(i) and z2(i) are expressed as in Equation (52). The phase change cycle of phase changer 205A is N, and the phase change cycle of phase changer 205B is N. However, N is an integer that is greater than or equal to 3. In other words, the number of transmission streams or number of transmission modulated signals is an integer that is greater than 2. Here, phase change value w(i) and phase change value y(i) are applied as follows.

[MATH. 137]
$$w(i) = e^{j\left(\frac{\pi \times i}{N} + \Delta\right)} \quad \text{Equation (137)}$$

[MATH. 138]
$$y(i) = e^{j\left(\frac{-\pi \times i}{N} + \Omega\right)} \quad \text{Equation (138)}$$

Note that $\Delta$ in Equation (137) and $\Omega$ in Equation (138) are real numbers (in one extremely simple, non-limiting example, $\Delta$ and $\Omega$ are both zero). When set in this manner, the peak-to-average power ratio (PAPR) of signal z1(t) (or z1(i)), and the PAPR of signal z2(t) (or z2(i)) in FIG. 20, FIG. 21, and FIG. 22 is, in the case of a single-carrier scheme, are the same. Accordingly, the phase noise in radio unit 107_A and 108_B in, for example, FIG. 1, and the linear required criteria for the transmission power unit are the same, which is advantageous since low power consumption is easily achievable and a common radio unit configuration can be used (note that there is a high probability that the same advantageous effects can be achieved when a multi-carrier scheme such as OFDM is used).

Phase changer w(i) and y(i) may be applied in the following manner.

[MATH. 139]
$$w(i) = e^{j\left(\frac{-\pi \times i}{N} + \Delta\right)} \quad \text{Equation (139)}$$

[MATH. 140]
$$y(i) = e^{j\left(\frac{\pi \times i}{N} + \Omega\right)} \quad \text{Equation (140)}$$

Even when applied as in Equation (139) and Equation (140), the same advantageous effects as above can be achieved.

Phase changer w(i) and y(i) may be applied in the following manner.

[MATH. 141]
$$w(i) = e^{j\left(\frac{k \times \pi \times i}{N} + \Delta\right)} \quad \text{Equation (141)}$$

[MATH. 142]
$$y(i) = e^{j\left(\frac{-k \times \pi \times i}{N} + \Omega\right)} \quad \text{Equation (142)}$$

Note that k is an integer other than 0 (for example, k may be 1, may be −1, may be 2, and may be −2; these are non-limiting examples). Even when applied as in Equation (141) and Equation (142), the same advantageous effects as above can be achieved.

Embodiment A7

Examples of configurations of signal processor 106 described with reference to, for example FIG. 1, are illustrated in FIG. 31, FIG. 32, and FIG. 33. Next, an example of operations performed by phase changers 205A, 205B illustrated in FIG. 31, FIG. 32, and FIG. 33 will be given.

As described in Embodiment 7, in phase changer 205B, for example, a phase change of y(i) is applied to s2(i). Accordingly, when phase-changed signal 2801B is expressed as s2(i), s2'(i) can be expressed as s2'(i)=y(i)×s2(i) (i is a symbol number (i is an integer that is greater than or equal to 0)).

In phase changer 205A, for example, a phase change of w(i) is applied to s1(i). Accordingly, when phase-changed signal 2901A is expressed as s1'(i), s1'(i) can be expressed as s1'(i)=w(i)×s1(i) (i is a symbol number (i is an integer that is greater than or equal to 0)). The phase change cycle of phase changer 205A is N, and the phase change cycle of phase changer 205B is N. However, N is an integer that is greater than or equal to 3. In other words, the number of transmission streams or number of transmission modulated signals is an integer that is greater than 2. Here, phase change value w(i) and phase change value y(i) are applied as follows.

[MATH. 143]

$$w(i) = e^{j\left(\frac{\pi \times i}{N} + \Delta\right)} \quad \text{Equation (143)}$$

[MATH. 144]

$$y(i) = e^{j\left(\frac{-\pi \times i}{N} + \Omega\right)} \quad \text{Equation (144)}$$

Note that Δ in Equation (143) and Ω in Equation (144) are real numbers (in one extremely simple, non-limiting example, Δ and Ω are both zero). When set in this manner, the peak-to-average power ratio (PAPR) of signal z1(t) (or z1(i)), and the PAPR of signal z2(t) (or z2(i)) in FIG. 31, FIG. 32, and FIG. 33 is, in the case of a single-carrier scheme, are the same. Accordingly, the phase noise in radio units 107_A and 108_B in, for example, FIG. 1, and the linear required criteria for the transmission power unit are the same, which is advantageous since low power consumption is easily achievable and a common radio unit configuration can be used (note that there is a high probability that the same advantageous effects can be achieved when a multi-carrier scheme such as OFDM is used).

Phase changer w(i) and y(i) may be applied in the following manner.

[MATH. 145]

$$w(i) = e^{j\left(\frac{-\pi \times i}{N} + \Delta\right)} \quad \text{Equation (145)}$$

[MATH. 146]

$$y(i) = e^{j\left(\frac{\pi \times i}{N} + \Omega\right)} \quad \text{Equation (146)}$$

Even when applied as in Equation (145) and Equation (146), the same advantageous effects as above can be achieved.

Phase changer w(i) and y(i) may be applied in the following manner.

[MATH. 147]

$$w(i) = e^{j\left(\frac{k \times \pi \times i}{N} + \Delta\right)} \quad \text{Equation (147)}$$

[MATH. 148]

$$y(i) = e^{j\left(\frac{-k \times g \times i}{N} + \Omega\right)} \quad \text{Equation (148)}$$

Note that k is an integer other than 0 (for example, k may be 1, may be −1, may be 2, and may be −2; these are non-limiting examples). Even when applied as in Equation (147) and Equation (148), the same advantageous effects as above can be achieved.

(Supplemental Information 5)

The embodiments of the present specification may be implemented for multi-carrier schemes such as OFDM and may be implemented for single-carrier schemes. Hereinafter, additional information will be given for cases in which a single-carrier scheme is applied.

For example, in Embodiment 1, using, for example, Equation (1) to Equation (36) and FIG. 2, or in other embodiments, using FIG. 18 to FIG. 22 and FIG. 28 to FIG. 33, signal z1(i) and signal z2(i) (or signal z1'(i) and signal z2'(i)) are generated, and signal z1(i) and signal z2(i) (or signal z1'(i) and signal z2'(i)) are transmitted from the transmission device at the same time and at the same frequency (same frequency band). Note that i is a symbol number.

Here, for example, in cases in which a multi-carrier scheme such as OFDM is used, as described in Embodiments 1 through 6, signal z1(i) and signal z2(i) (or signal z1'(i) and signal z2'(i)) are taken as functions of a frequency (carrier number), functions of time and frequency, or functions of time, and, for example, are arranged as follows.

Signal z1(i) and signal z2(i) (or signal z1'(i) and signal z2'(i)) are arranged along the frequency axis.

Signal z1(i) and signal z2(i) (or signal z1'(i) and signal z2'(i)) are arranged along the time axis.

Signal z1(i) and signal z2(i) (or signal z1'(i) and signal z2'(i)) are arranged along both the frequency and time axis.

Next, a specific example will be given.

Figure 45:
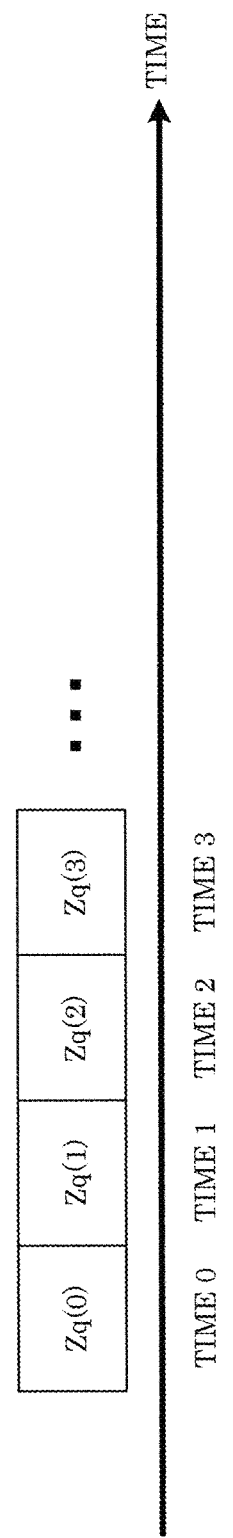
FIG. 45 illustrates one example of a symbol arrangement method with respect to the time axis of a signal.

FIG. 45 illustrates an example of a method of arranging symbols on the time axis for signal z1(i) and signal z2(i) (or signal z1'(i) and signal z2'(i)).

In FIG. 45, for example, zq(0) is shown. Here, q is 1 or 2. Accordingly, zq(0) in FIG. 45 indicates "in z1(i) and z2(i), when symbol number i=0, z1(0) and z2(0)". Similarly, zq(1) indicates "in z1(i) and z2(i), when symbol number i=1, z1(1) and z2(1)" (in other words, zq(X) indicates "in z1(i) and z2(i), when symbol number i=X, z1(X) and z2(X)"). Note that this also applies to FIG. 46, FIG. 47, FIG. 48, FIG. 49, and FIG. 50.

As illustrated in FIG. 45, symbol zq(0) whose symbol number i=0 is arranged at time 0, symbol zq(1) whose symbol number i=1 is arranged at time 1, symbol zq(2) whose symbol number i=2 is arranged at time 2, symbol zq(3) whose symbol number i=3 is arranged at time 3, and so on. With this, symbols are arranged on the time axis for signal z1(i) and signal z2(i) (or signal z1'(i) and signal z2'(i)). However, FIG. 45 merely illustrates one example; the relationship between time and symbol number is not limited to this example.

Figure 46:
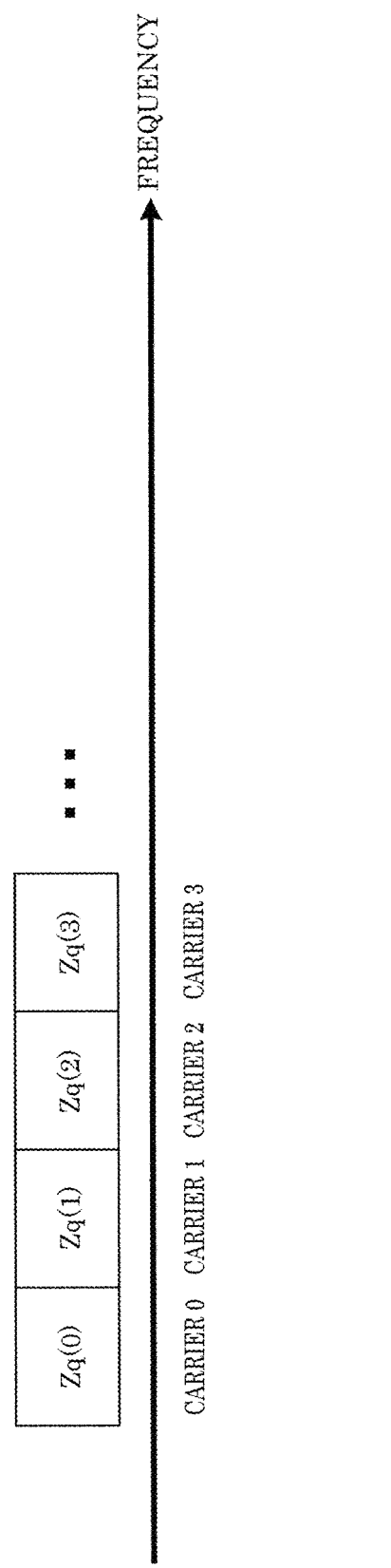
FIG. 46 illustrates one example of a symbol arrangement method with respect to the frequency axis of a signal.

FIG. 46 illustrates an example of a method of arranging symbols on the frequency axis for signal z1(i) and signal z2(i) (or signal z1'(i) and signal z2'(i)).

As illustrated in FIG. 46, symbol zq(0) whose symbol number i=0 is arranged at carrier 0, symbol zq(1) whose symbol number i=1 is arranged at carrier 1, symbol zq(2) whose symbol number i=2 is arranged at carrier 2, symbol zq(3) whose symbol number i=3 is arranged at carrier 3, and so on. With this, symbols are arranged on the frequency axis for signal z1(i) and signal z2(i) (or signal z1'(i) and signal z2'(i)). However, FIG. 46 merely illustrates one example; the relationship between frequency and symbol number is not limited to this example.

Figure 47:
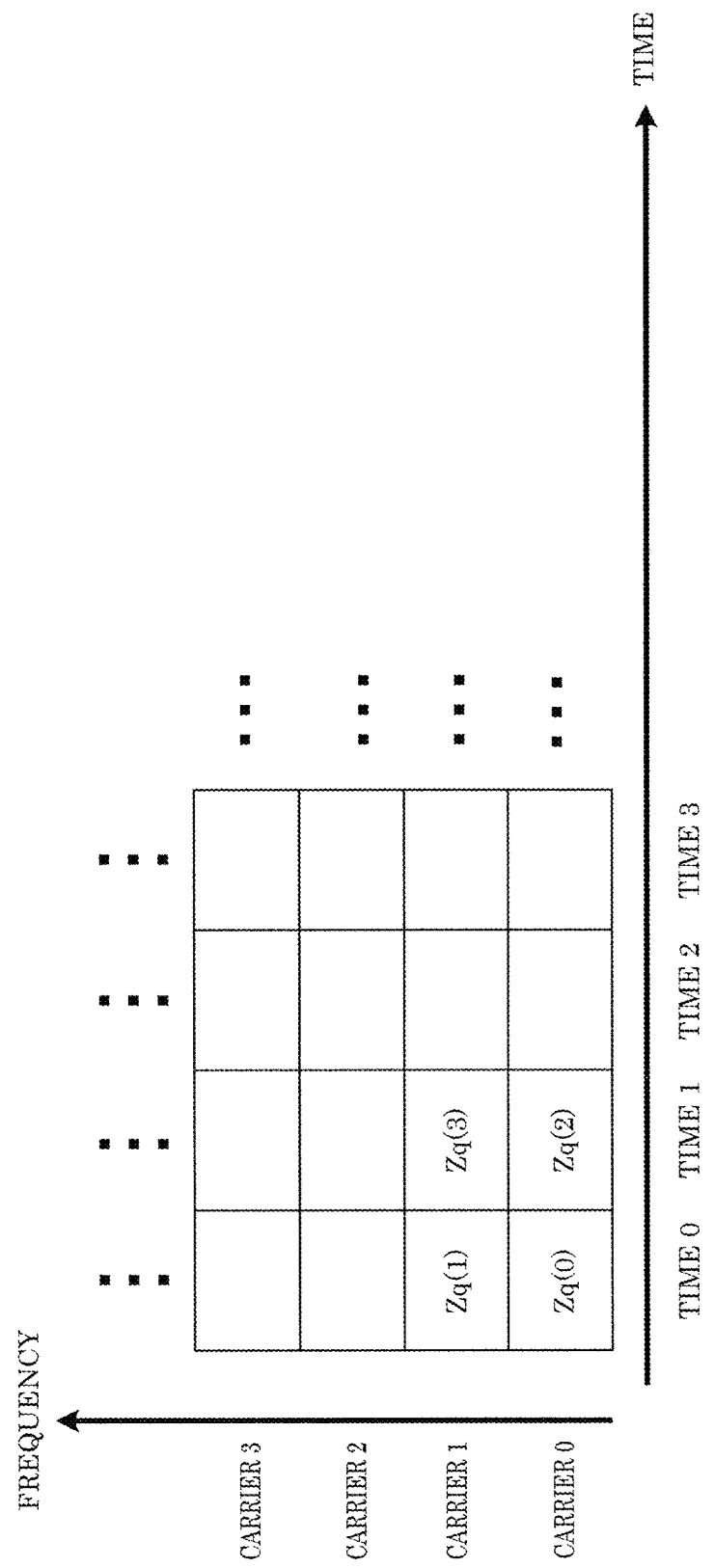
FIG. 47 illustrates one example of a symbol arrangement method with respect to the time and frequency axes of a signal.

FIG. 47 illustrates an example of a method of arranging symbols on the time and frequency axis for signal z1(i) and signal z2(i) (or signal z1'(i) and signal z2'(i)).

As illustrated in FIG. 47, symbol zq(0) whose symbol number i=0 is arranged at time 0 and carrier 0, symbol zq(1) whose symbol number i=1 is arranged at time 0 and carrier 1, symbol zq(2) whose symbol number i=2 is arranged at time 1 and carrier 0, symbol zq(3) whose symbol number i=3 is arranged at time 1 and carrier 1, and so on. With this, symbols are arranged on the time and frequency axis for signal z1(i) and signal z2(i) (or signal z1'(i) and signal z2'(i)). However, FIG. 47 merely illustrates one example; the relationship between time and frequency and symbol number is not limited to this example.

Figure 48:
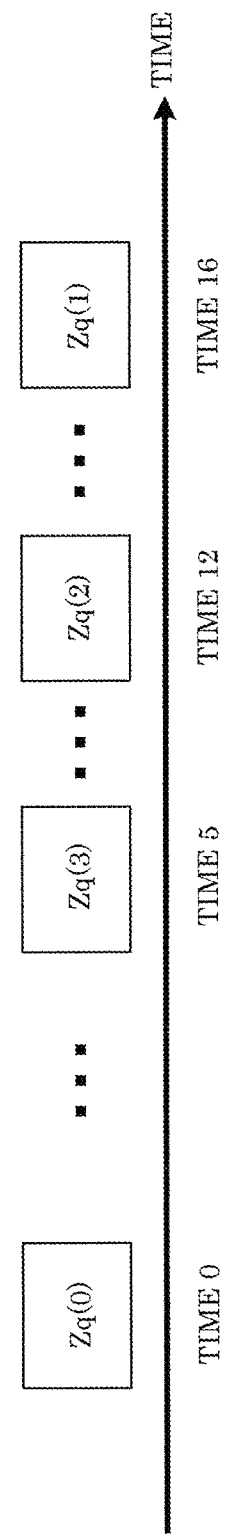
FIG. 48 illustrates a second example of a symbol arrangement method with respect to the time axis of a signal.

FIG. 48 illustrates a second example of an arrangement symbols on the time axis for signal z1(i) and signal z2(i) (or signal z1'(i) and signal z2'(i)).

As illustrated in FIG. 48, symbol zq(0) whose symbol number i=0 is arranged at time 0, symbol zq(1) whose symbol number i=1 is arranged at time 16, symbol zq(2) whose symbol number i=2 is arranged at time 12, symbol zq(3) whose symbol number i=3 is arranged at time 5, and so on. With this, symbols are arranged on the time axis for signal z1(i) and signal z2(i) (or signal z1'(i) and signal z2'(i)). However, FIG. 48 merely illustrates one example; the relationship between time and symbol number is not limited to this example.

Figure 49:
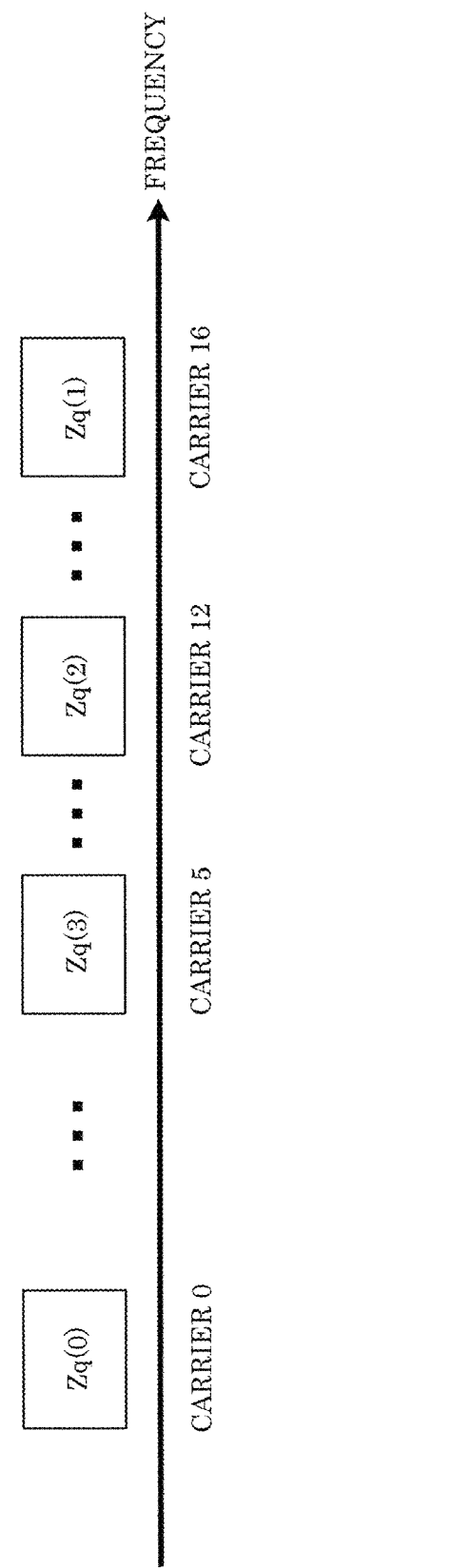
FIG. 49 illustrates a second example of a symbol arrangement method with respect to the frequency axis of a signal.

FIG. 49 illustrates a second example of an arrangement symbols on the frequency axis for signal z1(i) and signal z2(i) (or signal z1'(i) and signal z2'(i)).

As illustrated in FIG. 49, symbol zq(0) whose symbol number i=0 is arranged at carrier 0, symbol zq(1) whose symbol number i=1 is arranged at carrier 16, symbol zq(2) whose symbol number i=2 is arranged at carrier 12, symbol zq(3) whose symbol number i=3 is arranged at carrier 5, and so on. With this, symbols are arranged on the frequency axis for signal z1(i) and signal z2(i) (or signal z1'(i) and signal z2'(i)). However, FIG. 49 merely illustrates one example; the relationship between frequency and symbol number is not limited to this example.

Figure 50:
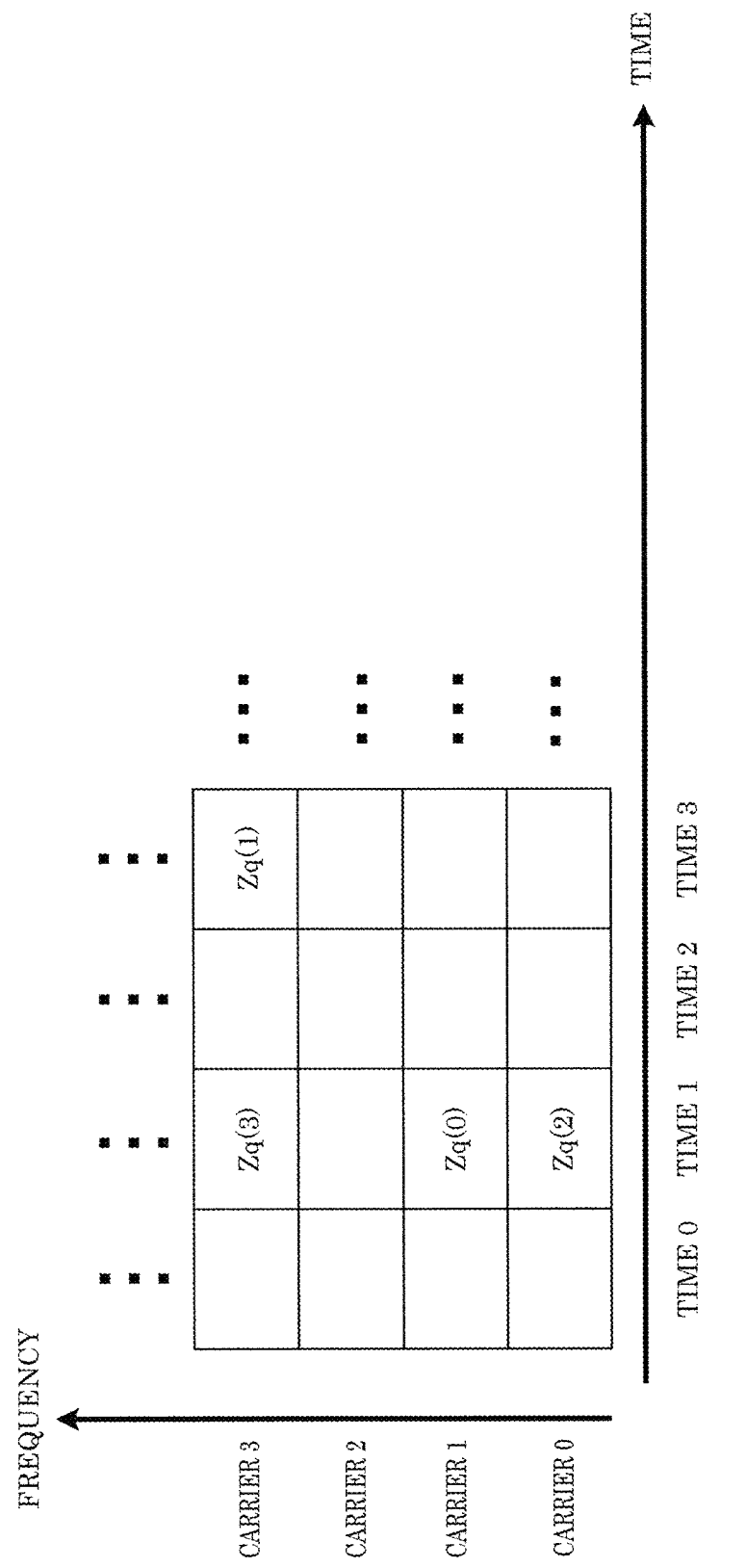
FIG. 50 illustrates one example of a symbol arrangement method with respect to the time and frequency axes of a signal.

FIG. 50 illustrates an example of an arrangement of symbols on the time and frequency axis for signal z1(i) and signal z2(i) (or signal z1'(i) and signal z2'(i)).

As illustrated in FIG. 50, symbol zq(0) whose symbol number i=0 is arranged at time 1 and carrier 1, symbol zq(1) whose symbol number i=1 is arranged at time 3 and carrier 3, symbol zq(2) whose symbol number i=2 is arranged at time 1 and carrier 0, symbol zq(3) whose symbol number i=3 is arranged at time 1 and carrier 3, and so on. With this, symbols are arranged on the time and frequency axis for signal z1(i) and signal z2(i) (or signal z1'(i) and signal z2'(i)). However, FIG. 50 merely illustrates one example; the relationship between time and frequency and symbol number is not limited to this example.

Moreover, in cases where a single-carrier scheme is used, after signal z1(i) and signal z2(i) (or signal z1'(i) and signal z2'(i)) are generated, symbols are arranged along the time axis. Accordingly, as described above, signal z1(i) and signal z2(i) (or signal z1'(i) and signal z2'(i)) are generated, symbols are arranged along the time axis, such as illustrated in FIG. 45 and FIG. 48. However, FIG. 45 and FIG. 48 merely illustrate examples; the relationship between time and symbol number is not limited to these examples.

Moreover, various frame configurations are described in the present specification. The modulated signals having a frame configuration described in the present specification are transmitted by a base station or AP using a multi-carrier scheme such as OFDM. Here, when a terminal communicating with the base station (AP) transmits a modulated signal, the modulated signal to be transmitted by the terminal is preferably a single-carrier scheme modulated signal (as a result of the base station or AP using the OFDM scheme, it is possible to concurrently transmit a data symbol group to a plurality of terminals; moreover, as a result of the terminal using a single-carrier scheme, power consumption can be reduced).

Using part of a frequency band used by the modulated signal transmitted by the base station or AP, the terminal may implement a time division duplex (TDD) scheme for modulation scheme transmission.

In the present specification, phase changer 205A and/or phase changer 205B are described as implementing a phase change.

Here, when the phase change cycle of phase changer 205A is expressed as NA, and NA is an integer that is greater than or equal to 3, that is to say, the number of transmission streams or the number of modulated signals is an integer greater than 2, there is a high probability that the reception device in the communication partner can achieve a beneficial data reception quality.

Similarly, when the phase change cycle of phase changer 205B is expressed as NB, and NB is an integer that is greater than or equal to 3, that is to say, the number of transmission streams or the number of modulated signals is an integer greater than 2, there is a high probability that the reception device in the communication partner can achieve a beneficial data reception quality.

As a matter of course, the embodiments may be carried out by combining a plurality of the exemplary embodiments and other contents described in the present specification.

Embodiment A8

In this embodiment, an operational example of a communications device based on the operations described in, for example, Embodiment 7 and Supplemental Information 1, will be given.

First Example

Figure 51:
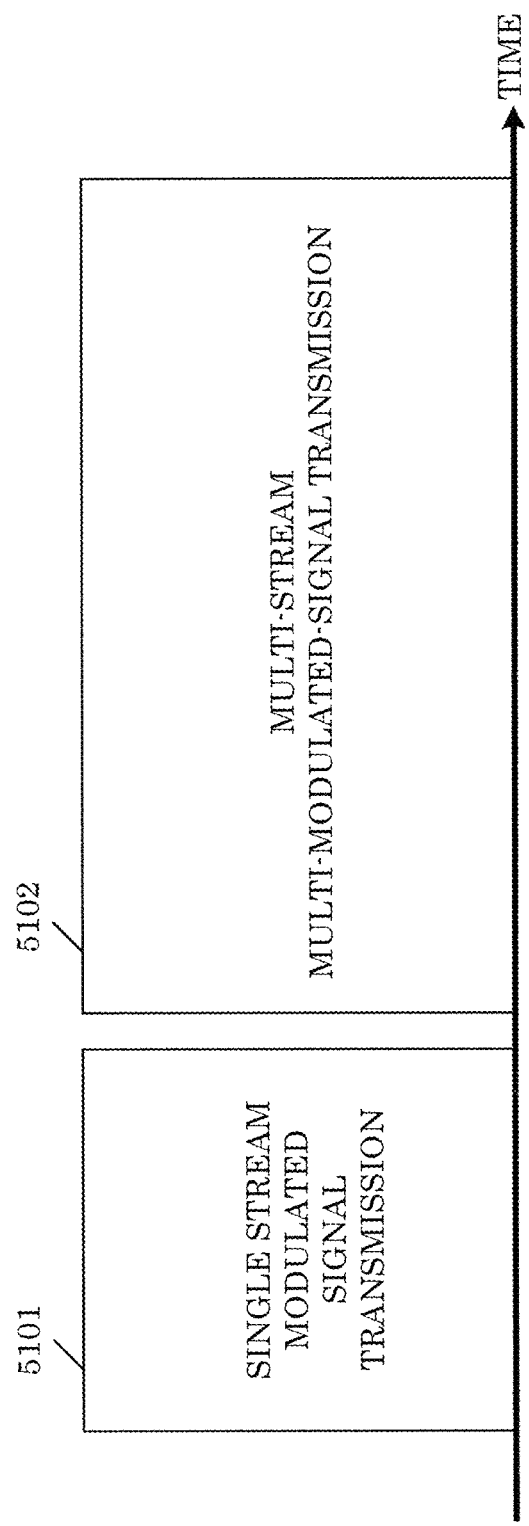
FIG. 51 illustrates one example of a frame configuration of a modulated signal transmitted by a base station or AP.

FIG. 51 illustrates one example of a configuration of a modulated signal transmitted by a base station or AP according to this embodiment.

In FIG. 51, time is represented on the horizontal axis. As illustrated in FIG. 51, the transmission device in the base station or AP performs "single stream modulated signal transmission 5101" and subsequently performs "multi-stream multi-modulated-signal transmission 5102".

Figure 52:
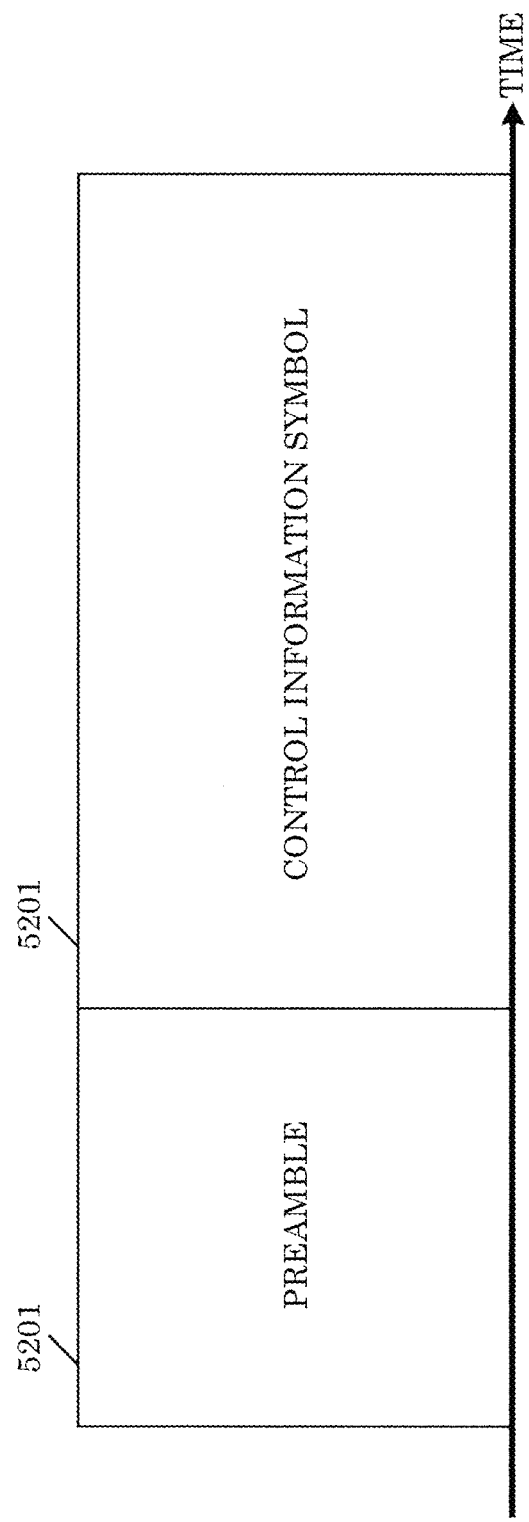
FIG. 52 illustrates one example of a frame configuration when single stream modulated signal transmission 5101 in FIG. 51 is performed.

FIG. 52 illustrates one example of a frame configuration when single stream modulated signal transmission 5101 in FIG. 51 is performed.

In FIG. 52, time is represented on the horizontal axis. As illustrated in FIG. 52, the base station or AP transmits preamble 5201 and subsequently transmits control information symbol 5201.

Note that preamble 5201 conceivably includes a symbol for the terminal, which is the communication partner of the base station or AP, to perform signal detection, time synchronization, frequency synchronization, frequency offset estimation, channel estimation, and/or frame synchronization. For example, preamble 5201 is conceivably a PSK (phase shift keying) scheme symbol.

Control information symbol 5201 is a symbol including, for example, information relating to the communications method of the modulated signal transmitted by the base station and AP and/or information required by the terminal to demodulate a data symbol. However, the information included in control information symbol 5202 is not limited to this example; control information symbol 5202 may include data (a data symbol), and may include other control information.

Moreover, the configuration of the symbols included in the single stream modulated signal is not limited to the example illustrated in FIG. 52, and the symbols included in the single stream modulated signal are not limited to the example illustrated in FIG. 52.

Figure 53:
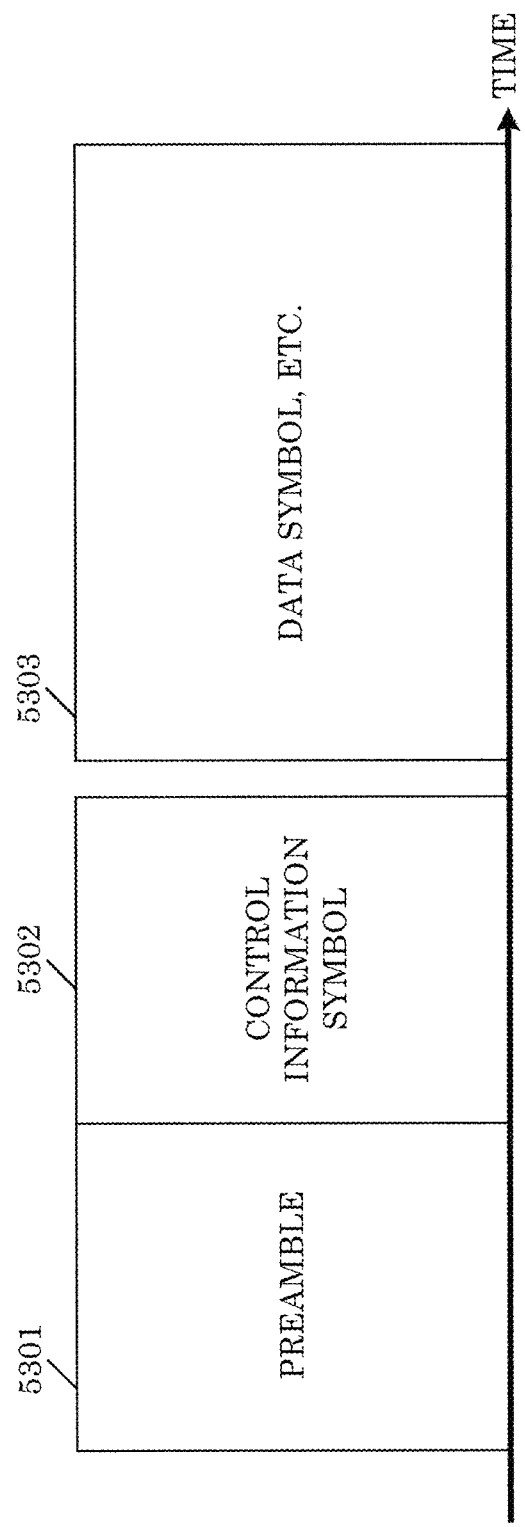
FIG. 53 illustrates one example of a frame configuration when multi-stream multi-modulated-signal transmission 5102 in FIG. 51 is performed.

FIG. 53 illustrates one example of a frame configuration when multi-stream multi-modulated-signal transmission 5102 in FIG. 51 is performed.

In FIG. 53, time is represented on the horizontal axis. As illustrated in FIG. 53, the base station or AP transmits preamble 5301, subsequently transmits control information symbol 5302, and subsequently transmits, for example, data symbol 5303.

Note that regarding at least data symbols, a plurality of modulated signals for a plurality of streams are transmitted at the same time and at the same frequency. Note that preamble 5301 conceivably includes a symbol for the terminal, which is the communication partner of the base station or AP, to perform signal detection, time synchronization, frequency synchronization, frequency offset estimation, channel estimation, and/or frame synchronization. For example, preamble 5301 is conceivably a PSK scheme symbol. Moreover, as a result of a symbol for channel estimation being transmitted from a plurality of antennas, demodulation of a data symbol included in, for example, data symbol 5303 becomes possible.

Control information symbol 5302 is a symbol including, for example, information relating to the communications method of the modulated signal transmitted by the base station and AP and/or information required by the terminal to demodulate a data symbol. However, the information included in control information symbol 5302 is not limited to this example; control information symbol 5302 may include data (a data symbol), and may include other control information.

Moreover, the symbols included in the plurality of modulated signals for plurality of streams are not limited to the example illustrated in FIG. 53. Note that hereinafter, the scheme used for "single stream modulated signal transmission 5101" in FIG. 51 may be a single-carrier scheme, and the scheme used for "multi-stream multi-modulated-signal transmission 5102" in FIG. 51 may be a single-carrier scheme or a multi-carrier scheme. Note that in the following description, the multi-carrier scheme is exemplified as the OFDM scheme (however, note that the multi-carrier scheme used is not limited to the OFDM scheme).

One characteristic of this embodiment is that CDD(CSD) as described in Supplemental Information 1 is implemented upon performing single stream modulated signal transmission 5101 using a single-carrier scheme in FIG. 51.

Then, upon performing multi-stream multi-modulated-signal transmission 5102 in FIG. 51, phase change is switched between implementation and non-implementation.

Next, operations performed by the transmission device in the base station will be described with reference to FIG. 54.

Figure 54:
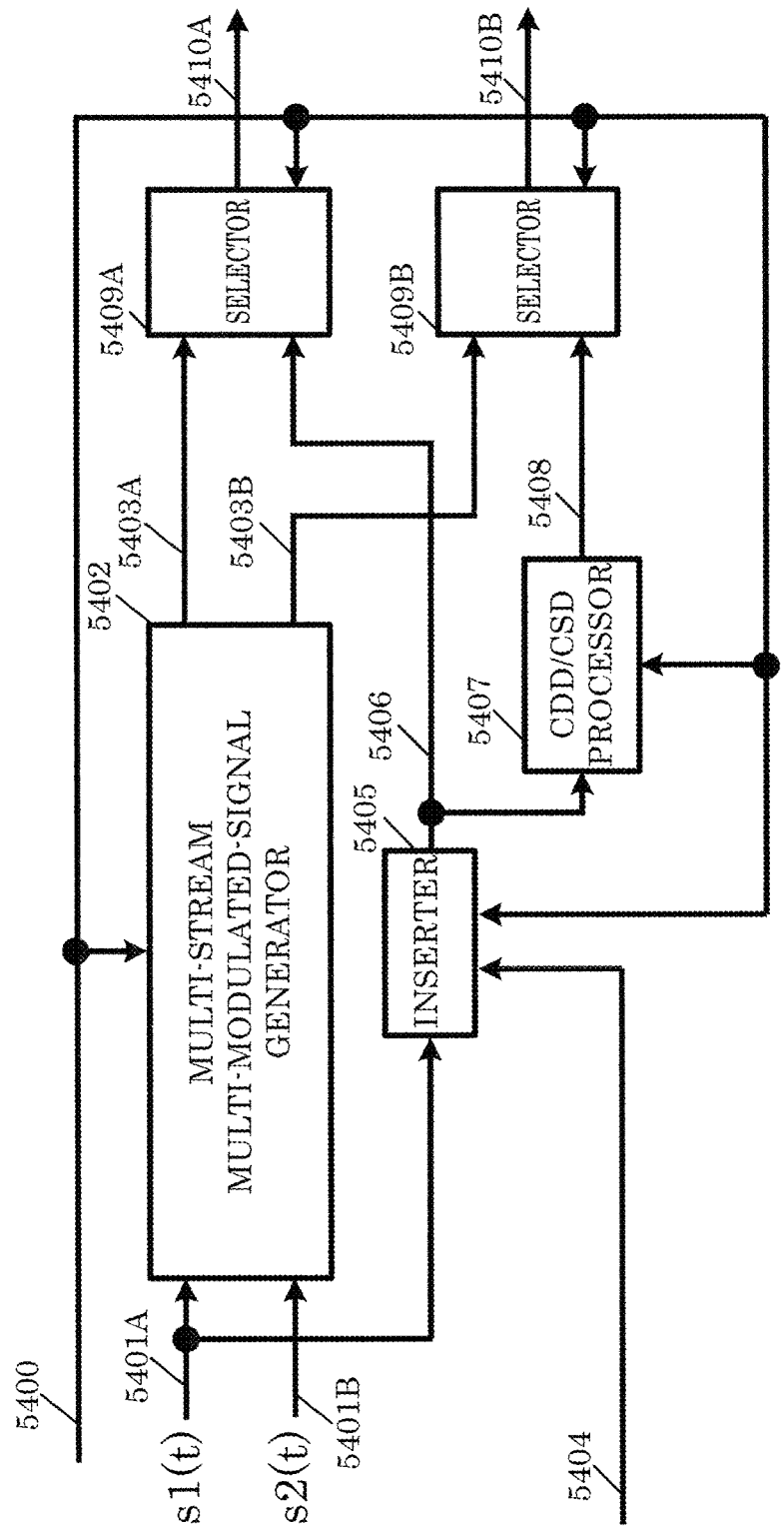
FIG. 54 illustrates one example of a configuration of a signal processor in a transmission device included in a base station.

FIG. 54 illustrates one example of a configuration of signal processor 106 in, for example, the transmission device in the base station illustrated in FIG. 1 or FIG. 44.

Multi-stream multi-modulated-signal generator 5402 has the configuration illustrated in, for example, FIG. 2, FIG. 18, FIG. 19, FIG. 20, FIG. 21, FIG. 22, FIG. 28, FIG. 29, FIG. 30, FIG. 31, FIG. 32, or FIG. 33. Multi-stream multi-modulated-signal generator 5402 receives inputs of mapped signal 5401A (s1(t)), mapped signal 5401B (s2(t)), and control signal 5400. Here, mapped signal 5401A (s1(t)) corresponds to mapped signal 201A, mapped signal 5401B (s2(t)) corresponds to mapped signal 201B, and control signal 5400 corresponds to control signal 200. Multi-stream multi-modulated-signal generator 5402 performs processing described with reference to, for example, FIG. 2, FIG. 18, FIG. 19, FIG. 20, FIG. 21, FIG. 22, FIG. 28, FIG. 29, FIG. 30, FIG. 31, FIG. 32, and FIG. 33, and outputs signals 5403A, 5403B.

Note that signal 5403A corresponds to 208A in FIG. 2, and 5403B corresponds to 210B in FIG. 2. Signal 5403A corresponds to 210A in FIG. 18, and 5403B corresponds to 208B in FIG. 18. Signal 5403A corresponds to 210A in FIG. 19, and 5403B corresponds to 210B in FIG. 19. Signal 5403A corresponds to 208A in FIG. 20, and 5403B corresponds to 210B in FIG. 20. Signal 5403A corresponds to 210A in FIG. 21, and 5403B corresponds to 208B in FIG. 21. Signal 5403A corresponds to 210A in FIG. 22, and 5403B corresponds to 210B in FIG. 22. Signal 5403A corresponds to 208A in FIG. 28, and 5403B corresponds to 210B in FIG. 28. Signal 5403A corresponds to 210A in FIG. 29, and 5403B corresponds to 208B in FIG. 29. Signal 5403A corresponds to 210A in FIG. 30, and 5403B corresponds to 210B in FIG. 30. Signal 5403A corresponds to 208A in FIG. 31, and 5403B corresponds to 210B in FIG. 31. Signal 5403A corresponds to 210A in FIG. 32, and 5403B corresponds to 208B in FIG. 32. Signal 5403A corresponds to 208A in FIG. 33, and 5403B corresponds to 210B in FIG. 33.

Then, based on information included in control signal 200 relating to whether it is time to perform single stream modulated signal transmission or time to perform multi-stream multi-modulated-signal transmission, when multi-stream multi-modulated-signal generator 5402 determines that it is time to perform multi-stream multi-modulated-signal transmission, each signal processor operates, and signals 5403A, 5403B are generated and output.

Inserter 5405 receives inputs of mapped signal 5401A, preamble and control symbol signal 5404, and control signal 5400, and based on information included in control signal 5400 relating to whether it is time to perform single stream modulated signal transmission or time to perform multi-stream multi-modulated-signal transmission, when inserter 5405 determines that it is time to perform single stream modulated signal transmission, for example, inserter 5405 generates and outputs (single-carrier scheme) signal 5406 in accordance with the frame configuration illustrated in FIG. 52, based on mapped signal 5401A and preamble and control symbol signal 5404.

Note that in FIG. 54, inserter 5405 is illustrated as receiving an input of mapped signal 5401A, but when generating a signal in accordance with the frame configuration illustrated in FIG. 52, mapped signal 5401A is not used.

CDD (CSD) processor 5407 receives inputs of (single-carrier scheme) signal 5406 in accordance with the frame configuration and control signal 5400, and when control signal 5400 indicates that it is time to perform single stream modulated signal transmission, performs CDD(CSD) processing on (single-carrier scheme) signal 5406 in accordance with the frame configuration and outputs CDD (CSD) processed signal 5408 in accordance with the frame configuration.

Selector 5409A receives inputs of signal 5403A, signal 5406 in accordance with the frame configuration, and control signal 5400, and based on control signal 5400, selects either signal 5403A or signal 5406 in accordance with frame configuration, and outputs selected signal 5410A.

For example, in single stream modulated signal transmission 5101 in FIG. 51, selector 5409A outputs signal 5406 in accordance with the frame configuration as selected signal 5410A, and in multi-stream multi-modulated-signal transmission 5102 in FIG. 51, selector 5409A outputs signal 5403A as selected signal 5410A.

Selector 5409B receives inputs of signal 5403B, CDD (CSD) processed signal 5408 in accordance with the frame configuration, and control signal 5400, and based on control signal 5400, selects either signal 5403B or CDD (CSD) processed signal 5408 in accordance with the frame configuration, and outputs selected signal 5410B.

For example, in single stream modulated signal transmission 5101 in FIG. 51, selector 5409B outputs CDD (CSD) processed signal 5408 in accordance with the frame configuration as selected signal 5410B, and in multi-stream multi-modulated-signal transmission 5102 in FIG. 51, selector 5409B outputs signal 5403B as selected signal 5410B.

Note that selected signal 5410A corresponds to processed signal 106_A in FIG. 1, FIG. 44, and selected signal 5410B corresponds to processed signal 106_B in FIG. 1, FIG. 44.

Figure 55:
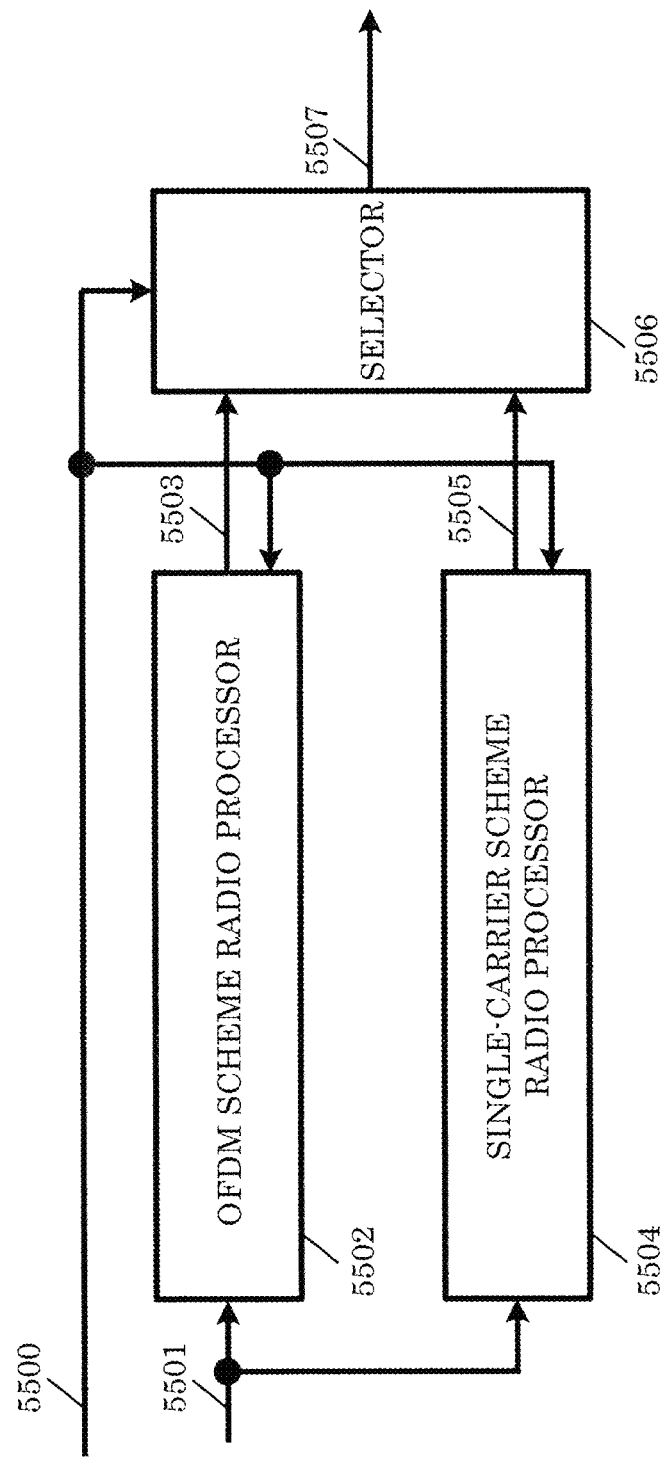
FIG. 55 illustrates one example of a configuration of a radio unit.

FIG. 55 illustrates one example of a configuration of radio units 107_A, 107_B in FIG. 1, FIG. 44.

OFDM scheme radio unit 5502 receives inputs of processed signal 5501 and control signal 5500, and when information included in control signal 5500 relating to whether either OFDM scheme or single-carrier scheme has been selected indicates that OFDM scheme has been selected, processes processed signal 5501 and outputs OFDM scheme modulated signal 5503.

Note that OFDM is presented as an example, but another multi-carrier scheme may be used.

Single-carrier scheme radio unit 5504 receives inputs of processed signal 5501 and control signal 5500, and when information included in control signal 5500 relating to whether either OFDM scheme or single-carrier scheme has been selected indicates that single-carrier scheme has been selected, processes processed signal 5501 and outputs single-carrier scheme modulated signal 5505.

Selector 5506 receives inputs of OFDM scheme modulated signal 5503, single-carrier scheme modulated signal 5505, and control signal 5500, and when information included in control signal 5500 relating to whether either OFDM scheme or single-carrier scheme has been selected indicates that OFDM scheme has been selected, outputs OFDM scheme modulated signal 5503 as selected signal 5507, and when information included in control signal 5500 relating to whether either OFDM scheme or single-carrier scheme has been selected indicates that single-carrier scheme has been selected, outputs single-carrier scheme modulated signal 5505 as selected signal 5507.

Note that when radio unit 107_A has the configuration illustrated in FIG. 55, processed signal 5501 corresponds to signal 106_A, control signal 5500 corresponds to control signal 100, and selected signal 5507 corresponds to 108_A. Moreover, when radio unit 107_B has the configuration illustrated in FIG. 55, processed signal 5501 corresponds to signal 106_B, control signal 5500 corresponds to control signal 100, and selected signal 5507 corresponds to 108_B.

Hereinafter, the operations described above will be described further with reference to the description of Embodiment 7.

Example 1-1

In FIG. 51, in "multi-stream multi-modulated-signal transmission 5102", CDD (CSD) processing is not performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18. FIG. 19, FIG. 20, FIG. 21. FIG. 22, FIG. 28, FIG. 29, FIG. 30, FIG. 31, FIG. 32, or FIG. 33 do not implement a phase change. Accordingly, control information (u11) for (controlling ON/OFF of) cyclic delay diversity (CDD (CSD)) described in Embodiment 7 is ignored in "multi-stream multi-modulated-signal transmission 5102". Note that in such cases, phase changer 209A and/or 209B need not be included in multi-stream multi-modulated-signal generator 5402 illustrated in FIG. 54.

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD)) processing is always performed. In such cases, control information (u11) for (controlling ON/OFF of) cyclic delay diversity (CDD (CSD)) described in Embodiment 7 is not necessary.

Example 1-2

In FIG. 51, in "multi-stream multi-modulated-signal transmission 5102", CDD (CSD) processing is not performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly, control information (u11) for (controlling ON/OFF of cyclic delay diversity (CDD (CSD)) described in Embodiment 7 is ignored in "multi-stream multi-modulated-signal transmission 5102". Note that in such cases, phase changer 209A and/or 209B need not be included in multi-stream multi-modulated-signal generator 5402 illustrated in FIG. 54.

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Example 1-3

In FIG. 51, in "multi-stream multi-modulated-signal transmission 5102", CDD (CSD) processing is performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD (CSD) processing. Accordingly, control information (u11) for (controlling ON/OFF of) cyclic delay diversity (CDD (CSD)) described in Embodiment 7 is ignored in "multi-stream multi-modulated-signal transmission 5102".

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD)) processing is always performed. In such cases, control information (u11) for (controlling ON/OFF of) cyclic delay diversity (CDD (CSD)) described in Embodiment 7 is not necessary.

Example 1-4

In FIG. 51, in "multi-stream multi-modulated-signal transmission 5102", CDD (CSD) processing is performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD (CSD) processing. Accordingly, control information (u11) for (controlling ON/OFF of) cyclic delay diversity (CDD (CSD)) described in Embodiment 7 is ignored in "multi-stream multi-modulated-signal transmission 5102".

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31. FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Example 1-5

In FIG. 51, in "multi-stream multi-modulated-signal transmission 5102", whether CDD (CSD) processing is performed or not is selectable, and in "multi-stream multi-modulated-signal transmission 5102", a single-carrier scheme or OFDM scheme can be selected.

Accordingly, based on control information (u11) for (controlling ON/OFF of cyclic delay diversity (CDD (CSD)) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD (CSD) or (ii) do not implement a phase change or do not perform CDD (CSD).

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD))

processing is always performed. In such cases, control information (u11) for (controlling ON/OFF of) cyclic delay diversity (CDD (CSD)) described in Embodiment 7 is not necessary.

Example 1-6

In FIG. 51, in "multi-stream multi-modulated-signal transmission 5102", whether CDD (CSD) processing is performed or not is selectable, and in "multi-stream multi-modulated-signal transmission 5102", a single-carrier scheme or OFDM scheme can be selected.

Accordingly, based on control information (u11) for (controlling ON/OFF of cyclic delay diversity (CDD (CSD)) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD (CSD) or (ii) do not implement a phase change or do not perform CDD (CSD).

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2. FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Second Example

FIG. 51 illustrates one example of a configuration of a modulated signal transmitted by a base station or AP according to this embodiment. As FIG. 51 has already been described, repeated description will be omitted.

FIG. 52 illustrates one example of a frame configuration when single stream modulated signal transmission 5101 in FIG. 51 is performed. As FIG. 52 has already been described, repeated description will be omitted.

FIG. 53 illustrates one example of a frame configuration when multi-stream multi-modulated-signal transmission 5102 in FIG. 51 is performed. As FIG. 53 has already been described, repeated description will be omitted.

Note that hereinafter, the scheme used for "single stream modulated signal transmission 5101" in FIG. 51 may be a single-carrier scheme, and the scheme used for "multi-stream multi-modulated-signal transmission 5102" in FIG. 51 may be a single-carrier scheme or a multi-carrier scheme. Note that in the following description, the multi-carrier scheme is exemplified as the OFDM scheme (however, note that the multi-carrier scheme used is not limited to the OFDM scheme).

One characteristic of this embodiment is that CDD(CSD) as described in Supplemental Information 1 is implemented upon performing single stream modulated signal transmission 5101 using a single-carrier scheme in FIG. 51.

Then, upon performing multi-stream multi-modulated-signal transmission 5102 in FIG. 51, phase change is switched between implementation and non-implementation.

Next, operations performed by the transmission device in the base station will be described with reference to FIG. 56.

Figure 56:
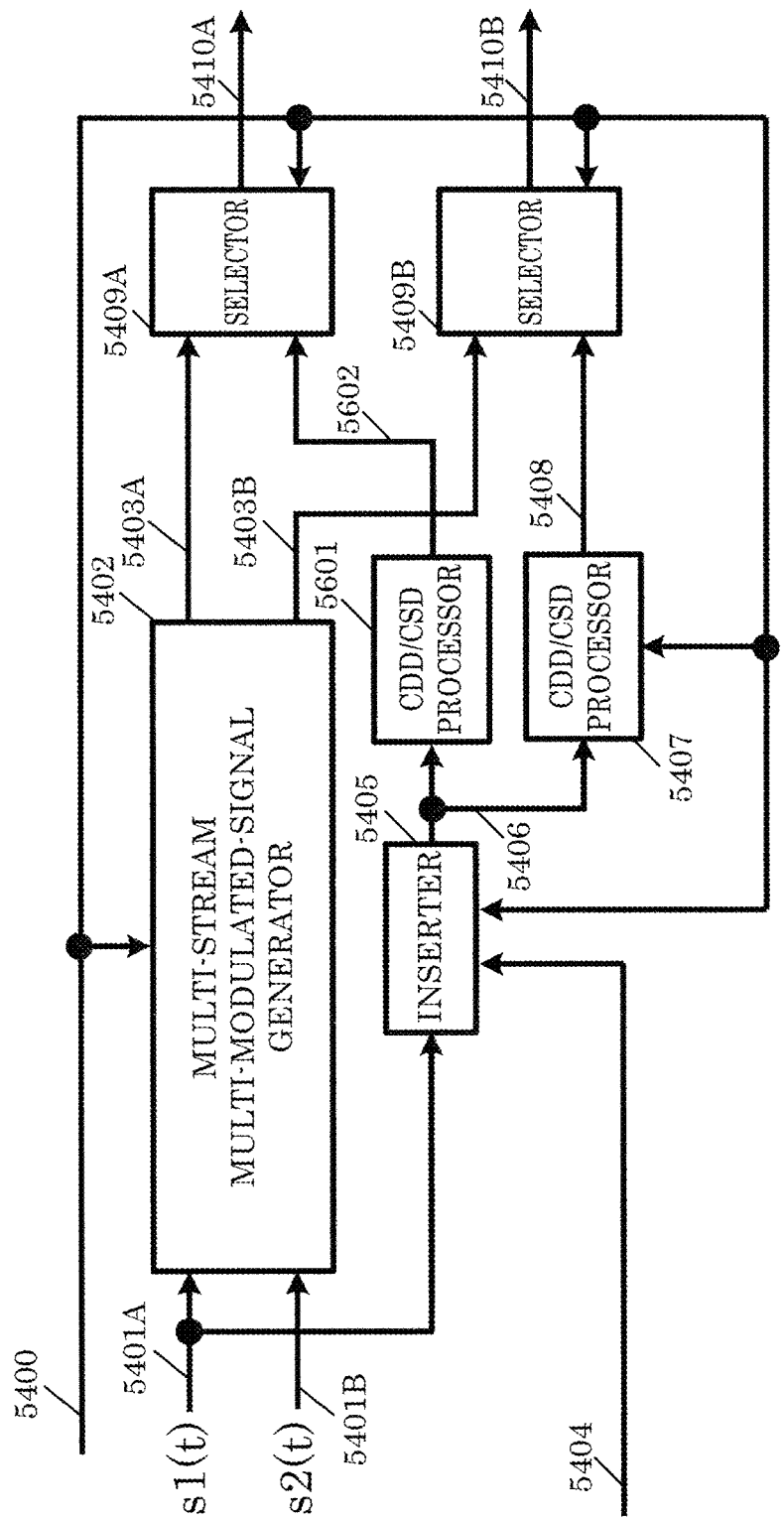
FIG. 56 illustrates one example of a configuration of a signal processor in a transmission device in a base station.

FIG. 56 illustrates one example of a configuration of signal processor 106 in, for example, the transmission device in the base station illustrated in FIG. 1 or FIG. 44. In FIG. 56, components that operate the same as in FIG. 54 share like reference marks. Accordingly, repeated description will be omitted.

CDD (CSD) processor 5601 receives inputs of (single-carrier scheme) signal 5406 in accordance with the frame configuration and control signal 5400, and when control signal 5400 indicates that it is time to perform single stream modulated signal transmission, performs CDD(CSD) processing on (single-carrier scheme) signal 5406 in accordance with the frame configuration and outputs CDD (CSD) processed signal 5602 in accordance with the frame configuration.

Selector 5409A receives inputs of signal 5403A, CDD (CSD) processed signal 5602 in accordance with the frame configuration, and control signal 5400, and based on control signal 5400, selects either signal 5403A or CDD (CSD) processed signal 5602 in accordance with the frame configuration in accordance with frame configuration, and outputs selected signal 5410A.

For example, in single stream modulated signal transmission 5101 in FIG. 51, selector 5409A outputs CDD (CSD) processed signal 5602 in accordance with the frame configuration as selected signal 5410A, and in multi-stream multi-modulated-signal transmission 5102 in FIG. 51, selector 5409A outputs signal 5403A as selected signal 5410A.

FIG. 55 illustrates one example of a configuration of radio units 107_A, 107_B in FIG. 1, FIG. 44. As FIG. 55 has already been described, repeated description will be omitted Example 2-1

In FIG. 51, in "multi-stream multi-modulated-signal transmission 5102", CDD (CSD) processing is not performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly, control information (u11) for (controlling ON/OFF of) cyclic delay diversity (CDD (CSD)) described in Embodiment 7 is ignored in "multi-stream multi-modulated-signal transmission 5102". Note that in such cases, phase changer 209A and/or 209B need not be included in multi-stream multi-modulated-signal generator 5402 illustrated in FIG. 56

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG.

31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD)) processing is always performed. In such cases, control information (u11) for (controlling ON/OFF of) cyclic delay diversity (CDD (CSD)) described in Embodiment 7 is not necessary.

Example 2-2

In FIG. 51, in "multi-stream multi-modulated-signal transmission 5102", CDD (CSD) processing is not performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly, control information (u11) for (controlling ON/OFF of) cyclic delay diversity (CDD (CSD)) described in Embodiment 7 is ignored in "multi-stream multi-modulated-signal transmission 5102". Note that in such cases, phase changer 209A and/or 209B need not be included in multi-stream multi-modulated-signal generator 5402 illustrated in FIG. 54.

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Example 2-3

In FIG. 51, in "multi-stream multi-modulated-signal transmission 5102", CDD (CSD) processing is performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD (CSD) processing. Accordingly, control information (u11) for (controlling ON/OFF of) cyclic delay diversity (CDD (CSD)) described in Embodiment 7 is ignored in "multi-stream multi-modulated-signal transmission 5102".

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD)) processing is always performed. In such cases, control information (u11) for (controlling ON/OFF of) cyclic delay diversity (CDD (CSD)) described in Embodiment 7 is not necessary.

Example 2-4

In FIG. 51, in "multi-stream multi-modulated-signal transmission 5102", CDD (CSD) processing is performed, and in "multi-stream multi-modulated-signal transmission 5102", a single-carrier scheme or OFDM scheme can be selected.

Accordingly, for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD (CSD) processing. Accordingly, control information (u11) for (controlling ON/OFF of) cyclic delay diversity (CDD (CSD)) described in Embodiment 7 is ignored in "multi-stream multi-modulated-signal transmission 5102".

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Example 2-5

In FIG. 51, in "multi-stream multi-modulated-signal transmission 5102", whether CDD (CSD) processing is performed or not is selectable, and in "multi-stream multi-modulated-signal transmission 5102", a single-carrier scheme or OFDM scheme can be selected.

Accordingly, based on control information (u11) for (controlling ON/OFF of) cyclic delay diversity (CDD (CSD)) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD (CSD) or (ii) do not implement a phase change or do not perform CDD (CSD).

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in FIG. 51, in "single stream modulated signal transmission 5101", cyclic delay diversity (CDD (CSD)) processing is always performed. In such cases, control information (u11) for (controlling ON/OFF of) cyclic delay diversity (CDD (CSD)) described in Embodiment 7 is not necessary.

Example 2-6

In FIG. 51, in "multi-stream multi-modulated-signal transmission 5102", whether CDD (CSD) processing is performed or not is selectable, and in "multi-stream multi-modulated-signal transmission 5102", a single-carrier scheme or OFDM scheme can be selected.

Accordingly, based on control information (u11) for (controlling ON/OFF of) cyclic delay diversity (CDD (CSD)) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD (CSD) or (ii) do not implement a phase change or do not perform CDD (CSD).

In "multi-stream multi-modulated-signal transmission 5102", the switching between ON/OFF of operation for (cyclically/regularly) changing the phase change value on a per-symbol basis is possible. Accordingly, phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for (cyclically/regularly) changing the phase change value on a per-symbol basis described in Embodiment 7.

Moreover, in "single stream modulated signal transmission", cyclic delay diversity (CDD (CSD)) processing is controlled via control information (u11) for (controlling ON/OFF of) cyclic delay diversity (CDD (CSD)) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for (controlling ON/OFF of) cyclic delay diversity (CDD (CSD)) indicates "ON", and in "single stream modulated signal transmission 5101" in FIG. 51, CDD (CSD) processing is performed.

Third Example

Figure 57:
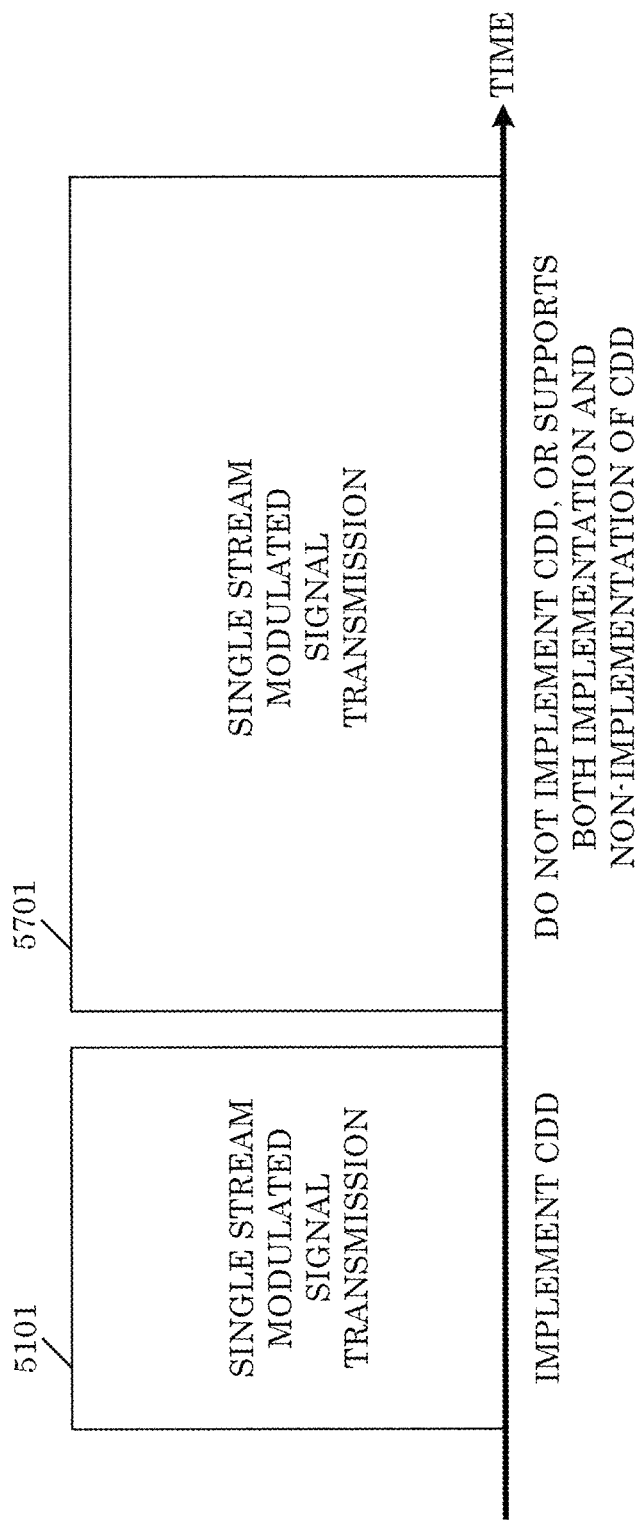
FIG. 57 illustrates one example of a frame configuration of a modulated signal transmitted by a base station or AP.

FIG. 57 illustrates one example of a configuration of a modulated signal transmitted by a base station or AP according to this embodiment.

In FIG. 57, time is represented on the horizontal axis. Operations that are the same as in FIG. 51 share like reference marks. As illustrated in FIG. 57, the transmission device in the base station or AP performs "single stream modulated signal transmission 5101" and subsequently performs "single stream modulated signal transmission 5701" again.

FIG. 52 illustrates one example of a frame configuration when single stream modulated signal transmission 5101 in FIG. 57 is performed. As FIG. 52 has already been described, repeated description will be omitted.

Figure 58:
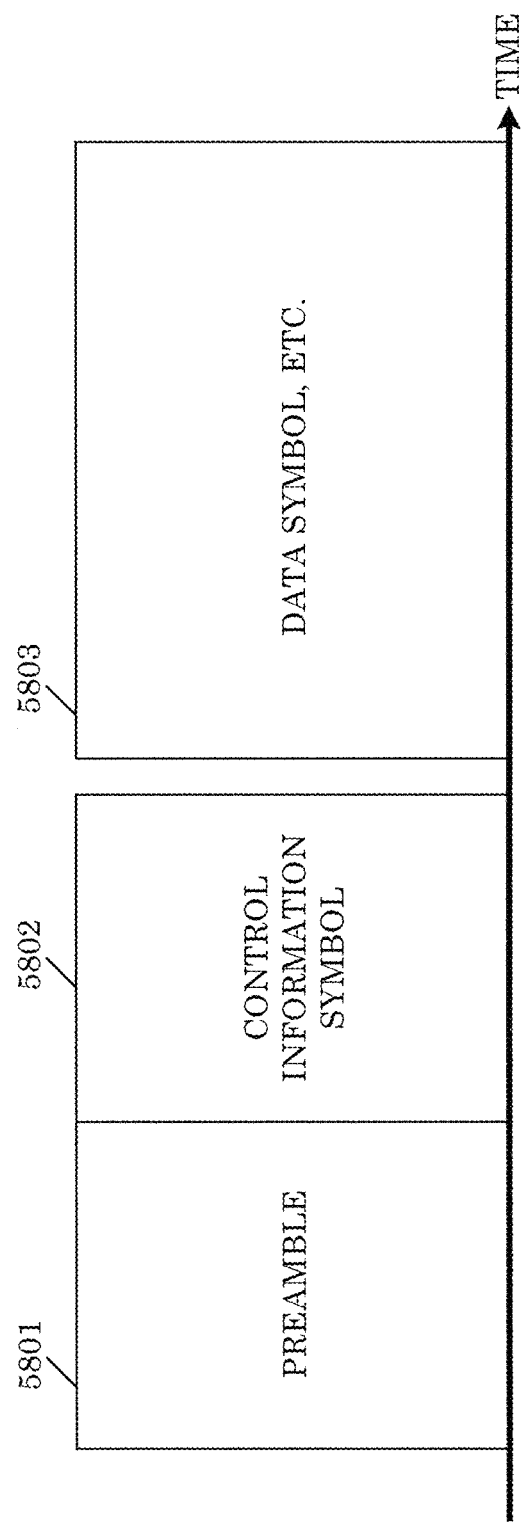
FIG. 58 illustrates one example of a frame configuration when single stream modulated signal transmission 5701 in FIG. 57 is performed.

FIG. 58 illustrates one example of a frame configuration when single stream modulated signal transmission 5701 in FIG. 57 is performed.

In FIG. 58, time is represented on the horizontal axis. As illustrated in FIG. 58, the base station or AP transmits preamble 5801, subsequently transmits control information symbol 5802, and subsequently transmits, for example, data symbol 5803. Note that preamble 5801, control information symbol, 5802, and, for example, data symbol 5803 are each transmitted via a single stream.

Preamble 5801 conceivably includes a symbol for the terminal, which is the communication partner of the base station or AP, to perform signal detection, time synchronization, frequency synchronization, frequency offset estimation, channel estimation, and/or frame synchronization. For example, preamble 5801 is conceivably a PSK scheme symbol.

Control information symbol 5802 is a symbol including, for example, information relating to the communications method of the modulated signal transmitted by the base station and AP and/or information required by the terminal to demodulate a data symbol. However, the information included in control information symbol 5802 is not limited to this example; control information symbol 5802 may include other control information.

Note that hereinafter, the scheme used for "single stream modulated signal transmission 5101" in FIG. 57 may be a single-carrier scheme, and the scheme used for "single stream modulated signal transmission 5701" in FIG. 57 may be a single-carrier scheme or a multi-carrier scheme. Note that in the following description, the multi-carrier scheme is exemplified as the OFDM scheme (however, note that the multi-carrier scheme used is not limited to the OFDM scheme).

One characteristic of this embodiment is that CDD(CSD) as described in Supplemental Information 1 is implemented upon performing single stream modulated signal transmission 5101 using a single-carrier scheme in FIG. 51.

Example 3-1

In FIG. 57, in "single stream modulated signal transmission 5701", CDD (CSD) processing is not performed, and in "single stream modulated signal transmission 5701", a single-carrier scheme or OFDM scheme can be selected.

When "single stream modulated signal transmission 5701" is performed, it is possible to select "multi-stream multi-modulated-signal transmission" instead of "single stream modulated signal transmission". Note that since "multi-stream multi-modulated-signal transmission" has already been described, repeated description will be omitted.

Next, operations performed by the transmission device in the base station will be described with reference to FIG. 54.

FIG. 54 illustrates one example of a configuration of signal processor 106 in, for example, the transmission device in the base station illustrated in FIG. 1 or FIG. 44. As the general operations illustrated in FIG. 54 have already been described, repeated description will be omitted.

In this example, the characteristic feature is that, in FIG. 57, when "single stream modulated signal transmission 5101" is performed, CDD (CSD) processing is performed, and when "single stream modulated signal transmission 5701" is performed, CDD (CSD) processing is not performed.

As the operations performed by inserter 5405 have already been described, repeated description will be omitted.

CDD (CSD) unit 5407 switches the CDD (CSD) processing ON and OFF based on control signal 5400. CDD (CSD) unit 5407 knows the timing of the "single stream modulated signal transmission 5101" in FIG. 57 from information included in control signal 5400 indicating whether it is time to transmit a plurality of modulated signals for a plurality of streams or time to transmit a single stream modulated signal. In such cases, CDD (CSD) unit 5407 determines to perform cyclic delay diversity based on control information (u11) included in control signal 5400 for (controlling ON/OFF of) cyclic delay diversity (CDD (CSD)) described in Embodiment 7. Accordingly, when "single stream modulated signal transmission 5101" in FIG. 57 is performed. CDD (CSD) unit 5407 performs signal processing for cyclic delay diversity, and outputs CDD (CSD) processed signal 5408 in accordance with the frame configuration.

CDD (CSD) unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal. CDD (CSD) unit 5407 determines to not perform cyclic delay diversity based on control information (u11) included in control signal 5400 for (controlling ON/OFF of) cyclic delay diversity (CDD (CSD)) described in Embodiment 7. Accordingly, when "single stream modulated signal transmission 5701" in FIG. 57 is performed, CDD (CSD) unit 5407 does not perform signal processing for cyclic delay diversity, and, for example, does not output a signal.

Selector 5409A receives inputs of signal 5403A, signal 5406 in accordance with the frame configuration, and control signal 5400, and based on control signal 5400, selects either signal 5403A or signal 5406 in accordance with frame configuration, and outputs selected signal 5410A. Accordingly, when "single stream modulated signal transmission 5101" is performed and when "single stream modulated signal transmission 5701" is performed, in either case, selector 5409A outputs signal 5406 in accordance with the frame configuration as selected signal 5410A.

When "single stream modulated signal transmission 5101" is performed, selector 5409B outputs CDD (CSD) processed signal 5408 in accordance with the frame configuration as selected signal 5410B, and when "single stream modulated signal transmission 5701" is performed, for example, does not output selected signal 5410B.

As the operations performed by radio units 107_A, 107_B in the base station illustrated in FIG. 1, FIG. 44 have already been described, repeated description will be omitted.

Example 3-2

In FIG. 57, in "single stream modulated signal transmission 5701", whether CDD (CSD) processing is performed or not is selectable, and in "single stream modulated signal transmission 5701", a single-carrier scheme or OFDM scheme can be selected.

When "single stream modulated signal transmission 5701" is performed, it is possible to select "multi-stream multi-modulated-signal transmission" instead of "single stream modulated signal transmission". Note that since "multi-stream multi-modulated-signal transmission" has already been described, repeated description will be omitted.

Next, operations performed by the transmission device in the base station will be described with reference to FIG. 54.

FIG. 54 illustrates one example of a configuration of signal processor 106 in, for example, the transmission device in the base station illustrated in FIG. 1 or FIG. 44. As the general operations illustrated in FIG. 54 have already been described, repeated description will be omitted.

In this example, the characteristic feature is that, in FIG. 57, when "single stream modulated signal transmission 5101" is performed, CDD (CSD) processing is performed, and when "single stream modulated signal transmission 5701" is performed, whether to perform CDD (CSD) processing or not is selectable.

As the operations performed by inserter 5405 have already been described, repeated description will be omitted.

CDD (CSD) unit 5407 switches the CDD (CSD) processing ON and OFF based on control signal 5400. CDD (CSD) unit 5407 knows the timing of the "single stream modulated signal transmission 5101" in FIG. 57 from information included in control signal 5400 indicating whether it is time to transmit a plurality of modulated signals for a plurality of streams or time to transmit a single stream modulated signal. In such cases, CDD (CSD) unit 5407 determines to perform cyclic delay diversity based on control information (u11) included in control signal 5400 for (controlling ON/OFF of) cyclic delay diversity (CDD (CSD)) described in Embodiment 7. Accordingly, when "single stream modulated signal transmission 5101" in FIG. 57 is performed, CDD (CSD) unit 5407 performs signal processing for cyclic delay diversity, and outputs CDD (CSD) processed signal 5408 in accordance with the frame configuration.

CDD (CSD) unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal. When "single stream modulated signal transmission 5701" is performed, CDD (CSD) unit 5407 determines to not perform cyclic delay diversity based on control information (u11) included in control signal 5400 for (controlling the ON/OFF of) cyclic delay diversity (CDD (CSD)) described in Embodiment 7. Accordingly, when "single stream modulated signal transmission 5701" in FIG. 57 is performed, CDD (CSD) unit 5407 does not perform signal processing for cyclic delay diversity, and, for example, does not output a signal.

Next, operations different from this example will be described.

CDD (CSD) unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal. When "single stream modulated signal transmission 5701" is performed, CDD (CSD) unit 5407 determines to perform cyclic delay diversity based on control information (u11) included in control signal 5400 for controlling (the ON/OFF of) cyclic delay diversity (CDD (CSD)) described in Embodiment 7. Accordingly, when "single stream modulated signal transmission 5701" in FIG. 57 is performed, CDD (CSD) unit 5407 performs signal processing for cyclic delay diversity, and outputs CDD (CSD) processed signal 5408 in accordance with the frame configuration.

Selector 5409A receives inputs of signal 5403A, signal 5406A in accordance with the frame configuration, and control signal 5400, and based on control signal 5400, selects either signal 5403A or signal 5406 in accordance with frame configuration, and outputs selected signal 5410A. Accordingly, when "single stream modulated signal transmission 5101" is performed and when "single stream modulated signal transmission 5701" is performed, in either case, selector 5409A outputs signal 5406 in accordance with the frame configuration as selected signal 5410A.

When "single stream modulated signal transmission 5101" is performed, selector 5409B outputs CDD (CSD) processed signal 5408 in accordance with the frame configuration as selected signal 5410B.

When "single stream modulated signal transmission 5701" is performed, when selector 5409B determines to not perform CDD (CSD) processing in "single stream modulated signal transmission 5701", selector 5409B, for example, does not output selected signal 5410B.

When "single stream modulated signal transmission 5701" is performed, when selector 5409B determines to perform CDD (CSD) processing in "single stream modulated signal transmission 5701", selector 5409B outputs CDD (CSD) processed signal 5408 in accordance with the frame configuration as selected signal 5410B.

As the operations performed by radio units 107_A, 107_B in the base station illustrated in FIG. 1, FIG. 44 have already been described, repeated description will be omitted.

As described above, control over whether to implement a phase change or not and control over whether to perform CDD (CSD) or not based on, for example, the number of transmission streams and/or the transmission method can be done in an appropriate manner. This makes it possible to achieve an advantageous effect in which it is possible to improve data reception quality of the communication partner. An advantageous characteristic is that, by performing CDD (CSD), the probability that data reception quality of the communication partner will improve increases, and, in particular, when single stream transmission is performed, it is possible to effectively use the plurality of transmitting antennas of the transmission device. Another advantageous characteristic is that, when performing multi-stream transmission, based the propagation/communications environment and/or phase change support by the communication partner, for example, it is possible to achieve favorable data reception quality by controlling whether a phase change is implemented or not.

Note that although FIG. 54 is used as an example of a portion of the configuration of signal processor 106 illustrated in FIG. 1 and/or FIG. 44, the configurations illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33 may be implemented.

For example, in the configurations illustrated in FIG. 2, FIG. 18, FIG. 19, FIG. 20, FIG. 21, FIG. 22, FIG. 28, FIG. 29, FIG. 30, FIG. 31, FIG. 32, and FIG. 33, when single stream transmission is performed, mapped signal 201B of s2(t) is nullified.

In weighting synthesizer 203, as precoding matrix F, for example, any of the following can be applied.

[MATH. 149]
$$F(i) = \begin{pmatrix} \beta & 0 \\ \beta & 0 \end{pmatrix} \qquad \text{Equation (149)}$$

[MATH. 150]
$$F(i) = \begin{pmatrix} 0 & \beta \\ 0 & \beta \end{pmatrix} \qquad \text{Equation (150)}$$

[MATH. 151]
$$F(i) = \begin{pmatrix} \alpha & 0 \\ \beta & 0 \end{pmatrix} \qquad \text{Equation (151)}$$

[MATH. 152]
$$F(i) = \begin{pmatrix} 0 & \alpha \\ 0 & \beta \end{pmatrix} \qquad \text{Equation (152)}$$

Note that α may be a real number, and, alternatively, may be an imaginary number. Note that ß may be a real number, and, alternatively, may be an imaginary number. However, α is not zero, and B is not zero.

The above was described in terms of expressions, the signal may be split instead of implementing the weighting synthesis (calculation using a matrix) as per the expressions above.

In single stream cases, phase changers 205A, 205B do not implement a phase change (the input signal is output as-is).

Moreover, in single stream cases, phase changers 209A, 209B may perform signal processing for CDD (CSD) instead of implementing a phase change.

Embodiment A9

In Supplemental Information 4, for example, it is stated that phase changers may be included before and after weighting synthesizer 203 in the configurations illustrated in, for example, FIG. 2, FIG. 18, FIG. 19, FIG. 20, FIG. 21, FIG. 22, FIG. 28, FIG. 29, FIG. 30, FIG. 31, FIG. 32, and FIG. 33.

In this embodiment, supplemental information regarding this point will be given.

Figure 59:
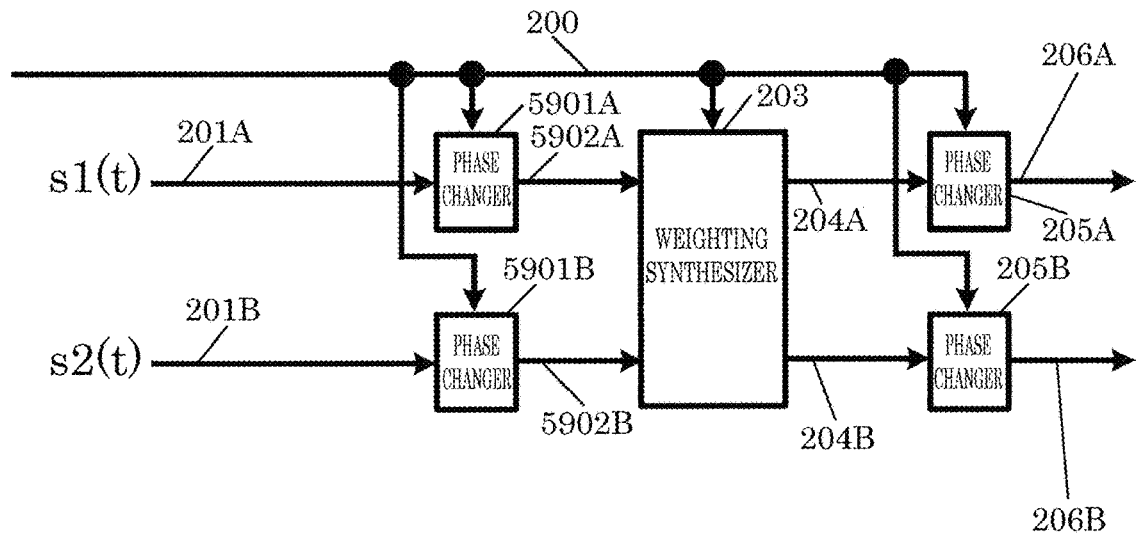
FIG. 59 illustrates a first example of how phase changers are arranged before and after a weighting synthesizer.

A first example of how phase changers are arranged before and after weighting synthesizer 203 is illustrated in FIG. 59. In FIG. 59, components that operate the same as in, for example, FIG. 2 share like reference marks. Accordingly, descriptions that overlap with, for example, FIG. 2 will be omitted. As illustrated in FIG. 59, phase changer 5901A receives inputs of mapped signal 201A (s1(t)) and control signal 200, and, for example, based information on the phase change method included in control signal 200, implements a phase change on mapped signal 201A (s1(t)) and outputs phase-changed signal 5902A.

Similarly, phase changer 5901B receives inputs of mapped signal 201B (s2(t)) and control signal 200, and, for example, based information on the phase change method included in control signal 200, implements a phase change on mapped signal 201B (s2(t)) and outputs phase-changed signal 5902B.

Then, phase-changed signal 206A is input into inserter 207A illustrated in, for example, FIG. 2, and phase-changed signal 206B is input into inserter 207B illustrated in, for example, FIG. 2.

Figure 60:
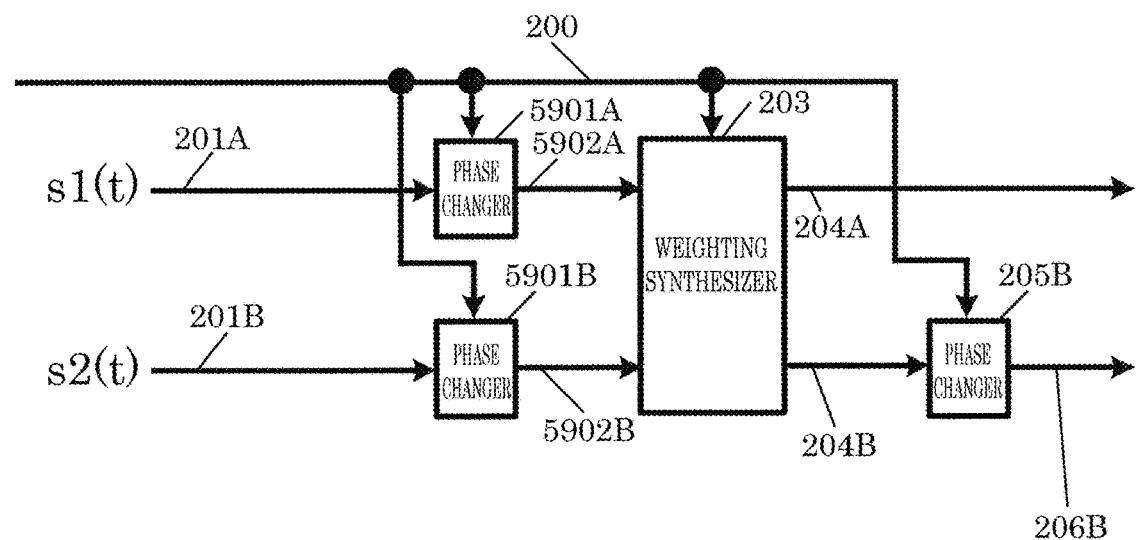
FIG. 60 illustrates a second example of how phase changers are arranged before and after a weighting synthesizer.

A second example of how phase changers are arranged before and after weighting synthesizer 203 is illustrated in FIG. 60. In FIG. 60, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

Unlike FIG. 59, in FIG. 60, only phase changer 205B is inserted after weighting synthesizer 203.

Then, weighting synthesized signal 204A is input into inserter 207A illustrated in, for example, FIG. 2, and phase-changed signal 206B is input into inserter 207B illustrated in, for example, FIG. 2.

Figure 61:
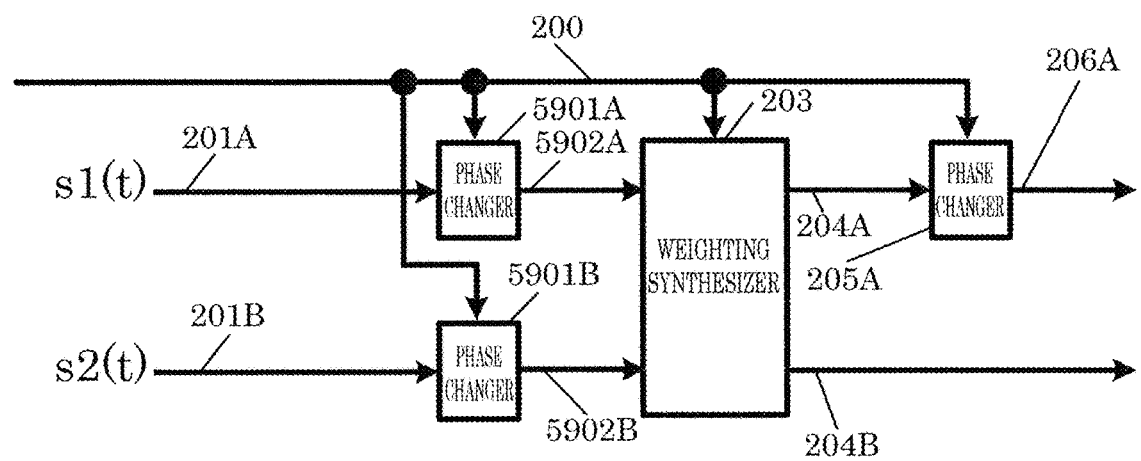
FIG. 61 illustrates a third example of how phase changers are arranged before and after a weighting synthesizer.

A third example of how phase changers are arranged before and after weighting synthesizer 203 is illustrated in FIG. 61. In FIG. 61, components that operate the same as in, for example. FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

Unlike FIG. 60, in FIG. 61, phase changer 205A is inserted after weighting synthesizer 203 on the top line.

Then, phase-changed signal 206A is input into inserter 207A illustrated in, for example, FIG. 2, and weighting synthesized signal 204B is input into inserter 207B illustrated in, for example, FIG. 2.

Figure 62:
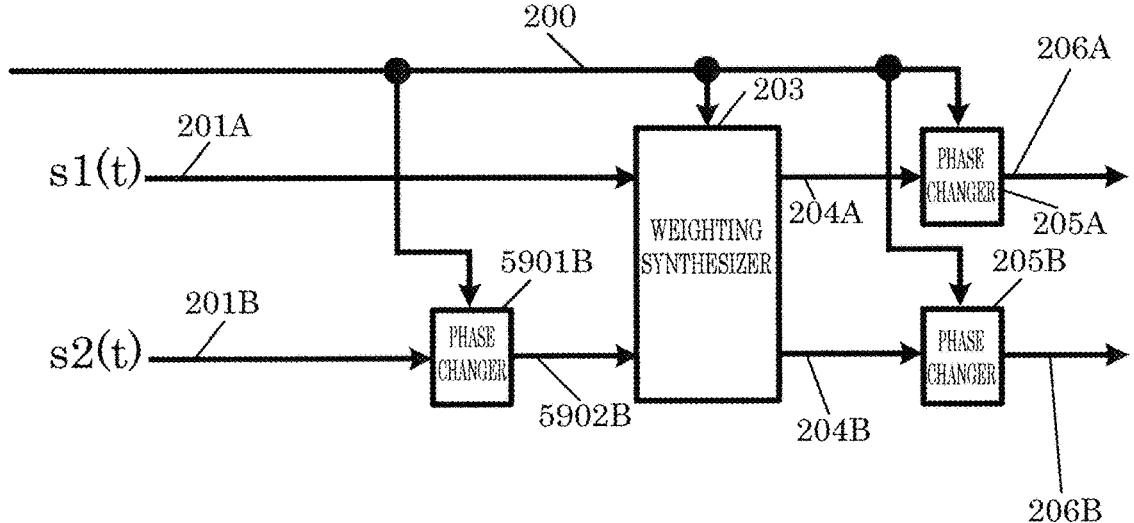
FIG. 62 illustrates a fourth example of how phase changers are arranged before and after a weighting synthesizer.

A fourth example of how phase changers are arranged before and after weighting synthesizer 203 is illustrated in FIG. 62. In FIG. 62, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

Unlike FIG. 59, in FIG. 62, only phase changer 5901B is inserted before the weighting synthesizer.

Then, phase-changed signal 206A is input into inserter 207A illustrated in, for example, FIG. 2, and phase-changed signal 206B is input into inserter 207B illustrated in, for example, FIG. 2.

Figure 63:
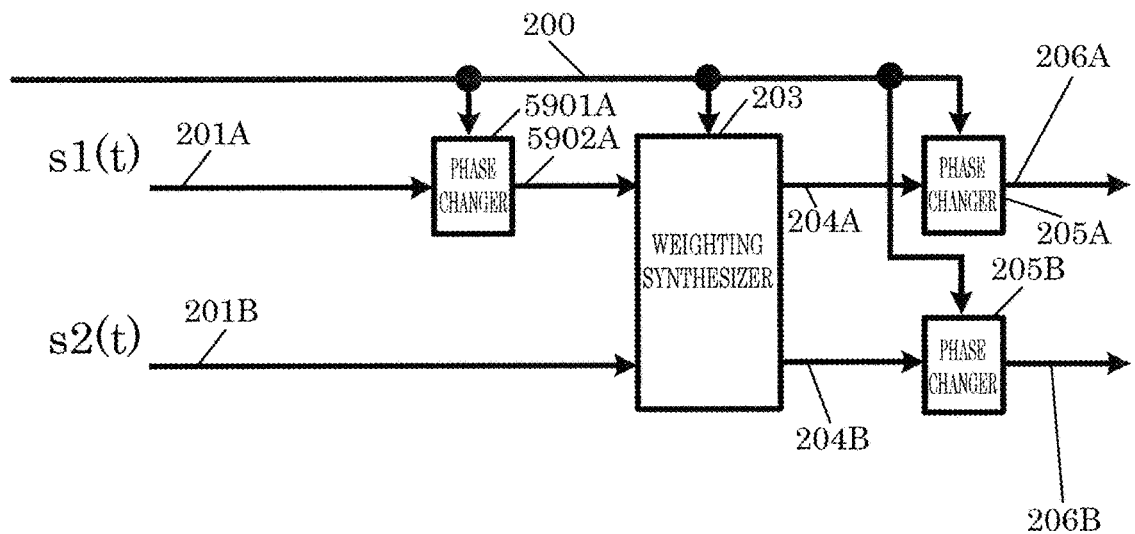
FIG. 63 illustrates a fifth example of how phase changers are arranged before and after a weighting synthesizer.

A fifth example of how phase changers are arranged before and after weighting synthesizer 203 is illustrated in FIG. 63. In FIG. 63, components that operate the same as in, for example, FIG. 2 share like reference marks. Accordingly, descriptions that overlap with, for example. FIG. 2 will be omitted. Moreover, components that operate the same as in FIG. 59 share like reference marks. Accordingly, descriptions that overlap with FIG. 59 will be omitted.

Unlike FIG. 62, in FIG. 63, phase changer 5901A is inserted before weighting synthesizer 203 on the top line.

Then, phase-changed signal 206A is input into inserter 207A illustrated in, for example, FIG. 2, and phase-changed signal 206B is input into inserter 207B illustrated in, for example, FIG. 2.

Figure 64:
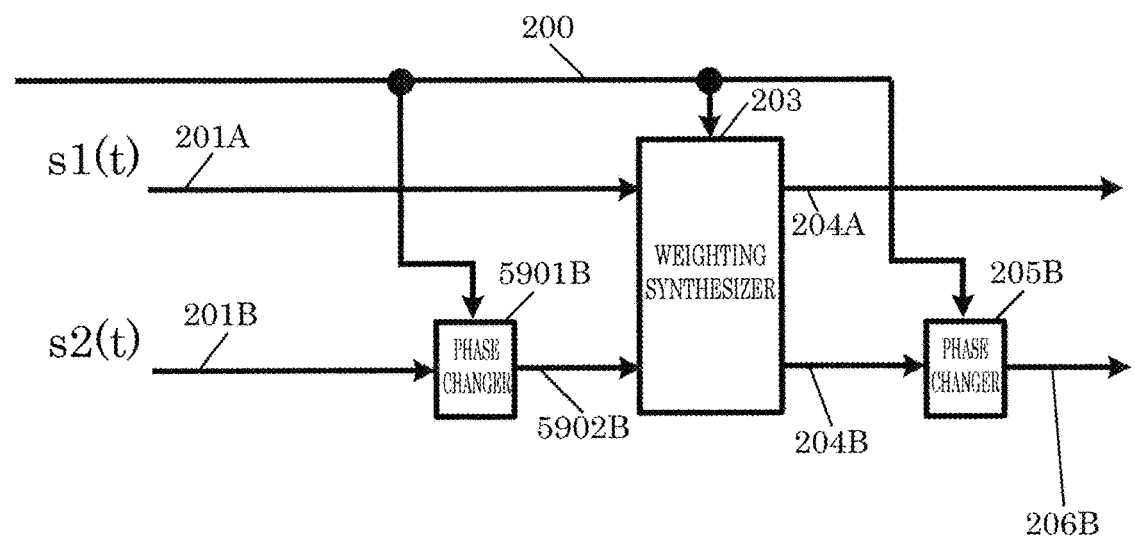
FIG. 64 illustrates a sixth example of how phase changers are arranged before and after a weighting synthesizer.

A sixth example of how phase changers are arranged before and after weighting synthesizer 203 is illustrated in FIG. 64. In FIG. 64, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

In FIG. 64, phase changers 5901B, 205B are present before and after weighting synthesizer 203, on the bottom line.

Then, weighting synthesized signal 204A is input into inserter 207A illustrated in, for example, FIG. 2, and phase-changed signal 206B is input into inserter 207B illustrated in, for example, FIG. 2.

Figure 65:
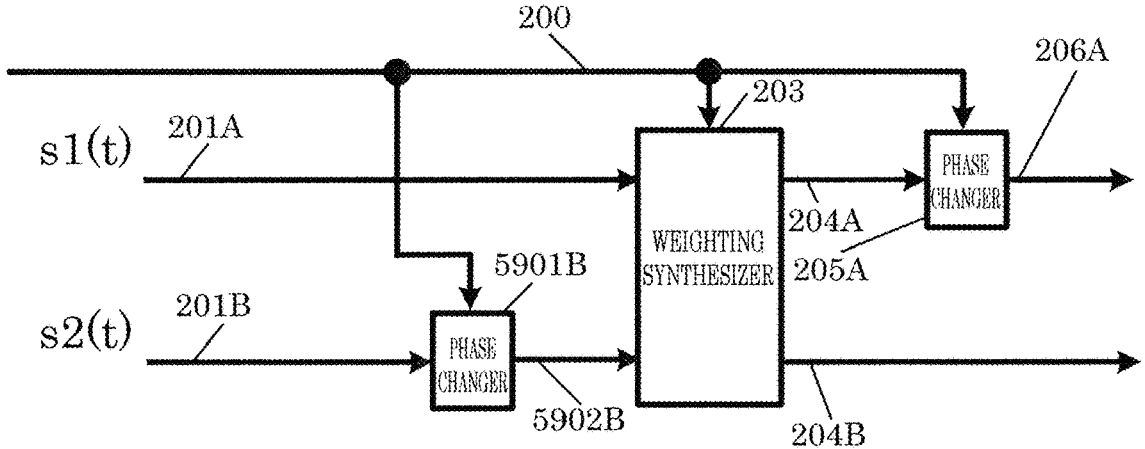
FIG. 65 illustrates a seventh example of how phase changers are arranged before and after a weighting synthesizer.

A seventh example of how phase changers are arranged before and after weighting synthesizer 203 is illustrated in FIG. 65. In FIG. 65, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

In FIG. 65, phase changers 5901B. 205A are present before and after weighting synthesizer 203, on the bottom and top lines, respectively.

Then, phase-changed signal 206A is input into inserter 207A illustrated in, for example, FIG. 2, and weighting synthesized signal 204B is input into inserter 207B illustrated in, for example, FIG. 2.

Figure 66:
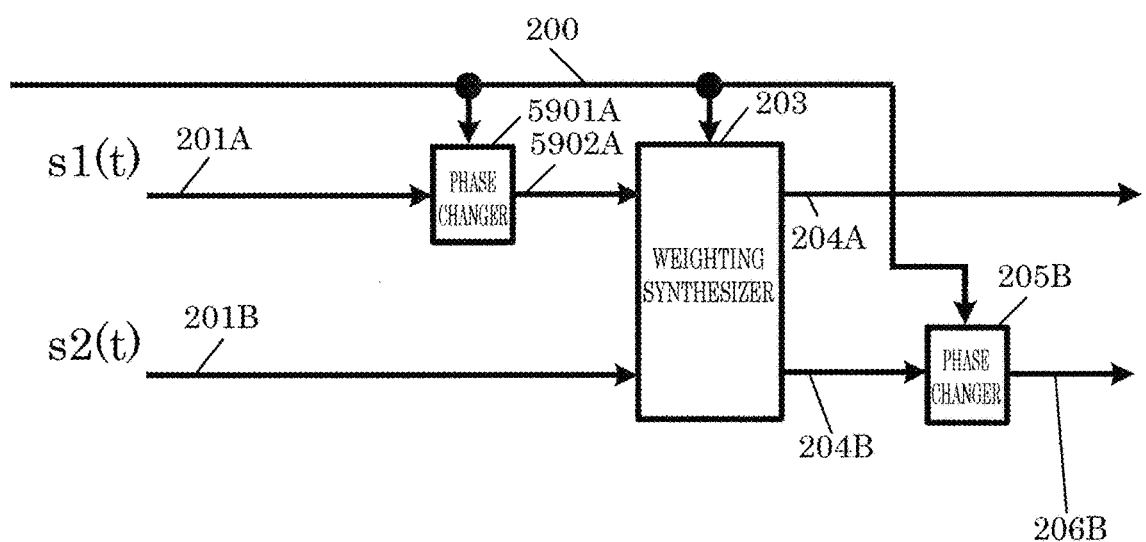
FIG. 66 illustrates an eighth example of how phase changers are arranged before and after a weighting synthesizer.

An eighth example of how phase changers are arranged before and after weighting synthesizer 203 is illustrated in FIG. 66. In FIG. 66, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

In FIG. 66, phase changers 5901A, 205B are present before and after weighting synthesizer 203, on the top and bottom lines, respectively.

Then, weighting synthesized signal 204B is input into inserter 207A illustrated in, for example, FIG. 2, and phase-changed signal 206B is input into inserter 207B illustrated in, for example, FIG. 2.

Figure 67:
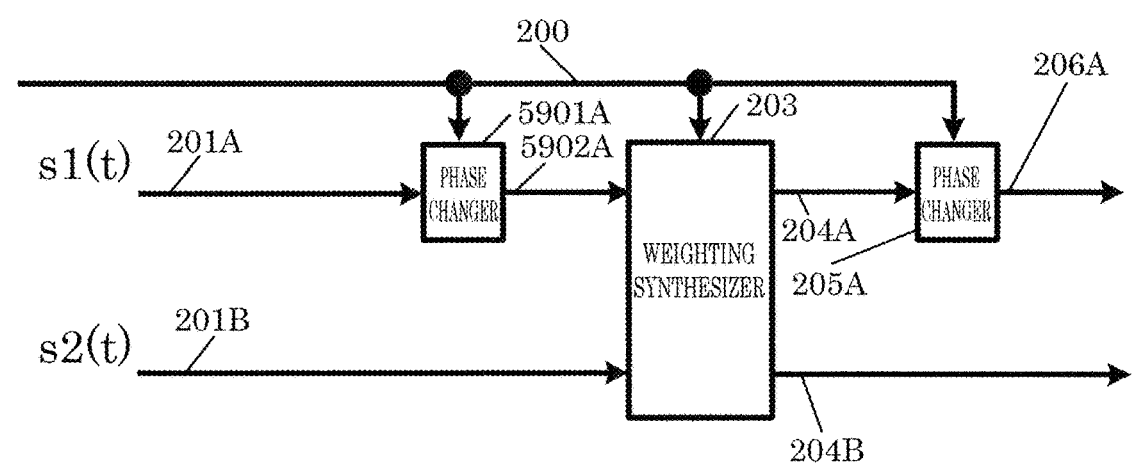
FIG. 67 illustrates a ninth example of how phase changers are arranged before and after a weighting synthesizer.

A ninth example of how phase changers are arranged before and after weighting synthesizer 203 is illustrated in FIG. 67. In FIG. 67, components that operate the same as in, for example, FIG. 2 share like reference marks. Accordingly, descriptions that overlap with, for example, FIG. 2 will be omitted. Moreover, components that operate the same as in FIG. 59 share like reference marks. Accordingly, descriptions that overlap with FIG. 59 will be omitted.

In FIG. 67, phase changers 5901A, 205A are present before and after weighting synthesizer 203, on the top line.

Then, phase-changed signal 206A is input into inserter 207A illustrated in, for example, FIG. 2, and weighting synthesized signal 204B is input into inserter 207B illustrated in, for example, FIG. 2.

The embodiments described in the present specification may be implemented using these configurations.

The phase change method used by phase changers 5901A, 5901B, 205A, and 205B in FIG. 59, FIG. 60, FIG. 61, FIG.

62, FIG. 63, FIG. 64, FIG. 65, FIG. 66, and FIG. 67 is, for example, set according to control signal 200.

Embodiment A10

In this embodiment, an example of a robust communications method will be given.

First Example

Figure 68:
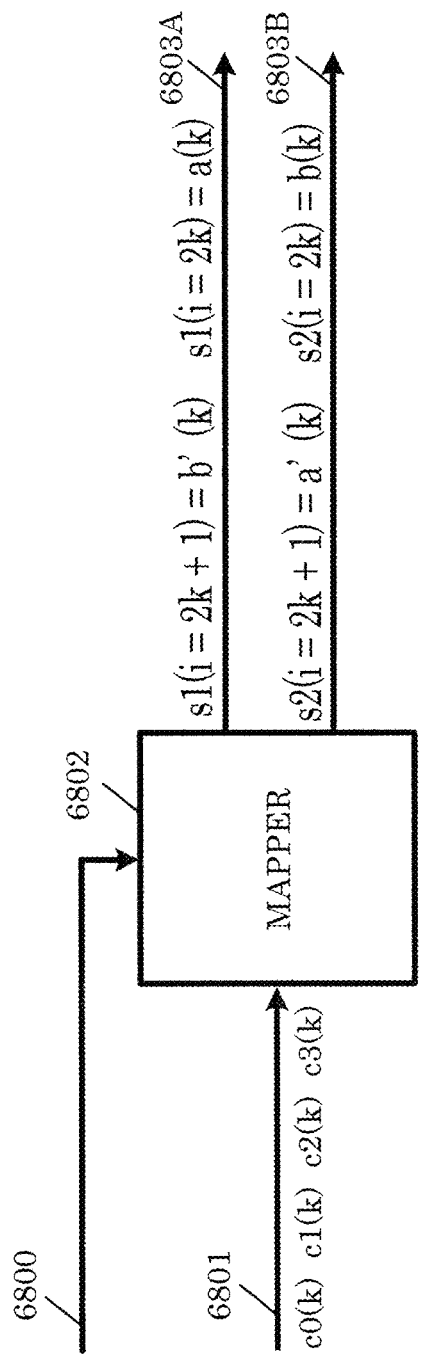
FIG. 68 illustrates operations performed by the mapper illustrated in FIG. 1.

FIG. 68 illustrates operations performed by, for example, mapper 104 in FIG. 1 of a base station or AP.

Mapper 6802 receives inputs of encoded data 6801 and control signal 6800, and when a robust transmission method is specified by control signal 6800, performs mapping processes such as those described below, and outputs mapped signals 6803A, 6803B.

Note that control signal 6800 corresponds to 100 in FIG. 1, encoded data 6801 corresponds to 103 in FIG. 1, mapper 6802 corresponds to 104 in FIG. 1, mapped signal 6803A corresponds to 105_1 in FIG. 1, and mapped signal 6801B corresponds to 105_2 in FIG. 1.

For example, mapper 6802 receives inputs of bit c0(k), bit c1(k), bit c2(k), and bit c3(k) as encoded data 6801. Note that k is an integer that is greater than or equal to 0.

For example, mapper 6802 performs QPSK modulation on c0(k) and c1(k) to obtain mapped signal a(k).

For example, mapper 6802 performs QPSK modulation on c2(k) and c3(k) to obtain mapped signal b(k).

For example, mapper 6802 performs QPSK modulation on c0(k) and c1(k) to obtain mapped signal a'(k).

For example, mapper 6802 performs QPSK modulation on c2(k) and c3(k) to obtain mapped signal b'(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1), i.e., mapped signal 6803A whose symbol number i=2k+1, is expressed as b'(k), and s2(i=2k+1), i.e., mapped signal 6803B whose symbol number i=2k+1, is expressed as a'(k).

Next, the relationship between "a(k) and a'(k)" and "b(k) and b'(k)" will be described.

Figure 69:
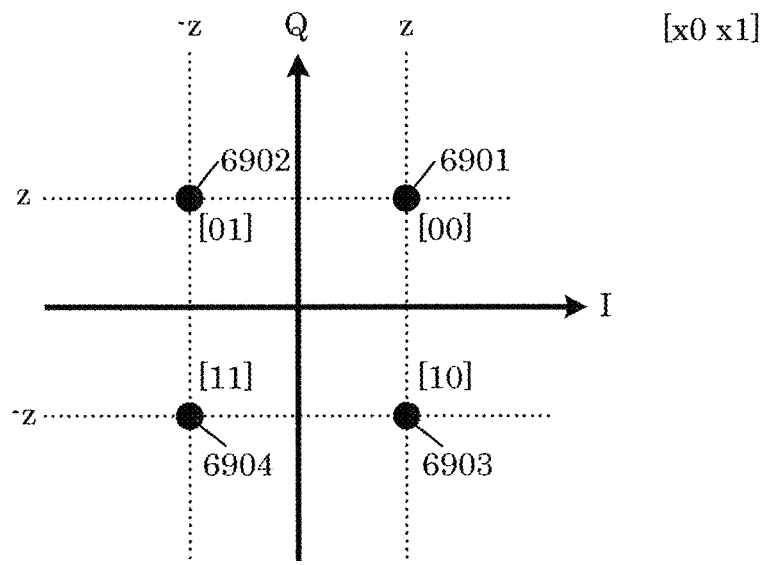
FIG. 69 illustrates an example of a distribution of signal points in an in-phase I-quadrature Q plane when QPSK is used.

FIG. 69 illustrates an example of a distribution of signal points in an in-phase I-quadrature Q plane when QPSK is used, and illustrates the relationship between signal points for the values for bit x0 and bit x1.

When bits [x0 x1]=[0 0] (i.e., when x0 is 0 and x1 is 0), in-phase component I is set to z and quadrature component Q is set to z (which matches signal point 6901). Note that z is a real number that is greater than 0.

When bits [x0 x1]=[0 1] (i.e., when x0 is 0 and x1 is 1), in-phase component I is set to −z and quadrature component Q is set to z (which matches signal point 6902).

When bits [x0 x1]=[1 0] (i.e., when x0 is 1 and x1 is 0), in-phase component I is set to z and quadrature component Q is set to −z (which matches signal point 6903).

When bits [x0 x1]=[1 1] (i.e., when x0 is 1 and x1 is 1), in-phase component I is set to −z and quadrature component Q is set to −z (which matches signal point 6904).

Figure 70:
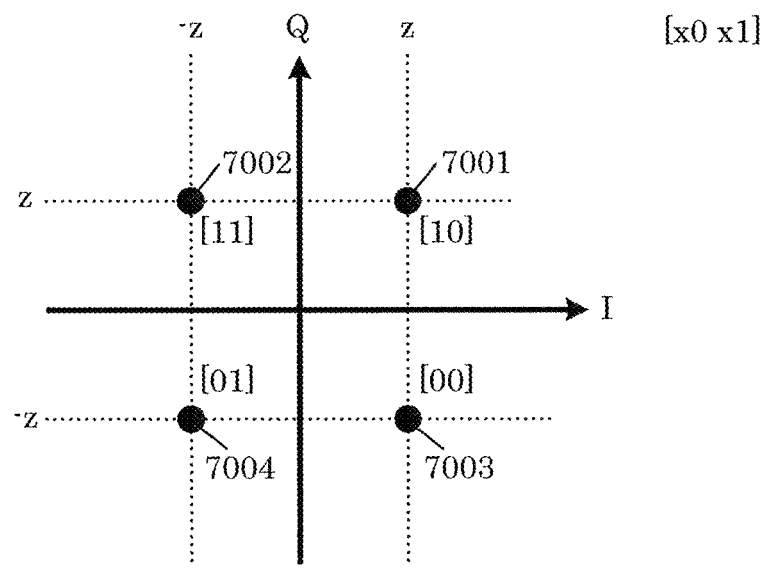
FIG. 70 illustrates an example of a distribution of signal points in an in-phase I-quadrature Q plane when QPSK is used.

FIG. 70 illustrates an example of a distribution of signal points in an in-phase I-quadrature Q plane when QPSK is used, and illustrates the relationship between signal points for the values for bit x0 and bit x1. However, "the relationship between signal points for the values for bit x0 and bit x1" in FIG. 69 and "the relationship between signal points for the values for bit x0 and bit x1" in FIG. 70 are different.

When bits [x0 x1]=[0 0] (i.e., when x0 is 0 and x1 is 0), in-phase component I is set to z and quadrature component Q is set to −z (which matches signal point 7003). Note that z is a real number that is greater than 0.

When bits [x0 x1]=[0 1] (i.e., when x0 is 1 and x1 is 1), in-phase component I is set to −z and quadrature component Q is set to −z (which matches signal point 7004)

When bits [x0 x1]=[1 0] (i.e., when x0 is 1 and x1 is 0), in-phase component I is set to z and quadrature component Q is set to z (which matches signal point 7001).

When bits [x0 x1]=[1 1] (i.e., when x0 is 1 and x1 is 1), in-phase component I is set to −z and quadrature component Q is set to z (which matches signal point 7002).

Figure 71:
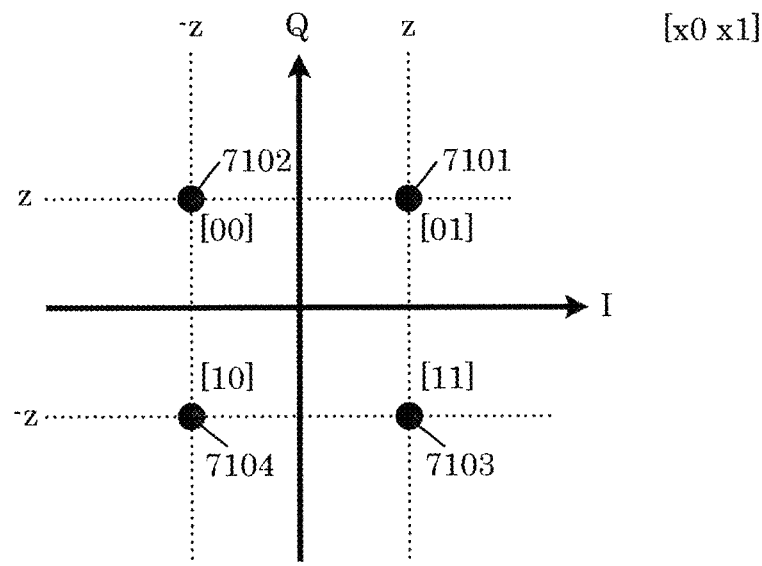
FIG. 71 illustrates an example of a distribution of signal points in an in-phase I-quadrature Q plane when QPSK is used.

FIG. 71 illustrates an example of a distribution of signal points in an in-phase I-quadrature Q plane when QPSK is used, and illustrates the relationship between signal points for the values for bit x0 and bit x1. However, "the relationship between signal points for the values for bit x0 and bit x1" in FIG. 71 is different from "the relationship between signal points for the values for bit x0 and bit x1" in FIG. 69 and "the relationship between signal points for the values for bit x0 and bit x1" in FIG. 70.

When bits [x0 x1]=[0 0] (i.e., when x0 is 0 and x1 is 0), in-phase component I is set to −z and quadrature component Q is set to z (which matches signal point 7102). Note that z is a real number that is greater than 0.

When bits [x0 x1]=[0 1] (i.e., when x0 is 0 and x1 is 1), in-phase component I is set to z and quadrature component Q is set to z (which matches signal point 7101).

When bits [x0 x1]=[1 0] (i.e., when x0 is 1 and x1 is 0), in-phase component I is set to −z and quadrature component Q is set to −z (which matches signal point 7104).

When bits [x0 x1]=[1 1] (i.e., when x0 is 1 and x1 is 1), in-phase component I is set to −z and quadrature component Q is set to −z (which matches signal point 7103).

Figure 72:
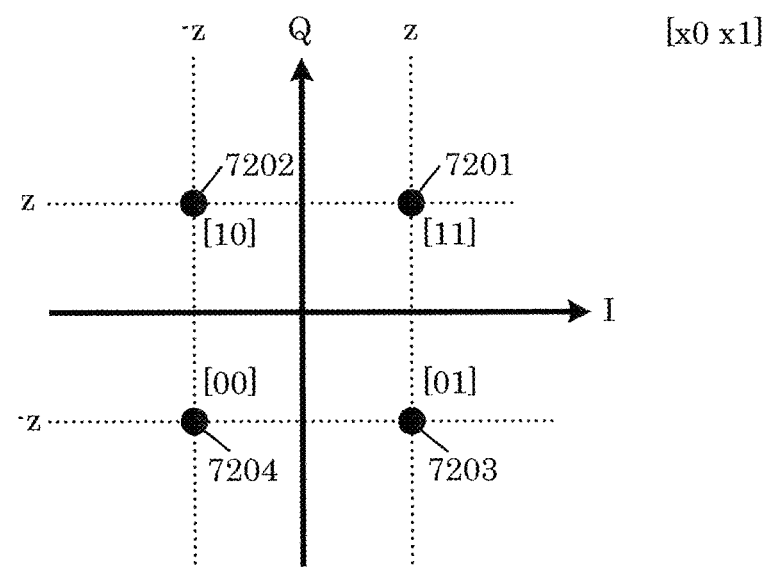
FIG. 72 illustrates an example of a distribution of signal points in an in-phase I-quadrature Q plane when QPSK is used.

FIG. 72 illustrates an example of a distribution of signal points in an in-phase I-quadrature Q plane when QPSK is used, and illustrates the relationship between signal points for the values for bit x0 and bit x1. However. "the relationship between signal points for the values for bit x0 and bit x1" in FIG. 72 is different from "the relationship between signal points for the values for bit x0 and bit x1" in FIG. 69, "the relationship between signal points for the values for bit x0 and bit x1" in FIG. 70, and "the relationship between signal points for the values for bit x0 and bit x1" in FIG. 71.

When bits [x0 x1]=[0 0] (i.e., when x0 is 0 and x1 is 0), in-phase component I is set to −z and quadrature component Q is set to −z (which matches signal point 7204). Note that z is a real number that is greater than 0.

When bits [x0 x1]=[0 1] (i.e., when x0 is 0 and x1 is 1), in-phase component I is set to z and quadrature component Q is set to −z (which matches signal point 7203).

When bits [x0 x1]=[1 0] (i.e., when x0 is 1 and x1 is 0), in-phase component I is set to −z and quadrature component Q is set to z (which matches signal point 7202).

When bits [x0 x1]=[1 1] (i.e., when x0 is 1 and x1 is 1), in-phase component I is set to z and quadrature component Q is set to z (which matches signal point 7201).

For example, in order to generate a(k), the mapping illustrated in FIG. 69 is used. For example, c0(k)=0 and c1(k)=0, signal point 6901 is mapped using the mapping illustrated in FIG. 69, and signal point 6901 corresponds to a(k).

In order to generate a'(k), the mapping to be used is set to any one of the mapping illustrated in FIG. 69, the mapping illustrated in FIG. 70, the mapping illustrated in FIG. 71, or the mapping illustrated in FIG. 72.

<1>

In order to generate a'(k) when the mapping to be used is set to the mapping illustrated in FIG. 69, since c0(k)=0 and c1(k)=0, signal point 6901 is mapped using the mapping illustrated in FIG. 69, and signal point 6901 corresponds to a'(k).

<2>

In order to generate a'(k) when the mapping to be used is set to the mapping illustrated in FIG. 70, since c0(k)=0 and c1(k)=0, signal point 7003 is mapped using the mapping illustrated in FIG. 70, and signal point 7003 corresponds to a'(k).

<3>

In order to generate a'(k) when the mapping to be used is set to the mapping illustrated in FIG. 71, since c0(k)=0 and c1(k)=0, signal point 7102 is mapped using the mapping illustrated in FIG. 71, and signal point 7102 corresponds to a'(k).

<4>

In order to generate a'(k) when the mapping to be used is set to the mapping illustrated in FIG. 72, since c0(k)=0 and c1(k)=0, signal point 7204 is mapped using the mapping illustrated in FIG. 72, and signal point 7204 corresponds to a'(k).

As described above, the relationship between "bits (for example x0, x1) to be transmitted for generation of a(k) and the distribution of signal points" and the relationship between "bits (for example x0, x1) to be transmitted for generation of a'(k) and the distribution of signal points" may be the same, and, alternatively, may be different.

An example of a case in which the relationships are the same is one in which FIG. 69 is used to generate a(k) and FIG. 69 is used to generate a'(k) as described above.

Examples of cases in which the relationships are different include those in which FIG. 69 is used to generate a(k) and FIG. 70 is used to generate a'(k), FIG. 69 is used to generate a(k) and FIG. 71 is used to generate a'(k), and FIG. 69 is used to generate a(k) and FIG. 72 is used to generate a'(k), as described above.

Other examples include "the modulation scheme for generating a(k) and the modulation scheme for generating a(k) are different" and "the signal point distribution in the in-phase I-quadrature Q plane for generating a(k) and the signal point distribution in the in-phase I-quadrature Q plane for generating a'(k) are different".

For example, as described above, QPSK may be used as the modulation scheme for generating a(k), and a signal point distribution modulation scheme other than QPSK may be used as the modulation scheme for generating a'(k). Moreover, the signal point distribution in the in-phase I-quadrature Q plane for generating a(k) may be the distribution illustrated in FIG. 69, and the signal point distribution in the in-phase I-quadrature Q plane for generating a'(k) may be a distribution different from that illustrated in FIG. 69.

Note that "different signal point distributions in the in-phase I-quadrature Q plane" means, for example, when the coordinates of four signal points in the in-phase I-quadrature Q plane for generating a(k) are distributed as illustrated in FIG. 69, at least one of the four signal points in the in-phase I-quadrature Q plane for generating a'(k) does not overlap with any one of the four signal points in FIG. 69.

For example, in order to generate b(k), the mapping illustrated in FIG. 69 is used. For example, c2(k)=0 and c3(k)=0, signal point 6901 is mapped using the mapping illustrated in FIG. 69, and signal point 6901 corresponds to b(k).

In order to generate b'(k), the mapping to be used is set to any one of the mapping illustrated in FIG. 69, the mapping illustrated in FIG. 70, the mapping illustrated in FIG. 71, or the mapping illustrated in FIG. 72.

<5>

In order to generate b'(k) when the mapping to be used is set to the mapping illustrated in FIG. 69, since c2(k)=0 and c3(k)=0, signal point 6901 is mapped using the mapping illustrated in FIG. 69, and signal point 6901 corresponds to b'(k).

<6>

In order to generate b'(k) when the mapping to be used is set to the mapping illustrated in FIG. 70, since c2(k)=0 and c3(k)=0, signal point 7003 is mapped using the mapping illustrated in FIG. 70, and signal point 7003 corresponds to b'(k).

<7>

In order to generate b'(k) when the mapping to be used is set to the mapping illustrated in FIG. 71, since c2(k)=0 and c3(k)=0, signal point 7102 is mapped using the mapping illustrated in FIG. 71, and signal point 7102 corresponds to b'(k).

<8>

In order to generate b'(k) when the mapping to be used is set to the mapping illustrated in FIG. 72, since c2(k)=0 and c3(k)=0, signal point 7204 is mapped using the mapping illustrated in FIG. 72, and signal point 7204 corresponds to b'(k).

As described above, the relationship between "bits (for example x0, x1) to be transmitted for generation of b(k) and the distribution of signal points" and the relationship between "bits (for example x0, x1) to be transmitted for generation of b'(k) and the distribution of signal points" may be the same, and, alternatively, may be different.

An example of a case in which the relationships are the same is one in which FIG. 69 is used to generate b(k) and FIG. 69 is used to generate b'(k) as described above.

Examples of cases in which the relationships are different include those in which FIG. 69 is used to generate b(k) and FIG. 70 is used to generate b'(k), FIG. 69 is used to generate b(k) and FIG. 71 is used to generate b'(k), and FIG. 69 is used to generate b(k) and FIG. 72 is used to generate b'(k), as described above.

Other examples include "the modulation scheme for generating b(k) and the modulation scheme for generating b(k) are different" and "the signal point distribution in the in-phase I-quadrature Q plane for generating b(k) and the signal point distribution in the in-phase I-quadrature Q plane for generating b'(k) are different".

For example, as described above, QPSK may be used as the modulation scheme for generating b(k), and a signal point distribution modulation scheme other than QPSK may be used as the modulation scheme for generating b'(k). Moreover, the signal point distribution in the in-phase I-quadrature Q plane for generating b(k) may be the distribution illustrated in FIG. 69, and the signal point distribution in the in-phase I-quadrature Q plane for generating b'(k) may be a distribution different from that illustrated in FIG. 69.

Note that "different signal point distributions in the in-phase I-quadrature Q plane" means, for example, when the coordinates of four signal points in the in-phase I-quadrature Q plane for generating b(k) are distributed as illustrated in FIG. 69, at least one of the four signal points in the in-phase I-quadrature Q plane for generating b'(k) does not overlap with any one of the four signal points in FIG. 69.

As described above, since mapped signal 6803A corresponds to 105_1 in FIG. 1 and mapped signal 6803B corresponds to 105_2 FIG. 1, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 1.

Second Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

Figure 73:
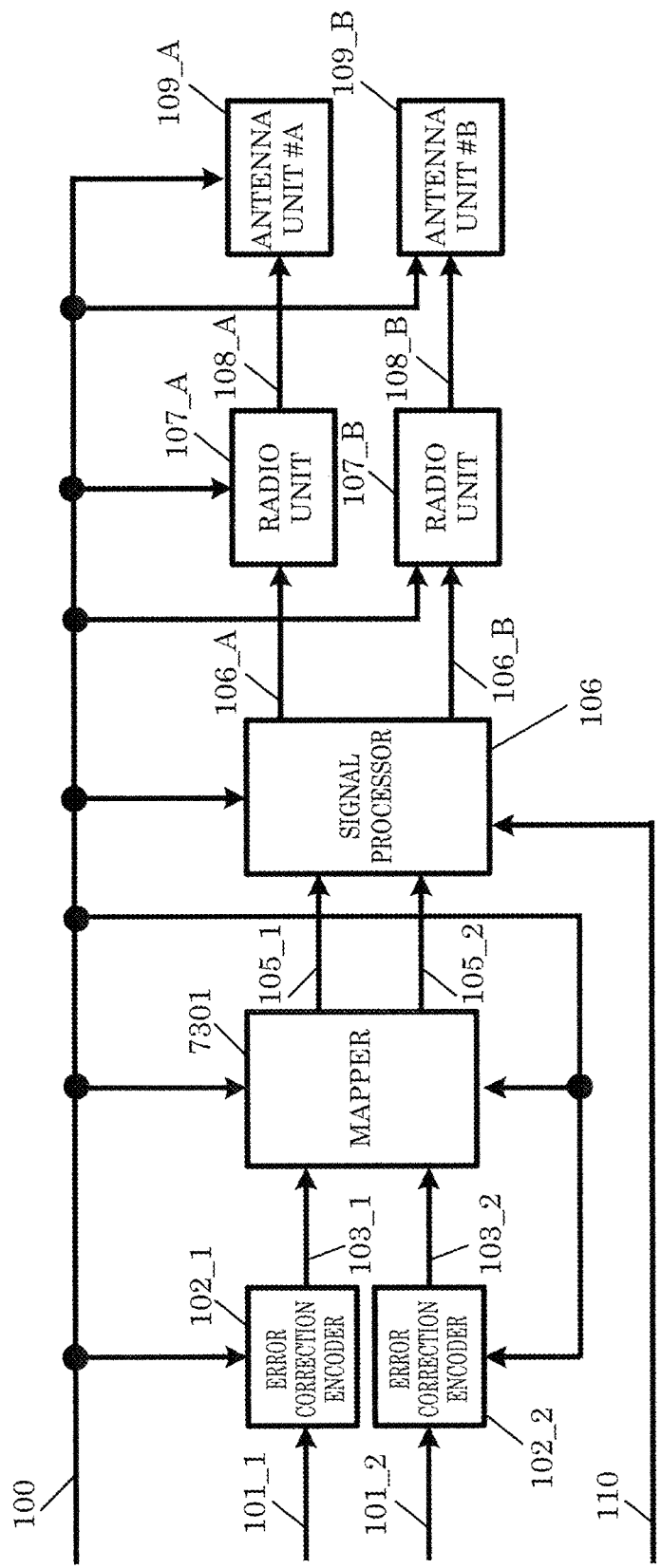
FIG. 73 illustrates one example of a configuration of a transmission device in a base station or AP.

In FIG. 73, components that operate the same as in FIG. 1, FIG. 44 share like reference marks. Accordingly, repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 105_1, 105_2.

Figure 74:
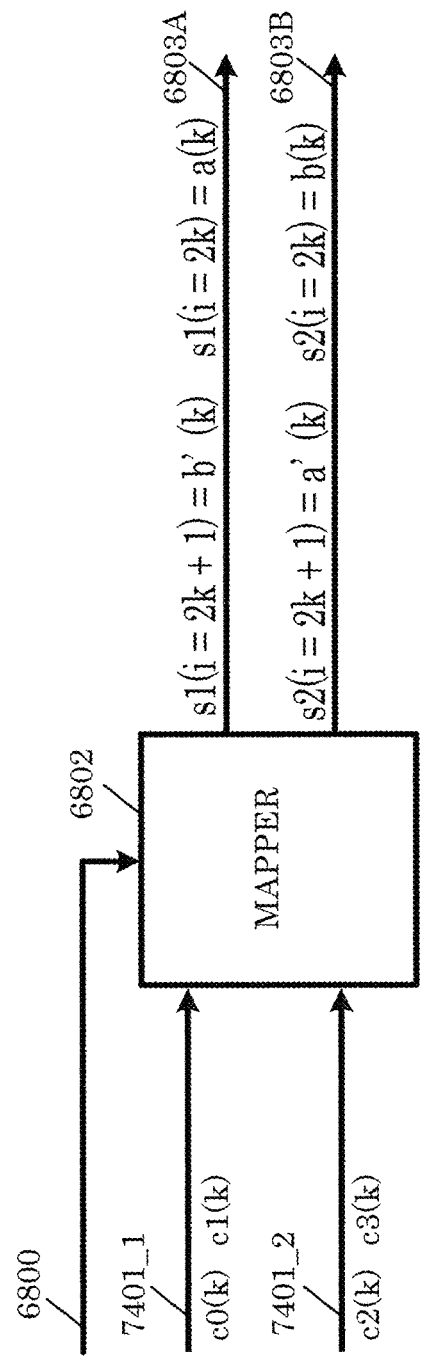
FIG. 74 illustrates operations performed by the mapper illustrated in FIG. 73.

FIG. 74 illustrates operations performed by mapper 7301 illustrated in FIG. 73. In FIG. 74, components that operate the same as in FIG. 68 share like reference marks. Accordingly, repeated description thereof will be omitted.

Mapper 6802 receives inputs of encoded data 74011, 74012, and control signal 6800, and when a robust transmission method is specified by control signal 6800, performs mapping processes such as those described below, and outputs mapped signals 6803A, 6803B.

Note that control signal 6800 corresponds to 100 in FIG. 73, encoded data 7401_1 corresponds to 103_1 in FIG. 73, encoded data 7401_2 corresponds to 103_2 in FIG. 73, mapper 6802 corresponds to 7301 in FIG. 73, mapped signal 6803A corresponds to 105_1 in FIG. 73, and mapped signal 6801B corresponds to 105_2 in FIG. 73.

For example, mapper 6802 receives inputs of bit c0(k) and bit c1(k) as encoded data 7401_1, and bit c2(k), and bit c3(k) as encoded data 7401_2. Note that k is an integer that is greater than or equal to 0.

For example, mapper 6802 performs QPSK modulation on c0(k) and c1(k) to obtain mapped signal a(k).

For example, mapper 6802 performs QPSK modulation on c2(k) and c3(k) to obtain mapped signal b(k).

For example, mapper 6802 performs QPSK modulation on c0(k) and c1(k) to obtain mapped signal a'(k).

For example, mapper 6802 performs QPSK modulation on c2(k) and c3(k) to obtain mapped signal b'(k).

[Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1), i.e., mapped signal 6803A whose symbol number i=2k+1, is expressed as b'(k), and s2(i=2k+1), i.e., mapped signal 6803B whose symbol number i=2k+1, is expressed as a'(k).

Next, the relationship between "a(k) and a'(k)" and "b(k) and b'(k)" will be described with reference to FIG. 69, FIG. 70, FIG. 71, and FIG. 72.

As described above, since mapped signal 6803A corresponds to 105_1 in FIG. 73 and mapped signal 6803B corresponds to 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Third Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly, repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 105_1, 105_2.

Figure 75:
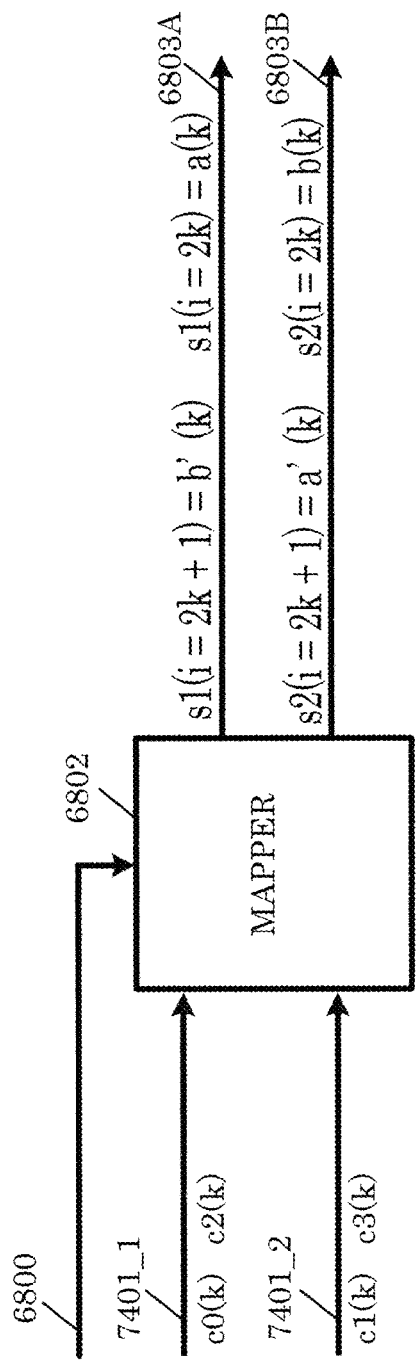
FIG. 75 illustrates operations performed by the mapper illustrated in FIG. 73.

FIG. 75 illustrates operations performed by mapper 7301 illustrated in FIG. 73. In FIG. 75, components that operate the same as in FIG. 68, FIG. 74 share like reference marks. Accordingly, repeated description thereof will be omitted.

Mapper 6802 receives inputs of encoded data 74011, 7401_2, and control signal 6800, and when a robust transmission method is specified by control signal 6800, performs mapping processes such as those described below, and outputs mapped signals 6803A, 6803B.

Note that control signal 6800 corresponds to 100 in FIG. 73, encoded data 7401_1 corresponds to 103_1 in FIG. 73, encoded data 7401_2 corresponds to 103_2 in FIG. 73, mapper 6802 corresponds to 7301 in FIG. 73, mapped signal 6803A corresponds to 105_1 in FIG. 73, and mapped signal 6801B corresponds to 105_2 in FIG. 73.

For example, mapper 6802 receives inputs of bit c0(k) and bit c2(k) as encoded data 7401_1, and bit c1(k), and bit c3(k) as encoded data 7401_2. Note that k is an integer that is greater than or equal to 0.

For example, mapper 6802 performs QPSK modulation on c0(k) and c1(k) to obtain mapped signal a(k).

For example, mapper 6802 performs QPSK modulation on c2(k) and c3(k) to obtain mapped signal b(k).

For example, mapper 6802 performs QPSK modulation on c0(k) and c1(k) to obtain mapped signal a'(k).

For example, mapper 6802 performs QPSK modulation on c2(k) and c3(k) to obtain mapped signal b'(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1). i.e., mapped signal 6803A whose symbol number i=2k+1, is expressed as b'(k), and s2(i=2k+1), i.e., mapped signal 6803B whose symbol number i=2k+1, is expressed as a'(k).

Next, the relationship between "a(k) and a'(k)" and "b(k) and b'(k)" will be described with reference to FIG. 69, FIG. 70, FIG. 71, and FIG. 72.

As described above, since mapped signal 6803A corresponds to 105_1 in FIG. 73 and mapped signal 6803B corresponds to 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Fourth Example

Figure 76:
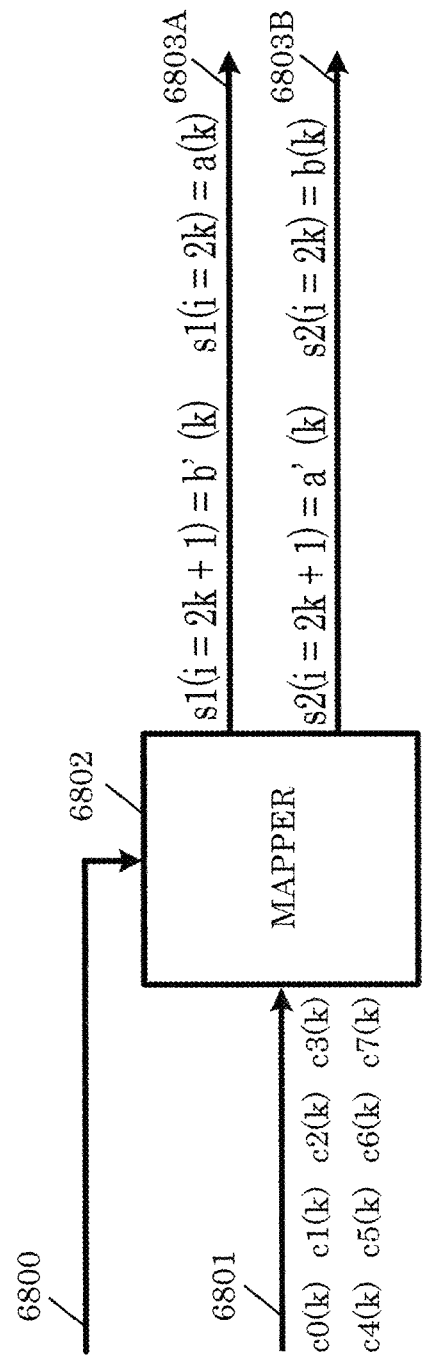
FIG. 76 illustrates operations performed by the mapper illustrated in FIG. 1.

FIG. 76 illustrates operations performed by mapper 104 in FIG. 1 of a base station or AP. In FIG. 76, components that operate the same as in FIG. 68 share like reference marks.

Mapper 6802 receives inputs of encoded data 6801 and control signal 6800, and when a robust transmission method is specified by control signal 6800, performs mapping processes such as those described below, and outputs mapped signals 6803A, 6803B.

Note that control signal 6800 corresponds to 100 in FIG. 1, encoded data 6801 corresponds to 103 in FIG. 1, mapper 6802 corresponds to 104 in FIG. 1, mapped signal 6803A corresponds to 105_1 in FIG. 1, and mapped signal 6801B corresponds to 105_2 in FIG. 1.

For example, mapper 6802 receives inputs of bit c0(k), bit c1(k), bit c2(k), bit c3(k), bit c4(k), bit c5(k), bit c6(k), and bit c7(k) as encoded data 6801. Note that k is an integer that is greater than or equal to 0.

Mapper 6802 performs modulation using a modulation scheme that uses 16 signal points, such as 16QAM, on, for example, bit c0(k), bit c1(k), bit c2(k), and bit c3(k), to obtain mapped signal a(k).

Mapper 6802 performs modulation using a modulation scheme that uses 16 signal points, such as 16QAM, on, for example, bit c4(k), bit c5(k), bit c6(k), and bit c7(k), to obtain mapped signal b(k).

Mapper 6802 performs modulation using a modulation scheme that uses 16 signal points, such as 16QAM, on, for example, bit c0(k), bit c1(k), bit c2(k), and bit c3(k), to obtain mapped signal a'(k).

Mapper 6802 performs modulation using a modulation scheme that uses 16 signal points, such as 16QAM, on, for example, bit c4(k), bit c5(k), bit c6(k), and bit c7(k), to obtain mapped signal b'(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1). i.e., mapped signal 6803A whose symbol number i=2k+1, is expressed as b(k), and s2(i=2k+1), i.e., mapped signal 6803B whose symbol number i=2k+1, is expressed as a'(k).

Regarding the relationship between "a(k) and a(k)" and "b(k) and b'(k)", as described above, for example, the relationship between "bits (for example x0, x1, x2, x3 (x2 and x3 are added since there are 16 signal points)) to be transmitted for generation of a(k) and the distribution of signal points" and the relationship between "bits (for example x0 x1, x2, x3) to be transmitted for generation of a'(k) and the distribution of signal points" may be the same, and, alternatively, may be different.

Other examples include "the modulation scheme for generating a(k) and the modulation scheme for generating a'(k) are different" and "the signal point distribution in the in-phase I-quadrature Q plane for generating a(k) and the signal point distribution in the in-phase I-quadrature Q plane for generating a'(k) are different".

Note that "different signal point distributions in the in-phase I-quadrature Q plane" means, for example, when the coordinates of 16 signal points in the in-phase I-quadrature Q plane for generating a(k), at least one of the 16 signal points in the in-phase I-quadrature Q plane for generating a'(k) does not overlap with any one of the 16 signal points in the in-phase I-quadrature Q plane for generating a(k).

Regarding the relationship between "a(k) and a'(k)" and "b(k) and b'(k)", as described above, for example, the relationship between "bits (for example x0, x1, x2, and x3 (x2 and x3 are added since there are 16 signal points)) to be transmitted for generation of b(k) and the distribution of signal points" and the relationship between "bits (for example x0 x1, x2, x3) to be transmitted for generation of b'(k) and the distribution of signal points" may be the same, and, alternatively, may be different.

Other examples include "the modulation scheme for generating b(k) and the modulation scheme for generating b'(k) are different" and "the signal point distribution in the in-phase I-quadrature Q plane for generating b(k) and the signal point distribution in the in-phase I-quadrature Q plane for generating b'(k) are different".

Note that "different signal point distributions in the in-phase I-quadrature Q plane" means, for example, when the coordinates of 16 signal points in the in-phase I-quadrature Q plane for generating b(k), at least one of the 16 signal points in the in-phase I-quadrature Q plane for generating b'(k) does not overlap with any one of the 16 signal points in the in-phase I-quadrature Q plane for generating b(k).

As described above, since mapped signal 6803A corresponds to 105_1 in FIG. 1 and mapped signal 6803B corresponds to 105_2 FIG. 1, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 1.

Fifth Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly, repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 105_1, 105_2.

Figure 77:
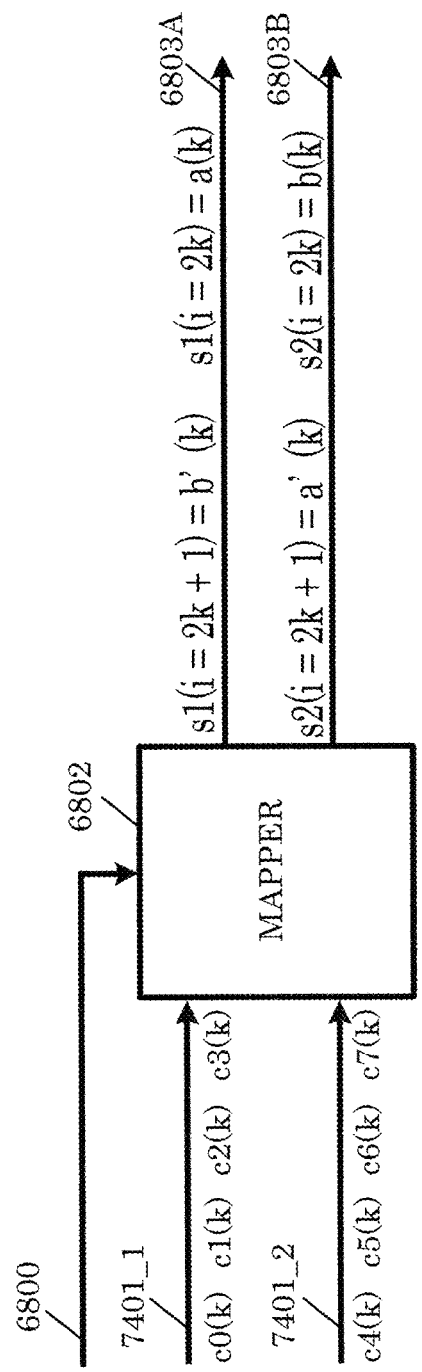
FIG. 77 illustrates operations performed by the mapper illustrated in FIG. 73.

FIG. 77 illustrates operations performed by mapper 7301 illustrated in FIG. 73. In FIG. 77, components that operate the same as in FIG. 68, FIG. 74 share like reference marks. Accordingly, repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to 100 in FIG. 73, encoded data 7401_1 corresponds to 103_1 in FIG. 73, encoded data 7401_2 corresponds to 103_2 in FIG. 73, mapper 6802 corresponds to 7301 in FIG. 73, mapped signal 6803A corresponds to 105_1 in FIG. 73, and mapped signal 6801B corresponds to 105_2 in FIG. 73.

For example, mapper 6802 receives inputs of bits c0(k), c1(k), c2(k), and c3(k) as encoded data 74011, and bits c4(k), c5(k), c6(k), and c7(k) as encoded data 7401_2. Note that k is an integer that is greater than or equal to 0.

Mapper 6802 performs modulation using a modulation scheme that uses 16 signal points, such as 16QAM, on, for example, bit c0(k), bit c1(k), bit c2(k), and bit c3(k), to obtain mapped signal a(k).

Mapper 6802 performs modulation using a modulation scheme that uses 16 signal points, such as 16QAM, on, for example, bit c4(k), bit c5(k), bit c6(k), and bit c7(k), to obtain mapped signal b(k).

Mapper 6802 performs modulation using a modulation scheme that uses 16 signal points, such as 16QAM, on, for example, bit c0(k), bit c1(k), bit c2(k), and bit c3(k), to obtain mapped signal a'(k).

Mapper 6802 performs modulation using a modulation scheme that uses 16 signal points, such as 16QAM, on, for example, bit c4(k), bit c5(k), bit c6(k), and bit c7(k), to obtain mapped signal b'(k)

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1), i.e., mapped signal 6803A whose symbol number i=2k+1, is expressed as b'(k), and s2(i=2k+1), i.e., mapped signal 6803B whose symbol number i=2k+1, is expressed as a'(k).

Next, the relationship between "a(k) and a'(k)" and "b(k) and b'(k)" will be described with reference to the fourth example.

As described above, since mapped signal 6803A corresponds to 105_1 in FIG. 73 and mapped signal 6803B corresponds to 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Sixth Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly, repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 105_1, 105_2.

Figure 78:
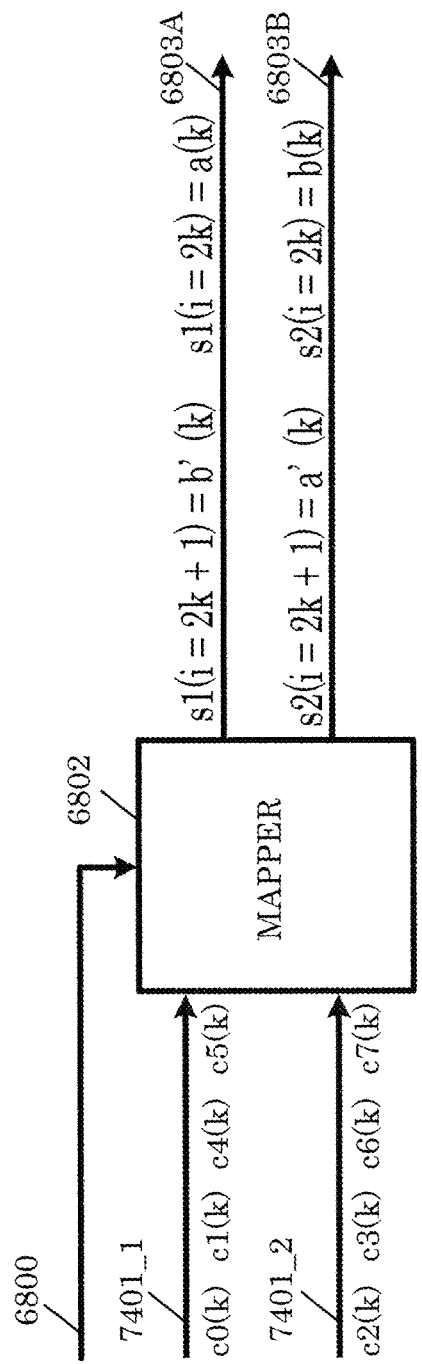
FIG. 78 illustrates operations performed by the mapper illustrated in FIG. 73.

FIG. 78 illustrates operations performed by mapper 7301 illustrated in FIG. 73. In FIG. 78, components that operate the same as in FIG. 68, FIG. 74 share like reference marks. Accordingly, repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to 100 in FIG. 73, encoded data 7401_1 corresponds to 103_1 in FIG. 73, encoded data 7401_2 corresponds to 103_2 in FIG. 73, mapper 6802 corresponds to 7301 in FIG. 73, mapped signal 6803A corresponds to 105_1 in FIG. 73, and mapped signal 6801B corresponds to 105_2 in FIG. 73.

For example, mapper 6802 receives inputs of bits c0(k), c1(k), c4(k), and c5(k) as encoded data 7401_1, and bits c2(k), c3(k), c6(k), and c7(k) as encoded data 7401_2. Note that k is an integer that is greater than or equal to 0.

Mapper 6802 performs modulation using a modulation scheme that uses 16 signal points, such as 16QAM, on, for example, bit c0(k), bit c1(k), bit c2(k), and bit c3(k), to obtain mapped signal a(k).

Mapper 6802 performs modulation using a modulation scheme that uses 16 signal points, such as 16QAM, on, for example, bit c4(k), bit c5(k), bit c6(k), and bit c7(k), to obtain mapped signal b(k).

Mapper 6802 performs modulation using a modulation scheme that uses 16 signal points, such as 16QAM, on, for example, bit c0(k), bit c1(k), bit c2(k), and bit c3(k), to obtain mapped signal a'(k).

Mapper 6802 performs modulation using a modulation scheme that uses 16 signal points, such as 16QAM, on, for example, bit c4(k), bit c5(k), bit c6(k), and bit c7(k), to obtain mapped signal b'(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k), i.e., mapped signal 6803A whose symbol number i=2k, is expressed as a(k), s2(i=2k), i.e., mapped signal 6803B whose symbol number i=2k, is expressed as b(k), s1(i=2k+1), i.e., mapped signal 6803A whose symbol number i=2k+1, is expressed as b'(k), and s2(i=2k+1), i.e., mapped signal 6803B whose symbol number i=2k+1, is expressed as a'(k).

Next, the relationship between "a(k) and a'(k)" and "b(k) and b'(k)" will be described with reference to the fourth example.

As described above, since mapped signal 6803A corresponds to 105_1 in FIG. 73 and mapped signal 6803B corresponds to 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

As described above, as a result of the transmission device transmitting a modulated signal, advantageous effects such as the reception device being able to achieve high data reception quality, and, for example, in environments in which direct waves are dominant, favorable data reception quality can be realized are achievable.

Note that a configuration in which the communications method (transmission method) described in this embodiment is selectable by the base station or AP and a configuration in which the terminal described in Embodiments A1, A2, and A4 transmit a reception capability notification symbol may be combined.

For example, when the terminal notifies the base station or AP that it supports phase change demodulated via information 3601 relating to support for demodulation of modulated signals with phase changes in FIG. 38, or notifies the base station or AP that it supports the transmission method (communications method) described in this embodiment via information 3702 relating to support for reception for a plurality of streams, the base station or AP can determine to transmit a plurality of modulated signals for a plurality of streams via the transmission method (communications method) described in this embodiment and then transmit the modulated signals. Accordingly, the terminal can achieve high data reception quality, and the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

Embodiment A11

In this embodiment, using the examples described in Embodiment A1, Embodiment A2, and Embodiment A4, another implementation method for operations performed by the terminal will be given.

FIG. 24 illustrates one example of a configuration of a terminal. As this example has already been described, repeated description will be omitted.

FIG. 41 illustrates one example of a configuration of reception device 2404 in the terminal illustrated in FIG. 24. As operations have already been described in Embodiment A4 in detail, description will be omitted from this embodiment.

FIG. 42 illustrates an example of a frame configuration upon single modulated signal transmission by a base station or AP, which is the communication partner of the terminal, using a multi-carrier transmission scheme such as OFDM. In FIG. 42, components that operate the same as in FIG. 4 share like reference marks. As operations have already been described in Embodiment A4 in detail, description will be omitted from this embodiment.

For example, the transmission device in the base station illustrated in FIG. 1 may transmit a single stream modulated signal having the frame configuration illustrated in FIG. 42.

FIG. 43 illustrates an example of a frame configuration upon single modulated signal transmission by a base station or AP, which is the communication partner of the terminal, using a single-carrier transmission scheme. In FIG. 43, components that operate the same as in FIG. 39 share like reference marks.

For example, the transmission device in the base station illustrated in FIG. 1 may transmit a single stream modulated signal having the frame configuration illustrated in FIG. 43.

For example, the transmission device in the base station illustrated in FIG. 1 may transmit a plurality of streams of a plurality of modulated signals having the frame configuration illustrated in FIG. 4 and/or FIG. 5.

Furthermore, for example, the transmission device in the base station illustrated in FIG. 1 may transmit a plurality of streams of a plurality of modulated signals having the frame configuration illustrated in FIG. 39 and/or FIG. 40.

Figure 79:
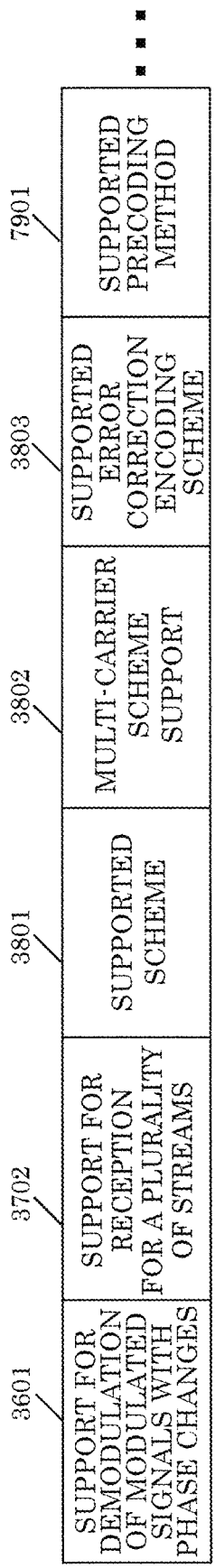
FIG. 79 illustrates an example of data included in a reception capability notification symbol transmitted by the terminal illustrated in FIG. 35.

FIG. 79 illustrates an example of data included in the reception capability notification symbol (3502) transmitted by the terminal illustrated in FIG. 35, different from the examples illustrated in FIG. 36, FIG. 37, and FIG. 38. Note that in FIG. 79, operations that are the same as in FIG. 36, FIG. 37, and FIG. 38 share like reference marks. Moreover, duplicate description of components that perform the same operations as in FIG. 36, FIG. 37, and FIG. 38 will be omitted.

Data 7901 relating to "supported precoding method" in FIG. 79 will be described.

When the base station or AP transmits a plurality of modulated signals for a plurality of streams, a single precoding method is selected from among a plurality of precoding schemes, and weighted synthesis is performed according to the selected precoding method (by, for example, weighting synthesizer 203 illustrated in FIG. 2) to generate a modulated signal to be transmitted. Note that, as described in the present specification, the base station or AP may perform a phase change.

Here, data for the terminal to notify the base station or AP of "whether the base station or AP is capable of demodulating the modulated signal when any one of the precoding is implemented" is data 7901 related to "supported precoding method".

For example, assume that the base station or AP may possibly support "Equation (33) or Equation (34)" as precoding method #A and support "θ=π/4 radians in Equation (15) or Equation (16)" as precoding method #B upon generating a plurality of streams of modulated signals.

Upon generating a plurality of streams of modulated signals, assume the base station or AP selects one of precoding method #A and precoding method #B and implements precoding (weighted synthesis) based on the selected precoding method, and transmits the modulated signals.

Here, the terminal transmits modulated signals including "information on whether, upon the base station or AP transmitting a plurality of modulated signals using precoding method #A, the terminal is capable of receiving the modulated signals, demodulating the modulated signals and obtaining data" and "information on whether, upon the base station or AP transmitting a plurality of modulated signals using precoding method #B, the terminal is capable of receiving the modulated signals, demodulating the modulated signals and obtaining data", and by receiving these modulated signals, the base station or AP can know of "whether the terminal, which is the communication partner, supports precoding method #A and/or precoding method #B and can demodulate the modulated signals".

For example, information 7901 on supported precoding method illustrated in FIG. 79 and included in reception capability notification symbol (3502) that is transmitted by the terminal is configured as follows.

Information 7901 on supported precoding method is configured of two bits, bit m0 and bit m1, and the terminal transmits bit m0 and bit m1 to the base station or AP, which is the communication partner, as information 7901 on supported precoding method.

If the terminal receives modulated signals generated using precoding method #A by the base station or AP and can demodulate (supports demodulation of) the received modulated signals, the terminal sets m0 to 1, and transmits, to the base station or AP, which is the communication partner, bit m0 as part of information 7901 on supported precoding method.

Moreover, if the terminal receives modulated signals generated using precoding method #A by the base station or AP but does not support demodulation of the received modulated signals, the terminal sets m0 to 0, and transmits, to the base station or AP, which is the communication partner, bit m0 as part of information 7901 on supported precoding method.

If the terminal receives modulated signals generated using precoding method #B by the base station or AP and can demodulate (supports demodulation of) the received modulated signals, the terminal sets m1 to 1, and transmits, to the base station or AP, which is the communication partner, bit m1 as part of information 7901 on supported precoding method.

Moreover, if the terminal receives modulated signals generated using precoding method #B by the base station or AP but does not support demodulation of the received modulated signals, the terminal sets m1 to 0, and transmits, to the base station or AP, which is the communication partner, bit m1 as part of information 7901 on supported precoding method.

Next, a specific operational example will be given.

As a first example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

Thus, when the communication partner transmits a plurality of streams of modulated signals and phase change is implemented, the terminal supports reception of such.

The reception device of the terminal supports a single-carrier scheme and an OFDM scheme.

The reception device of the terminal supports decoding of "error correction encoding scheme #C" and decoding of "error correction encoding scheme #D" as an error correction encoding scheme.

The reception device of the terminal supports reception under "precoding method #A" and "precoding method #B" described above.

Therefore, based on the rules described in Embodiment A2, a terminal having the configuration illustrated in FIG. 8 that supports the above generates reception capability notification symbol 3502 illustrated in FIG. 79 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 79 and transmission device 2403 illustrated in FIG. 24 transmits reception capability notification symbol 3502 illustrated in FIG. 79 in accordance with the sequence illustrated in FIG. 35.

Note that in the case of the first example, bit m0 and bit m1 of information 7901 on supported precoding method are set to 1 and 1, respectively.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly, based on information 3702 relating to support for reception for a plurality of streams in FIG. 79, control signal generator 2308 in the base station knows that even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports demodulation of modulated signals with phase changes based on information 3601 relating to support for demodulation of modulated signals with phase changes in FIG. 79.

Control signal generator 2308 in the base station knows that the terminal supports a single-carrier scheme and an OFDM scheme based on information 3802 relating to multi-carrier scheme support in FIG. 79.

Then, based on information 3803 relating to supported error correction encoding scheme in FIG. 79, control signal generator 2308 in the base station knows that the terminal supports decoding of error correction encoding scheme #C and decoding of error correction encoding scheme #D.

Based on information 7901 relating to supported precoding method in FIG. 79, control signal generator 2308 in the base station knows that the terminal supports reception under precoding method #A and reception under precoding method #B.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a second example, the reception device of the terminal has the configuration illustrated in FIG. 41, and, for example, supports the following.

For example, the reception device of the terminal supports reception under "communications scheme #A" and "communications scheme #B" described in Embodiment A2.

Accordingly, even if the communication partner transmits a plurality of streams of a plurality of modulated signals, the reception device of the terminal does not support reception of such.

Thus, when the communication partner transmits a plurality of streams of a plurality of modulated signals and phase change is implemented, the terminal does not support reception of such.

The reception device of the terminal supports a single-carrier scheme and an OFDM scheme.

The reception device of the terminal supports decoding of "error correction encoding scheme #C" and decoding of "error correction encoding scheme #D" as an error correction encoding scheme.

The reception device of the terminal does not support reception under "precoding method #A" and "precoding method #B" described above.

Therefore, based on the rules described in Embodiment A2, a terminal having the configuration illustrated in FIG. 41 that supports the above generates reception capability notification symbol 3502 illustrated in FIG. 79 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 79 and transmission device 2403 illustrated in FIG. 24 transmits reception capability notification symbol 3502 illustrated in FIG. 79 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly, based on information 3702 relating to support for reception for a plurality of streams in FIG. 79, control signal generator 2308 in the base station knows that in "even if the communication partner transmits a plurality of streams of a plurality of modulated signals, the terminal does not support reception of such".

Accordingly, based on information 3601 relating to support for demodulation of modulated signals with phase changes in FIG. 79 being null, control signal generator 2308 in the base station determines to not transmit a phase-changed modulated signal, and outputs control signal 2309 including such information.

Control signal generator 2308 in the base station determines that information 7901 related to supported precoding method in FIG. 79 is null and the plurality of modulated signals for the plurality of streams will not be transmitted, and outputs control signal 2309 including such information.

Control signal generator 2308 in the base station knows that the terminal supports a single-carrier scheme and an OFDM scheme based on information 3601 relating to multi-carrier scheme support in FIG. 79.

Then, based on information 3803 relating to supported error correction encoding scheme in FIG. 79, control signal generator 2308 in the base station knows that the terminal supports decoding of error correction encoding scheme #C and decoding of error correction encoding scheme #D.

For example, the terminal has the configuration illustrated in FIG. 41, and thus operates are described above to prevent the plurality of modulated signals for the plurality of streams from being transmitted by the base station or AP to allow the base station or AP to accurately transmit modulated signals that can be demodulated and decoded by the terminal. This makes it possible to achieve an advantageous effect of an improvement in data transmission efficiency in the system including the base station or AP and terminal.

As a third example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

Thus, when the communication partner transmits a plurality of streams of modulated signals and phase change is implemented, the terminal supports reception of such.

The reception device of the terminal supports a single-carrier scheme and an OFDM scheme.

The reception device of the terminal supports decoding of "error correction encoding scheme #C" and decoding of "error correction encoding scheme #D" as an error correction encoding scheme.

The reception device of the terminal supports reception of "precoding method #A" described above.

Therefore, based on the rules described in Embodiment A2, a terminal having the configuration illustrated in FIG. 8 that supports the above generates reception capability notification symbol 3502 illustrated in FIG. 79 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 79 and transmission device 2403 illustrated in FIG. 24 transmits reception capability notification symbol 3502 illustrated in FIG. 79 in accordance with the sequence illustrated in FIG. 35.

Note that in the case of the third example, bit m0 and bit m1 of information 7901 on supported precoding method are set to 1 and 0, respectively.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly, based on information 3702 relating to support for reception for a plurality of streams in FIG. 79, control signal generator 2308 in the base station knows that even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports demodulation of modulated signals with phase changes based on information 3601 relating to support for demodulation of modulated signals with phase changes in FIG. 79.

Control signal generator 2308 in the base station knows that the terminal supports a single-carrier scheme and an OFDM scheme based on information 3802 relating to multi-carrier scheme support in FIG. 79.

Then, based on information 3803 relating to supported error correction encoding scheme in FIG. 79, control signal generator 2308 in the base station knows that the terminal supports decoding of error correction encoding scheme #C and decoding of error correction encoding scheme #D.

Then, based on information 7901 relating to supported precoding method in FIG. 79, control signal generator 2308 in the base station knows that the terminal supports reception under precoding method #A.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a fourth example, the reception device of the terminal has the configuration illustrated in FIG. 8, and, for example, supports the following.

For example, the reception device of the terminal supports reception under "communications scheme #A" and "communications scheme #B" described in Embodiment A2.

Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such.

The reception device of the terminal supports single-carrier schemes. Note that in a single-carrier scheme, the base station, which is the communication partner, does not support "implementation of a phase change for a plurality of streams of a plurality of modulated signals, and does not support "implementations of precoding".

Thus, when the communication partner transmits a plurality of streams of a plurality of modulated signals and phase change is implemented, the terminal does not support reception of such.

The reception device of the terminal supports decoding of "error correction encoding scheme #C" and decoding of "error correction encoding scheme #D" as an error correction encoding scheme.

The reception device of the terminal supports reception of "precoding method #A" described above.

Therefore, based on the rules described in Embodiment A2, a terminal having the configuration illustrated in FIG. 8 that supports the above generates reception capability notification symbol 3502 illustrated in FIG. 79 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 79 and transmission device 2403 illustrated in FIG. 24 transmits reception capability notification symbol 3502 illustrated in FIG. 79 in accordance with the sequence illustrated in FIG. 35.

Accordingly, based on information 3702 relating to support for reception for a plurality of streams in FIG. 79, control signal generator 2308 in the base station knows that even if the communication partner transmits a plurality of streams of a plurality of modulated signals, the terminal supports reception of such, and in "communications scheme #A" and "communications scheme #B", even if the communication partner transmits a single stream modulated signal, the terminal supports reception of such.

Control signal generator 2308 in the base station knows that the terminal supports single-carrier schemes based on information 3802 relating to multi-carrier scheme support in FIG. 79.

Accordingly, based on information 3601 relating to support for demodulation of modulated signals with phase changes in FIG. 79 being null, control signal generator 2308 in the base station determines to not transmit a phase-changed modulated signal, and outputs control signal 2309 including such information. Control signal generator 2308 in the base station determines that information 7901 related to supported precoding method in FIG. 79 is null, and outputs control information 2309 indicating that precoding method #A is supported.

Then, based on information 3803 relating to supported error correction encoding scheme in FIG. 79, control signal generator 2308 in the base station knows that the terminal supports decoding of error correction encoding scheme #C and decoding of error correction encoding scheme #D.

Accordingly, the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a fifth example, the reception device of the terminal has the configuration illustrated in FIG. 41, and, for example, supports the following.

For example, the reception device of the terminal supports reception under "communications scheme #A" described in Embodiment A2.

Accordingly, even if the communication partner transmits a plurality of streams of a plurality of modulated signals, the terminal does not support reception of such.

Thus, when the communication partner transmits a plurality of streams of a plurality of modulated signals and phase change is implemented, the terminal does not support reception of such.

Furthermore, even if the communication partner transmits a plurality of streams of a plurality of modulated signals generated using "precoding method #A", the terminal does not support reception of such, and even if the communication partner transmits a plurality of streams of a plurality of modulated signals generated using "precoding method #B", the terminal does not support reception of such.

Only single-carrier scheme is supported.

The terminal supports only decoding of "error correction encoding scheme #C" as an error correction encoding scheme.

Therefore, based on the rules described in Embodiment A2, a terminal having the configuration illustrated in FIG. 41 that supports the above generates reception capability notification symbol 3502 illustrated in FIG. 79 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 79 and transmission device 2403 illustrated in FIG. 24 transmits reception capability notification symbol 3502 illustrated in FIG. 79 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A is supported from supported scheme 3801.

Based on information 3601 related to support for demodulation of modulated signals with phase changes in FIG. 79 being null and communications scheme #A being supported, control signal generator 2308 in the base station determines to not transmit modulated signals implemented with a phase change, and outputs control signal 2309 including such information. This is because communications scheme #A does not support multi-stream multi-modulated-signal transmission or reception.

Based on information 3702 relating to support for reception for a plurality of streams in FIG. 79 being null and communications method #A being supported, control signal generator 2308 in the base station determines to not transmit a plurality of modulated signals for a plurality of streams, and outputs control signal 2309 including such information. This is because communications scheme #A does not support transmission or reception of a plurality of modulated signals for a plurality of streams.

Control signal generator 2308 in the base station determines that information 7901 related to supported precoding method in FIG. 79 is null since communications scheme #A is supported, determines not to transmit the plurality of modulated signals for the plurality of streams, and outputs control signal 2309 including such information.

Based on information 3803 relating to supported error correction encoding scheme in FIG. 79 being null and communications method #A being supported, control signal generator 2308 in the base station determines to use error correction encoding scheme #C, and outputs control signal 2309 including such information. This is because communications scheme #A supports error correction encoding scheme #C.

For example, as illustrated in FIG. 41, since communications method #A is supported, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the communications method #A modulated signal being accurately transmitted.

As described above, the base station or AP obtains, from the terminal, which is the communication partner of the base station or AP, information relating to a scheme in which demodulation is supported by the terminal, and based on that information, determines the number of modulated signals, the communications method of the modulated signals, and the signal processing method of the modulated signals, for example, and as a result, the base station or AP can accurately generate and transmit a modulated signal receivable by the terminal, which makes it possible to achieve an advantageous effect of an improvement in data transmission efficiency in the system including the base station or AP and terminal.

Here, for example, as illustrated in FIG. 79, by configuring a reception capability notification symbol of a plurality of items of information, the base station or AP can easily determine the validity of information included in the reception capability notification symbol, and as a result, it is possible to rapidly determine, for example, a modulated signal scheme and signal processing method to be used for transmission.

Then, based on information on the reception capability notification symbol transmitted by the terminals, the base station or AP can improve data transmission efficiency by transmitting modulated signals to each terminal using a suitable transmission method.

Note that the method of configuring the information on the reception capability notification symbol described in this embodiment is merely one non-limiting example. Moreover, the order in which and timing at which the terminal transmits the reception capability notification symbols to the base station or AP described in this embodiment are merely non-limiting examples.

Embodiment B1

In this embodiment, an example of a specific phase change method used under a single-carrier (SC) scheme will be described.

In this embodiment, a case in which the base station or AP and the terminal communicate with each other will be supposed. Here, one example of the configuration of the transmission device in the base station or AP is as illustrated in FIG. 1. Since this configuration has been described in other embodiments, repeated description will be omitted.

Figure 81:
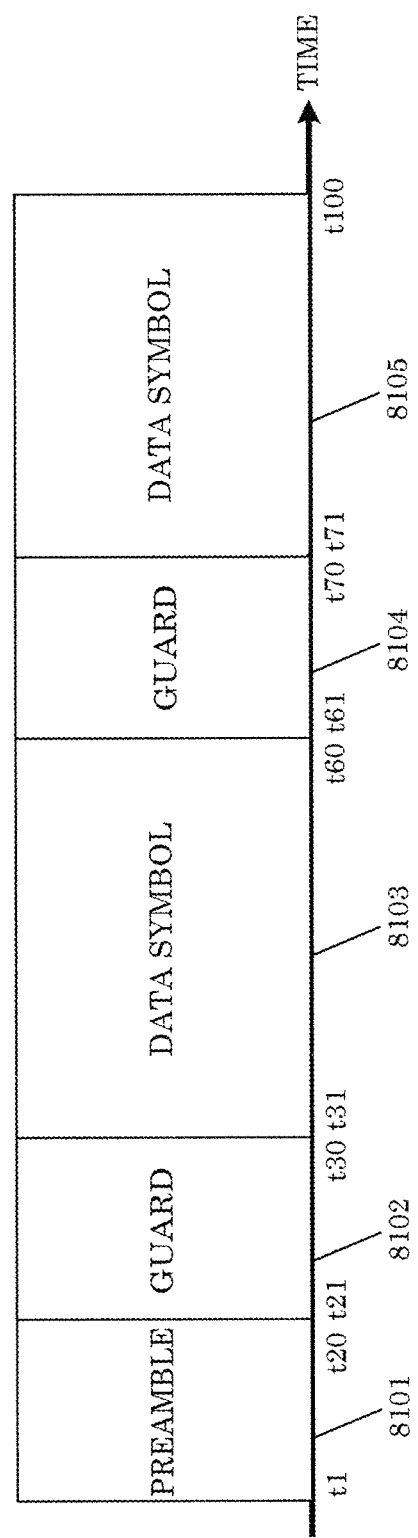
FIG. 81 illustrates one example of a frame configuration of a transmission signal illustrated in FIG. 1.

FIG. 81 illustrates an example of a frame configuration of transmission signal 108_A illustrated in FIG. 1. In FIG. 81, time is represented on the horizontal axis (accordingly, this relates to a single-carrier scheme signal).

As illustrated in FIG. 81, in transmission signal 108_A, the base station or AP transmits preamble 8101 from time t1 to time t20, transmits guard 8102 using time t21 through time t30, transmits data symbol 8103 using time t31 through time t60, transmits guard 8104 using t61 through t70, and transmits data symbol 8105 using t71 through t100.

Figure 82:
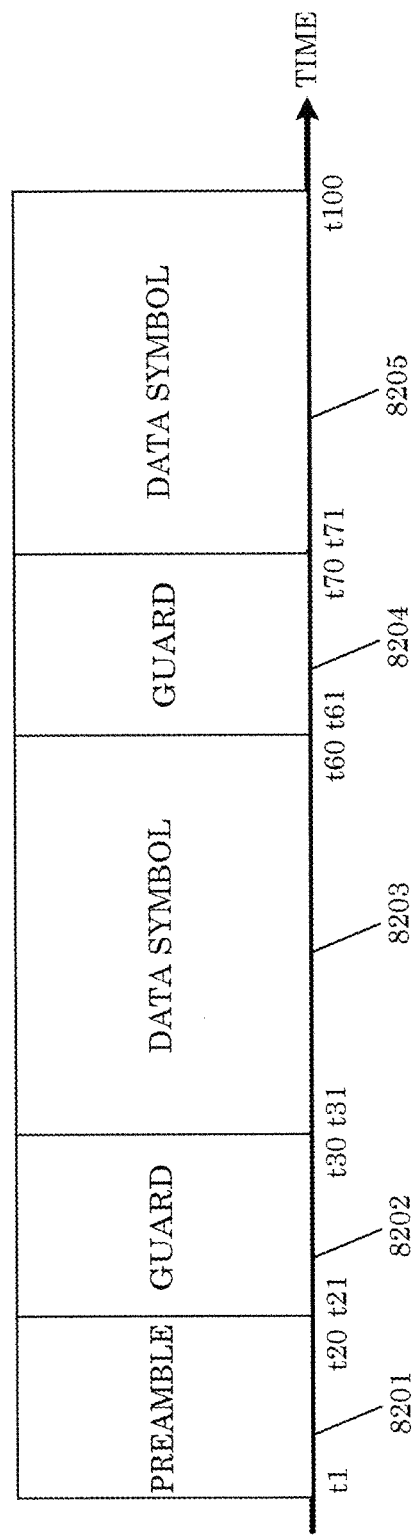
FIG. 82 illustrates one example of a frame configuration of a transmission signal illustrated in FIG. 1.

FIG. 82 illustrates an example of a frame configuration of transmission signal 108_B illustrated in FIG. 1. In FIG. 82, time is represented on the horizontal axis (accordingly, this relates to a single-carrier scheme signal).

As illustrated in FIG. 82, in transmission signal 108_1B, the base station or AP transmits preamble 8201 from time t1 to time t20, transmits guard 8202 using time t21 through time t30, transmits data symbol 8203 using time t31 through time t60, transmits guard 8204 using t61 through t70, and transmits data symbol 8205 using t71 through t100.

Note that preamble 8101 and 8201 are symbols for channel estimation by the terminal, which is the communication partner of the base station or AP, and, for example, the mapping method is PSK (phase shift keying) known to the base station and terminal. Preambles 8101 and 8201 are transmitted at the same time using the same frequency.

Guards 8102 and 8202 are symbols that are inserted upon generation of single-carrier scheme modulated signals. Guards 8102 and 8202 are transmitted at the same time using the same frequency.

Data symbols 8103 and 8203 are data symbols for the base station or AP to transmit data to the terminal. Data symbols 8103 and 8203 are transmitted at the same time using the same frequency.

Guards 8104 and 8204 are symbols that are inserted upon generation of single-carrier scheme modulated signals. Guards 8104 and 8204 are transmitted at the same time using the same frequency.

Data symbols 8105 and 8205 are data symbols for the base station or AP to transmit data to the terminal. Data symbols 8105 and 8205 are transmitted at the same time using the same frequency.

Similar to Embodiment 1, the base station or AP generates mapped signal s1(t) and mapped signal s2(t). When data symbols 8102 and 8105 include only mapped signal s1(t), data symbols 8202 and 8205 include only mapped signal s2(t). Moreover, when data symbols 8102 and 8105 include only mapped signal s2(t), data symbols 8202 and 8205 include only mapped signal s1(t). When data symbols 8102 and 8105 include both mapped signal s1(t) and mapped signal s2(t), data symbols 8202 and 8205 include both mapped signal s1(t) and mapped signal s2(t). As this has already been described in, for example, Embodiment 1, detailed description will be omitted.

For example, the configuration of signal processor 106 illustrated in FIG. 1 is as illustrated in FIG. 2. Hereinafter, two suitable examples of when a single-carrier scheme is used will be given.

Suitable Example 1

As a first measure in the first example, a phase change is implemented in phase changer 205B, and a phase change is not implemented in phase changer 209B. Note that control of this is performed by control signal 200. Here, the signal corresponding to transmission signal 108A in FIG. 1 is signal 208A in FIG. 2, and the signal corresponding to transmission signal 108B in FIG. 1 is signal 210B in FIG. 2.

As a second measure in the first example, a phase change is implemented in phase changer 205B, and phase changer 209B is omitted. Here, the signal corresponding to transmission signal 108A in FIG. 1 is signal 208A in FIG. 2, and the signal corresponding to transmission signal 108B in FIG. 1 is signal 208B in FIG. 2.

In suitable Example 1, either one of the first and second measures may be implemented.

Next, operations performed by phase changer 205B will be described. Similar to the description given in Embodiment 1, in phase changer 205B, a phase change is implemented on a data symbol. Similar to Embodiment 1, the phase change value of symbol number i in phase changer 205B is expressed as y(i). y(i) is applied with the following equation.

[MATH. 153]

$$y(i) = e^{j\lambda(i)} \qquad \text{Equation (153)}$$

In FIG. 81 and FIG. 82, data symbols are present at i=t31, t32, t33 . . . t58, t59, and t60, and i=t71, t72, t73 . . . t98, t99, and t100. Here, one important condition is that either one of Equation (154) and Equation (155) is satisfied.

[MATH. 154]

$$\frac{\pi}{2} \text{ radians} < \lambda(i) - \lambda(i-1) < \pi \text{ radians} \qquad \text{Equation (154)}$$

[MATH. 155]

$$\pi \text{ radians} < \lambda(i) - \lambda(i-1) < \frac{3\pi}{2} \text{ radians} \qquad \text{Equation (155)}$$

Note that in Equation (154) and Equation (155), i=t32, t33, t34 . . . t58, t59, and t60, or i=t72, t73, t74 . . . t98, t99, t100. To rephrase "either one of Equation (154) and Equation (155) is satisfied", when $\lambda(i)-\lambda(i-1)$ is greater than or equal to 0 radians and less than $2\pi$ radians, the value is as close to n as possible.

Taking into consideration the transmission spectrum, $\lambda(i)-\lambda(i-1)$ need be a fixed value. As described in other embodiments, in environments in which direct waves are dominant, it is important $\lambda(i)$ be switched regularly by the reception device in the terminal, which is the communication partner of the base station or AP, in order to achieve good data reception quality. The cycle of $\lambda(i)$ may be increased as needed. For example, consider a case in which the cycle is set to 5 or higher.

When cycle X=2×n+1 (note that n is an integer that is greater than or equal to 2), it is sufficient if the following conditions are satisfied.

When i satisfies i=t32, t33, t34 . . . t58, t59, and t60, or i=t72, t73, t74 . . . t98, t99, t100, in any instance of i, Equation (156) is satisfied.

[MATH. 156]

$$\lambda(i) - \lambda(i-1) = \pi - \frac{\pi}{2 \times n + 1} \text{ radians} \qquad \text{Equation (156)}$$

When cycle X=2×m (note that m is an integer that is greater than or equal to 3), it is sufficient if the following conditions are satisfied.

When i satisfies i=t32, t33, t34 . . . t58, t59, and t60, or i=t72, t73, t74 . . . t98, t99, t100, in any instance of i, Equation (157) is satisfied.

[MATH. 157]

$$\lambda(i) - \lambda(i-1) = \pi - \frac{\pi}{m} \text{ radians} \qquad \text{Equation (157)}$$

It was stated that "when $\lambda(i)-\lambda(i-1)$ is greater than or equal to 0 radians and less than $2\pi$ radians, the value is as close to n as possible". This will be described next.

Figure 83:
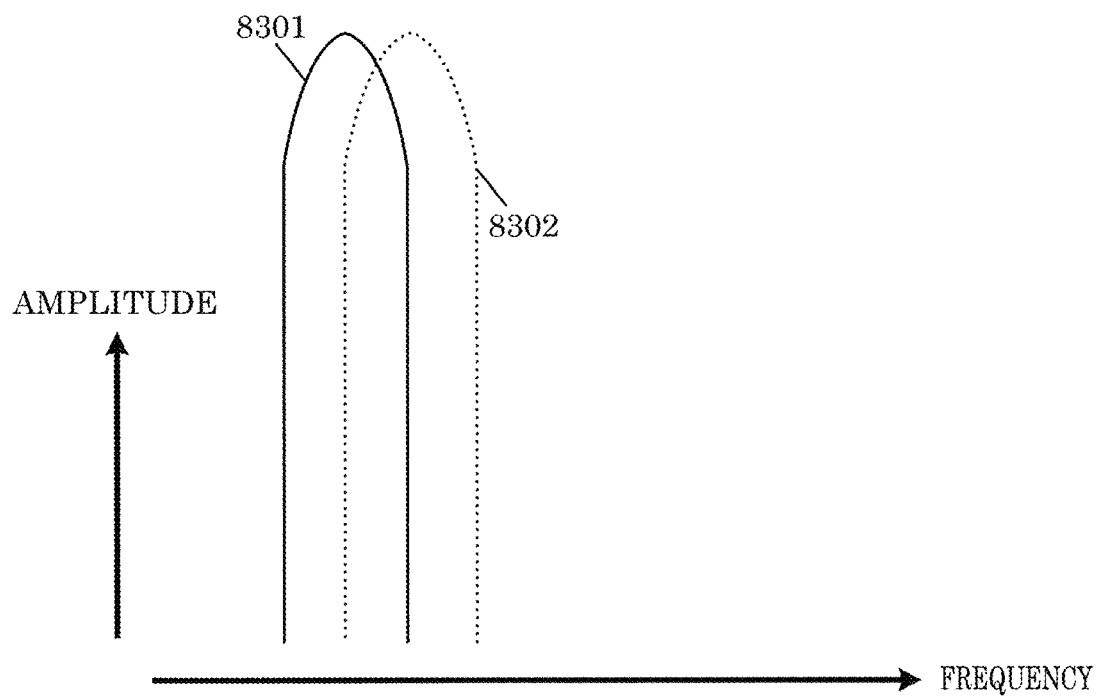
FIG. 83 illustrates one example of a spectrum of a transmission signal illustrated in FIG. 1.

In FIG. 83, a phase change is not implemented, that is to say, the spectrum of transmission signal 108A in FIG. 1 (signal 208A in FIG. 2) is illustrated by solid line 8301 in FIG. 83. In FIG. 83, frequency is represented on the horizontal axis and amplitude is represented on the vertical axis.

In phase changer 205B illustrated in FIG. 2, when $\lambda(i)-\lambda(i-1)$ is set to n radians and a phase change is implemented, the spectrum of transmission signal 108B in FIG. 1 is expressed by dotted line 8302 in FIG. 83.

As illustrated in FIG. 83, spectrum 8301 and spectrum 8302 effectively partially overlap. When transmission is performed to achieve this state, when the propagation environment of the base station and the terminal, which is the communication partner, is a multi-path environment, the multi-path effect on transmission signal 108A and the multi-path effect on transmission signal 108B are different, thereby improving the possibility that spatial diversity can be achieved. The effect of spatial diversity decreases as $\lambda(i)-\lambda(i-1)$ nears 0.

Accordingly, "when $\lambda(i)-\lambda(i-1)$ is greater than or equal to 0 radians and less than $2\pi$ radians, the value is as close to $\pi$ as possible".

However, when a phase change is implemented in phase changer 205B in FIG. 2, as described in the present specification, in an environment in which direct waves are dominant, it is possible to achieve the advantageous effect that the effect of data reception quality will increase. Accordingly, when $\lambda(i)-\lambda(i-1)$ is set to satisfy the above-described conditions, in a multi-path environment, an environment in which direct waves are dominant, or in both environments, it is possible to achieve a superior advantageous effect, namely that high data reception quality can be achieved by the terminal, which is the communication partner.

Suitable Example 2

In Example 2, phase changer 205B does not implement a phase change, and phase changer 209B does implement a phase change. Note that control of this is performed by control signal 200. Here, the signal corresponding to transmission signal 108A in FIG. 1 is signal 208A in FIG. 2, and the signal corresponding to transmission signal 108B in FIG. 1 is signal 210B in FIG. 2.

Next, operations performed by phase changer 209B will be described. In phase changer 209B, in the frame configuration illustrated in FIG. 82, a phase change is implemented on at least guards 8202 and 8204 and data symbols 8203 and 8205. Note that a phase change may or may not be applied to preamble 8201. The phase change value of phase changer 209B is expressed as g(i). g(i) is applied with the following equation.

[MATH. 158]

$$g(i)=e^{j\rho(i)} \qquad (158)$$

In FIG. 81 and FIG. 82, data symbols and guards are present at i=t21, t22, t23 . . . t98, t99, and t100. Here, one important condition is that either one of Equation (159) and Equation (160) is satisfied.

[MATH. 159]

$$\frac{\pi}{2} \text{ radians} < \rho(i) - \rho(i-1) < \pi \text{ radians} \qquad \text{Equation (159)}$$

[MATH. 160]

$$\pi \text{ radians} < \rho(i) - \rho(i-1) < \frac{3\pi}{2} \text{ radians} \qquad \text{Equation (160)}$$

Note that in Equation (159) and Equation (160), i=t22, t23, t24 . . . t98, t99, and t100. To rephrase "either one of Equation (159) and Equation (160) is satisfied", when ρ(i)-ρ(i−1) is greater than or equal to 0 radians and less than 2n radians, the value is as close to u as possible.

Taking into consideration the transmission spectrum, ρ(i)-ρ(i−1) need be a fixed value. As described in other embodiments, in environments in which direct waves are dominant, it is important ρ(i) be switched regularly by the reception device in the terminal, which is the communication partner of the base station or AP, in order to achieve good data reception quality. The cycle of ρ(i) may be increased as needed. For example, consider a case in which the cycle is set to 5 or higher.

When cycle X=2×n+1 (note that n is an integer that is greater than or equal to 2), it is sufficient if the following conditions are satisfied.

When i satisfies i=t22, t23, t24 . . . t98, t99, t100, in any instance of i, Equation (161) is satisfied.

[MATH. 161]

$$\rho(i) - \rho(i-1) = \pi - \frac{\pi}{2 \times n + 1} \text{ radians} \qquad \text{Equation (161)}$$

When cycle X=2×m (note that m is an integer that is greater than or equal to 3), it is sufficient if the following conditions are satisfied.

When i satisfies i=t22, t23, t24 . . . t98, t99, t100, in any instance of i, Equation (162) is satisfied.

[MATH. 162]

$$\rho(i) - \rho(i-1) = \pi - \frac{\pi}{m} \text{ radians} \qquad \text{Equation (162)}$$

It was stated that "when ρ(i)-ρ(i−1) is greater than or equal to 0 radians and less than 2π radians, the value is as close to π as possible". This will be described next.

In FIG. 83, a phase change is not implemented, that is to say, the spectrum of transmission signal 108A in FIG. 1 (signal 208A in FIG. 2) is illustrated by solid line 8301 in FIG. 83. In FIG. 83, frequency is represented on the horizontal axis and amplitude is represented on the vertical axis.

In phase changer 209B illustrated in FIG. 2, when ρ(i)-ρ(i−1) is set to n radians and a phase change is implemented, the spectrum of transmission signal 108B in FIG. 1 is expressed by dotted line 8302 in FIG. 83.

As illustrated in FIG. 83, spectrum 8301 and spectrum 8302 effectively partially overlap. When transmission is performed to achieve this state, when the propagation environment of the base station and the terminal, which is the communication partner, is a multi-path environment, the multi-path effect on transmission signal 108A and the multi-path effect on transmission signal 108B are different, thereby improving the possibility that spatial diversity can be achieved. The effect of spatial diversity decreases as ρ(i)-ρ(i−1) nears 0.

Accordingly, "when ρ(i)-ρ(i−1) is greater than or equal to 0 radians and less than 2π radians, the value is as close to π as possible".

However, when a phase change is implemented in phase changer 209B in FIG. 2, as described in the present specification, in an environment in which direct waves are dominant, it is possible to achieve the advantageous effect that the effect of data reception quality will increase. Accordingly, when ρ(i)-ρ(i−1) is set to satisfy the above-described conditions, in a multi-path environment, an environment in which direct waves are dominant, or in both environments, it is possible to achieve a superior advantageous effect, namely that high data reception quality can be achieved by the terminal, which is the communication partner.

By setting the phase change value as described in the present embodiment, in both an environment including multiple paths and in an environment which direct waves are dominant, it is possible to achieve the advantageous effect of improvement in data reception quality in the terminal, which is the communication partner. Note that one conceivable configuration for the reception device in the terminal is a configuration like the one illustrated in FIG. 8, for example. However, as the operations illustrated in FIG. 8 have already been described in other embodiments, description will be omitted.

There are many methods for generating single-carrier scheme modulated signals. This embodiment can implement any of them for any of the schemes. Examples of single-carrier schemes include DFT (Discrete Fourier Transform)-Spread OFDM (Orthogonal Frequency Division Multiplexing), Trajectory Constrained DFT-Spread OFDM, OFDM based SC (Single Carrier), SC (Single Carrier)-FDMA (Frequency Division Multiple Access), and Guard interval DFT-Spread OFDM.

Moreover, the phase change method according to this embodiment achieves the same advantageous effects even when applied to a multi-carrier scheme such as OFDM. Note that when applied to a multi-carrier scheme, symbols may be aligned along the temporal axis, may be aligned along the frequency axis (carrier axis), and may be aligned along both temporal and frequency axes. This is also explained in other embodiments.

Embodiment B2

In this embodiment, preferable examples of the precoding method used in the transmission device in the base station or AP will be given.

In this embodiment, a case in which the base station or AP and the terminal communicate with each other will be supposed. Here, one example of the configuration of the transmission device in the base station or AP is as illustrated in FIG. 1. Since this configuration has been described in other embodiments, repeated description will be omitted.

Examples of the configuration of signal processor 106 in FIG. 1 are illustrated in FIG. 2, FIG. 18, FIG. 19, FIG. 20, FIG. 21, FIG. 22, FIG. 28, FIG. 29, FIG. 30, FIG. 31, FIG. 32, and FIG. 33, and examples of configurations including before and after weighting synthesizer 203 are illustrated in FIG. 59, FIG. 60, FIG. 61, FIG. 62, FIG. 63, FIG. 64, FIG. 65, FIG. 66 and FIG. 67.

In this embodiment, preferable examples of the weighting synthesis method used in weighting synthesizer 203 based on the modulation scheme (set) of mapped signal 201A (s1(t)) and mapped signal 201B (s2(t)) in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63. FIG. 64, FIG. 65, FIG. 66, and FIG. 67 will be given.

As a first example, the precoding method used in weighting synthesizer 203 when mapped signal 201A (s1(t)) is BPSK(Binary Phase Shift Keying) and mapped signal 201B (s2(t)) is BPSK or when mapped signal 201A (s1(t)) is π/2 shift BPSK and mapped signal 201B (s2(t)) is π/2 shift BPSK will be described.

Figure 84:
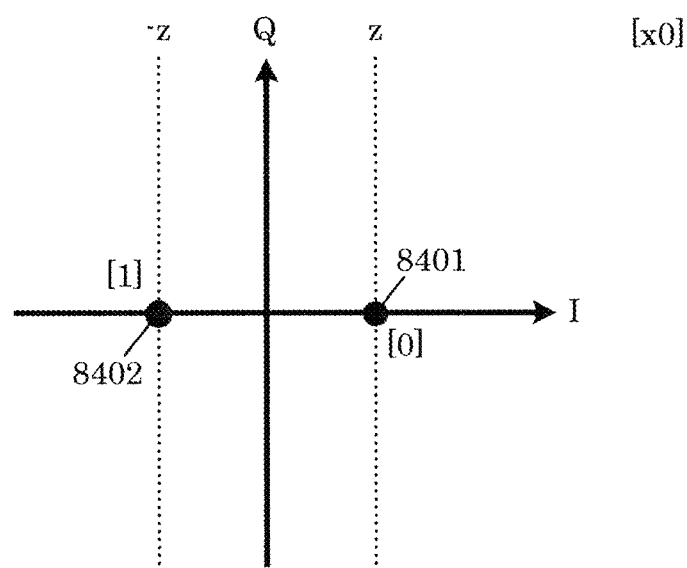
FIG. 84 illustrates an example of a distribution of signal points in an in-phase I-quadrature Q plane when BPSK is used.

First, a simple description of BPSK will be given. FIG. 84 illustrates an arrangement of signal points in an in-phase I-quadrature Q plane in the case of BPSK. In FIG. 84, 8401 and 8402 indicate signal points. For example, at symbol number i=0, when "x0=0" is transmitted in a BPSK symbol, the signal point is 8401, i.e., I=z, Q=0. Note that z is a real number that is greater than 0. When "x0=1" is transmitted in a BPSK symbol, the signal point is 8402, i.e., I=−z, Q=0. However, the relationship between x0 and the signal points is not limited to the example illustrated in FIG. 84.

Figure 85:
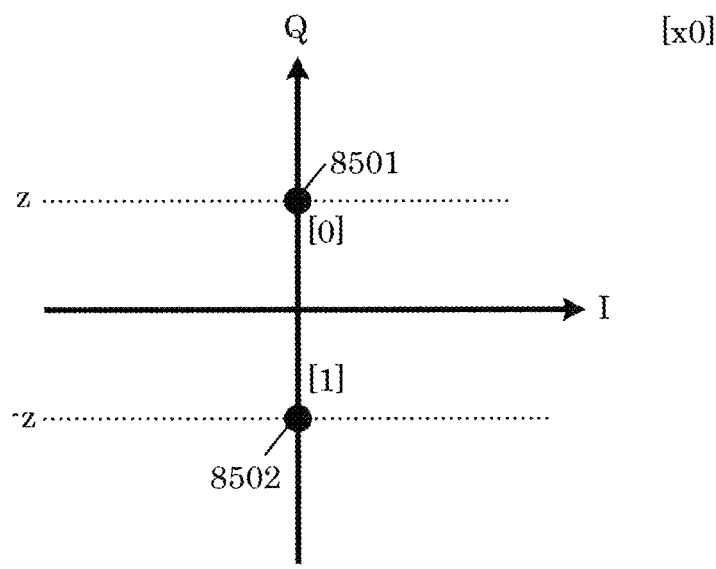
FIG. 85 illustrates an example of a distribution of signal points when symbol number i is an even number.

Next, a simple description of π/2 shift BPSK will be given. The symbol number is expressed as i. Note that i is an integer. When symbol number i is an odd number, the signal points are arranged as illustrated in FIG. 84. When symbol number i is an even number, the signal points are arranged as illustrated in FIG. 85. However, the relationship between x0 and the signal points is not limited to the examples illustrated in FIG. 84 and FIG. 85.

Next. FIG. 85 will be described. In FIG. 85, 8501 and 8502 indicate signal points. At symbol number i=1, when "x0=0" is transmitted, the signal point is 8501, i.e., I=0, Q=z. When "X0=1" is transmitted, the signal point is 8502, i.e., I=0, Q=−z. However, the relationship between x0 and the signal points is not limited to the example illustrated in FIG. 85.

As a different example of π/2 shift BPSK, when symbol number i is an odd number, the signal points are arranged as illustrated in FIG. 85, and when symbol number i is an even number, the signal points are arranged as illustrated in FIG. 84. However, the relationship between x0 and the signal points is not limited to the examples illustrated in FIG. 84 and FIG. 85.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, consider a case in which, for example, precoding matrix F or F(i) used in weighting synthesizer 203 is only a real number. For example, precoding matrix F is expressed with the following equation.

[MATH. 163]
$$F = \begin{pmatrix} 1 & -1 \\ 1 & 1 \end{pmatrix} \quad \text{Equation (163)}$$

Figure 86:
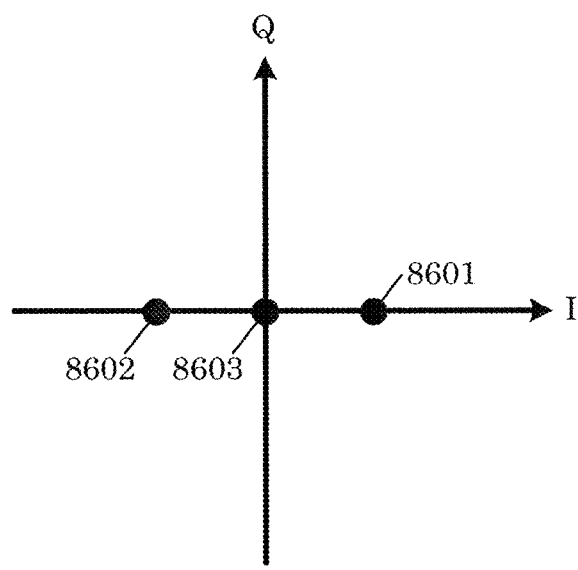
FIG. 86 illustrates signal points of a precoded signal in an in-phase I-quadrature Q plane when BPSK is used.

For example, in the case of BPSK, the signal points of the signal after precoding in in-phase I-quadrature Q plane include three points, namely, signal points 8601, 8602, and 8603 illustrated in FIG. 86 (one point overlaps with a signal point).

In this state, consider a case in which, as illustrated in FIG. 1, transmission signals 108_A and 108_B are transmitted and in the terminal, which is the communication partner, the reception power of either of transmission signal 108_A or transmission signal 108_B is low.

Here, as illustrated in FIG. 86, since there are only three signal points, a problem arises in which data reception quality is bad. Taking this into consideration, a method is proposed in which precoding matrix F is comprised of not only real numbers. In one example, precoding matrix F can be applied as follows.

[MATH. 164]
$$F = \begin{pmatrix} 1 & j \\ j & 1 \end{pmatrix} \quad \text{Equation (164)}$$

or

[MATH. 165]
$$F = \frac{\alpha}{\sqrt{2}} \begin{pmatrix} 1 & j \\ j & 1 \end{pmatrix} \quad \text{Equation (165)}$$

or

[MATH. 166]
$$F = \begin{pmatrix} \alpha \times 1 & \alpha \times j \\ \alpha \times j & \alpha \times 1 \end{pmatrix} \quad \text{Equation (166)}$$

or

[MATH. 167]
$$F = \begin{pmatrix} j & 1 \\ 1 & j \end{pmatrix} \quad \text{Equation (167)}$$

or

[MATH. 168]
$$F = \frac{\alpha}{\sqrt{2}} \begin{pmatrix} j & 1 \\ 1 & j \end{pmatrix} \quad \text{Equation (168)}$$

-continued or

[MATH. 169]

$$F = \begin{pmatrix} \alpha \times j & \alpha \times 1 \\ \alpha \times 1 & \alpha \times j \end{pmatrix} \quad \text{Equation (169)}$$

or

[MATH. 170]

$$F = \begin{pmatrix} 1 & j \\ 1 & -j \end{pmatrix} \quad \text{Equation (170)}$$

or

[MATH. 171]

$$F = \frac{\alpha}{\sqrt{2}} \begin{pmatrix} 1 & j \\ 1 & -j \end{pmatrix} \quad \text{Equation (171)}$$

or

[MATH. 172]

$$F = \begin{pmatrix} \alpha \times 1 & \alpha \times j \\ \alpha \times 1 & -\alpha \times j \end{pmatrix} \quad \text{Equation (172)}$$

or

[MATH. 173]

$$F = \begin{pmatrix} 1 & -j \\ 1 & j \end{pmatrix} \quad \text{Equation (173)}$$

or

[MATH. 174]

$$F = \frac{\alpha}{\sqrt{2}} \begin{pmatrix} 1 & -j \\ 1 & j \end{pmatrix} \quad \text{Equation (174)}$$

or

[MATH. 175]

$$F = \begin{pmatrix} \alpha \times 1 & -\alpha \times j \\ \alpha \times 1 & \alpha \times j \end{pmatrix} \quad \text{Equation (175)}$$

or

[MATH. 176]

$$F = \begin{pmatrix} j & 1 \\ -j & 1 \end{pmatrix} \quad \text{Equation (176)}$$

or

[MATH. 177]

$$F = \frac{\alpha}{\sqrt{2}} \begin{pmatrix} j & 1 \\ -j & 1 \end{pmatrix} \quad \text{Equation (177)}$$

or

[MATH. 178]

$$F = \begin{pmatrix} \alpha \times j & \alpha \times 1 \\ -\alpha \times j & \alpha \times 1 \end{pmatrix} \quad \text{Equation (178)}$$

or

[MATH. 179]

$$F = \begin{pmatrix} -j & 1 \\ j & 1 \end{pmatrix} \quad \text{Equation (179)}$$

or

[MATH. 180]

$$F = \frac{\alpha}{\sqrt{2}} \begin{pmatrix} -j & 1 \\ j & 1 \end{pmatrix} \quad \text{Equation (180)}$$

or

[MATH. 181]

$$F = \begin{pmatrix} -\alpha \times j & \alpha \times 1 \\ \alpha \times j & \alpha \times 1 \end{pmatrix} \quad \text{Equation (181)}$$

Note that α may be a real number, and, alternatively, may be an imaginary number. However, α is not 0 (zero).

Figure 87:
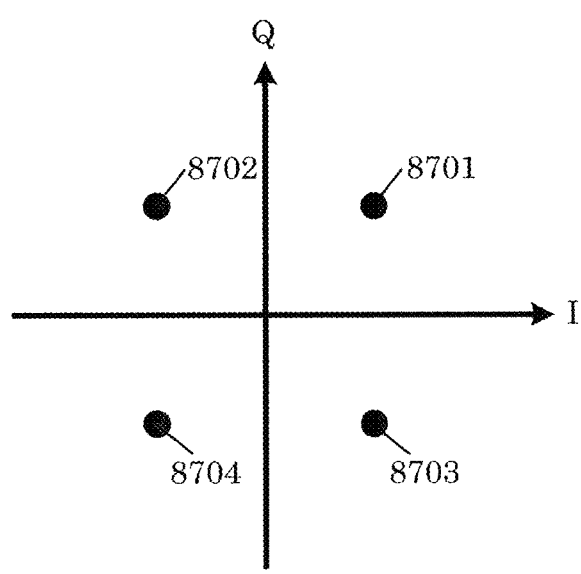
FIG. 87 illustrates signal points of a weighting synthesized signal in an in-phase I-quadrature Q plane.

In weighting synthesizer 203, when precoding is performed using either one of the precoding matrices expressed in Equation (164) or Equation (181), the signal points in the in-phase I-quadrature Q plane of weighting synthesized signals 204A, 204B are arranged like signal points 8701, 8702, 8703, and 8704 illustrated in FIG. 87. Accordingly, when the base station or AP transmits transmission signals 108_A and 108_B and in the terminal, which is the communication partner, the reception power of either of transmission signal 108_A or transmission signal 108_B is low, taking into consideration the state illustrated in FIG. 87, it is possible to achieve the advantageous effect of an improvement in data reception quality by the terminal.

Note that in the above description, the configuration of signal processor 106 in the transmission device in FIG. 1 included in the base station or AP is described as being any one of the configurations illustrated in FIG. 2, FIG. 18, FIG. 19, FIG. 20, FIG. 21, FIG. 22, FIG. 59, and FIG. 60, but in phase changer 205A, phase changer 205B, phase changer 209A, and phase changer 209B in FIG. 2, FIG. 18, FIG. 19, FIG. 20, FIG. 21, FIG. 22, FIG. 59, and FIG. 60, a phase change need not be implemented. Here, a phase change is not implemented on input signals, and the signals are output as-is. For example, in FIG. 2, when phase changer 205B does not implement a phase change, signal 204B becomes signal 206B. When phase changer 209B does not perform a phase change, signal 208B becomes signal 210B.

Phase changer 205A, phase changer 205B, phase changer 209A, and/or phase changer 209B may be omitted. For example, in FIG. 2, when phase changer 205B is omitted, input 206B of inserter 207B corresponds to signal 204B. Moreover, when phase changer 209B is omitted, signal 210B corresponds to signal 208B.

Next, as a second example, the precoding method used in weighting synthesizer 203 when mapped signal 201A (s1(t)) is QPSK (Quadrature Phase Shift Keying) and mapped signal 201B (s2(t)) is QPSK will be described.

First, a simple description of QPSK will be given. FIG. 85 illustrates an arrangement of signal points in an in-phase I-quadrature Q plane in the case of QPSK. In FIG. 85, 8701, 8702, 8703, and 8704 indicate signal points. In a QPSK symbol, mapping of any one of signal points 8701, 8702, 8703, and 8704 is performed on the two-bit input of x0, x1 to obtain in-phase component I, quadrature component Q.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 182]

$$F = \begin{pmatrix} 1 & 2 \\ -2 & 1 \end{pmatrix} \quad \text{Equation (182)}$$

-continued

[MATH. 183]
$$F = \frac{\beta}{\sqrt{5}}\begin{pmatrix} 1 & 2 \\ -2 & 1 \end{pmatrix}$$
Equation (183)

or

[MATH. 184]
$$F = \begin{pmatrix} \beta\times 1 & \beta\times 2 \\ -\beta\times 2 & \beta\times 1 \end{pmatrix}$$
Equation (184)

or

[MATH. 185]
$$F = \begin{pmatrix} 2 & 1 \\ 1 & -2 \end{pmatrix}$$
Equation (185)

or

[MATH. 186]
$$F = \frac{\beta}{\sqrt{5}}\begin{pmatrix} 2 & 1 \\ 1 & -2 \end{pmatrix}$$
Equation (186)

or

[MATH. 187]
$$F = \begin{pmatrix} \beta\times 2 & \beta\times 1 \\ \beta\times 1 & -\beta\times 2 \end{pmatrix}$$
Equation (187)

or

[MATH. 188]
$$F = \begin{pmatrix} 1 & -2 \\ 2 & 1 \end{pmatrix}$$
Equation (188)

or

[MATH. 189]
$$F = \frac{\beta}{\sqrt{5}}\begin{pmatrix} 1 & -2 \\ 2 & 1 \end{pmatrix}$$
Equation (189)

or

[MATH. 190]
$$F = \begin{pmatrix} \beta\times 1 & -\beta\times 2 \\ \beta\times 2 & \beta\times 1 \end{pmatrix}$$
Equation (190)

or

[MATH. 191]
$$F = \begin{pmatrix} -2 & 1 \\ 1 & 2 \end{pmatrix}$$
Equation (191)

or

[MATH. 192]
$$F = \frac{\beta}{\sqrt{5}}\begin{pmatrix} -2 & 1 \\ 1 & 2 \end{pmatrix}$$
Equation (192)

or

[MATH. 193]
$$F = \begin{pmatrix} -\beta\times 2 & \beta\times 1 \\ \beta\times 1 & \beta\times 2 \end{pmatrix}$$
Equation (193)

or

[MATH. 194]
$$F = \begin{pmatrix} 1 & 2 \\ 2 & -1 \end{pmatrix}$$
Equation (194)

or

[MATH. 195]
$$F = \frac{\beta}{\sqrt{5}}\begin{pmatrix} 1 & 2 \\ 2 & -1 \end{pmatrix}$$
Equation (195)

or

[MATH. 196]
$$F = \begin{pmatrix} \beta\times 1 & \beta\times 2 \\ \beta\times 2 & -\beta\times 1 \end{pmatrix}$$
Equation (196)

or

[MATH. 197]
$$F = \begin{pmatrix} 2 & 1 \\ -1 & 2 \end{pmatrix}$$
Equation (197)

or

[MATH. 198]
$$F = \frac{\beta}{\sqrt{5}}\begin{pmatrix} 2 & 1 \\ -1 & 2 \end{pmatrix}$$
Equation (198)

or

[MATH. 199]
$$F = \begin{pmatrix} \beta\times 2 & \beta\times 1 \\ -\beta\times 1 & \beta\times 2 \end{pmatrix}$$
Equation (199)

or

[MATH. 200]
$$F = \begin{pmatrix} -1 & 2 \\ 2 & 1 \end{pmatrix}$$
Equation (200)

or

[MATH. 201]
$$F = \frac{\beta}{\sqrt{5}}\begin{pmatrix} -1 & 2 \\ 2 & 1 \end{pmatrix}$$
Equation (201)

or

[MATH. 202]
$$F = \begin{pmatrix} -\beta\times 1 & \beta\times 2 \\ \beta\times 2 & \beta\times 1 \end{pmatrix}$$
Equation (202)

or

[MATH. 203]
$$F = \begin{pmatrix} 2 & -1 \\ 1 & 2 \end{pmatrix}$$
Equation (203)

or

[MATH. 204]
$$F = \frac{\beta}{\sqrt{5}}\begin{pmatrix} 2 & -1 \\ 1 & 2 \end{pmatrix}$$
Equation (204)

or

[MATH. 205]
$$F = \begin{pmatrix} \beta\times 2 & -\beta\times 1 \\ \beta\times 1 & \beta\times 2 \end{pmatrix}$$
Equation (202)

β may be a real number, and, alternatively, may be an imaginary number. However, β is not 0 (zero).

In weighting synthesizer 203, when precoding is performed using either one of the precoding matrices expressed in Equation (182) or Equation (205), the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108_A or transmission signal 108_B is low, taking into consideration the state of the signal points described above, it is possible to achieve the advantageous effect of an improvement in data reception quality by the terminal.

Note that in the above description, it is described that the configuration of signal processor 106 in the transmission device in FIG. 1 included in the base station or AP is any one of the configurations illustrated in FIG. 2, FIG. 18, FIG. 19, FIG. 20, FIG. 21, FIG. 22, FIG. 59, or FIG. 60, phase changer 205A, phase changer 205B, phase changer 209A, and phase changer 209B in FIG. 2, FIG. 18, FIG. 19, FIG. 20, FIG. 21, FIG. 22, FIG. 59, or FIG. 60 need not apply a phase change. Here, a phase change is not implemented on input signals, and the signals are output as-is. For example, (in FIG. 2) when phase changer 205B does not implement a phase change, signal 204B corresponds to 206B. When phase changer 209B does not implement a phase change, signal 208B corresponds to signal 210B. When phase changer 205A does not implement a phase change, signal 204A corresponds to signal 206A. When phase changer 209A does not implement a phase change, signal 208A corresponds to 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment B3

In this embodiment, the configuration method of the preamble and control information symbol transmitted by the base station or AP and the operations performed by the terminal, which is the communication partner of the base station or AP will be described.

In Embodiment A8, the base station or AP is described as being able to selectively transmit a multi-carrier scheme, such as OFDM, modulated signal and a single-carrier scheme modulated signal (in particular, in the second example).

In this embodiment, the configuration method and transmission method of preambles and control information symbols in such a case will be described.

As described in Embodiment A8, the configuration of the transmission device in the base station or AP is the configuration illustrated in FIG. 1 or FIG. 44. However, the transmission device in the base station may be configured so as to include one error correction encoder illustrated in FIG. 1, and may be configured so as to include the plurality of error correction encoders illustrated in FIG. 44.

Radio unit 107_A and radio unit 107_B illustrated in FIG. 1. FIG. 44 have the configuration illustrated in FIG. 55, and are characterized in that they can selectively switch between a single-carrier scheme and an OFDM scheme. Note that since operations pertaining to FIG. 55 have already been described in Embodiment A8 in detail, description will be omitted from this embodiment.

Figure 88:
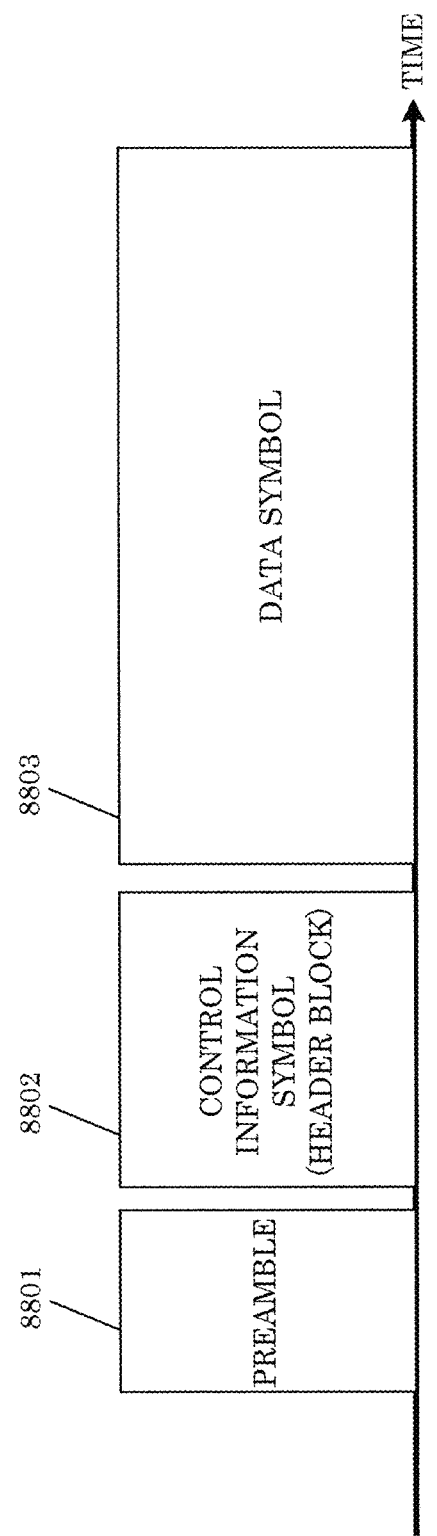
FIG. 88 illustrates one example of a frame configuration of a transmission signal transmitted by a base station or AP.

FIG. 88 illustrates one example of a frame configuration of a transmission signal transmitted by the base station or AP. Time is represented on the horizontal axis.

The base station or AP first transmits preamble 8801, and subsequently transmits control information symbol (header block) 8802 and data symbol 8803.

Preamble 8801 is a symbol for the reception device in the terminal, which is the communication partner of the base station or AP, to perform, for example, signal detection of a modulated signal transmitted by the base station or AP, frame synchronization, time synchronization, frequency synchronization, frequency offset estimation, and/or channel estimation. For example, preamble 8801 is configured as a PSK symbol known to the base station and terminal.

control information symbol (also referred to as a header block) 8802 is a symbol for transmitting control information related to data symbol 8803, and includes, for example, the transmission method of data symbol 8803, such as information on whether the transmission method is a single-carrier scheme or an OFDM scheme, information on whether the transmission method is single stream transmission or multi-stream transmission, information on the modulation scheme, and/or information on the error correction encoding method used upon generating the data symbols (for example, error correction code information, code length information, information on the encode rate of the error correction code). Moreover, control information symbol (also referred to as a header block) 8802 may include, for example, information on the data length to be transmitted.

Data symbol 8803 is a symbol for the base station or AP to transmit data, and the transmission method of which is switched as described above.

Note that FIG. 88 is merely one non-limiting example of a frame configuration. Moreover, not each of preamble 8801, control information symbol 8802, and data symbol 8803 need be present in the frame. For example, a pilot symbol or reference symbol may be included in the data symbol.

In this embodiment, as the transmission method for the data symbol, when a MIMO scheme (multi-stream transmission) and a single-carrier scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B. Then, as the transmission method for the data symbol, when a MIMO scheme (multi-stream transmission) and an OFDM scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

Next, information v1, v2, v3, and v4 included in control information symbol (header block) 8802 illustrated in FIG. 88 and transmitted by the base station or AP will be described.

TABLE 8

| v1 | transmission method |
|---|---|
| 0 | single-carrier scheme |
| 1 | OFDM scheme |

Interpretation of Table 8 is as follows.

When the transmission scheme of data symbol 8803 in FIG. 88 is a single-carrier scheme, v1 is set to 0 (v1=0), and the base station or AP transmits v1. When the transmission scheme of data symbol 8803 in FIG. 88 is an OFDM scheme, v1 is set to 1 (v1=1), and the base station or AP transmits v1.

TABLE 9

| v2 | stream(s) to be transmitted |
|---|---|
| 0 | single stream |
| 1 | plural streams (MIMO) |

Interpretation of Table 9 is as follows.

When single stream transmission is to be used upon transmitting data symbol 8803 illustrated in FIG. 88, v2 is set to 0 (v2=0), and the base station or AP transmits v2. When a plurality of modulated signals are to be transmitted at the same frequency and time using a plurality of antennas upon transmitting data symbol 8803 illustrated in FIG. 88, v2 is set to 1 (v2=1), and the base station or AP transmits v2.

However, in Table 9, the meaning of v2=1 may be interpreted as "transmission other than single stream transmission".

Moreover, a configuration method of information that can be interpreted the same as in Table 9 includes a method of preparing a plurality of bits and transmitting information on the number of transmission streams.

For example, when v21 and v22 are prepared and v21 and v22 are set such that v21=0 and v22=0, the base station or AP transmits a single stream, when v21 and v22 are set such that v21=1 and v22=0, the base station or AP transmits two streams, when v21 and v22 are set such that v21=0 and v22=1, the base station or AP transmits four streams, and when v21 and v22 are set such that v21=1 and v22=1, the base station or AP transmits eight streams. Then, the base station or AP transmits v21 and v22 as control information.

TABLE 10

| v3 | phase changer operation |
|---|---|
| 0 | phase change not implemented cyclically/regularly (OFF) |
| 1 | phase change implemented cyclically/regularly (ON) |

Interpretation of Table 10 is as follows.

When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is not implemented in phase changer 205A, phase changer 205B, phase changer 5901A, and phase changer 5901B, v3 is set to 0 (v3=0), and the base station or AP transmits v3. When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is implemented in phase changer 205A, phase changer 205B, phase changer 5901A, and phase changer 5901B, v3 is set to 1 (v3=1), and the base station or AP transmits v3.

TABLE 11

| v4 | precoding method when phase change is implemented cyclically/regularly |
|---|---|
| 0 | use precoding matrix #1 |
| 1 | use precoding matrix #2 |

Interpretation of Table 11 is as follows.

When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is implemented in phase changer 205A, phase changer 205B, phase changer 5901A, and phase changer 5901B, if precoding is to be performed using precoding matrix #1 in weighting synthesizer 203, v4 is set to 0 (v4=0), and the base station transmits v4. When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is implemented in phase changer 205A, phase changer 205B, phase changer 5901A, and phase changer 5901B, if precoding is to be performed using precoding matrix #2 in weighting synthesizer 203, v4 is set to 1 (v4=1), and the base station transmits v4.

Hereinbefore, v1, v2 (or v21 and v22), v3, and v4 have been described. Hereinafter, details regarding v3 and v4 in particular will be described.

As described above, as the transmission method for the data symbol, when a MIMO scheme (multi-stream transmission) and a single-carrier scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B.

Accordingly, when the base station or AP sets v1 to 0 (v1=0), and the transmission scheme used for the data symbol in FIG. 88 is a single-carrier scheme, (regardless of whether v2 indicates 0 or 1), the information on v3 is null (v3 may be set to 0 and may be set to 1) (then, when the data symbol in FIG. 88 is a single stream modulated signal or includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B, and a plurality of modulated signals are transmitted using a MIMO scheme. Note that the base station or AP may have a configuration in which phase changer 205A, phase changer 205B, and phase changer 5901A are omitted).

On the other hand, as the transmission method for the data symbol, when a MIMO scheme (multi-stream transmission) and an OFDM scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

Accordingly, when a single stream is used when the base station or AP sets v1 to 1 (v1=1), the transmission scheme of the data symbol in FIG. 88 is OFDM, v2 is set to 0 (v2=0) (or v21 and v22 are set to 0 (v21=0, v22=0)), and data symbol 8803 in FIG. 88 is transmitted, information on v3 is null (v3 may be set to 0 or 1) (here, the base station or AP transmits a single stream modulated signal).

When a plurality of modulated signals are transmitted at the same frequency and time using a plurality of antennas when the base station or AP sets v1 to 1 (v1=1), the transmission scheme of the data symbol in FIG. 88 is OFDM, v2 is set to 1 (v2=1) (or v21 and v22 are set to something other than 0 (something other than v21=0, v22=0)), and data symbol 8803 in FIG. 88 is transmitted, information on v3 "the base station or AP supports phase change", and "reception is possible even when the terminal, which is the communication partner of the base station or AP, has performed a phase change" is valid. Then, when the setting for v3 is valid, when the base station or AP does not implement a phase change in phase changer 205A, phase changer 205B, phase changer 5901A, or phase changer 5901B, v3 is set to 0 (v3=0), and the base station or AP transmits v3. When the base station or AP does implement a phase change in phase changer 205A, phase changer 205B, phase changer 5901A, and/or phase changer 5901B, v3 is set to 1 (v3=1), and the base station or AP transmits v3.

Note that since the determination of whether the terminal, which is the communication partner of the base station or AP, is capable of reception even when a phase change is implemented has already been described in another embodiment, repeated description will be omitted in this embodiment. Moreover, when the base station or AP does not support implementation of a phase change, the base station or AP does not include phase changer 205A, phase changer 205B, phase changer 5901A, phase changer 5901B.

Next, v4 will be described.

As described above, as the transmission method for the data symbol, when a MIMO scheme (multi-stream transmission) and a single-carrier scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B.

Accordingly, when the base station or AP sets v1 to 0 (v1=0), and the transmission scheme used for the data symbol in FIG. 88 is a single-carrier scheme, (regardless of whether v2 indicates 0 or 1), the information on v4 is null (v4 may be set to 0 and may be set to 1) (then, when the data symbol in FIG. 88 is a single-carrier scheme modulated signal or includes any one of the configurations illustrated in FIG. 2, FIG. 18, FIG. 19, FIG. 20, FIG. 21, FIG. 22, FIG. 28, FIG. 29, FIG. 30, FIG. 31. FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B, and a plurality of modulated signals are transmitted using a MIMO scheme. Note that the base station or AP may have a configuration in which phase changer 205A, phase changer 205B, and phase changer 5901A are omitted).

On the other hand, as the transmission method for the data symbol, when a MIMO scheme (multi-stream transmission) and an OFDM scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

Accordingly, when a single stream is used when the base station or AP sets v1 to 1 (v1=1), the transmission scheme of the data symbol in FIG. 88 is OFDM, v2 is set to 0 (v2=0) (or v21 and v22 are set to 0 (v21=0, v22=0)), and data symbol 8803 in FIG. 88 is transmitted, information on v4 is null (v4 may be set to 0 or 1) (here, the base station or AP transmits a single stream modulated signal).

When a plurality of modulated signals are transmitted at the same frequency and time using a plurality of antennas when the base station or AP sets v1 to 1 (v1=1), the transmission scheme of the data symbol in FIG. 88 is OFDM, v2 is set to 1 (v2=1) (or v21 and v22 are set to something other than 0 (something other than v21=0, v22=0)), and data symbol 8803 in FIG. 88 is transmitted, there is a possibility that information on v4 "the base station or AP supports phase change", and "reception is possible even when the terminal, which is the communication partner of the base station or AP, has performed a phase change" is valid.

When the base station or AP does not implement a phase change in phase changer 205A, phase changer 205B, phase changer 5901A, and/or phase changer 5901B, v4 is null and may be set to 0 or 1 (and the base station or AP transmits v4 information).

When the base station or AP does implement a phase change in phase changer 205A, phase changer 205B, phase changer 5901A, and/or phase changer 5901B, v4 information is valid, and in weighting synthesizer 203, if precoding is to be performed using precoding matrix #1, v4 is set to 0 (v4=0), and the base station or AP transmits v4. In weighting synthesizer 203, if precoding is to be performed using precoding matrix #2, v4 is set to 1 (v4=1), and the base station transmits v4.

Note that since the determination of whether the terminal, which is the communication partner of the base station or AP, is capable of reception even when a phase change is implemented has already been described in another embodiment, repeated description will be omitted in this embodiment. Moreover, when the base station or AP does not support implementation of a phase change, the base station or AP does not include phase changer 205A, phase changer 205B, phase changer 5901A, phase changer 5901B.

Although an example is given above in which control information symbol 8802 includes information v1, v2, v3, and v4, the base station or AP need not transmit all of information v1, v2, v3, and v4 in control information symbol 8802.

For example, regarding at least some of the signals in preamble 8801 in FIG. 88, when the transmission method of data symbol 8803 differs in regard to being a single-carrier scheme or an OFDM scheme, the base station or AP may transmit information v1 in the control information symbol. In such cases, based on the signal transmitted as preamble 8801, the terminal determines whether the transmission scheme of data symbol 8803 is a single-carrier scheme or an OFDM scheme.

Note that, regarding at least some of the signals in preamble 8801 in FIG. 88, when the transmission method of data symbol 8803 differs in regard to being a single-carrier scheme or an OFDM scheme, the base station or AP may transmit information v1 in control information symbol 8802. In such cases, based on one or both of (i) the signal transmitted as preamble 8801 and (ii) information v1 included in control information symbol 8802, the terminal determines whether the transmission scheme of data symbol 8803 is a single-carrier scheme or an OFDM scheme.

In the above description, an example is given in which the terminal can determine the information known by information v1 based on a single other than control information symbol 8802, but regarding information v2, v3, and v4 as well, when the terminal can make a determination based on a signal other than control information symbol 8802, information that enables said determination need not be transmitted in control information symbol 8802. However, similar to the example given regarding information v1, even information indicating that the terminal can make the determination based on a signal other than control information symbol 8802 may be transmitted in control information symbol 8802.

Moreover, for example, when, depending on whether the transmission scheme of data symbol 8803 is a single-carrier scheme or an OFDM scheme, control information symbol 8802 includes other control information in which the possible values are different, this other control information may be taken as information v1. In such cases, based on this other control information, the terminal determines whether the transmission scheme of data symbol 8803 is a single-carrier scheme or an OFDM scheme.

In the above description, when the transmission device in the base station or AP has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change need not be implemented in phase changer 209A, phase changer 209B. Here, a phase change is not implemented on input signals, and the signals are output as-is. For example, (in FIG. 2) when phase changer 209B does not implement a phase change, signal 208B corresponds to signal 210B. Moreover, when phase changer 209A does not implement a phase change, signal 208A corresponds to signal 210A. As another configuration, phase changer 209A and phase changer 209B may be omitted. For example, (in FIG. 2) when phase changer 209B is omitted, signal 210B corresponds to signal 208B. When phase changer 209A is omitted, signal 210A corresponds to signal 208A.

Next, operations performed by the reception device of the terminal, which is the communication partner of the base station or AP, will be described.

Figure 89:
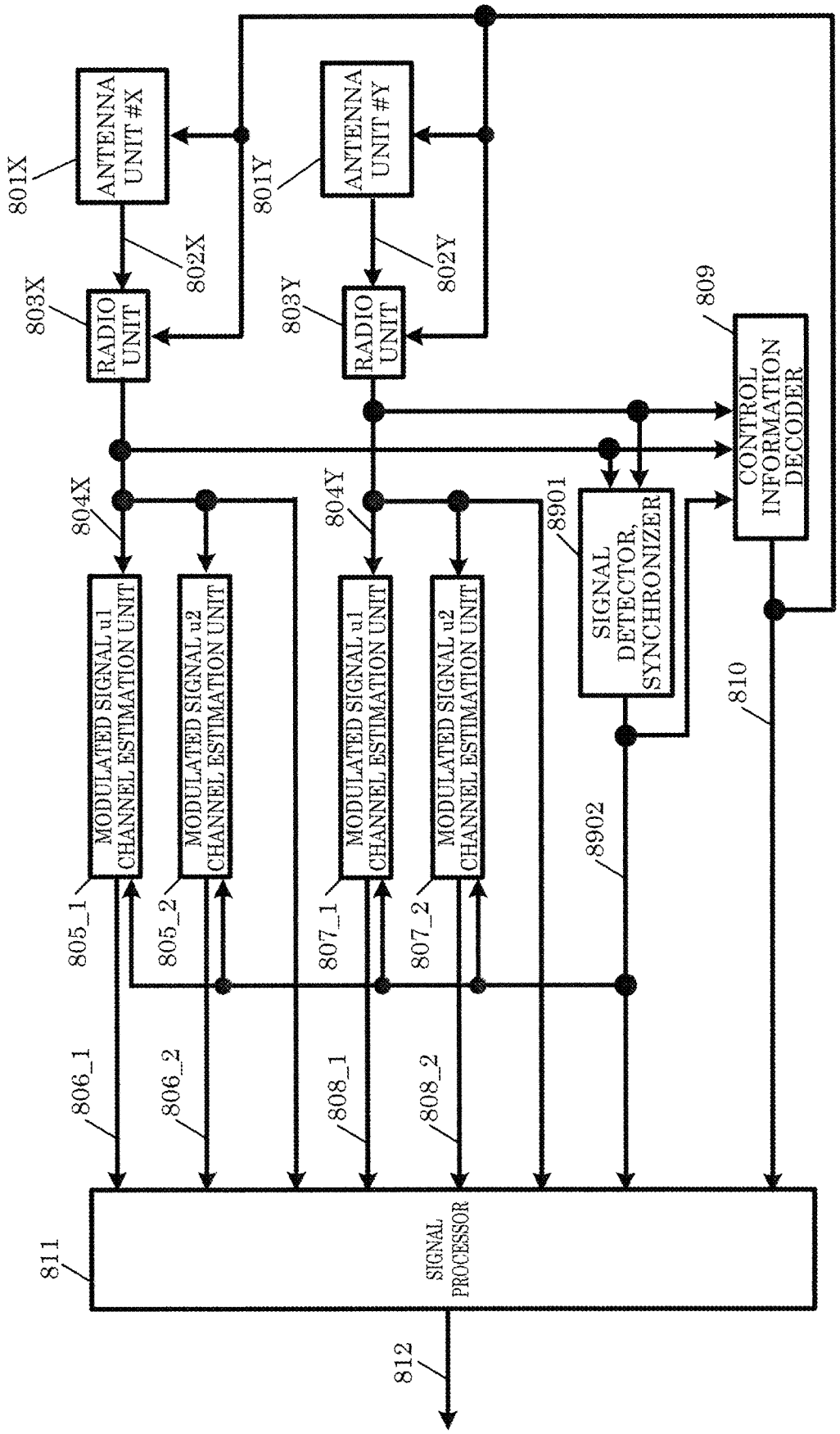
FIG. 89 illustrates one example of a configuration of a reception device.

The configuration of the reception device of the terminal is illustrated in FIG. 89. In FIG. 89, components that operate the same as in FIG. 8 share like reference marks. Accordingly, repeated description thereof will be omitted.

Signal detector, synchronizer 8901 receives inputs of baseband signal 804X, 804Y, detects preamble 8801 included in baseband signal 804X, 804Y, performs signal detection, frame synchronization, time synchronization, frequency synchronization, frequency offset estimation, etc., and outputs the result as system control signal 8902.

Channel estimation unit 805_1, 807_1 of modulated signal u1 and channel estimation unit 805_2 807_2 of modulated signal u2 receive an input of system control signal 8902, and based on system control signal 8902, for example, detect preamble 8801 and perform channel estimation.

Control information decoder (control information detector) 809 receives inputs of baseband signal 804X, 804Y and system control signal 8902, detects control information symbol (header block) 8802 illustrated in FIG. 88 and included in baseband signal 804X, 804Y, performs demodulation and decoding to obtain control information, and outputs the result as control signal 810.

Then, signal processor 811, radio unit 803X, 803Y, antenna unit #X (801X), antenna unit #Y (801Y) receive an input of control signal 810, and may switch operations to be performed based on control signal 810. Note that details will be described later.

Control information decoder (control information detector) 809 receives inputs of baseband signal 804X, 804Y and system control signal 8902, detects control information symbol (header block) 8802 illustrated in FIG. 88 and included in baseband signal 804X, 804Y, performs demodulation and decoding, and at least obtains v1 in Table 8, v2 in Table 9, v3 in Table 10, and v4 in Table 11 transmitted by the base station or AP. Hereinafter, a detailed example of operations performed by control information decoder (control information detector) 809 will be given.

Consider a terminal capable of demodulating only a single-carrier scheme modulated signal. In such a case, the terminal determines that v3 information (v3 bit) obtained by control information decoder (control information detector) 809 is null (v3 information (v3 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal determines, based on preamble 8801 and control information symbol 8802, whether data symbol 8803 is an OFDM scheme modulated signal or a single-carrier scheme modulated signal. When determined to be an OFDM scheme modulated signal, since the terminal is not functionally equipped to demodulate data symbol 8803, data symbol 8803 is not demodulated. On the other hand, when determined to be a single-carrier scheme modulated signal, the terminal demodulates data symbol 8803. Here, the terminal determines a demodulation method for data symbol 8803 based on information obtained by control information decoder (control information detector) 809.

Here, since a phase change is not implemented cyclically/regularly on a single-carrier scheme modulated signal, the terminal uses, among control information obtained by control information decoder (control information detector) 809, control information excluding at least the bit corresponding to v3 information to determine the demodulation method for data symbol 8803.

Consider a terminal capable of demodulating only a single stream modulated signal. In such a case, the terminal determines that v3 information (v3 bit) obtained by control information decoder (control information detector) 809 is null (v3 information (v3 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal determines, based on preamble 8801 and control information symbol 8802, whether data symbol 8803 is a single stream modulated signal or a multi-stream modulated signal. When determined to be a multi-stream modulated signal, since the terminal is not functionally equipped to demodulate data symbol 8803, data symbol 8803 is not demodulated. On the other hand, when determined to be a single stream modulated signal, the terminal demodulates data symbol 8803. Here, the terminal determines a demodulation method for data symbol 8803 based on information obtained by control information decoder (control information detector) 809. Here, since a phase change is not implemented cyclically/regularly on a single stream modulated signal, the terminal uses, among control information obtained by control information decoder (control information detector) 809, control information excluding at least the bit corresponding to v3 information to determine the demodulation method for data symbol 8803.

Even if the base station or AP transmits a modulated signal generated when a phase change is implemented in phase changer 205A, phase changer 205B, phase changer 5901A, and/or phase changer 5901B, a terminal that does not support demodulation of such a modulated signal determines that v3 information (v3 bit) obtained by control information demodulator (control information detector) 809 is null (v3 information (v3 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal demodulates and decodes data symbol 8803 based on preamble 8801 and control information symbol 8802, but since "even if the base station or AP transmits a modulated signal generated when a phase change is implemented in phase changer 205A, phase changer 205B, phase changer 5901A, and/or phase changer 5901B, the terminal does not support demodulation of such a modulated signal", a phase change is not implemented cyclically/regularly, and the terminal determines a demodulation method for data symbol 8803 using, from among control information obtained by control information decoder (control information detector) 809, at least control information excluding at least the bit corresponding to v3 information.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is an OFDM scheme modulated signal from v1, v3 information (v3 bit) is determined to be valid.

Here, control information decoder (control information detector) 809 determines a demodulation method for data symbol 8803 based on control information including v3 information (v3 bit). Then, signal processor 811 performs operations for demodulation and decoding using a method based on the determined demodulation method.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is single-carrier scheme modulated signal from v1, v3 information (v3 bit) is determined to be null (v3 information (v3 bit) is not necessary).

Here, control information decoder (control information detector) 809 determines a demodulation method for data symbol 8803 using control information excluding at least the bit corresponding to v3 information. Then, signal processor 811 performs operations for demodulation and decoding using a method based on the determined demodulation method.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is a single stream modulated signal from v2 (or v21, v22), v3 information (v3 bit) is determined to be null (v3 information (v3 bit) is not necessary).

Here, control information decoder (control information detector) 809 determines a demodulation method for data symbol 8803 using control information excluding at least the bit corresponding to v3 information. Then, signal processor 811 performs operations for demodulation and decoding using a method based on the determined demodulation method.

Consider a terminal capable of demodulating only a single-carrier scheme modulated signal. In such a case, the terminal determines that v4 information (v4 bit) obtained by control information decoder (control information detector) 809 is null (v4 information (v4 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal determines, based on preamble 8801 and control information symbol 8802, whether data symbol 8803 is an OFDM scheme modulated signal or a single-carrier scheme modulated signal. When determined to be an OFDM scheme modulated signal, since the terminal is not functionally equipped to demodulate data symbol 8803, data symbol 8803 is not demodulated. On the other hand, when determined to be a single-carrier scheme modulated signal, the terminal demodulates data symbol 8803. Here, the terminal determines a demodulation method for data symbol 8803 based on information obtained by control information decoder (control information detector) 809. Here, since a phase change is not implemented cyclically/regularly on a single-carrier scheme modulated signal, the terminal uses, among control information obtained by control information decoder (control information detector) 809, control information excluding at least the bit corresponding to(v3 information and) v4 information to determine the demodulation method for data symbol 8803.

Consider a terminal capable of demodulating only a single stream modulated signal. In such a case, the terminal determines that v4 information (v4 bit) obtained by control information decoder (control information detector) 809 is null (v4 information (v4 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal determines, based on preamble 8801 and control information symbol 8802, whether data symbol 8803 is a single stream modulated signal or a multi-stream modulated signal. When determined to be a multi-stream modulated signal, since the terminal is not functionally equipped to demodulate data symbol 8803, data symbol 8803 is not demodulated. On the other hand, when determined to be a single stream modulated signal, the terminal demodulates data symbol 8803. Here, the terminal determines a demodulation method for data symbol 8803 based on information obtained by control information decoder (control information detector) 809. Here, since a phase change is not implemented cyclically/regularly on a single stream modulated signal, the terminal uses, among control information obtained by control information decoder (control information detector) 809, control information excluding at least the bit corresponding to (v3 information and) v4 information to determine the demodulation method for data symbol 8803.

Even if the base station or AP transmits a modulated signal generated when a phase change is implemented in phase changer 205A, phase changer 205B, phase changer 5901A, and/or phase changer 5901B, a terminal that does not support demodulation of such a modulated signal determines that v4 information (v4 bit) obtained by control information demodulator (control information detector) 809 is null (v4 information (v4 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal demodulates and decodes data symbol 8803 based on preamble 8801 and control information symbol 8802, but since "even if the base station or AP transmits a modulated signal generated when a phase change is implemented in phase changer 205A, phase changer 205B, phase changer 5901A, and/or phase changer 5901B, the terminal does not support demodulation of such a modulated signal", a phase change is not implemented cyclically/regularly, and the terminal determines a demodulation method for data symbol 8803 using, from among control information obtained by control information decoder (control information detector) 809, at least control information excluding at least the bit corresponding to (v3 information and) v4 information.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is an OFDM scheme modulated signal from v1, v4 information (v4 bit) is determined to be valid.

Here, control information decoder (control information detector) 809 determines a demodulation method for data symbol 8803 based on control information including v4 information (v4 bit). Then, signal processor 811 performs operations for demodulation and decoding using a method based on the determined demodulation method.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is single-carrier scheme modulated signal from v1, v4 information (v4 bit) is determined to be null (v4 information (v4 bit) is not necessary).

Here, control information decoder (control information detector) 809 determines a demodulation method for data symbol 8803 using control information excluding at least the bit corresponding to (v3 information and) v4 information. Then, signal processor 811 performs operations for demodulation and decoding using a method based on the determined demodulation method.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information demodulator (control information detector) 809 that the modulated signal is a single stream modulated signal from v2 (or v21, v22), v3 information (v3 bit) is determined to be null (v4 information (v4 bit) is not necessary).

Here, control information decoder (control information detector) 809 determines a demodulation method for data symbol 8803 using control information excluding at least the bit corresponding to (v3 information and) v4 information.

Then, signal processor 811 performs operations for demodulation and decoding using a method based on the determined demodulation method.

By the base station or AP and the terminal, which is the communication partner of the base station or AP, operating as described in the present embodiment, the base station or AP and the terminal can perform communication accurately, and as a result, it is possible to achieve an advantageous effect in that data reception quality is improved and data transmission speed is improved. Moreover, when the base station or AP uses an OFDM scheme and implements a phase change upon transmitting a plurality of streams, in an environment in which direct waves are dominant, the terminal, which is the communication partner, can achieve an advantageous effect of an improvement in data reception quality.

Embodiment C1

In this embodiment, an example of a specific phase change method used under a single-carrier (SC) scheme that differs from the example described in Embodiment B1 will be described.

In this embodiment, a case in which the base station or AP and the terminal communicate with each other will be supposed. Here, one example of the configuration of the transmission device in the base station or AP is as illustrated in FIG. 1. Since this configuration has been described in other embodiments, repeated description will be omitted.

FIG. 81 illustrates an example of a frame configuration of transmission signal 108_A illustrated in FIG. 1. In FIG. 81, time is represented on the horizontal axis (accordingly, this relates to a single-carrier scheme signal).

As illustrated in FIG. 81, in transmission signal 108_A, the base station or AP transmits preamble 8101 from time t1 to time t20, transmits guard 8102 using time t21 through time t30, transmits data symbol 8103 using time t31 through time t60, transmits guard 8104 using t61 through t70, and transmits data symbol 8105 using t71 through t100.

FIG. 82 illustrates an example of a frame configuration of transmission signal 108_B illustrated in FIG. 1. In FIG. 82, time is represented on the horizontal axis (accordingly, this relates to a single-carrier scheme signal).

As illustrated in FIG. 82, in transmission signal 108_B, the base station or AP transmits preamble 8201 from time t1 to time t20, transmits guard 8202 using time t21 through time t30, transmits data symbol 8203 using time t31 through time t60, transmits guard 8204 using t61 through t70, and transmits data symbol 8205 using t71 through t100.

Note that preamble 8101 and 8201 are symbols for channel estimation by the terminal, which is the communication partner of the base station or AP, and, for example, the mapping method is PSK (phase shift keying) known to the base station and terminal. Preambles 8101 and 8201 are transmitted at the same time using the same frequency.

Guards 8102 and 8202 are symbols that are inserted upon generation of single-carrier scheme modulated signals. Guards 8102 and 8202 are transmitted at the same time using the same frequency.

Data symbols 8103 and 8203 are data symbols for the base station or AP to transmit data to the terminal. Data symbols 8103 and 8203 are transmitted at the same time using the same frequency.

Guards 8104 and 8204 are symbols that are inserted upon generation of single-carrier scheme modulated signals. Guards 8104 and 8204 are transmitted at the same time using the same frequency.

Data symbols 8105 and 8205 are data symbols for the base station or AP to transmit data to the terminal. Data symbols 8105 and 8205 are transmitted at the same time using the same frequency.

Similar to Embodiment 1, the base station or AP generates mapped signal s1(t) and mapped signal s2(t). When data symbols 8102 and 8105 include only mapped signal s1(t), data symbols 8202 and 8205 include only mapped signal s2(t). Moreover, when data symbols 8102 and 8105 include only mapped signal s2(t), data symbols 8202 and 8205 include only mapped signal s1(t). When data symbols 8102 and 8105 include both mapped signal s1(t) and mapped signal s2(t), data symbols 8202 and 8205 include both mapped signal s1(t) and mapped signal s2(t). As this has already been described in, for example, Embodiment 1, detailed description will be omitted.

For example, the configuration of signal processor 106 illustrated in FIG. 1 is as illustrated in FIG. 2. Hereinafter, two suitable examples of when a single-carrier scheme is used will be given.

Suitable Example 1

As a first measure in the first example, a phase change is implemented in phase changer 205B, and a phase change is not implemented in phase changer 209B. Note that control of this is performed by control signal 200. Here, the signal corresponding to transmission signal 108A in FIG. 1 is signal 208A in FIG. 2, and the signal corresponding to transmission signal 108B in FIG. 1 is signal 210B in FIG. 2.

As a second measure in the first example, a phase change is implemented in phase changer 205B, and phase changer 209B is omitted. Here, the signal corresponding to transmission signal 108A in FIG. 1 is signal 208A in FIG. 2, and the signal corresponding to transmission signal 108B in FIG. 1 is signal 208B in FIG. 2.

In suitable Example 1, either one of the first and second measures may be implemented.

Next, operations performed by phase changer 205B will be described. Similar to the description given in Embodiment 1, in phase changer 205B, a phase change is implemented on a data symbol. Similar to Embodiment 1, the phase change value of symbol number i in phase changer 205B is expressed as y(i). y(i) is applied with the following equation.

[MATH. 206]

$$y(i)=e^{j\lambda(i)} \quad \text{Equation (206)}$$

In FIG. 81 and FIG. 82, data symbols are present at i=t31, t32, t33 ... t58, t59, and t60, and i=t71, t72, t73 ... t98, t99, and t100. Here, one important condition is that either one of Equation (207) and Equation (208) is satisfied.

[MATH. 207]

$$\frac{\pi}{2} \text{ radians } < \lambda(i) - \lambda(i-1) < \pi \text{ radians} \quad \text{Equation (207)}$$

[MATH. 208]

$$\pi \text{ radians } < \lambda(i) - \lambda(i-1) < \frac{3\pi}{2} \text{ radians} \quad \text{Equation (208)}$$

Note that in Equation (207) and Equation (208), i=t32, t33, t34 ... t58, t59, and t60, or i=t72, t73, t74 ... t98, t99, t100. To rephrase "either one of Equation (207) and Equation (208) is satisfied", when λ(i)-λ(i−1) is greater than or equal to 0 radians and less than 2π radians, the value is as close to π as possible.

Taking into consideration the transmission spectrum, λ(i)-λ(i−1) need be a fixed value. As described in other embodiments, in environments in which direct waves are dominant, it is important a(i) be switched regularly by the reception device in the terminal, which is the communication partner of the base station or AP, in order to achieve good data reception quality. The cycle of λ(i) may be increased as needed. For example, consider a case in which the cycle is set to 5 or higher.

When cycle X=2×n+1 (note that n is an integer that is greater than or equal to 2), it is sufficient if the following conditions are satisfied.

When i satisfies i=t32, t33, t34 . . . t58, t59, and t60, or i=t72, t73, t74 . . . t98, t99, t100, in any instance of i, Equation (209) is satisfied.

[MATH. 209]

$$\lambda(i) - \lambda(i-1) = \pi + \frac{\pi}{2 \times n + 1} \text{ radians} \quad \text{Equation (209)}$$

When cycle X=2×m (note that m is an integer that is greater than or equal to 3), it is sufficient if the following conditions are satisfied.

When i satisfies i=t32, t33, t34 . . . t58, t59, and t60, or i=t72, t73, t74 . . . t98, t99, t100, in any instance of i, Equation (210) is satisfied.

[MATH. 210]

$$\lambda(i) - \lambda(i-1) = \pi + \frac{\pi}{m} \text{ radians} \quad \text{Equation (210)}$$

It was stated that "when λ(i)-λ(i−1) is greater than or equal to 0 radians and less than 2π radians, the value is as close to π as possible". This will be described next.

In FIG. 83, a phase change is not implemented, that is to say, the spectrum of transmission signal 108A in FIG. 1 (signal 208A in FIG. 2) is illustrated by solid line 8301 in FIG. 83. In FIG. 83, frequency is represented on the horizontal axis and amplitude is represented on the vertical axis.

In phase changer 205B illustrated in FIG. 2, when λ(i)λ(i−1) is set to π radians and a phase change is implemented, the spectrum of transmission signal 108B in FIG. 1 is expressed by dotted line 8302 in FIG. 83.

As illustrated in FIG. 83, spectrum 8301 and spectrum 8302 effectively partially overlap. When transmission is performed to achieve this state, when the propagation environment of the base station and the terminal, which is the communication partner, is a multi-path environment, the multi-path effect on transmission signal 108A and the multi-path effect on transmission signal 108B are different, thereby improving the possibility that spatial diversity can be achieved. The effect of spatial diversity decreases as λ(i)-λ(i−1) nears 0.

Accordingly, "when λ(i)-λ(i−1) is greater than or equal to 0 radians and less than 2π radians, the value is as close to π as possible".

However, when a phase change is implemented in phase changer 205B in FIG. 2, as described in the present specification, in an environment in which direct waves are dominant, it is possible to achieve the advantageous effect that the effect of data reception quality will increase. Accordingly, when λ(i)-λ(i−1) is set to satisfy the above-described conditions, in a multi-path environment, an environment in which direct waves are dominant, or in both environments, it is possible to achieve a superior advantageous effect, namely that high data reception quality can be achieved by the terminal, which is the communication partner.

Suitable Example 2

In Example 2, phase changer 205B does not implement a phase change, and phase changer 209B does implement a phase change. Note that control of this is performed by control signal 200. Here, the signal corresponding to transmission signal 108A in FIG. 1 is signal 208A in FIG. 2, and the signal corresponding to transmission signal 108B in FIG. 1 is signal 210B in FIG. 2.

Next, operations performed by phase changer 209B will be described. In phase changer 209B, in the frame configuration illustrated in FIG. 82, a phase change is implemented on at least guards 8202 and 8204 and data symbols 8203 and 8205. Note that a phase change may or may not be applied to preamble 8201. The phase change value of phase changer 209B is expressed as g(i). g(i) is applied with the following equation.

[MATH. 211]

$$g(i) = e^{j\rho(i)} \quad \text{Equation (211)}$$

In FIG. 81 and FIG. 82, data symbols and guards are present at i=t21, t22, t23 . . . t98, t99, and t100. Here, one important condition is that either one of Equation (212) and Equation (213) is satisfied.

[MATH. 212]

$$\frac{\pi}{2} \text{ radians } < \rho(i) - \rho(i-1) < \pi \text{ radians} \quad \text{Equation (212)}$$

[MATH. 213]

$$\pi \text{ radians } < \rho(i) - \rho(i-1) < \frac{3\pi}{2} \text{ radians} \quad \text{Equation (213)}$$

Note that in Equation (212) and Equation (213), i=t22, t23, t24 . . . t98, t99, and t100. To rephrase "either one of Equation (159) and Equation (160) is satisfied", when ρ(i)-ρ(i−1) is greater than or equal to 0 radians and less than 2a radians, the value is as close to π as possible.

Taking into consideration the transmission spectrum, ρ(i)-ρ(i−1) need be a fixed value. As described in other embodiments, in environments in which direct waves are dominant, it is important ρ(i) be switched regularly by the reception device in the terminal, which is the communication partner of the base station or AP, in order to achieve good data reception quality. The cycle of ρ(i) may be increased as needed. For example, consider a case in which the cycle is set to 5 or higher.

When cycle X=2×n+1 (note that n is an integer that is greater than or equal to 2), it is sufficient if the following conditions are satisfied.

When i satisfies i=t22, t23, t24 . . . t98, t99, t100, in any instance of i, Equation (214) is satisfied.

[MATH. 214]

$$\rho(i) - \rho(i-1) = \pi + \frac{\pi}{2 \times n + 1} \text{ radians} \quad \text{Equation (214)}$$

When cycle X=2×m (note that m is an integer that is greater than or equal to 3), it is sufficient if the following conditions are satisfied.

When i satisfies i=t22, t23, t24 . . . t98, t99, t100, in any instance of i, Equation (215) is satisfied.

[MATH. 215]

$$\rho(i) - \rho(i-1) = \pi + \frac{\pi}{m} \text{ radians} \quad \text{Equation (215)}$$

It was stated that "when ρ(i)-ρ(i−1) is greater than or equal to 0 radians and less than 2π radians, the value is as close to π as possible". This will be described next.

In FIG. 83, a phase change is not implemented, that is to say, the spectrum of transmission signal 108A in FIG. 1 (signal 208A in FIG. 2) is illustrated by solid line 8301 in FIG. 83. In FIG. 83, frequency is represented on the horizontal axis and amplitude is represented on the vertical axis.

In phase changer 209B illustrated in FIG. 2, when ρ(i)-ρ(i−1) is set to n radians and a phase change is implemented, the spectrum of transmission signal 108B in FIG. 1 is expressed by dotted line 8302 in FIG. 83.

As illustrated in FIG. 83, spectrum 8301 and spectrum 8302 effectively partially overlap. When transmission is performed to achieve this state, when the propagation environment of the base station and the terminal, which is the communication partner, is a multi-path environment, the multi-path effect on transmission signal 108A and the multi-path effect on transmission signal 108B are different, thereby improving the possibility that spatial diversity can be achieved. The effect of spatial diversity decreases as ρ(i)-ρ(i−1) nears 0.

Accordingly, "when ρ(i)-ρ(i−1) is greater than or equal to 0 radians and less than 2π radians, the value is as close to π as possible".

However, when a phase change is implemented in phase changer 209B in FIG. 2, as described in the present specification, in an environment in which direct waves are dominant, it is possible to achieve the advantageous effect that the effect of data reception quality will increase. Accordingly, when ρ(i)-ρ(i−1) is set to satisfy the above-described conditions, in a multi-path environment, an environment in which direct waves are dominant, or in both environments, it is possible to achieve a superior advantageous effect, namely that high data reception quality can be achieved by the terminal, which is the communication partner.

By setting the phase change value as described in the present embodiment, in both an environment including multiple paths and in an environment which direct waves are dominant, it is possible to achieve the advantageous effect of improvement in data reception quality in the terminal, which is the communication partner. Note that one conceivable configuration for the reception device in the terminal is a configuration like the one illustrated in FIG. 8, for example. However, as the operations illustrated in FIG. 8 have already been described in other embodiments, description will be omitted.

There are many methods for generating single-carrier scheme modulated signals. This embodiment can implement any of them for any of the schemes. Examples of single-carrier schemes include DFT (Discrete Fourier Transform)-Spread OFDM (Orthogonal Frequency Division Multiplexing). Trajectory Constrained DFT-Spread OFDM, OFDM based SC (Single Carrier), SC (Single Carrier)-FDMA (Frequency Division Multiple Access), and Guard interval DFT-Spread OFDM.

Moreover, the phase change method according to this embodiment achieves the same advantageous effects even when applied to a multi-carrier scheme such as OFDM. Note that when applied to a multi-carrier scheme, symbols may be aligned along the temporal axis, may be aligned along the frequency axis (carrier axis), and may be aligned along both temporal and frequency axes. This is also explained in other embodiments.

Supplemental Information 6

In the present specification, one example of a configuration of the reception device in the terminal, which is the communication partner of the base station or AP, upon the transmission device in the base station or AP transmitting a single stream modulated signal, is given in FIG. 41, but the configuration of a terminal that receives a single stream modulated signal is not limited to the configuration illustrated in FIG. 41. For example, the reception device in the terminal may include a plurality of receiving antennas. For example, in FIG. 8, when channel estimation unit 805_2, 807_2 of modulated signal u2 does not operate, the channel estimation unit operates for a single modulated signal, and even with such a configuration, a single stream modulated signal can be received.

Accordingly, in the description in the present specification, an embodiment described with reference to FIG. 41 may be replaced with the reception device configuration described above, and can operate in the same manner and thus achieve the same advantageous effects.

Moreover, in the present specification, examples of configurations of a reception capability notification symbol transmitted by the terminal are given in FIG. 38 and FIG. 79. Here, advantageous effects related to the inclusion of a plurality of items of information were described. Hereinafter, a transmission method for the "plurality of items of information" included in the reception capability notification symbol transmitted by the terminal will be described.

Configuration Example 1

For example, from among "information 3601 related to support for demodulation of modulated signals with phase changes", "information 3702 related to support for reception of a plurality of streams", "information 3801 related to supported schemes", "information 3802 related to multi-carrier scheme support", and "information 3803 related to supported error correction encoding scheme" illustrated in FIG. 38, at least two of these items of information are transmitted in the same frame or in the same sub-frame.

Configuration Example 2

For example, from among "information 3601 related to support for demodulation of modulated signals with phase changes", "information 3702 related to support for reception of a plurality of streams", "information 3801 related to supported schemes", "information 3802 related to multi-carrier scheme support", "information 3803 related to supported error correction encoding scheme", and "information 7901 related to supported precoding method" illustrated in FIG. 79, at least two of these items of information are transmitted in the same frame or in the same sub-frame.

Next, "frame" and "sub-frame" will be described.

Figure 80:
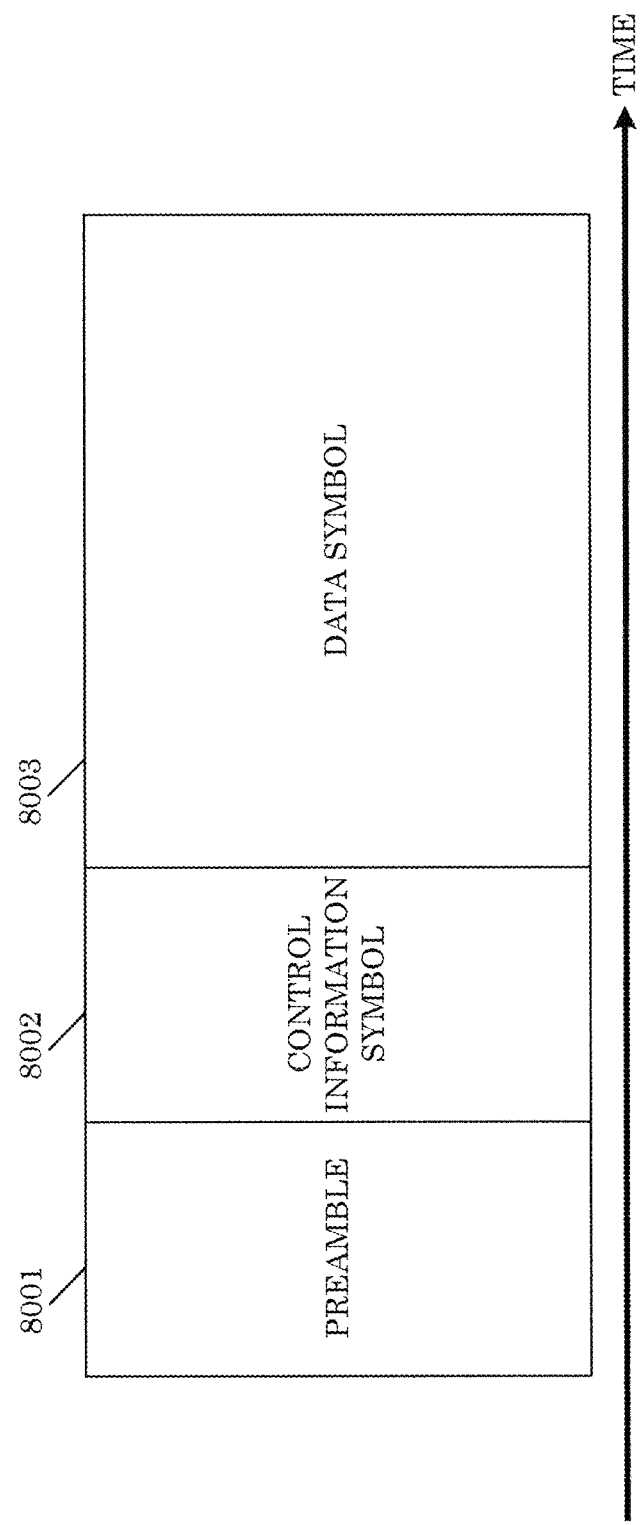
FIG. 80 illustrates one example of a frame configuration.

FIG. 80 illustrates an example of a frame configuration. In FIG. 80, time is represented on the horizontal axis. For example, in FIG. 80, the frame includes preamble 8001, control information symbol 8002, and data symbol 8003 (for example, the frame may: include at least preamble 8001: include at least control information symbol 8002; include at least preamble 8001 and data symbol 8003; include at least preamble 8001 and control information symbol 8002; include at least preamble 8001 and data symbol 8003; or include at least preamble 8001, control information symbol 8002, and data symbol 8003).

The terminal transmits a reception capability notification symbol using any one of preamble 8001, control information symbol 8002, or data symbol 8003.

Note that FIG. 80 may be referred to as a sub-frame. FIG. 80 may also be referred to something other than a frame or sub-frame.

As described above, as a result of the terminal transmitting the at least two items of information included in the reception capability notification symbol, the advantageous effects described in Embodiments A1, A2, A4, A11, etc., can be achieved.

Configuration Example 3

For example, from among "information 3601 related to support for demodulation of modulated signals with phase changes", "information 3702 related to support for reception of a plurality of streams", "information 3801 related to supported schemes", "information 3802 related to multi-carrier scheme support", and "information 3803 related to supported error correction encoding scheme" illustrated in FIG. 38, at least two of these items of information are transmitted in the same packet.

Configuration Example 4

For example, from among "information 3601 related to support for demodulation of modulated signals with phase changes", "information 3702 related to support for reception of a plurality of streams", "information 3801 related to supported schemes", "information 3802 related to multi-carrier scheme support", "information 3803 related to supported error correction encoding scheme", and information 7901 related to supported precoding method" illustrated in FIG. 79, at least two of these items of information are transmitted in the same packet.

Consider the frame illustrated in FIG. 80. Assume the frame: includes at least preamble 8001 and data symbol 8003; includes at least control information symbol 8002 and data symbol 8003; or includes at least preamble 8001, control information symbol 8002, and data symbol 8003.

In such cases, there are two types of methods for transmitting packets.
First Method:
Data symbol 8003 includes a plurality of packets. In such a case, at least the two items of information included in the reception capability notification symbol are transmitted via data symbol 8003.

Second Method:
The packet is transmitted via a plurality of frames of data symbols. In such a case, at least the two items of information included in the reception capability notification symbol are transmitted via a plurality of frames.

As described above, as a result of the terminal transmitting the at least two items of information included in the reception capability notification symbol, the advantageous effects described in Embodiments A1, A2, A4, A11, etc., can be achieved.

Note that although the terminology "preamble" is used in FIG. 80, this element may be referred to as something else. The "preamble" includes at least one of the following symbols or signals: a symbol or signal for the communication partner to detect a modulated signal; a symbol or signal for the communication partner to perform channel estimation (propagation environment estimation); a symbol or signal for the communication partner to perform time synchronization: a symbol or signal for the communication partner to perform frequency synchronization; and a symbol or signal for the communication partner to perform frequency offset estimation.

Moreover, although the terminology "control information symbol" is used in FIG. 80, this element may be referred to as something else. The "control information symbol" is a symbol that includes at least one of the following items of information: information on the error correction encoding scheme for generating a data symbol; information on the modulation scheme for generating a data symbol; information on the number of symbols in a data symbol; information related to the transmission method of a data symbol; information required for transmitting things other than a data symbol to the communication partner; and information other than a data symbol.

Note that the order in which preamble 8001, control information symbol 8002, and data symbol 8003 are transmitted, i.e., the frame configuration method, is not limited to the example illustrated in FIG. 80.

Embodiments A1, A2, A4, A11, etc., describe an example in which the terminal transmits a reception capability notification symbol and the communication partner of the terminal is the base station or AP, but these are non-limiting examples. For example, the base station or AP may transmit a reception capability notification symbol, and the communication partner of the base station or AP may be the terminal. Moreover, the terminal may transmit a reception capability notification symbol and the communication partner of the terminal may be a terminal. Moreover, the base station or AP may transmit a reception capability notification symbol, and the communication partner of the base station or AP may be a base station or AP.

Note that in the phase change processing implemented on a precoded (weighting synthesized) signal, there are instances in which different values are used for the phase change cycle N depending on whether a single-carrier scheme frame is to be transmitted or an OFDM scheme frame is to be transmitted. This is because, for example, when the number of data symbols arranged in a frame differs between a single-carrier scheme and an OFDM scheme, there is a possibility that the preferred phase chance cycle differs between a single-carrier scheme and an OFDM scheme. In the above description, a cycle in the phase change processing implemented on a precoded (weighting synthesized) signal is described, but when precoding (weighting synthesis) is not performed, a different value may be used for the cycle in the phase change processing implemented on the mapped signal depending on whether the scheme is a single-carrier scheme or an OFDM scheme.

Embodiment C2

A variation of Embodiment B3 will be described. The configuration method of the preamble and control information symbol transmitted by the base station or AP and the operations performed by the terminal, which is the communication partner of the base station or AP will be described.

As described in Embodiment A8, the configuration of the transmission device in the base station or AP is the configuration illustrated in FIG. 1 or FIG. 44. However, the transmission device in the base station may be configured so as to include one error correction encoder illustrated in FIG. 1, and may be configured so as to include the plurality of error correction encoders illustrated in FIG. 44.

Radio unit 107_A and radio unit 107_B illustrated in FIG. 1, FIG. 44 have the configuration illustrated in FIG. 55, and are characterized in that they can selectively switch between a single-carrier scheme and an OFDM scheme. Note that since operations pertaining to FIG. 55 have already been described in Embodiment A8 in detail, description will be omitted from this embodiment.

FIG. 88 illustrates one example of a frame configuration of a transmission signal transmitted by the base station or AP. Time is represented on the horizontal axis.

The base station or AP first transmits preamble 8801, and subsequently transmits control information symbol (header block) 8802 and data symbol 8803.

Preamble 8801 is a symbol for the reception device in the terminal, which is the communication partner of the base station or AP, to perform, for example, signal detection of a modulated signal transmitted by the base station or AP, frame synchronization, time synchronization, frequency synchronization, frequency offset estimation, and/or channel estimation. For example, preamble 8801 is configured as a PSK symbol known to the base station and terminal.

Control information symbol (also referred to as a header block) 8802 is a symbol for transmitting control information related to data symbol 8803, and includes, for example, the transmission method of data symbol 8803, such as information on whether the transmission method is a single-carrier scheme or an OFDM scheme, information on whether the transmission method is single stream transmission or multi-stream transmission, information on the modulation scheme, and/or information on the error correction encoding method used upon generating the data symbols (for example, error correction code information, code length information, information on the encode rate of the error correction code). Moreover, control information symbol (also referred to as a header block) 8802 may include, for example, information on the data length to be transmitted.

Data symbol 8803 is a symbol for the base station or AP to transmit data, and regarding the transmission method, data symbol 8803 is transmitted either under a single-carrier scheme or an OFDM scheme, and the modulation scheme and error correction encoding method of data symbol 8803 may be switched between SISO or MIMO transmission.

Note that FIG. 88 is merely one non-limiting example of a frame configuration. Moreover, not each of preamble 8801, control information symbol 8802, and data symbol 8803 need be present in the frame. For example, a pilot symbol or reference symbol may be included in the data symbol.

As described in Embodiment B3, in the data symbol, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

Accordingly, information included in control information symbol (header block) 8802 illustrated in FIG. 88 and transmitted by the base station or AP includes the v3 bits illustrated in Table 10 and the v4 bits illustrated in Table 11.

Additionally, v5 bits defined as follows is also included in control information symbol (header block) 8802 illustrated in FIG. 88 and transmitted by the base station or AP.

TABLE 12

| v5 | phase change value when phase change is implemented cyclically/regularly |
|---|---|
| 0 | use phase change method #1 |
| 1 | use phase change method #2 |

Interpretation of Table 12 is as follows.

When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is implemented in phase changer 205A, phase changer 205B, phase changer 5901A, and/or phase changer 5901B, v5 is set to 0 (v5=0) in weighting synthesizer 203 if a phase change is to be implemented using phase change method #1, and the base station transmits v5. When a plurality of modulated signals are transmitted at the same frequency and time using a plurality of antennas upon transmitting data symbol 8803 illustrated in FIG. 88, and signal processor 106 has any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, when a phase change is implemented in phase changer 205A, phase changer 205B, phase changer 5901A, and/or phase changer 5901B, v5 is set to 1 (v5=1) in weighting synthesizer 203 if a phase change is to be implemented using phase change method #2, and the base station transmits v5.

One example will be described using Embodiment B1.

As a first example, phase change method #1 is when $\lambda(i)-\lambda(i-1)$ indicated in Equation (209) is set as follows.

[MATH. 216]

$$\lambda(i) - \lambda(i-1) = \frac{9\pi}{8} \text{ radians} \qquad \text{Equation (216)}$$

Moreover, phase change method #2 is when $\lambda(i)-\lambda(i-1)$ indicated in Equation (209) is set as follows.

[MATH. 217]

$$\lambda(i)-\lambda(i-1)=\pi \text{ radians} \qquad \text{Equation (217)}$$

As a second example, phase change method #1 is when $\rho(i)-\rho(i-1)$ indicated in Equation (214) is set as follows.

[MATH. 218]

$$\rho(i) - \rho(i-1) = \frac{9\pi}{8} \text{ radians} \qquad \text{Equation (218)}$$

Moreover, phase change method #2 is when ρ(i)-ρ(i−1) indicated in Equation (214) is set as follows.

[MATH. 219]

$$\rho(i)-\rho(i-1)=\pi \text{ radians} \qquad (219)$$

Note that the schemes for phase change method #1 and phase change method #2 are not limited to the above examples; it is sufficient so long as the phase change methods differ between phase change method #1 and phase change method #2. Moreover, in the above examples, the phase change method is implemented in one location, but a phase change may be implemented in two or more phase changers.

In the above examples, phase change method #1 is a method that improves the reception quality of terminal, which is the communication partner, in radio wave propagation environment in which the direct waves are dominant and in multi-path environments, and phase change method #2 is a method that improves reception quality of the terminal, which is the communication partner, when the radio wave environment is, in particular, a multi-path environment.

Accordingly, by the base station changing the phase change method appropriately for the radio wave propagation environment in accordance with the set value for v5, the terminal, which is the communication partner, is capable of achieving the advantageous effect of improved reception quality.

Hereinafter, an operational example in which base station transmits v1, v2, v3, and v4 described in Embodiment B3 and transmits the above-described v5 will be given.

For example, in the base station, when MIMO transmission is performed, i.e., when v2 is set to 1 (v2=1) and a phase change is not to be implemented cyclically/regularly, i.e., v3 is set to 0 (v3=0), v5 information is null (v5 may be set to 0 and may be set to 1).

In the base station, when MIMO transmission is performed, i.e., when v2 is set to 1 (v2=1) and a phase change is to be implemented cyclically/regularly, i.e., v3 is set to 0 (v3=0), v5 information is valid. Note that v5 may be interpreted as illustrated in Table 12.

Accordingly, when the terminal, which is the communication partner of the base station, obtains v2 and recognizes that v2=0, i.e., that it is single stream transmission, the terminal uses control information excluding at least the bit corresponding to v5, and determines the demodulation method for data symbol 8803.

Moreover, when the terminal, which is the communication partner of the base station, obtains v2 and recognizes that v2=1, i.e., that it is MIMO transmission, and obtains v3 and v3=0, i.e., a phase change is not implemented cyclically/regularly, the terminal uses control information excluding at least the bit corresponding to v5, and determines the demodulation method for data symbol 8803.

When the terminal, which is the communication partner of the base station, obtains v2 and recognizes that v2=1, i.e., that it is MIMO transmission, and obtains v3 and v3=1, i.e., a phase change is implemented cyclically/regularly, the terminal uses control information including the bit corresponding to v5, and determines the demodulation method for data symbol 8803.

By the base station or AP and the terminal, which is the communication partner of the base station or AP, operating as described in the present embodiment, the base station or AP and the terminal can perform communication accurately, and as a result, it is possible to achieve an advantageous effect in that data reception quality is improved and data transmission speed is improved.

Embodiment C3

In this embodiment, a variation of Embodiment C2 will be described.

In this embodiment, as the transmission method for the data symbol, when a MIMO scheme (multi-stream transmission) and a single-carrier scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B. Then, as the transmission method for the data symbol, when a MIMO scheme (multi-stream transmission) and an OFDM scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

How v5 is handled in such situations will be described next.

As the transmission method for the data symbol, when a MIMO scheme (multi-stream transmission) and a single-carrier scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65. FIG. 66, and FIG. 67, a phase change is not implemented by phase changer 205A, phase changer 205B, phase changer 5901A, and phase changer 5901B.

Accordingly, when the base station or AP sets v1 to 0 (v1=0), and the transmission scheme used for the data symbol in FIG. 88 is a single-carrier scheme, (regardless of whether v2 indicates 0 or 1), the information on v5 is null (v5 may be set to 0 and may be set to 1) (then, when the data symbol in FIG. 88 is a single-carrier scheme modulated signal or includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, a phase change is not implemented by phase changer 205A, phase changer 205B, phase changer 5901A, and phase changer 5901B, and a plurality of modulated signals are transmitted using a MIMO scheme. Note that the base station or AP may have a configuration in which phase changer 205A, phase changer 205B, and phase changer 5901A are omitted).

On the other hand, as the transmission method for the data symbol, when a MIMO scheme (multi-stream transmission) and an OFDM scheme are selected, when signal processor 106 includes any one of the configurations illustrated in FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, switching can be performed for whether a phase change is implemented by phase changer 205A, phase changer 205B, phase changer 5901A, and phase changer 5901B.

Accordingly, when a single stream is transmitted when the base station or AP sets v1 to 1 (v1=1), the transmission scheme of the data symbol in FIG. 88 is OFDM, v2 is set to 0 (v2=0) (or v21 and v22 are set to 0 (v21=0, v22=0)), and data symbol 8803 in FIG. 88 is transmitted, information on v5 is null (v5 may be set to 0 or 1) (here, the base station or AP transmits a single stream modulated signal).

When a plurality of modulated signals are transmitted at the same frequency and time using a plurality of antennas when the base station or AP sets v1 to 1 (v1=1), the transmission scheme of the data symbol in FIG. 88 is OFDM, v2 is set to 1 (v2=1) (or v21 and v22 are set to something other than 0 (something other than v21=0, v22=0)), and data symbol 8803 in FIG. 88 is transmitted, there is a possibility that information on v5 "the base station or AP supports phase change", and "reception is possible even when the terminal, which is the communication partner of the base station or AP, has performed a phase change" is valid.

When the base station or AP does not perform a phase change in phase changer 205A, phase changer 205B, phase changer 5901A, and/or phase changer 5901B, v5 information is null, and v5 may be set to 0 or 1 (the base station then transmits v5 information).

When the base station or AP does implement a phase change in phase changer 205A, phase changer 205B, phase changer 5901A, and/or phase changer 5901B, v5 information is valid, and in the phase changer, if phase change is to be implemented using phase change method #1, v5 is set to 0 (v5=0), and the base station transmits v5. Moreover, in the phase changer, if phase change is to be implemented using phase change method #2, v5 is set to 1 (v5=1) and the base station transmits v5.

Note that since the determination of whether the terminal, which is the communication partner of the base station or AP, is capable of reception even when a phase change is implemented has already been described in another embodiment, repeated description will be omitted in this embodiment. Moreover, when the base station or AP does not support implementation of a phase change, the base station or AP does not include phase changer 205A, phase changer 205B, phase changer 5901A, phase changer 5901B.

Next, an example of operations performed by the terminal, which is the communication partner of the base station, will be given.

Consider a terminal capable of demodulating only a single-carrier scheme modulated signal. In such a case, the terminal determines that v5 information (v5 bit) obtained by control information demodulator (control information detector) 809 is null (v5 information (v5 bit) is not necessary). Accordingly, since the modulated signal generated by the base station or AP when a phase change is implemented in phase changer 205A, phase changer 205B, phase changer 5901A, and/or phase changer 5901B is not transmitted, signal processor 911 does not perform corresponding signal processing, but instead performs demodulation and/or decoding corresponding to signal processing under a different scheme to obtain and output reception data 812.

More specifically, when the terminal receives a signal transmitted from another communications device such as the base station or AP, the terminal determines, based on preamble 8801 and control information symbol 8802, whether data symbol 8803 is an OFDM scheme modulated signal or a single-carrier scheme modulated signal. When determined to be an OFDM scheme modulated signal, since the terminal is not functionally equipped to demodulate data symbol 8803, data symbol 8803 is not demodulated. On the other hand, when determined to be a single-carrier scheme modulated signal, the terminal demodulates data symbol 8803. Here, the terminal determines a demodulation method for data symbol 8803 based on information obtained by control information decoder (control information detector) 809. Here, since a phase change is not implemented cyclically/regularly on a single-carrier scheme modulated signal, the terminal uses, among control information obtained by control information decoder (control information detector) 809, control information excluding at least the bit corresponding to (v3 information and) v5 information to determine the demodulation method for data symbol 8803.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information decoder (control information detector) 809 that the modulated signal is an OFDM scheme modulated signal from v1, v5 information (v5 bit) is determined to be valid.

Here, control information decoder (control information detector) 809 determines a demodulation method for data symbol 8803 based on control information including v5 information (v5 bit). Then, signal processor 811 performs operations for demodulation and decoding using a method based on the determined demodulation method.

When the base station or AP transmits a modulated signal generated when a phase change is implemented in phase changer 205A, phase changer 205B, phase changer 5901A, and/or phase changer 5901B, when a terminal that supports demodulation of such a modulated signal determines in control information decoder (control information detector) 809 that the modulated signal is single-carrier scheme modulated signal from v1, v6 information (v5 bit) is determined to be null (v5 information (v5 bit) is not necessary).

Here, control information decoder (control information detector) 809 determines a demodulation method for data symbol 8803 using control information excluding at least the bit corresponding to (v3 information and) v5 information. Then, signal processor 811 performs operations for demodulation and decoding using a method based on the determined demodulation method.

By the base station or AP and the terminal, which is the communication partner of the base station or AP, operating as described in the present embodiment, the base station or AP and the terminal can perform communication accurately, and as a result, it is possible to achieve an advantageous effect in that data reception quality is improved and data transmission speed is improved. Moreover, when the base station or AP uses an OFDM scheme and implements a phase change upon transmitting a plurality of streams, in an environment in which direct waves are dominant, the terminal, which is the communication partner, can achieve an advantageous effect of an improvement in data reception quality.

Embodiment C4

Next, a variation of Embodiment B2 will be described. The precoding method in weighting synthesizer 203 when mapped signal 201A (s1(t)) is QPSK (or π/2 shift QPSK)

and mapped signal 201B (s2(t)) is QPSK (or π/2 shift QPSK) will be described (note that in Embodiment B2, π/2 shift QPSK may be used instead of QPSK).

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 220]

$$F = \begin{pmatrix} 1 & e^{j\frac{\pi}{3}} \\ 1 & -e^{j\frac{\pi}{3}} \end{pmatrix} \quad \text{Equation (220)}$$

or

[MATH. 221]

$$F = \frac{\beta}{\sqrt{2}} \begin{pmatrix} 1 & e^{j\frac{\pi}{3}} \\ 1 & -e^{j\frac{\pi}{3}} \end{pmatrix} \quad \text{Equation (221)}$$

or

[MATH. 222]

$$F = \begin{pmatrix} \beta \times 1 & \beta \times e^{j\frac{\pi}{3}} \\ \beta \times 1 & -\beta \times e^{j\frac{\pi}{3}} \end{pmatrix} \quad \text{Equation (222)}$$

or

[MATH. 223]

$$F = \begin{pmatrix} e^{j\theta_{11}} & e^{j(\theta_{11}+\frac{\pi}{3})} \\ e^{j\theta_{21}} & e^{j(\theta_{21}+\frac{\pi}{3})} \end{pmatrix} \quad \text{Equation (223)}$$

or

[MATH. 224]

$$F = \frac{\beta}{\sqrt{2}} \begin{pmatrix} e^{j\theta_{11}} & e^{j(\theta_{11}+\frac{\pi}{3})} \\ e^{j\theta_{21}} & e^{j(\theta_{21}+\frac{\pi}{3})} \end{pmatrix} \quad \text{Equation (224)}$$

or

[MATH. 225]

$$F = \begin{pmatrix} \beta \times e^{j\theta_{11}} & \beta \times e^{j(\theta_{11}+\frac{\pi}{3})} \\ \beta \times e^{j\theta_{21}} & \beta \times e^{j(\theta_{21}+\frac{\pi}{3})} \end{pmatrix} \quad \text{Equation (225)}$$

ß may be a real number, and, alternatively, may be an imaginary number. However, ß is not 0 (zero). Moreover, θ11 and θ21 are real numbers.

In weighting synthesizer 203, when precoding is performed using either one of the precoding matrices expressed in Equation (220) or Equation (225), the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108_A or transmission signal 108_B is low, taking into consideration the state of the signal points described above, it is possible to achieve the advantageous effect of an improvement in data reception quality by the terminal.

Precoding matrix F may be applied as follows.

[MATH. 226]

$$F = \begin{pmatrix} a & b \\ c & d \end{pmatrix} \quad \text{Equation (226)}$$

Note that a, b, c, and d can be defined by imaginary numbers (and thus may be real numbers). Here, in Equation (220) through Equation (225), since the absolute values of a, b, c, and d are equal, it is possible to achieve the advantageous effect that it is highly possible to achieve diversity gain.

Note that in the above description, the configuration of signal processor 106 in transmission device that is illustrated in FIG. 1 and included in the base station or AP is exemplified as being any one of the configurations illustrated in FIG. 2, FIG. 18, FIG. 19, FIG. 20, FIG. 21, FIG. 22, FIG. 59, and FIG. 60, but a phase change need not be implemented by phase changer 205A, phase changer 205B, phase changer 209A, and/or phase changer 209B illustrated in FIG. 2, FIG. 18, FIG. 19, FIG. 20, FIG. 21, FIG. 22, FIG. 59, and FIG. 60. Here, a phase change is not implemented on input signals, and the signals are output as-is. For example, (in FIG. 2) in phase changer 205B, when a phase change is not implemented, signal 204B corresponds to signal 206B. When a phase change is not implemented in phase changer 209B, signal 208B corresponds to signal 210B. When a phase change is not implemented in phase changer 205A, signal 204A corresponds to signal 206A. When a phase change is not implemented in phase changer 209A, signal 208A corresponds to signal 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment C5

Next, a variation of Embodiment B2 will be described. The precoding method used in weighting synthesizer 203 when mapped signal 201A (s1(t)) is 16QAM (or π/2 shift 16QAM) and mapped signal 201B (s2(t)) is 16QAM (or π/2 shift 16QAM) will be described.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 227]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$

Equation (227)

or

[MATH. 228]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$

Equation (228)

or

[MATH. 229]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix}$$

Equation (229)

As a first method, in Equation (227), Equation (228), and Equation (229), α is defined as follows.

[MATH. 230]

$\alpha = 5/4$    Equation (230)

ß may be a real number, and, alternatively, may be an imaginary number. θ11 is a real number, θ21 is a real number, and δ is a real number.

As a second method, in Equation (227), Equation (228), and Equation (229), α is defined as follows.

[MATH. 231]

$\alpha = 4/5$    Equation (231)

ß may be a real number, and, alternatively, may be an imaginary number. θ11 is a real number, θ21 is a real number, and δ is a real number.

In weighting synthesizer 203, when precoding using any one of the precoding matrices according to the first method using Equation (227), the first method using Equation (228), the first method using Equation (229), the second method using Equation (227), the second method using Equation (228), and the second method using Equation (229) is performed, the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108A or transmission signal 108_B is low, taking into consideration the state of the signal points described above, it is possible to achieve the advantageous effect of an improvement in data reception quality by the terminal.

Precoding matrix F may be applied as shown in Equation (226). Here, in the first method using Equation (227), the first method using Equation (228), the first method using Equation (229), the second method using Equation (227), the second method using Equation (228), and the second method using Equation (229), since there is no big difference between the absolute values of a, b, c, and d, it is possible to achieve the advantageous effect that it is highly possible to achieve diversity gain.

Note that in the above description, the configuration of signal processor 106 in the transmission device in FIG. 1 included in the base station or AP is described as being any one of the configurations illustrated in FIG. 2, FIG. 18, FIG. 19, FIG. 20, FIG. 21, FIG. 22, FIG. 59, and FIG. 60, but in phase changer 205A, phase changer 205B, phase changer 209A, and phase changer 209B in FIG. 2, FIG. 18, FIG. 19, FIG. 20, FIG. 21, FIG. 22, FIG. 59, and FIG. 60, a phase change need not be implemented. Here, a phase change is not implemented on input signals, and the signals are output as-is. For example, (in FIG. 2) in phase changer 205B, when a phase change is not implemented, signal 204B corresponds to signal 206B. When a phase change is not implemented in phase changer 209B, signal 208B corresponds to signal 210B. When a phase change is not implemented in phase changer 205A, signal 204A corresponds to signal 206A. When a phase change is not implemented in phase changer 209A, signal 208A corresponds to signal 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment C6

Next, a variation of Embodiment B2 will be described. The precoding method used in weighting synthesizer 203 when mapped signal 201A (s1(t)) is 64QAM (or π/2 shift 64QAM) and mapped signal 201B (s2(t)) is 64QAM (or π/2 shift 64QAM) will be described.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 232]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$

Equation (232)

or

[MATH. 233]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$

Equation (233)

or

[MATH. 234]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix}$$

Equation (234)

As a first method, in Equation (232), Equation (233), and Equation (234), α is defined as follows.

[MATH. 235]

$\alpha = 9/8$    Equation(235)

ß may be a real number, and, alternatively, may be an imaginary number. θ11 is a real number, θ21 is a real number, and δ is a real number.

As a second method, in Equation (232), Equation (233), and Equation (234), α is defined as follows.

[MATH. 236]

$$\alpha = 3/9 \quad \text{Equation (236)}$$

ß may be a real number, and, alternatively, may be an imaginary number. θ11 is a real number, θ21 is a real number, and δ is a real number.

In weighting synthesizer 203, when precoding using any one of the precoding matrices according to the first method using Equation (232), the first method using Equation (233), the first method using Equation (234), the second method using Equation (232), the second method using Equation (233), and the second method using Equation (234) is performed, the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108_A or transmission signal 108_B is low, taking into consideration the state of the signal points described above, it is possible to achieve the advantageous effect of an improvement in data reception quality by the terminal.

Precoding matrix F may be applied as shown in Equation (226). Here, in the first method using Equation (232), the first method using Equation (233), the first method using Equation (234), the second method using Equation (232), the second method using Equation (233), and the second method using Equation (234), since there is no big difference between the absolute values of a, b, c, and d, it is possible to achieve the advantageous effect that it is highly possible to achieve diversity gain.

Note that in the above description, the configuration of signal processor 106 in the transmission device in FIG. 1 included in the base station or AP is described as being any one of the configurations illustrated in FIG. 2, FIG. 18, FIG. 19, FIG. 20, FIG. 21, FIG. 22, FIG. 59, and FIG. 60, but in phase changer 205A, phase changer 205B, phase changer 209A, and phase changer 209B in FIG. 2, FIG. 18, FIG. 19, FIG. 20, FIG. 21, FIG. 22, FIG. 59, and FIG. 60, a phase change need not be implemented. Here, a phase change is not implemented on input signals, and the signals are output as-is. For example, (in FIG. 2) in phase changer 205B, when a phase change is not implemented, signal 204B corresponds to signal 206B. When a phase change is not implemented in phase changer 209B, signal 208B corresponds to signal 210B. When a phase change is not implemented in phase changer 205A, signal 204A corresponds to signal 206A. When a phase change is not implemented in phase changer 209A, signal 208A corresponds to signal 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment C7

Next, a variation of Embodiment B2 will be described. The precoding method used in weighting synthesizer 203 when mapped signal 201A (s1(t)) is 16QAM (or π/2 shift 16QAM) and mapped signal 201B (s2(t)) is 16QAM (or π/2 shift 16QAM) will be described.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 237]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (237)}$$

or

[MATH. 238]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (238)}$$

or

[MATH. 239]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix} \quad \text{Equation (239)}$$

As a first method, in Equation (237), Equation (238), and Equation (239), α is defined as follows.

[MATH. 240]

$$\alpha = 4 \quad \text{Equation (240)}$$

ß may be a real number, and, alternatively, may be an imaginary number. θ11 is a real number, θ21 is a real number, and δ is a real number.

As a second method, in Equation (237), Equation (238), and Equation (239), α is defined as follows.

[MATH. 241]

$$\alpha = 1/4 \quad \text{Equation (241)}$$

ß may be a real number, and, alternatively, may be an imaginary number. θ11 is a real number, θ21 is a real number, and δ is a real number.

In weighting synthesizer 203, when precoding using any one of the precoding matrices according to the first method using Equation (237), the first method using Equation (238), the first method using Equation (239), the second method using Equation (237), the second method using Equation (238), and the second method using Equation (239) is performed, the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108_A or transmission signal 108_B is low, taking into consideration the state of the signal points described above, it is possible to achieve the advantageous effect of an improvement in data reception quality by the terminal.

Note that in the above description, the configuration of signal processor 106 in the transmission device in FIG. 1 included in the base station or AP is described as being any one of the configurations illustrated in FIG. 2, FIG. 18, FIG. 19, FIG. 20, FIG. 21, FIG. 22, FIG. 59, and FIG. 60, but in phase changer 205A, phase changer 205B, phase changer 209A, and phase changer 209B in FIG. 2, FIG. 18, FIG. 19, FIG. 20, FIG. 21, FIG. 22, FIG. 59, and FIG. 60, a phase change need not be implemented. Here, a phase change is not implemented on input signals, and the signals are output as-is. For example, (in FIG. 2) in phase changer 205B, when a phase change is not implemented, signal 204B corresponds to signal 206B. When a phase change is not implemented in phase changer 209B, signal 208B corresponds to signal 210B. When a phase change is not implemented in phase changer 205A, signal 204A corresponds to signal 206A. When a phase change is not implemented in phase changer 209A, signal 208A corresponds to signal 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment C8

Next, a variation of Embodiment B2 will be described. The precoding method used in weighting synthesizer 203 when mapped signal 201A (s1(t)) is 64QAM (or π/2 shift 64QAM) and mapped signal 201B (s2(t)) is 64QAM (or π/2 shift 64QAM) will be described.

When the configuration of signal processor 106 in FIG. 1 is any one of the configurations illustrated in FIG. 2, FIG. 18, FIG. 19, FIG. 20, FIG. 21, FIG. 22, FIG. 59, or FIG. 60, for example, the following is applied as the precoding matrix F used in weighting synthesizer 203.

[MATH. 242]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (242)}$$

or

[MATH. 243]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (243)}$$

or

[MATH. 244]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix} \quad \text{Equation (244)}$$

As a first method, in Equation (242), Equation (243), and Equation (244), α is defined as follows.

[MATH. 245]

$$\alpha = 8 \quad \text{Equation (245)}$$

β may be a real number, and, alternatively, may be an imaginary number. θ11 is a real number, θ21 is a real number, and δ is a real number.

As a second method, in Equation (242), Equation (243), and Equation (244), α is defined as follows.

[MATH. 246]

$$\alpha = \frac{1}{8} \quad \text{Equation (246)}$$

β may be a real number, and, alternatively, may be an imaginary number. θ11 is a real number, θ21 is a real number, and δ is a real number.

In weighting synthesizer 203, when precoding using any one of the precoding matrices according to the first method using Equation (242), the first method using Equation (243), the first method using Equation (244), the second method using Equation (242), the second method using Equation (243), and the second method using Equation (244) is performed, the signal points in the in-phase I-quadrature Q plane of weighting synthesized signals 204A, 204B do not overlap and are widely spread apart. Accordingly, when the base station or AP transmits transmission signals 108_A and 108_B and in the terminal, which is the communication partner, the reception power of either of transmission signal 108_A or transmission signal 108_B is low, taking into consideration the state of the signal points described above, it is possible to achieve the advantageous effect of an improvement in data reception quality by the terminal.

Note that in the above description, the configuration of signal processor 106 in the transmission device in FIG. 1 included in the base station or AP is described as being any one of the configurations illustrated in FIG. 2, FIG. 18, FIG. 19, FIG. 20, FIG. 21, FIG. 22, FIG. 59, and FIG. 60, but in phase changer 205A, phase changer 205B, phase changer 209A, and phase changer 209B in FIG. 2, FIG. 18, FIG. 19, FIG. 20, FIG. 21, FIG. 22, FIG. 59, and FIG. 60, a phase change need not be implemented. Here, a phase change is not implemented on input signals, and the signals are output as-is. For example, (in FIG. 2) in phase changer 205B, when a phase change is not implemented, signal 204B corresponds to signal 206B. When a phase change is not implemented in phase changer 209B, signal 208B corresponds to signal 210B. When a phase change is not implemented in phase changer 205A, signal 204A corresponds to signal 206A. When a phase change is not implemented in phase changer 209A, signal 208A corresponds to signal 210B.

Phase changer 205A, phase changer 205B, phase changer 209A, and/or phase changer 209B may be omitted. For example, (in FIG. 2) when phase changer 205B is omitted, input 206B of inserter 207B corresponds to signal 204B. When phase changer 209B is omitted, signal 210B corresponds to signal 208B. When phase changer 205A is omitted, input 206A of inserter 207A corresponds to signal 204A. When phase changer 209A is omitted, signal 210A corresponds to signal 208A.

When the precoding matrices are set as described above, it is possible to achieve an advantageous effect of an improvement in data reception quality in the terminal, which is the communication partner of the base station or AP. Note that this embodiment may be combined with other embodiments, including Embodiment B1.

Embodiment D1

In this embodiment, preferable examples of the precoding method used in the transmission device in the base station or AP and based on Embodiment B2 will be given.

Figure 90:
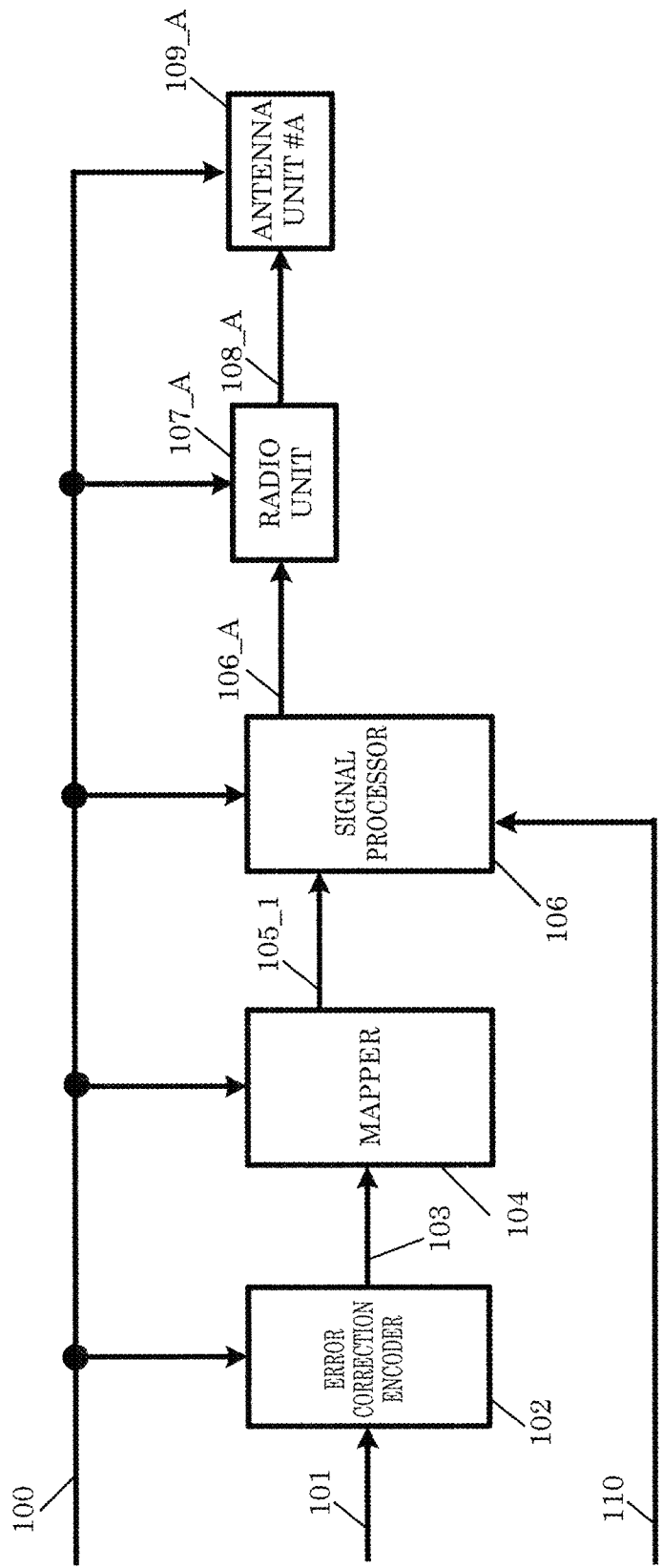
FIG. 90 illustrates one example of a configuration of a transmission device.

Consider a case in which the base station or AP and the terminal communicate with each. FIG. 90 illustrates an example of the configuration of the transmission device in the base station AP in such a case. In FIG. 90, objects that operate the same as in FIG. 1 share like reference marks, and repeated description of such objects will be omitted.

Error correction encoder 102 receives inputs of data 101 and control signal 100, and based on information related to the error correction code included in control signal 100, performs error correction encoding, and outputs encoded data 103.

Mapper 104 receives inputs of encoded data 103 and control signal 100, and based on information on the modulated signal included in control signal 100, performs mapping in accordance with the modulation scheme, and outputs mapped signal (baseband signal) 105_1.

Signal processor 106 receives inputs of mapped signal 105_1, signal group 110, and control signal 100, performs signal processing based on control signal 100, and outputs signal-processed signal 106_A.

Radio unit 107_A receives inputs of signal-processed signal 106_A and control signal 100, and based on control signal 100, processes signal-processed signal 106_A and outputs transmission signal 108_A. Transmission signal 108_A is then output as radio waves from antenna unit #A (109_A).

Figure 91:
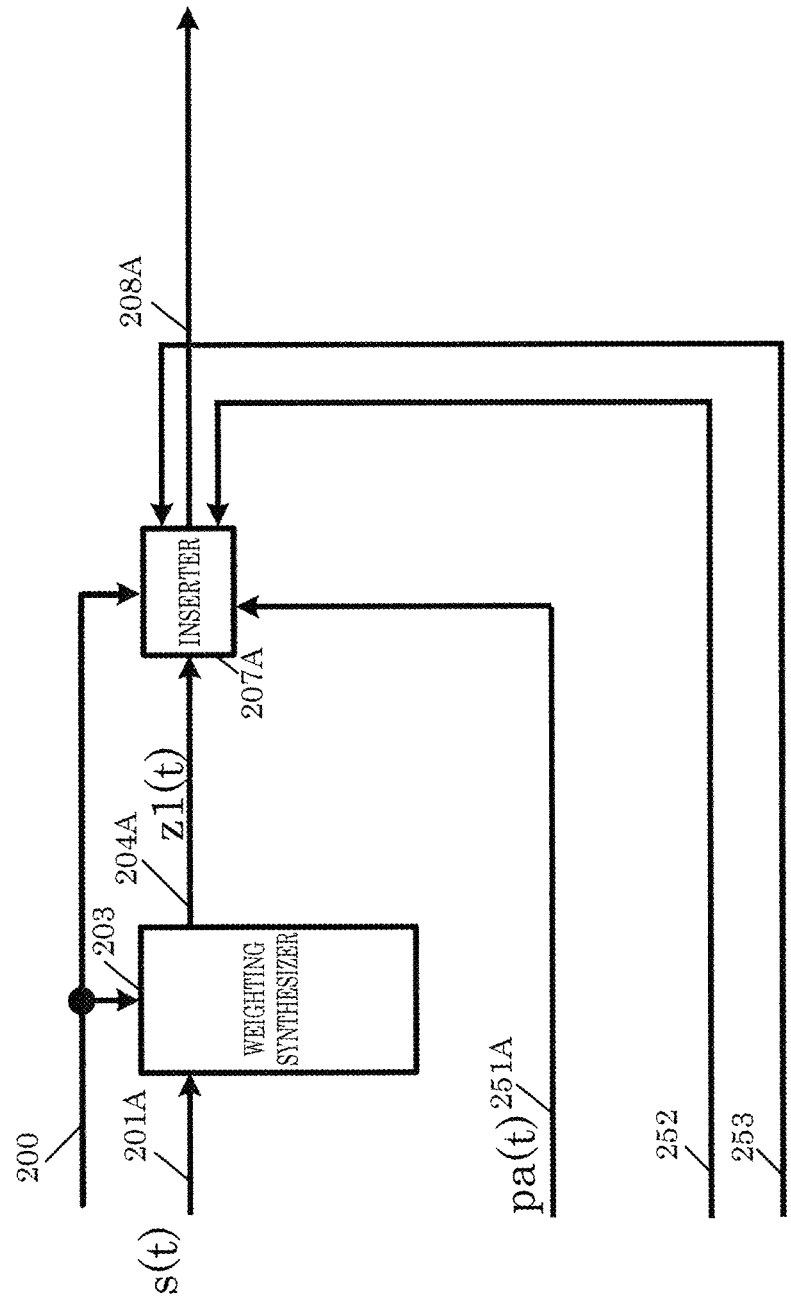
FIG. 91 illustrates one example of a configuration of the signal processor illustrated in FIG. 90.

FIG. 91 illustrates one example of a configuration of signal processor 106 illustrated in FIG. 90. Note that in FIG. 91, operations that are the same as in FIG. 2 share like reference marks, and duplicate description thereof is omitted.

Weighting synthesizer (precoder) 203 receives inputs of mapped signal 201A (corresponding to mapped signal 1051 in FIG. 90) and control signal 200 (corresponding to control signal 100 in FIG. 90), performs weighting synthesis (precoding) based on control signal 200, and outputs weighted signal 204A.

Here, mapped signal 201A is expressed as s1(t) and weighted signal 204A is expressed as z1(t). Note that one example of t is time (s1(t), z1(t) are defined as complex numbers (accordingly, they may be real numbers)).

Weighting synthesizer 203 then performs weighted synthesis on the two symbols s1(2i−1) and s1(2i) in mapped signal 201A s1(t), and outputs the two symbols z1(2i−1) and z1(2i) in weighted signal 204A z1(t). More specifically, the following calculation is performed.

[MATH. 247]

$$\begin{pmatrix} z1(2i-1) \\ z1(2i) \end{pmatrix} = \begin{pmatrix} a & b \\ c & d \end{pmatrix} \begin{pmatrix} s1(2i-1) \\ s1(2i) \end{pmatrix} = F \begin{pmatrix} s1(2i-1) \\ s1(2i) \end{pmatrix}$$ Equation (247)

Note that F is a matrix for weighted synthesis, and a, b, c, and d can be defined as complex numbers. Accordingly, a, b, c, and d can be defined as complex numbers (may be real numbers). Note that i is a symbol number (note that here, i is an integer that is greater than or equal to 1).

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Figure 92:
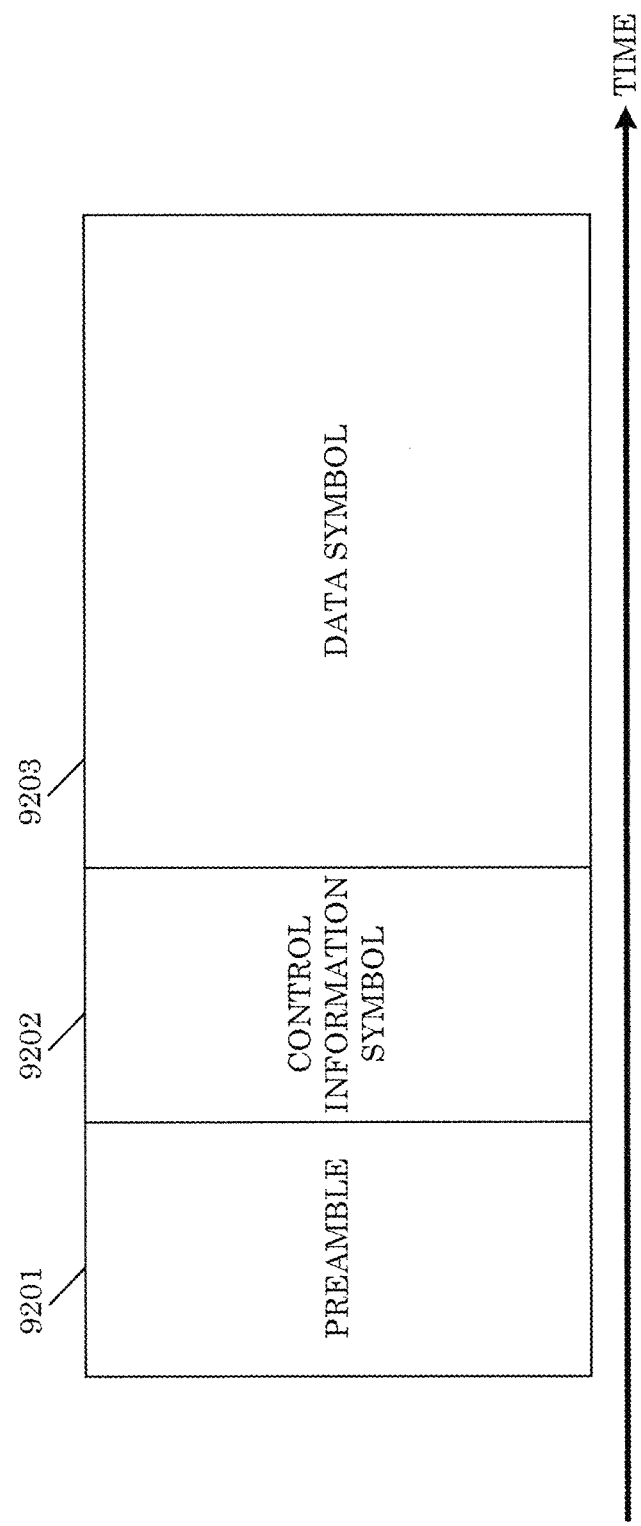
FIG. 92 illustrates one example of a frame configuration of a modulated signal transmitted by the transmission device illustrated in FIG. 90.

FIG. 92 illustrates one example of a frame configuration of a modulated signal transmitted by the transmission device illustrated in FIG. 90. Time is represented on the horizontal axis. 9201 is a preamble, and is, for example, a symbol for the reception device that receives the modulated signal transmitted by the transmission device illustrated in FIG. 90 to implement time synchronization, frame synchronization, signal detection, frequency synchronization, frequency offset estimation, etc. 9202 is a control information symbol, and is, for example, a symbol for transmitting control information, such as the modulation scheme, error correction encoding scheme, and/or transmission method of a data symbol.

9203 is a data symbol, and is a symbol for transmitting z1(2i−1) and z1(2i) described above. Since the frame configuration illustrated in FIG. 92 is a single-carrier scheme frame configuration, z1(2i−1) and z1(2i) are arranged in order along the time axis. For example, symbols are arranged along the time axis in the order of z1(2i−1) and z1(2i). Note that the transmission device illustrated in FIG. 90 may include an interleaver for shifting the order of the symbols, and depending on the shifting of the order of the symbols, z1(2i−1) and z1(2i) need not be temporally adjacent. Moreover, in FIG. 92, a pilot symbol is not included, but a pilot symbol may be included in the frame. Moreover, symbols other than those illustrated in FIG. 92 may be included in the frame.

Figure 93:
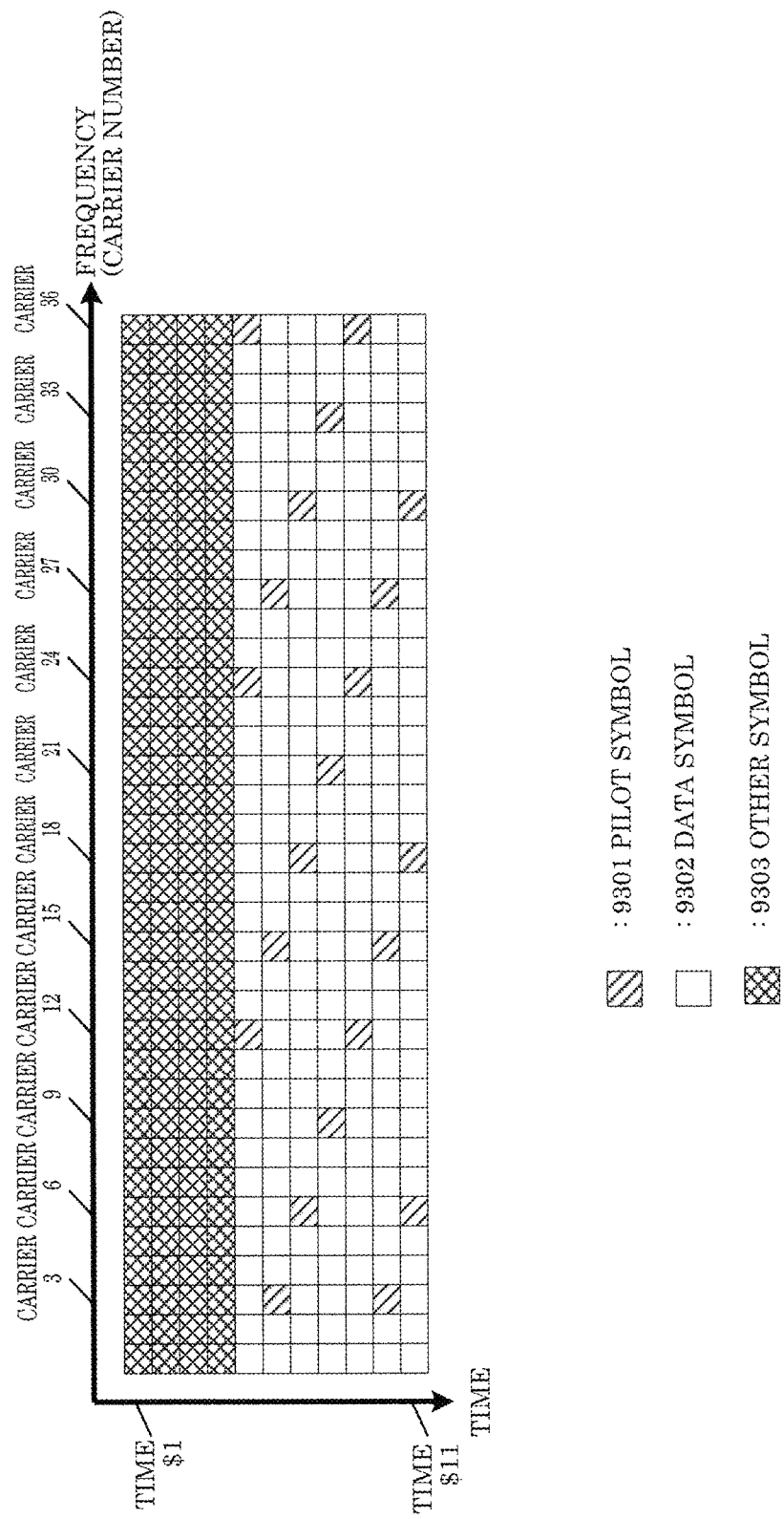
FIG. 93 illustrates one example of a frame configuration of a modulated signal transmitted by the transmission device illustrated in FIG. 90.

FIG. 93 illustrates one example of a frame configuration different from FIG. 92 of a modulated signal transmitted by the transmission device illustrated in FIG. 90. Frequency is represented on the horizontal axis, and time is represented on the vertical axis. 9301 is a pilot symbol, and is, for example a symbol for the reception device that receives the modulated signal transmitted by the transmission device illustrated in FIG. 90 to implement channel estimation, etc. 9303 is some other type of symbol, including, for example, a preamble and control information symbol. The preamble is a symbol for the reception device that receives the modulated signal transmitted by the transmission device illustrated in FIG. 90 to implement time synchronization, frame synchronization, signal detection, frequency synchronization, frequency offset estimation, etc., and the control information symbol is a symbol for transmitting control information on the modulation scheme, error correction encoding scheme, transmission method, etc., of a data symbol.

9302 is a data symbol, and is a symbol for transmitting z1(2i−1) and z1(2i) described above. Since the frame configuration illustrated in FIG. 93 is a multi-carrier transmission scheme frame configuration such as an OFDM frame configuration, z1(2i−1) and z1(2i) may be arranged in order along the time axis, and may be arranged in order along the frequency axis. Note that the transmission device illustrated in FIG. 90 may include an interleaver for shifting the order of the symbols, and depending on the shifting of the order of the symbols, z1(2i−1) and z1(2i) need not be temporally adjacent, and need not be adjacent on the frequency axis. Moreover, the frame may include symbols other than those illustrated n FIG. 93.

A suitable example of a weighting synthesis method for weighting synthesizer 203 in FIG. 91 when signal processor 106 in FIG. 90 has the configuration illustrated in FIG. 91 will be described.

As a first example, the precoding method used in weighting synthesizer 203 in FIG. 91 when mapped signal 201A (s1(t)) is BPSK(Binary Phase Shift Keying) or when mapped signal 201A (s1(t)) is π/2 shift BPSK will be described.

Consider a case in which the matrix F or F(i) for the weighting synthesis to be used in weighting synthesizer 203 in FIG. 91 includes only real numbers. For example, the matrix F for weighting synthesis is expressed as shown in the following equation.

[MATH. 248]

$$F = \begin{pmatrix} 1 & -1 \\ 1 & 1 \end{pmatrix} \quad \text{Equation (248)}$$

For example, in the case of BPSK, the signal points of the signal after precoding in in-phase I-quadrature Q plane include three points, namely, signal points 8601, 8602, and 8603 illustrated in FIG. 86 (one point overlaps with a signal point).

Consider a case in which, under the conditions above, as illustrated in FIG. 1, z1(2i−1) and z1(2i) are transmitted and in the terminal, which is the communication partner, the reception power of z1(2i, z1(2i−1) or z1(2i) is low.

Here, as illustrated in FIG. 86, since there are only three signal points, a problem arises in which data reception quality is bad. Taking this into consideration, a method is proposed in which precoding matrix F for weighting synthesis is comprised of not only real numbers. As an example, matrix F for weighting synthesis is applied as follows.

[MATH. 249]

$$F = \begin{pmatrix} 1 & j \\ j & 1 \end{pmatrix} \quad \text{Equation (249)}$$

or

[MATH. 250]

$$F = \frac{\alpha}{\sqrt{2}} \begin{pmatrix} 1 & j \\ j & 1 \end{pmatrix} \quad \text{Equation (250)}$$

or

[MATH. 251]

$$F = \begin{pmatrix} \alpha \times 1 & \alpha \times j \\ \alpha \times j & \alpha \times 1 \end{pmatrix} \quad \text{Equation (251)}$$

or

[MATH. 252]

$$F = \begin{pmatrix} j & 1 \\ 1 & j \end{pmatrix} \quad \text{Equation (252)}$$

or

[MATH. 253]

$$F = \frac{\alpha}{\sqrt{2}} \begin{pmatrix} j & 1 \\ 1 & j \end{pmatrix} \quad \text{Equation (253)}$$

or

[MATH. 254]

$$F = \begin{pmatrix} \alpha \times j & \alpha \times 1 \\ \alpha \times 1 & \alpha \times j \end{pmatrix} \quad \text{Equation (254)}$$

or

[MATH. 255]

$$F = \begin{pmatrix} 1 & j \\ 1 & -j \end{pmatrix} \quad \text{Equation (255)}$$

or

[MATH. 256]

$$F = \frac{\alpha}{\sqrt{2}} \begin{pmatrix} 1 & j \\ 1 & -j \end{pmatrix} \quad \text{Equation (256)}$$

or

[MATH. 257]

$$F = \begin{pmatrix} \alpha \times 1 & \alpha \times j \\ \alpha \times 1 & -\alpha \times j \end{pmatrix} \quad \text{Equation (257)}$$

or

[MATH. 258]

$$F = \begin{pmatrix} 1 & -j \\ 1 & j \end{pmatrix} \quad \text{Equation (258)}$$

or

[MATH. 259]

$$F = \frac{\alpha}{\sqrt{2}} \begin{pmatrix} 1 & -j \\ 1 & j \end{pmatrix} \quad \text{Equation (259)}$$

or

[MATH. 260]

$$F = \begin{pmatrix} \alpha \times 1 & -\alpha \times j \\ \alpha \times 1 & \alpha \times j \end{pmatrix} \quad \text{Equation (260)}$$

or

[MATH. 261]

$$F = \begin{pmatrix} j & 1 \\ -j & 1 \end{pmatrix} \quad \text{Equation (261)}$$

or

[MATH. 262]

$$F = \frac{\alpha}{\sqrt{2}} \begin{pmatrix} j & 1 \\ -j & 1 \end{pmatrix} \quad \text{Equation (262)}$$

or

[MATH. 263]

$$F = \begin{pmatrix} \alpha \times j & \alpha \times 1 \\ -\alpha \times j & \alpha \times 1 \end{pmatrix} \quad \text{Equation (263)}$$

or

[MATH. 264]

$$F = \begin{pmatrix} -j & 1 \\ j & 1 \end{pmatrix} \quad \text{Equation (264)}$$

or

[MATH. 265]

$$F = \frac{\alpha}{\sqrt{2}} \begin{pmatrix} -j & 1 \\ j & 1 \end{pmatrix} \quad \text{Equation (265)}$$

or

[MATH. 266]

$$F = \begin{pmatrix} -\alpha \times j & \alpha \times 1 \\ \alpha \times j & \alpha \times 1 \end{pmatrix} \quad \text{Equation (266)}$$

Note that $\alpha$ may be a real number, and, alternatively, may be an imaginary number. However, $\alpha$ is not 0 (zero).

When weighting synthesis using either of the matrices illustrated in Equation (249) or Equation (266) for weighting synthesis is performed in weighting synthesizer 203 illustrated in FIG. 91, the signal points in the in-phase I-quadrature Q plane of weighting synthesized signal 204A are aligned in the order of signal point 8701, 8702, 8703, and 8704 in FIG. 87. Accordingly, when the base station or AP transmits transmission signal 108_A and in the terminal, which is the communication partner, the reception power of either of z1(2i−1) or z1(2i) is low, taking into consideration the state illustrated in FIG. 87, it is possible to achieve the advantageous effect of an improvement in data reception quality by the terminal.

Next, as a second example, a suitable example of a weighting synthesis method to be used in weighting synthesizer 203 when mapped signal 201A (s1(t)) is QPSK (Quadrature Phase Shift Keying) will be described.

When signal point processor 106 in FIG. 90 has the configuration illustrated in FIG. 91, in one example of matrix F for weighting synthesis to be used by weighting synthesizer 203, the following may be applied.

[MATH. 267]
$$F = \begin{pmatrix} 1 & 2 \\ -2 & 1 \end{pmatrix}$$ Equation (267)

or

[MATH. 268]
$$F = \frac{\beta}{\sqrt{5}} \begin{pmatrix} 1 & 2 \\ -2 & 1 \end{pmatrix}$$ Equation (268)

or

[MATH. 269]
$$F = \begin{pmatrix} \beta \times 1 & \beta \times 2 \\ -\beta \times 2 & \beta \times 1 \end{pmatrix}$$ Equation (269)

or

[MATH. 270]
$$F = \begin{pmatrix} 2 & 1 \\ 1 & -2 \end{pmatrix}$$ Equation (270)

or

[MATH. 271]
$$F = \frac{\beta}{\sqrt{5}} \begin{pmatrix} 2 & 1 \\ 1 & -2 \end{pmatrix}$$ Equation (271)

or

[MATH. 272]
$$F = \begin{pmatrix} \beta \times 2 & \beta \times 1 \\ \beta \times 1 & -\beta \times 2 \end{pmatrix}$$ Equation (272)

or

[MATH. 273]
$$F = \begin{pmatrix} 1 & -2 \\ 2 & 1 \end{pmatrix}$$ Equation (273)

or

[MATH. 274]
$$F = \frac{\beta}{\sqrt{5}} \begin{pmatrix} 1 & -2 \\ 2 & 1 \end{pmatrix}$$ Equation (274)

or

[MATH. 275]
$$F = \begin{pmatrix} \beta \times 1 & -\beta \times 2 \\ \beta \times 2 & \beta \times 1 \end{pmatrix}$$ Equation (275)

-continued or

[MATH. 276]
$$F = \begin{pmatrix} -2 & 1 \\ 1 & 2 \end{pmatrix}$$ Equation (276)

or

[MATH. 277]
$$F = \frac{\beta}{\sqrt{5}} \begin{pmatrix} -2 & 1 \\ 1 & 2 \end{pmatrix}$$ Equation (277)

or

[MATH. 278]
$$F = \begin{pmatrix} -\beta \times 2 & \beta \times 1 \\ \beta \times 1 & \beta \times 2 \end{pmatrix}$$ Equation (278)

or

[MATH. 279]
$$F = \begin{pmatrix} 1 & 2 \\ 2 & -1 \end{pmatrix}$$ Equation (279)

or

[MATH. 280]
$$F = \frac{\beta}{\sqrt{5}} \begin{pmatrix} 1 & 2 \\ 2 & -1 \end{pmatrix}$$ Equation (280)

or

[MATH. 281]
$$F = \begin{pmatrix} \beta \times 1 & \beta \times 2 \\ \beta \times 2 & -\beta \times 1 \end{pmatrix}$$ Equation (281)

or

[MATH. 282]
$$F = \begin{pmatrix} 2 & 1 \\ -1 & 2 \end{pmatrix}$$ Equation (282)

or

[MATH. 283]
$$F = \frac{\beta}{\sqrt{5}} \begin{pmatrix} 2 & 1 \\ -1 & 2 \end{pmatrix}$$ Equation (283)

or

[MATH. 284]
$$F = \begin{pmatrix} \beta \times 2 & \beta \times 1 \\ -\beta \times 1 & \beta \times 2 \end{pmatrix}$$ Equation (284)

or

[MATH. 285]
$$F = \begin{pmatrix} -1 & 2 \\ 2 & 1 \end{pmatrix}$$ Equation (285)

or

[MATH. 286]
$$F = \frac{\beta}{\sqrt{5}} \begin{pmatrix} -1 & 2 \\ 2 & 1 \end{pmatrix}$$ Equation (286)

or

[MATH. 287]
$$F = \begin{pmatrix} -\beta \times 1 & \beta \times 2 \\ \beta \times 2 & \beta \times 1 \end{pmatrix}$$ Equation (287)

-continued or

[MATH. 288]

$$F = \begin{pmatrix} 2 & -1 \\ 1 & 2 \end{pmatrix}$$ Equation (288)

or

[MATH. 289]

$$F = \frac{\beta}{\sqrt{5}} \begin{pmatrix} 2 & -1 \\ 1 & 2 \end{pmatrix}$$ Equation (289)

or

[MATH. 290]

$$F = \begin{pmatrix} \beta \times 2 & -\beta \times 1 \\ \beta \times 1 & \beta \times 2 \end{pmatrix}$$ Equation (290)

ß may be a real number, and, alternatively, may be an imaginary number. However, ß is not 0 (zero).

When weighting synthesis using either of the matrices illustrated in Equation (267) or Equation (290) for weighting synthesis is performed in weighting synthesizer 203 illustrated in FIG. 91, the signal points in the in-phase I-quadrature Q plane of weighting synthesized signal 204A do not overlap and are widely spread apart. Accordingly, when the base station or AP transmits transmission signal 108_A and in the terminal, which is the communication partner, the reception power of either of z1(2i−1) or z1(2i) is low, taking into consideration the state of the signal points described above, it is possible to achieve the advantageous effect of an improvement in data reception quality by the terminal.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment D2

Next, a variation of Embodiment D1 will be described. A weighting synthesis method used in weighting synthesizer 203 in FIG. 91 when mapped signal 201A (s1(t)) is QPSK (or π/2 shift QPSK) will be described (note that in Embodiment D1, π/2 shift QPSK may be used instead of QPSK).

When signal processor 106 in FIG. 90 has the configuration illustrated in FIG. 91, in one example of matrix F for weighting synthesis to be used by weighting synthesizer 203, the following may be applied.

[MATH. 291]

$$F = \begin{pmatrix} 1 & e^{j\frac{\pi}{3}} \\ 1 & -e^{j\frac{\pi}{3}} \end{pmatrix}$$ Equation (291)

or

[MATH. 292]

$$F = \frac{\beta}{\sqrt{2}} \begin{pmatrix} 1 & e^{j\frac{\pi}{3}} \\ 1 & -e^{j\frac{\pi}{3}} \end{pmatrix}$$ Equation (292)

or

[MATH. 293]

$$F = \begin{pmatrix} \beta \times 1 & \beta \times e^{j\frac{\pi}{3}} \\ \beta \times 1 & -\beta \times e^{j\frac{\pi}{3}} \end{pmatrix}$$ Equation (293)

or

[MATH. 294]

$$F = \begin{pmatrix} 1 & e^{j\frac{\pi}{3}} \\ 1 & -e^{j\frac{\pi}{3}} \end{pmatrix}$$ Equation (294)

or

[MATH. 295]

$$F = \frac{\beta}{\sqrt{2}} \begin{pmatrix} e^{j\theta_{11}} & e^{j(\theta_{11}+\frac{\pi}{3})} \\ e^{j\theta_{21}} & e^{j(\theta_{21}+\pi+\frac{\pi}{3})} \end{pmatrix}$$ Equation (295)

or

[MATH. 296]

$$F = \begin{pmatrix} \beta \times e^{j\theta_{11}} & \beta \times e^{j(\theta_{11}+\frac{\pi}{3})} \\ \beta \times e^{j\theta_{21}} & \beta \times e^{j(\theta_{21}+\pi+\frac{\pi}{3})} \end{pmatrix}$$ Equation (296)

ß may be a real number, and, alternatively, may be an imaginary number. However, ß is not 0 (zero). Moreover, θ11 and θ21 are real numbers.

When weighting synthesis using either of the matrices illustrated in Equation (291) or Equation (296) for weighting synthesis is performed in weighting synthesizer 203 illustrated in FIG. 91, the signal points in the in-phase I-quadrature Q plane of weighting synthesized signal 204A do not overlap and are widely spread apart. Accordingly, when the base station or AP transmits transmission signal 108_A and in the terminal, which is the communication partner, the reception power of either of z1(2i−1) or z1(2i) is low, taking into consideration the state of the signal points described above, it is possible to achieve the advantageous effect of an improvement in data reception quality by the terminal.

Matrix F for weighting synthesis is applied as follows.

[MATH. 297]

$$F = \begin{pmatrix} a & b \\ c & d \end{pmatrix}$$ Equation (297)

Note that a, b, c, and d can be defined by imaginary numbers (and thus may be real numbers). Here, in Equation (291) through Equation (296), since the absolute values of a, b, c, and d are equal, it is possible to achieve the advantageous effect that it is highly possible to achieve diversity gain.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment D3

Next, a variation of Embodiment D1 will be described. A weighting synthesis method used in weighting synthesizer 203 in FIG. 91 when mapped signal 201A (s1(t)) is 16QAM (or π/2 shift 16QAM) will be described.

When signal processor 106 in FIG. 90 has the configuration illustrated in FIG. 91, in one example of matrix F for weighting synthesis to be used by weighting synthesizer 203, the following may be applied.

[MATH. 298]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (298)}$$

or

[MATH. 299]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (299)}$$

or

[MATH. 300]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix} \quad \text{Equation (300)}$$

As a first method, in Equation (298), Equation (299), and Equation (300), α is defined as follows.

[MATH. 301]

$$\alpha = 5/4 \quad (301)$$

ß may be a real number, and, alternatively, may be an imaginary number. θ11 is a real number, θ21 is a real number, and δ is a real number.

As a second method, in Equation (298), Equation (299), and Equation (300), α is defined as follows.

[MATH. 302]

$$\alpha = 4/5 \quad \text{Equation (302)}$$

ß may be a real number, and, alternatively, may be an imaginary number. θ11 is a real number, θ21 is a real number, and δ is a real number.

In weighting synthesizer 203, when precoding using any one of the precoding matrices according to the first method using Equation (227), the first method using Equation (228), the first method using Equation (229), the second method using Equation (227), the second method using Equation (228), and the second method using Equation (229) is performed, the signal points in the in-phase I-quadrature Q plane of weighting synthesized signal 204A do not overlap and are widely spread apart. Accordingly, when the base station or AP transmits transmission signal 108_A and in the terminal, which is the communication partner, the reception power of either of z1(2i−1) or z1(2i) is low, taking into consideration the state of the signal points described above, it is possible to achieve the advantageous effect of an improvement in data reception quality by the terminal.

Matrix F for weighting synthesis is expressed as shown in Equation (297). Here, in the first method using Equation (298), the first method using Equation (299), the first method using Equation (300), the second method using Equation (298), the second method using Equation (299), and the second method using Equation (300), since there is no big difference between the absolute values of a, b, c, and d, it is possible to achieve the advantageous effect that it is highly possible to achieve diversity gain.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment D4

Next, a variation of Embodiment D1 will be described. A weighting synthesis method used in weighting synthesizer 203 in FIG. 91 when mapped signal 201A (s1(t)) is 64QAM (or π/2 shift 64QAM) will be described.

When signal processor 106 in FIG. 90 has the configuration illustrated in FIG. 91, in one example of matrix F for weighting synthesis to be used by weighting synthesizer 203, the following may be applied.

[MATH. 303]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (303)}$$

or

[MATH. 304]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix} \quad \text{Equation (304)}$$

or

[MATH. 305]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix} \quad \text{Equation (305)}$$

As a first method, in Equation (303), Equation (304), and Equation (305), α is defined as follows.

[MATH. 306]

$$\alpha = 9/8 \quad \text{Equation (306)}$$

ß may be a real number, and, alternatively, may be an imaginary number. θ11 is a real number, θ21 is a real number, and δ is a real number.

As a second method, in Equation (303), Equation (304), and Equation (305), α is defined as follows.

[MATH. 307]

$$\alpha = 8/9 \quad \text{Equation (307)}$$

ß may be a real number, and, alternatively, may be an imaginary number. θ11 is a real number, θ21 is a real number, and δ is a real number.

In weighting synthesizer 203, when weighting synthesis using any one of the matrices for weighting synthesis according to the first method using Equation (303), the first method using Equation (304), the first method using Equation (305), the second method using Equation (303), the second method using Equation (304), and the second method using Equation (305) is performed, the signal points in the in-phase I-quadrature Q plane of weighting synthesized signal 204A do not overlap and are widely spread apart. Accordingly, when the base station or AP transmits transmission signal 108_A and in the terminal, which is the communication partner, the reception power of either of z1(2i−1) or z1(2i) is low, taking into consideration the state of the signal points described above, it is possible to achieve the advantageous effect of an improvement in data reception quality by the terminal.

Matrix F for weighting synthesis is expressed as shown in Equation (297). Here, in the first method using Equation (303), the first method using Equation (304), the first method using Equation (305), the second method using Equation (303), the second method using Equation (304), and the second method using Equation (305), since there is no big difference between the absolute values of a, b, c, and d, it is possible to achieve the advantageous effect that it is highly possible to achieve diversity gain.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment D5

Next, a variation of Embodiment D1 will be described. A weighting synthesis method used in weighting synthesizer 203 when mapped signal 201A (s1(t)) is 16QAM (or π/2 shift 16QAM) will be described.

When signal processor 106 in FIG. 90 has the configuration illustrated in FIG. 91, in one example of matrix F for weighting synthesis to be used by weighting synthesizer 203, the following may be applied.

[MATH. 308]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$ Equation (308)

or

[MATH. 309]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$ Equation (309)

or

[MATH. 310]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix}$$ Equation (310)

As a first method, in Equation (308), Equation (309), and Equation (310), α is defined as follows.

[MATH. 311]

α=4 Equation (311)

ß may be a real number, and, alternatively, may be an imaginary number. θ11 is a real number, θ21 is a real number, and δ is a real number.

As a second method, in Equation (308), Equation (309), and Equation (310), α is defined as follows.

[MATH. 312]

α=¼ Equation (312)

ß may be a real number, and, alternatively, may be an imaginary number. θ11 is a real number, θ21 is a real number, and δ is a real number.

In weighting synthesizer 203, when weighting synthesis using any one of the matrices for weighting synthesis according to the first method using Equation (308), the first method using Equation (309), the first method using Equation (310), the second method using Equation (308), the second method using Equation (309), and the second method using Equation (310) is performed, the signal points in the in-phase I-quadrature Q plane of weighting synthesized signal 204A do not overlap and are widely spread apart.

Accordingly, when the base station or AP transmits transmission signal 108_A and in the terminal, which is the communication partner, the reception power of either of z1(2i−1) or z1(2i) is low, taking into consideration the state of the signal points described above, it is possible to achieve the advantageous effect of an improvement in data reception quality by the terminal.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment D6

Next, a variation of Embodiment D1 will be described. A weighting synthesis method used in weighting synthesizer 203 in FIG. 91 when mapped signal 201A (s1(t)) is 64QAM (or π/2 shift 64QAM) will be described.

When signal processor 106 in FIG. 90 has the configuration illustrated in FIG. 91, in one example of matrix F for weighting synthesis to be used by weighting synthesizer 203, the following may be applied.

[MATH. 313]

$$F = \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$ Equation (313)

or

[MATH. 314]

$$F = \frac{\beta}{\sqrt{\alpha^2+1}} \begin{pmatrix} e^{j\theta_{11}} & \alpha \times e^{j(\theta_{11}+\delta)} \\ \alpha \times e^{j\theta_{21}} & e^{j(\theta_{21}+\pi+\delta)} \end{pmatrix}$$ Equation (314)

or

[MATH. 315]

$$F = \begin{pmatrix} \beta \times e^{j\theta_{11}} & \beta \times \alpha \times e^{j(\theta_{11}+\delta)} \\ \beta \times \alpha \times e^{j\theta_{21}} & \beta \times e^{j(\theta_{21}+\pi+\delta)} \end{pmatrix}$$ Equation (315)

As a first method, in Equation (313), Equation (314), and Equation (315), α is defined as follows.

[MATH. 316]

α=8 Equation (316)

ß may be a real number, and, alternatively, may be an imaginary number. θ11 is a real number, θ21 is a real number, and δ is a real number.

As a second method, in Equation (313), Equation (314), and Equation (315), α is defined as follows.

[MATH. 317]

α=⅛ Equation (317)

ß may be a real number, and, alternatively, may be an imaginary number. θ11 is a real number, θ21 is a real number, and δ is a real number.

In weighting synthesizer 203, when weighting synthesis using any one of the matrices for weighting synthesis according to the first method using Equation (313), the first method using Equation (314), the first method using Equation (315), the second method using Equation (313), the second method using Equation (314), and the second method using Equation (315) is performed, the signal points in the in-phase I-quadrature Q plane of weighting synthesized signal 204A do not overlap and are widely spread apart. Accordingly, when the base station or AP transmits transmission signal 108_A and in the terminal, which is the communication partner, the reception power of either of $z1(2i-1)$ or $z1(2i)$ is low, taking into consideration the state of the signal points described above, it is possible to achieve the advantageous effect of an improvement in data reception quality by the terminal.

When the matrices for weighting synthesis are set as described above, it is possible to achieve an advantageous effect of an improvement in data reception quality in the terminal, which is the communication partner of the base station or AP. Note that this embodiment may be combined with other embodiments.

Embodiment E1

In this embodiment, the configuration of a transmission device that supports both the transmission method described in the present specification of transmitting a plurality of signals generated by precoding a plurality of modulated signal from a plurality of antennas at the same time and frequency and the transmission method described from Embodiments D1 through D6 of differing at least one of frequency and time of a plurality of weighting synthesized signals generated by performing weighting synthesis on a plurality of modulated signal and transmitting the signals from at least one antenna.

As described in Embodiment A8, the configuration of the transmission device in the base station or AP is the configuration illustrated in FIG. 1 or FIG. 44. Note that the transmission device in the base station may be configured to be capable of implementing both the method of generating a plurality of signals from data encoded by the single error correction encoder illustrated in FIG. 1 and the method of generating a plurality of signals from data encoded by the plurality of error correction encoders illustrated in FIG. 44.

Radio unit 107_A and radio unit 107_B in FIG. 1 and FIG. 44 include, for example, the configurations illustrated in FIG. 3 or FIG. 55. When radio unit 107_A and radio unit 107_B have the configuration illustrated in FIG. 55, they can selectively switch between a single-carrier scheme and an OFDM scheme. Note that since operations pertaining to FIG. 3 have already been described in an embodiment in detail and operations pertaining to FIG. 55 have already been described in Embodiment A8 in detail, description will be omitted from this embodiment.

The transmission device in the base station or AP switches between transmission using the transmission method described in the present specification of transmitting a plurality of signals generated by precoding a plurality of modulated signal from a plurality of antennas at the same time and frequency and the transmission method described from Embodiments D1 through D6 of differing at least one of frequency and time of a plurality of weighting synthesized signals generated by performing weighting synthesis on a plurality of modulated signal and transmitting the signals from at least one antenna.

For example, upon single stream modulated signal transmission described in Embodiment A8, the transmission device in the base station or AP performs transmission using the transmission method described from Embodiments D1 through D6 of differing at least one of frequency and time of a plurality of weighting synthesized signals generated by performing weighting synthesis on a plurality of modulated signal and transmitting the signals from at least one antenna.

Since operations performed by the transmission device in the base station or AP for transmitting a plurality of modulated signals for a plurality of streams have already been described in Embodiment A8, description will be omitted from this embodiment.

The transmission device in the base station or AP may use, as precoding processes to be implemented in transmission of a plurality of modulated signals for a plurality of streams, the precoding processes expressed by the matrix F that represents the weighting synthesis processes implemented in single stream modulated signal transmission. For example, the transmission device in the base station or AP performs the precoding processes illustrated in Equation (248) in transmission of a plurality of modulated signals for a plurality of streams, and performs the weighting synthesis processes illustrated in Equation (248) in single stream modulated signal transmission.

With such a configuration, since the precoding processes implemented in transmission of a plurality of modulated signals for a plurality of streams and the weighting synthesis processes implemented in single stream modulated signal transmission are the same, the transmission device in the base station or AP reduce the scale of circuitry used compared to when different matrices F are used for the precoding processes and the weighting synthesis.

Moreover, in the above description, an example is given in which the matrix F representing the precoding processes and the weighting synthesis processes is exemplified as the matrix F illustrated in Equation (248), but even if the matrix F representing the precoding processes and the weighting synthesis processes is another matrix F described in the present disclosure, it can be implemented in the same manner, as a matter of course.

Moreover, operations performed by the transmission device in the base station or AP in transmission of a plurality of modulated signals for a plurality of streams are not limited to the examples in Embodiment A8. The transmission device included in the base station or AP can implement transmission of a plurality of modulated signals for a plurality of streams using arbitrary configurations and operations described in other embodiments for transmitting a plurality of transmission signals generated from the plurality of modulated signals from a plurality of antennas at the same frequency and time. For example, the transmission device in the base station or AP may include the configuration illustrated in FIG. 73 and described in Embodiment A10.

Next, the reception device included in the terminal will be described.

The reception device in the terminal that receives the signal transmitted by the transmission device in the base station or AP using transmission of a plurality of modulated signals for a plurality of streams performs operations for reception and demodulation of received signals that support the method of transmission of a plurality of modulated signals for a plurality of streams described in other embodiments, and obtains the transmitted data.

The reception device in the terminal that receives the signal transmitted by the transmission device in the base station or AP using single stream modulated signal transmission includes, for example, the configuration illustrated in FIG. 41. Signal processor 4109 uses both or at least one of the received plurality of weighting synthesized signals, performs demodulation and error correction decoding according to the weighting synthesis processed implemented on the signal(s), and obtains the transmitted data. As operations have already been described in Embodiment A4 in detail, description will be omitted from this embodiment. The reception device in the terminal described here can be applied in the same manner as described in Embodiments D1 through D6.

Note that the transmission device in the base station or AP may use, as precoding processes to be implemented in transmission of a plurality of modulated signals for a plurality of streams, a single precoding method selected from among a plurality of precoding methods expressed by mutually different matrices F. Similarly, the transmission device in the base station or AP may us, as weighting synthesis processes to be implemented in single stream modulated signal transmission, a single weighting synthesis method selected from among a plurality of weighting synthesis methods expressed by mutually different matrices F. Here, if the matrix F expressing at least one of the precoding methods selectable by the transmission device in the base station or AP is the same as the matrix F expressing a weighting synthesis method selectable by the transmission device in the base station or AP, the transmission device in the base station or AP can reduce the scale of the circuitry used.

A first transmission device according to one aspect of the present embodiment described above performs transmission in a transmission mode selected from among a plurality of transmission modes including a first transmission mode and a second transmission mode. In the first transmission mode, a first transmission signal and a second transmission signal generated by implementing first signal processing on a first modulated signal and a second modulated signal are transmitted from a plurality of antennas at the same frequency and same time. In the second transmission mode, a third transmission signal and a fourth transmission signal generated by implementing second signal processing on a third modulated signal and a fourth modulated signal are transmitted from at least one antenna at different frequencies, different times, or different frequencies and times. The first signal processing and the second signal processing include weighting synthesis defined by the same matrix F.

A second transmission device according to another aspect of the present embodiment generates a first transmission signal and a second transmission signal by implementing predetermined signal processing including weighting synthesis defined by a matrix F on a first modulated signal and a second modulated signal. In a first transmission mode, the first transmission signal and the second transmission signal are transmitted from a plurality of antennas at the same frequency and the same time, and in a second transmission mode, the first transmission signal and the second transmission signal are transmitted from at least one antenna at different frequencies, different times, or different frequencies and times.

Embodiment F1

In this embodiment, using the examples described in Embodiment A1. Embodiment A2, Embodiment A4, and Embodiment A11, another implementation method for operations performed by the terminal will be given.

FIG. 23 illustrates one example of a configuration of the base station or AP. As this example has already been described, repeated description will be omitted.

FIG. 24 illustrates one example of a configuration of a terminal, which is the communication partner of the base station or AP. As this example has already been described, repeated description will be omitted.

FIG. 34 illustrates one example of a system configuration in a state in which base station or AP 3401 and terminal 3402 are communicating. As this example has already been described in Embodiment A1, Embodiment A2, Embodiment A4, and Embodiment A11, repeated description will be omitted.

Figure 94:
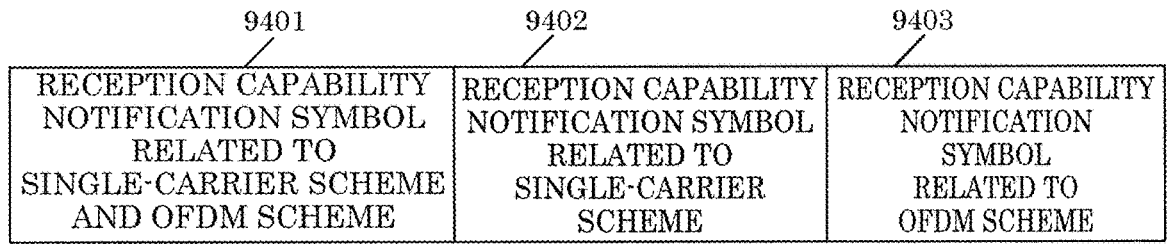
FIG. 94 illustrates a specific example of a reception capability notification symbol transmitted by the terminal illustrated in FIG. 35.

FIG. 35 illustrates an example of communication between the base station or AP 3401 and terminal 3402 illustrated in FIG. 34. As this example has already been described in Embodiment A1, Embodiment A2, Embodiment A4, and Embodiment A11, repeated description will be omitted FIG. 94 illustrates a specific example of a configuration of reception capability notification symbol 3502 transmitted by the terminal illustrated in FIG. 35.

Before moving onto the description of FIG. 94, first, a configuration in which the terminal is provided as a terminal that communicates with the base station or AP will be described.

In this embodiment, there is a possibility that the following types of terminals exist.

Terminal Type #1:

Terminal Type #1 can demodulate single-carrier scheme and single stream transmission modulated signals.

Terminal Type #2:

Terminal Type #2 can demodulate single-carrier scheme and single stream transmission modulated signals. Additionally, Terminal Type #2 can receive and demodulate single-carrier scheme modulated signals transmitted from a plurality of antennas by the communication partner.

Terminal Type #3:

Terminal Type #3 can demodulate single-carrier scheme and single stream transmission modulated signals. Additionally, Terminal Type #3 can demodulate OFDM scheme and single stream transmission modulated signals.

Terminal Type #4:

Terminal Type #4 can demodulate single-carrier scheme and single stream transmission modulated signals. Additionally, Terminal Type #4 can receive and demodulate single-carrier scheme modulated signals transmitted from a plurality of antennas by the communication partner. Additionally, Terminal Type #4 can demodulate OFDM scheme and single stream transmission modulated signals. Additionally, Terminal Type #4 can receive and demodulate OFDM scheme modulated signals transmitted from a plurality of antennas by the communication partner.

Terminal Type #5:

Terminal Type #5 can demodulate OFDM scheme and single stream transmission modulated signals.

Terminal Type #6:

Terminal Type #6 can demodulate OFDM scheme and single stream transmission modulated signals. Additionally, Terminal Type #6 can receive and demodulate OFDM scheme modulated signals transmitted from a plurality of antennas by the communication partner.

In this embodiment, for example, Terminal Type #1 through Terminal Type #6 are capable of communicating with the base station or AP and vice versa. However, the base station or AP may communicate with a type of terminal other than Terminal Type #1 through Terminal Type #6.

In view of this, disclosed is a reception capability notification symbol such as the one illustrated in FIG. 94.

FIG. 94 illustrates a specific example of a configuration of reception capability notification symbol 3502 transmitted by the terminal illustrated in FIG. 35.

As illustrated in FIG. 94, reception capability notification symbols include reception capability notification symbol 9401 related to single-carrier scheme and OFDM scheme, reception capability notification symbol 9402 related to single-carrier scheme, and reception capability notification symbol 9403 related to OFDM scheme. Note that reception capability notification symbols other than those illustrated in FIG. 94 may be included.

Reception capability notification symbol 9401 related to single-carrier scheme and OFDM scheme includes data for notifying the communication partner (in this case, for example, the base station or AP) of the reception capability of both the single-carrier scheme modulated signal and the OFDM scheme modulated signal.

Reception capability notification symbol 9402 related to single-carrier scheme includes data for notifying the communication partner (in this case, for example, the base station or AP) of the reception capability of the single-carrier scheme modulated signal.

Reception capability notification symbol 9403 related to OFDM scheme includes data for notifying the communication partner (in this case, for example, the base station or AP) of the reception capability of the OFDM scheme modulated signal.

Figure 95:
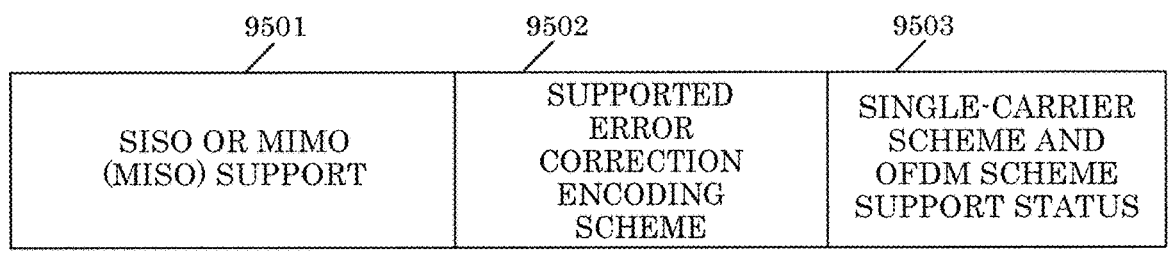
FIG. 95 illustrates one example of a configuration of the reception capability notification symbol related to a single-carrier scheme and an OFDM scheme illustrated in FIG. 94.

FIG. 95 illustrates an example of reception capability notification symbol 9401 related to single-carrier scheme and OFDM scheme illustrated in FIG. 94.

Reception capability notification symbol 9401 related to single-carrier scheme and OFDM scheme illustrated in FIG. 94 includes data related to SISO or MIMO (MISO) support 9501, data related to supported error correction encoding scheme 9502, and data related to single-carrier scheme and OFDM scheme support status 9503.

When data related to SISO or MIMO (MISO) support 9501 is indicated by g0 and g1, for example, when the communication partner of the terminal transmits a single stream modulated signal and the terminal can demodulate such a modulated signal, the terminal sets g0 to 1 (g0=1) and sets g1 to 0 (g1=0), and transmits a reception capability notification symbol including g0 and g1.

When the communication partner of the terminal transmits a plurality of different modulated signals from a plurality of antennas and the terminal can demodulate such modulated signals, the terminal sets g0 to 0 (g0=0) and sets g1 to 1 (g1=1), and transmits a reception capability notification symbol including g0 and g1.

When the communication partner of the terminal transmits a single stream modulated signal and the terminal can demodulate such a modulated signal and when the communication partner of the terminal transmits a plurality of different modulated signal from a plurality of antennas and the terminal can demodulate such modulated signals, the terminal sets g0 to 1 (g0=1) and sets g1 to 1 (g1=1), and transmits a reception capability notification symbol including g0 and g1.

When data related to supported error correction encoding scheme 9502 is g2, for example, when the terminal is capable of error correction decoding first error correction encoding scheme data, the terminal sets g2 to 0 (g2=0), and transmits a reception capability notification symbol including g2.

When the terminal is capable of error correction decoding first error correction encoding scheme data and capable of error correction decoding second error correction encoding scheme data, the terminal sets g2 to 1 (g2=1), and transmits a reception capability notification symbol including g2.

As another example, assume that each of the terminals is capable of error correction decoding first error correction encoding scheme data. Furthermore, when the terminal is capable of error correction decoding second error correction encoding scheme data, the terminal sets g2 to 1 (g2=1), and when the terminal is not capable of error correction decoding second error correction encoding scheme data, the terminal sets g2 to 0 (g2=0). Note that the terminal transmits a reception capability notification symbol including g2.

Note that the first error correction encoding scheme and the second error correction encoding scheme are different schemes. For example, assume that the block length (code length) of the first error correction encoding scheme is A bits (A is an integer that is greater than or equal to 2) and the block length (code length) of the second error correction encoding scheme is B bits (B is an integer that is greater than or equal to 2), and that A≠B. However, the example of different schemes i not limited to this example; it is sufficient if the error correction code used in the first error correction encoding scheme and the error correction code used in the second error correction encoding scheme are different.

When the data related to single-carrier scheme and OFDM scheme support status 9503 is expressed as g3 and g4, for example, when the terminal is capable of demodulating a single-carrier scheme modulated signal, the terminal sets g3 to 1 (g3=1) and sets g4 to 0 (g4=0) (here, the terminal does not support demodulation of an OFDM modulated signal), and the terminal transmits a reception capability notification symbol including g3 and g4.

When the terminal is capable of demodulating an OFDM scheme modulated signal, the terminal sets g3 to 0 (g3=0) and sets g4 to 1 (g4=1) (in this case, the terminal does not support demodulation of a single-carrier scheme modulated signal), and the terminal transmits a reception capability notification symbol including g3 and g4.

When the terminal is capable of demodulating a single-carrier scheme modulated signal and capable of demodulating an OFDM scheme modulated signal, the terminal sets g3 to 1 (g3=1) and sets g4 to 1 (g4=1), and transmits a reception capability notification symbol including g3 and g4.

Figure 96:
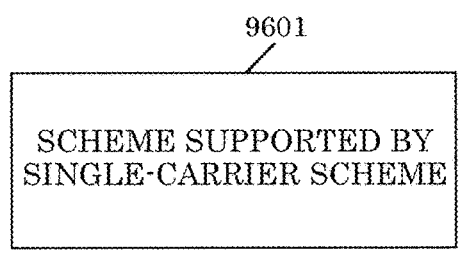
FIG. 96 illustrates one example of a configuration of the reception capability notification symbol related to a single-carrier scheme illustrated in FIG. 94.

FIG. 96 illustrates an example of a configuration of reception capability notification symbol 9402 related to a single-carrier scheme illustrated in FIG. 94.

Reception capability notification symbol 9402 related to a single-carrier scheme illustrated in FIG. 94 includes data related to scheme 9601 supported by a single-carrier scheme.

When data related to scheme 9601 supported by a single-carrier scheme is expressed as h0 and h1, for example, when the communication partner of the terminal performs channel bonding and transmits a modulated signal, if the terminal is capable of demodulating such a modulated signal, the terminal sets h0 to 1 (h0=1) and if the terminal does not support demodulation of such a modulated signal, the terminal sets h0 to 0 (h0=0), and then the terminal transmits a reception capability notification symbol including h0.

When the communication partner of the terminal performs channel aggregation and transmits a modulated signal, if the terminal is capable of demodulating such a modulated signal, the terminal sets h1 to 1 (h1=1) and if the terminal does not support demodulation of such a modulated signal, the terminal sets h1 to 0 (h1=0), and then the terminal transmits a reception capability notification symbol including h1.

Note that when the terminal sets g3 described above to 0 and sets g4 described above to 1, since the terminal does not support demodulation of a single-carrier scheme modulated signal, the bit (field) indicated by h0 becomes a null bit (field), and the bit (field) indicated by h1 becomes a null bit (field).

Note that when the terminal sets g3 to 0 and sets g4 to 1, h0 and h1 described above may be predefined as reserved (held for future use) bits (fields), and the terminal may determine h0 and h1 described above to be null bits (fields) (may determine h0 or h1 described above to be null bits (fields)), and the base station or AP may obtain h0 and h1 described above but determine h0 and h1 to be null bits (fields) (determine h0 or h1 to be null bits (fields)).

In the above description, it is described that the terminal may set g3 to 0 and set g4 to 1, in other words, the terminal may not support demodulation of a single-carrier scheme modulated signal, but an embodiment in which each of the terminals supports single-carrier scheme demodulation is possible. In such cases, the bit (field) expressed by g3 described above is not required.

Figure 97:
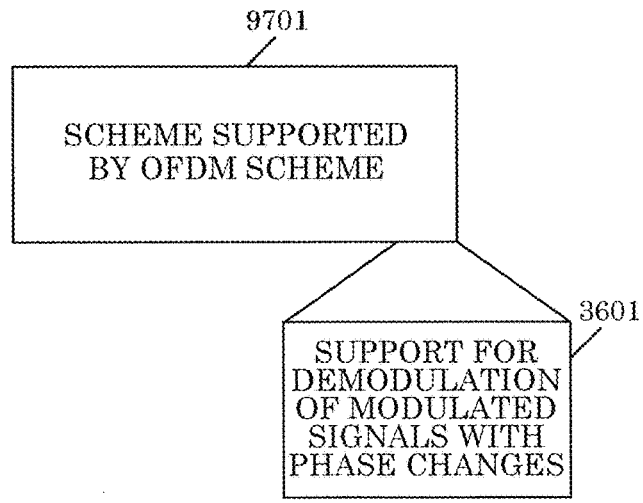
FIG. 97 illustrates one example of a configuration of the reception capability notification symbol related to an OFDM scheme illustrated in FIG. 94.

FIG. 97 illustrates an example of a configuration of reception capability notification symbol 9403 related to OFDM scheme illustrated in FIG. 94.

Reception capability notification symbol 9403 related to an OFDM scheme illustrated in FIG. 94 includes data related to scheme 9701 supported by an OFDM scheme.

Data related to scheme 9701 supported by an OFDM scheme includes data 3601 related to support for demodulation of modulated signals with phase changes illustrated in, for example, FIG. 36, FIG. 38, and FIG. 79. Note that since data 3601 related to support for demodulation of modulated signals with phase changes has already been described in Embodiments A1, A2, A4, A11, etc., repeated description herein will be omitted.

When data 3601 related to support for demodulation of modulated signals with phase changes is expressed as k0, for example, when the communication partner of the terminal generates modulated signals, implements phase change processing, and transmits the generated modulated signals from a plurality of antennas, if the terminal is capable of demodulating such modulated signals, the terminal sets k0 to 1 (k0=1), and if the terminal does not support demodulation of such modulated signal, the terminal sets k0 to 0 (k0=0), and then the terminal transmits a reception capability notification symbol including k0.

Note that when the terminal sets g3 described above to 1 and sets g4 described above to 0, since the terminal does not support demodulation of an OFDM scheme modulated signal, the bit (field) indicated by k0 becomes a null bit (field).

When the terminal sets g3 to 1 and sets g4 to 0, k0 described above may be predefined as a reserved (held for future use) bit (field), and the terminal may determine k0 described above to be a null bit (field), and the base station or AP may obtain k0 described above but determine k0 to be a null bit (field).

In the above description, an embodiment is possible in which each of the terminals supports single-carrier scheme demodulation. In such cases, the bit (field) expressed by g3 described above is not required.

The base station that receives the reception capability notification symbol transmitted by the terminal in the above description generates and transmits modulated signals based on the received reception capability notification symbol so that the terminal can receive a transmission signal that can be demodulated. Note that specific examples of operations performed by the base station can be found in, for example, Embodiment A1, Embodiment A2, Embodiment A4, and Embodiment A11.

If the above is implemented, the following exemplary features can be achieved.

Feature #1:

A first reception device, characterized in that:
  the first reception device generates control information indicating a signal that is receivable by the first reception device and including first, second, third, and fourth regions;
  the first region is configured to store information indicating whether a signal for transmitting data generated using a single-carrier scheme is receivable or not, and information indicating whether a signal generated using a multi-carrier scheme is receivable or not;
  the second region is configured to store information for each of one or more schemes that can be used when the signal is generated using the single-carrier scheme, can be used when the signal is generated using the multi-carrier scheme, or can be used in both cases, the information indicating whether the signal generated using said scheme is receivable;
  the third region:
    is configured to, when the first region stores information indicating that the signal for transmitting data generated using the single-carrier scheme is receivable, store information for each of one or more schemes that can be used when the signal is generated using the single-carrier scheme, the information indicating whether the signal generated using said scheme is receivable; and
    is configured to be a null or reserved region when the first region stores information indicating that the signal for transmitting data generated using the single-carrier scheme is not receivable,
  the fourth region:
    is configured to, when the first region stores information indicating that the signal for transmitting data generated using the multi-carrier scheme is receivable, store information for each of one or more schemes that can be used when the signal is generated using the multi-carrier scheme, the information indicating whether the signal generated using said scheme is receivable; and
    is configured to be a null or reserved region when the first region stores information indicating that the signal for transmitting data generated using the multi-carrier scheme is not receivable; and
  the first reception device is configured to generate a control signal based on the control information and transmit the control signal to a transmission device.

The first reception device described above, characterized in that:
  the second region includes a fifth region configured to store information indicating whether a signal generated using a multiple-input multiple-output (MIMO) scheme is receivable or not;
  the second or fourth region includes a sixth region configured to store information indicating whether a signal generated using a phase change scheme that implements a phase change while regularly changing a phase change value is receivable or not, for at least one of transmission system signals that transmit data; and the first reception device is configured to set a bit in the sixth region to a predetermined value when (i) the first region stores information indicating that the signal for transmitting data generated using the multi-carrier scheme is not receivable or when (ii) the first region stores information indicating that the signal for transmitting data generated using the multi-carrier scheme is receivable and the fifth region stores information indicating that the signal generated using the MIMO scheme is not receivable.

A first transmission device, configured to:

receive the control signal from the first reception device described above;

demodulate the received control signal to obtain the control signal; and based on the control signal, determine a scheme to be used to generate a signal to be transmitted to the reception device.

The first transmission device described above, characterized in that:

the second region includes a fifth region configured to store information indicating whether a signal generated using a multiple-input multiple-output (MIMO) scheme is receivable or not;

the second or fourth region includes a sixth region configured to store information indicating whether a signal generated using a phase change scheme that implements a phase change while regularly changing a phase change value is receivable or not, for at least one of transmission system signals that transmit data; and the first transmission device is configured to determine a scheme to be used to generate a signal to be transmitted to the reception device, without using a value of a bit in the sixth region, when (i) the first region includes information indicating that the signal for transmitting data generated using the multi-carrier scheme is not receivable or when (ii) the first region includes information indicating that the signal for transmitting data generated using the multi-carrier scheme is receivable and the fifth region includes information indicating that the signal generated using the MIMO scheme is not receivable.

Feature #2:

A second reception device, characterized in that:

the second reception device generates control information indicating a signal that is receivable by the first reception device and including first, second, third, and fourth regions;

the first region is configured to store information indicating whether a signal for transmitting data generated using a multi-carrier scheme is receivable or not;

the second region is configured to store information for each of one or more schemes that can be used when the signal is generated using the single-carrier scheme, can be used when the signal is generated using the multi-carrier scheme, or can be used in both cases, the information indicating whether the signal generated using said scheme is receivable;

the third region is configured to store information for each of one or more schemes that can be used when the signal is generated using the single-carrier scheme, the information indicating whether the signal generated using said scheme is receivable;

the fourth region:

is configured to, when the first region stores information indicating that the signal for transmitting data generated using the multi-carrier scheme is receivable, store information for each of one or more schemes that can be used when the signal is generated using the multi-carrier scheme, the information indicating whether the signal generated using said scheme is receivable; and is configured to be a null or reserved region when the first region stores information indicating that the signal for transmitting data generated using the multi-carrier scheme is not receivable; and the second reception device is configured to generate a control signal based on the control information and transmit the control signal to a transmission device.

The second reception device described above, characterized in that:

the second region includes a fifth region configured to store information indicating whether a signal generated using a multiple-input multiple-output (MIMO) scheme is receivable or not;

the second or fourth region includes a sixth region configured to store information indicating whether a signal generated using a phase change scheme that implements a phase change while regularly changing a phase change value is receivable or not, for at least one of transmission system signals that transmit data; and the second reception device is configured to set a bit in the sixth region to a predetermined value when (i) the first region stores information indicating that the signal for transmitting data generated using the multi-carrier scheme is not receivable or when (ii) the first region stores information indicating that the signal for transmitting data generated using the multi-carrier scheme is receivable and the fifth region stores information indicating that the signal generated using the MIMO scheme is not receivable.

A second transmission device, configured to:

receive the control signal from the first reception device described above;

demodulate the received control signal to obtain the control signal; and based on the control signal, determine a scheme to be used to generate a signal to be transmitted to the reception device.

The second transmission device described above, characterized in that:

the second region includes a fifth region configured to store information indicating whether a signal generated using a multiple-input multiple-output (MIMO) scheme is receivable or not;

the second or fourth region includes a sixth region configured to store information indicating whether a signal generated using a phase change scheme that implements a phase change while regularly changing a phase change value is receivable or not, for at least one of transmission system signals that transmit data; and the second transmission device is configured to determine a scheme to be used to generate a signal to be transmitted to the second reception device, without using a value of a bit in the sixth region, when (i) the first region includes information indicating that the signal for transmitting data generated using the multi-carrier scheme is not receivable or when (ii) the first region includes information indicating that the signal for transmitting data generated using the multi-carrier scheme is receivable and the fifth region includes information indicating that the signal generated using the MIMO scheme is not receivable.

Note that in this embodiment, the configuration of reception capability notification symbol 3502 in FIG. 35 is exemplified as the configuration illustrated in FIG. 94, but the configuration is not limited to this example; for example, a different reception capability notification symbol may be included in FIG. 94. For example, the configuration may be the one illustrated in FIG. 98.

Figure 98:
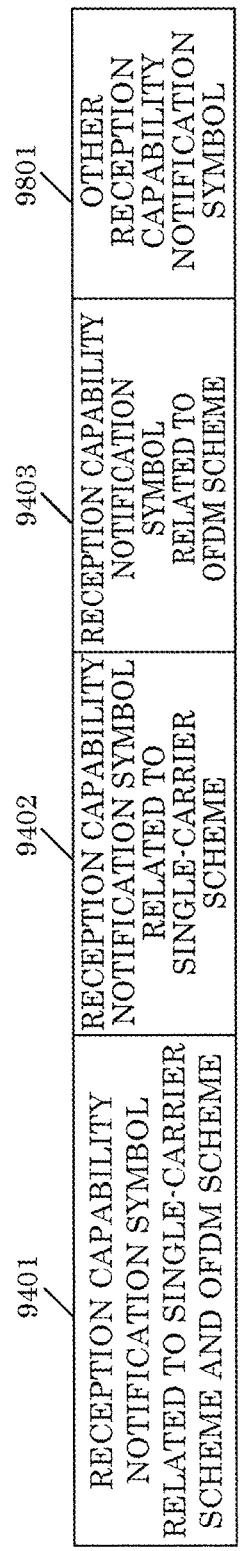
FIG. 98 illustrates a specific example of a reception capability notification symbol transmitted by the terminal illustrated in FIG. 35.

In FIG. 98, components that operate the same as in FIG. 94 share like reference marks. Accordingly, repeated description thereof will be omitted. In FIG. 98, other reception capability notification symbol 9801 is added as a reception capability notification symbol.

Other reception capability notification symbol 9801 is, for example, a reception capability notification symbol that does not correspond to reception capability notification symbol 9401 related to a single-carrier scheme and an OFDM scheme, does not correspond to reception capability notification symbol 9402 related to a single-carrier scheme, and does not correspond to reception capability notification symbol 9403 related to an OFDM scheme.

Even such a reception capability notification symbol can be implemented in the same manner as described above.

Moreover, in FIG. 94, the order of the reception capability notification symbols is exemplified as: reception capability notification symbol 9401 related to a single-carrier scheme and an OFDM scheme, reception capability notification symbol 9402 related to a single-carrier scheme, and reception capability notification symbol 9403 related to an OFDM scheme, but the order is not limited to this example. An alternative example will be given next.

In FIG. 94, suppose bits r0, r1, r2, and r3 are provided as reception capability notification symbol 9401 related to a single-carrier scheme and an OFDM scheme. In FIG. 94, suppose bits r4, r5, r6, and r7 are provided as reception capability notification symbol 9402 related to a single-carrier scheme. In FIG. 94, suppose bits r8, r9, r10, and r11 are provided as reception capability notification symbol 9403 related to an OFDM scheme.

In this example, in FIG. 94, assume bits r1, r2, r3, r4, r5, r6, r7, r8, r9, r10, and r11 are arranged in the stated order, and, for example, are arranged in the stated order in a frame.

As one alternative example, bits r1, r2, r3, r4, r5, r6, r7, r8, r9, r10, and r11 may be reorganized, such as in the order of bits r7, r2, r4, r6, r1, r8, r9, r5, r10, r3, and r11, and arranged in the stated order in a frame. Note that the order in which the bits are arranged is not limited to these arrangements.

Moreover, in FIG. 94, suppose fields s0, s1, s2, and s3 are provided as reception capability notification symbol 9401 related to a single-carrier scheme and an OFDM scheme. In FIG. 94, suppose fields s4, s5, s6, and s7 are provided as reception capability notification symbol 9402 related to a single-carrier scheme. In FIG. 94, suppose fields s8, s9, s10, and s11 are provided as reception capability notification symbol 9403 related to an OFDM scheme. Note that a field is configured of one or more bits.

In this example, in FIG. 94, assume fields s1, s2, s3, s4, s5, s6, s7, s8, 89, s10, and s11 are arranged in the stated order, and, for example, are arranged in the stated order in a frame.

As one alternative example, fields s1, s2, s3, s4, s5, s6, s7, s8, s9, s10, and s11 may be reorganized, such as in the order of fields s7, s2, s4, s6, s1, s8, s9, s5, s10, s3, and s11, and arranged in the stated order in a frame. Note that the order in which the fields are arranged is not limited to these arrangements.

Moreover, in FIG. 98, the order of the reception capability notification symbols is exemplified as: reception capability notification symbol 9401 related to a single-carrier scheme and an OFDM scheme, reception capability notification symbol 9402 related to a single-carrier scheme, reception capability notification symbol 9403 related to an OFDM scheme, and other reception capability notification symbol 9801, but the order is not limited to this example. An alternative example will be given next.

In FIG. 98, suppose bits r0, r1, r2, and r3 are provided as reception capability notification symbol 9401 related to a single-carrier scheme and an OFDM scheme. In FIG. 98, suppose bits r4, r5, r6, and r7 are provided as reception capability notification symbol 9402 related to a single-carrier scheme. In FIG. 98, suppose bits r8, r9, r10, and r11 are provided as reception capability notification symbol 9403 related to an OFDM scheme, and suppose bits r12, r13, r14, and r15 are provided as other reception capability notification symbol 9801.

In this example, in FIG. 98 assume bits r1, r2, r3, r4, r5, r6, r7, r8, r9, r10, r11, r12, r13, r14, and r15 are arranged in the stated order, and, for example, are arranged in the stated order in a frame As one alternative example, bits r1, r2, r3, r4, r5, r6, r7, r8, r9, r10, r11, r12, r13, r14, and r15 may be reorganized, such as in the order of bits r7, r2, r4, r6, r13, r1, r8, r12, r9, r5, r10, r3, r15, r11, and r14, and arranged in the stated order in a frame. Note that the order in which the bits are arranged is not limited to these arrangements.

Moreover, in FIG. 98, suppose fields s0, s1, s2, and s3 are provided as reception capability notification symbol 9401 related to a single-carrier scheme and an OFDM scheme. In FIG. 98, suppose fields s4, s5, s6, and s7 are provided as reception capability notification symbol 9402 related to a single-carrier scheme. In FIG. 98, suppose fields s8, s9, s10, and s11 are provided as reception capability notification symbol 9403 related to an OFDM scheme, and suppose fields s12, s13, s14, and s15 are provided as other reception capability notification symbol 9801. Note that a field is configured of one or more bits.

In this example, in FIG. 98, assume fields s1, s2, s3, s4, s5, s6, s7, s8, 89, s10, s11, s12, s13, s14, and s15 are arranged in the stated order, and, for example, are arranged in the stated order in a frame.

As one alternative example, fields s1, s2, s3, s4, s5, s6, s7, s8, s9, s10, s11, s12, s13, s14, and s15 may be reorganized, such as in the order of fields s7, s2, s4, s6, s13, s1, s8, s12, s9, s5, s10, s3, s15, s11, and s14, and arranged in the stated order in a frame. Note that the order in which the fields are arranged is not limited to these arrangements.

Note that information transmitted in a reception capability notification symbol related to a single-carrier scheme may not be explicitly indicated as information for a single-carrier scheme. The information transmitted in a reception capability notification symbol related to a single-carrier scheme described in this embodiment is, for example, information for notifying a selectable scheme when the transmission device transmits a signal via a single-carrier scheme. In another example, the information transmitted in a reception capability notification symbol related to a single-carrier scheme described in this embodiment is, in the case that the transmission device transmits signals using a scheme other than a single-carrier scheme, such as an OFDM scheme, not used (i.e., ignored) in the selection of a scheme to be used for signal transmission. In yet another example, the information transmitted in a reception capability notification symbol related to a single-carrier scheme described in this embodiment is, in the case that, for example, the reception device does not support reception of a single-carrier scheme signal (in the case that the transmission device is notified that the reception device does not support such reception), information that is transmitted in a region determined to be a null or reserved region by the transmission device or the reception device. As described above, although such a reception capability notification symbol is referred to as reception capability notification symbol 9402 related to a single-carrier scheme, this is merely one non-limiting example; such a reception capability notification symbol may be referred to as something else. For example, such a symbol may be referred to as a symbol for indicating reception ability of a (first) terminal. Moreover, reception capability notification symbol 9402 related to a single-carrier scheme may include information other than information for notifying of a receivable signal.

Similarly, information transmitted in a reception capability notification symbol related to an OFDM scheme may not be explicitly indicated as information for an OFDM scheme. The information transmitted in a reception capability notification symbol related to an OFDM scheme described in this embodiment is, for example, information for notifying a selectable scheme when the transmission device transmits a signal via an OFDM scheme. In another example, the information transmitted in a reception capability notification symbol related to an OFDM scheme described in this embodiment is, in the case that the transmission device transmits signals using a scheme other than an OFDM scheme, such as a single-carrier scheme, not used (i.e., ignored) in the selection of a scheme to be used for signal transmission. In yet another example, the information transmitted in a reception capability notification symbol related to an OFDM scheme described in this embodiment is, in the case that, for example, the reception device does not support reception of an OFDM scheme signal, information that is transmitted in a region determined to be a null or reserved region by the transmission device or the reception device. As described above, although such a reception capability notification symbol is referred to as reception capability notification symbol 9403 related to an OFDM scheme, this is merely one non-limiting example; such a reception capability notification symbol may be referred to as something else. For example, such a symbol may be referred to as a symbol for indicating reception ability of a (second) terminal. Moreover, reception capability notification symbol 9403 related to an OFDM scheme may include information other than information for notifying of a receivable signal.

Although reception capability notification symbol 9401 related to a single-carrier scheme and an OFDM scheme is referred to as such, this is merely one non-limiting example; such a reception capability notification symbol may be referred to as something else. For example, such a symbol may be referred to as a symbol for indicating reception ability of a (third) terminal. Moreover, reception capability notification symbol 9401 related to a single-carrier scheme and an OFDM scheme may include information other than information for notifying of a receivable signal.

As described above, by forming a reception capability notification symbol, transmitting the reception capability notification symbol via a terminal, the base station receiving the reception capability notification symbol, referring to the validity indicated by the value of the reception capability notification symbol, generating and transmitting a modulated signal, the terminal can receive a modulated signal that can be demodulated, making it possible to accurately obtain data and thus achieve an advantageous effect of an improvement in data reception quality. Moreover, the terminal can determine the validity indicated by each of the bits (fields) of the reception capability notification symbol while generating data for each of the bits (fields), thus making it possible to transmit the reception capability notification symbol to the base station with certainty, thus making it possible to achieve the advantageous effect of an improvement in communication quality.

Embodiment G1

In this embodiment, additional information pertaining to Embodiment A1, Embodiment A2, Embodiment A4, and Embodiment A11 will be given.

As illustrated in FIG. 37 and FIG. 38, the terminal transmits, to the base station or AP, which is the communication partner of the terminal, data related to information 3702 related to support for reception of a plurality of streams, as a part of the reception capability notification symbol.

In Embodiments A1, A2, A4, A11, etc., the terminology "data related to information 3702 related to support for reception of a plurality of streams" is used, but this is merely a non-limiting example; any reception capability notification symbol that can identify whether there is support for reception of a plurality of streams or not can be implemented in the same manner. This will be discussed below.

For example, consider a modulation and coding scheme (MCS), such as the ones described below.

MCS #1:
Data symbol transmission via error correction encoding scheme #A, modulation scheme QPSK, and single stream transmission. This makes it possible to realize transmission speeds of 10 Mbps (bps: bits per second).

MCS #2:
Data symbol transmission via error correction encoding scheme #A, modulation scheme 16QAM, and single stream transmission. This makes it possible to realize transmission speeds of 20 Mbps.

MCS #3:
Data symbol transmission via error correction encoding scheme #B, modulation scheme QPSK, and single stream transmission. This makes it possible to realize transmission speeds of 15 Mbps.

MCS #4:
Data symbol transmission via error correction encoding scheme #B, modulation scheme 16QAM, and single stream transmission. This makes it possible to realize transmission speeds of 30 Mbps.

MCS #5:
Data symbol transmission via error correction encoding scheme #A, modulation scheme QPSK, and transmission of a plurality of streams from a plurality of antennas. This makes it possible to realize transmission speeds of Mbps (bps: bits per second).

MCS #6:
Data symbol transmission via error correction encoding scheme #A, modulation scheme 16QAM, and transmission of a plurality of streams from a plurality of antennas. This makes it possible to realize transmission speeds of Mbps.

MCS #7:
Data symbol transmission via error correction encoding scheme #B, modulation scheme QPSK, and transmission of a plurality of streams from a plurality of antennas. This makes it possible to realize transmission speeds of Mbps.

MCS #8:

Data symbol transmission via error correction encoding scheme #B, modulation scheme 16QAM, and transmission of a plurality of streams from a plurality of antennas. This makes it possible to realize transmission speeds of 60 Mbps.

Here, the terminal transmits information, via the reception capability notification symbol, to the base station or AP, which is the communication partner, indicating that demodulation for MCS #1, MCS #2, MCS #3, and MCS #4 is possible, or that demodulation for MCS #1, MCS #2, MCS #3, MCS #4, MCS #5, MCS #6, MCS #7, and MCS #8 is possible. In such cases, the communication partner is notified that demodulation for single stream transmission is possible or the communication partner is notified that demodulation for single stream is possible and demodulation for transmission of a plurality of streams from a plurality of antennas is possible, which achieves the same function as the notification via information 3702 related to support for reception of a plurality of streams.

However, when the terminal notifies, via a reception capability notification symbol, the base station or AP, which is the communication partner, of an MCS set that the terminal can demodulate, there is an advantage that the terminal can notify the base station or AP, which is the communication partner, of details regarding the MCS set that the terminal can demodulate.

Moreover, in FIG. 35, an example of communication between base station or AP 3401 and terminal 3402 in FIG. 34 is illustrated, but the configuration of communication between base station or AP 3401 and terminal 3402 is not limited to the example illustrated in FIG. 35. For example, in Embodiments A1, A2, A4, A11, F1, etc., the transmission of a reception capability notification symbol by a terminal to a communication partner (for example, a base station or AP) is a critical aspect of the present disclosure, and it is this that allows for the advantageous effects described in the embodiments to be achieved. Here, communication between the terminal and the communication partner of the terminal before transmission of the reception capability notification symbol by the terminal to the communication partner is not limited to the example illustrated in FIG. 35.

OTHER VARIATIONS, ETC.

Note that in the present specification, processed signal 106_A illustrated in, for example, FIG. 1, FIG. 44, and FIG. 73 may be transmitted from a plurality of antennas, and processed signal 106_B illustrated in, for example, FIG. 1, FIG. 44, and FIG. 73 may be transmitted from a plurality of antennas. Note that a configuration in which processed signal 106_A includes any one of, for example, signals 204A, 206A, 208A, and 210A is conceivable. Moreover, a configuration in which processed signal 106_B includes any one of, for example, signals 204B, 206B, 208B, and 210B is conceivable.

For example, assume there are N transmitting antennas, i.e., transmitting antennas 1 through N are provided. Note that N is an integer that is greater than or equal to 2. Here, the modulated signal transmitted from transmitting antenna k is expressed as ck. Note that k is an integer that is greater than or equal to 1 and less than or equal to N. Moreover, assume that vector C including c1 through cN is expressed as $C=(c1, c2 \ldots cN)^T$. Note that transposed vector A is expressed as $A^T$. Here, when the precoding matrix (weighting matrix) is G, the following expression holds true.

[MATH. 318]

$$C = G \begin{pmatrix} d_a^{(i)} \\ d_b^{(i)} \end{pmatrix} \quad \text{Equation (318)}$$

Note that da(i) is processed signal 106_A, db(i) is processed signal 106_B, and i is a symbol number. Moreover, G is a matrix having N rows and 2 columns, and may be a function of i. Moreover, G may be switched at some given timing (i.e., may be a function of frequency or time).

Moreover, "processed signal 106_A is transmitted from a plurality of transmitting antennas and processed signal 106_B is also transmitted from a plurality of transmitting antennas" and "processed signal 106_A is transmitted from a single transmitting antenna and processed signal 106_B is also transmitted from a single transmitting antenna" may be switched in the transmission device. Regarding the timing of the switching, the switching may be performed per frame, and the switching may be performed in accordance with the decision to transmit a modulated signal (may be any arbitrary timing).

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely applied to communications systems that transmit modulated signals from a plurality of antennas.

What is claimed is:
1. A transmitting device comprising:
a processor configured to:
generate a first precoded signal and a second precoded signal by performing a precoding process on a first baseband signal and a second baseband signal, respectively;
generate a first signal by inserting a pilot signal into the first precoded signal;
apply a phase change of $i \times \Delta\lambda$ to the second precoded signal, where i is a symbol number and an integer that is greater than or equal to 0, and $\Delta\lambda = \pi - \pi/m$ radians, where m is an integer that is greater than 3;
insert a pilot signal into the second precoded signal applied with the phase change; and
generate a second signal by applying a phase change to the second precoded signal applied with the phase change and inserted with the pilot signal, and
a transmitter configured to transmit the first signal and the second signal.
2. A receiving device comprising:
a receiver configured to receive a first signal and a second signal; and
a processor configured to generate a first baseband signal and a second baseband signal by performing a receiving process on the first signal and the second signal, the receiving process corresponding to a transmitting process, wherein the transmitting process includes:
- generating a first precoded signal and a second precoded signal by performing a precoding process on the first baseband signal and the second baseband signal, respectively;
- generating the first signal by inserting a pilot signal into the first precoded signal;
- applying a phase change of $i \times \Delta\lambda$ to the second precoded signal, where i is a symbol number and an integer that is greater than or equal to 0, and $\Delta\lambda = \pi - \pi/m$ radians, where m is an integer that is greater than 3;
- inserting a pilot signal into the second precoded signal applied with the phase change;
- generating the second signal by applying a phase change to the second precoded signal applied with the phase change and inserted with the pilot signal; and
- transmitting the first signal and the second signal.

3. A non-transitory computer readable medium storing a program configured to cause a transmitting device to perform:
- generating a first precoded signal and a second precoded signal by performing a precoding process on a first baseband signal and a second baseband signal, respectively;
- generating a first signal by inserting a pilot signal into the first precoded signal;
- applying a phase change of $i \times \Delta\lambda$ to the second precoded signal, where i is a symbol number and an integer that is greater than or equal to 0, and $\Delta\lambda = \pi - \pi/m$ radians, where m is an integer that is greater than 3;
- inserting a pilot signal into the second precoded signal applied with the phase change;
- generating a second signal by applying a phase change to the second precoded signal applied with the phase change and inserted with the pilot signal; and
- transmitting the first signal and the second signal.

\* \* \* \* \*